US012551547B2

(12) United States Patent
Walker et al.

(10) Patent No.: US 12,551,547 B2
(45) Date of Patent: Feb. 17, 2026

(54) HIGHLY NETWORKED IMMUNOGEN COMPOSITION

(71) Applicants: The General Hospital Corporation, Boston, MA (US); Massachusetts Eye and Ear Infirmary, Boston, MA (US)

(72) Inventors: Bruce D. Walker, Nahant, MA (US); Gaurav D. Gaiha, Somerville, MA (US); Elizabeth Rossin, Charlestown, MA (US)

(73) Assignees: The General Hospital Corporation, Boston, MA (US); Massachusetts Eye and Ear Infirmary, Boston, MA (US)

( * ) Notice: Subject to any disclaimer, the term of this patent is extended or adjusted under 35 U.S.C. 154(b) by 223 days.

(21) Appl. No.: 17/437,470

(22) PCT Filed: Mar. 12, 2020

(86) PCT No.: PCT/US2020/022403

§ 371 (c)(1),
(2) Date: Sep. 9, 2021

(87) PCT Pub. No.: WO2020/186064

PCT Pub. Date: Sep. 17, 2020

(65) Prior Publication Data

US 2022/0323570 A1 Oct. 13, 2022

Related U.S. Application Data

(60) Provisional application No. 62/817,094, filed on Mar. 12, 2019.

(51) Int. Cl.
*A61K 39/21* (2006.01)
*A61P 31/18* (2006.01)
*A61P 37/04* (2006.01)

(52) U.S. Cl.
CPC .............. *A61K 39/21* (2013.01); *A61P 31/18* (2018.01); *A61P 37/04* (2018.01)

(58) Field of Classification Search
CPC ........... A61K 39/21; A61P 37/04; A61P 31/18
See application file for complete search history.

(56) References Cited

U.S. PATENT DOCUMENTS 6,974,574 B2 * 12/2005 Walker ................. C07K 14/005 424/188.1
6,982,086 B2 * 1/2006 Haynes ................ C07K 14/005 424/188.1
6,994,851 B1 * 2/2006 Kundig .................. A61K 40/32 435/7.92
10,369,204 B2 * 8/2019 Schøller ........... C07K 14/70539
2004/0001845 A1 * 1/2004 Altfeld ................. C07K 14/005 424/188.1
2006/0153858 A1 7/2006 Kundig et al.
2007/0248584 A1 * 10/2007 Kent ....................... A61P 17/14 424/278.1
2008/0044484 A1 * 2/2008 Minev ..................... A61P 35/00 514/19.5
2008/0206270 A1 8/2008 Minev
2012/0258126 A1 * 10/2012 Scholler ............... A61K 47/646 424/190.1
2015/0329617 A1 * 11/2015 Winther ........... G01N 33/56977 435/325
2020/0138938 A1 * 5/2020 Wegmann ............... A61P 31/18
2021/0196806 A1 * 7/2021 Yelensky ................ A61P 35/00

FOREIGN PATENT DOCUMENTS

WO WO-2004/085466 A2 10/2004
WO WO-2016081859 A2 * 5/2016 ............ A61K 39/12

OTHER PUBLICATIONS

Gaiha et al., "Targeting Highly Networked CTL Epitopes as a Mechanism of Elite HIV-1 Control," Conference on Retroviruses and Opportunistic Infections, Mar. 4-7, Boston, MA, Abstract No. 232LB (2018) (2 pages).
International Search Report and Written Opinion for International Application No. PCT/US2020/022403, mailed Jul. 31, 2020 (17 pages).
Gaiha et al., "Structural topology defines protective CD8+ T cell epitopes in the HIV proteome," Available in PMC Nov. 14, 2019, published in final edited form as: Science. 364(6439):480-484 (May 3, 2019) (11 pages).
Goulder et al., "Novel, cross-restricted, conserved, and immunodominant cytotoxic T lymphocyte epitopes in slow progressors in HIV type 1 infection," AIDS Res Hum Retroviruses. 12(18):1691-8 (Dec. 10, 1996).
Hanke et al., "Design and construction of an experimental HIV-1 vaccine for a year-2000 clinical trial in Kenya," Nat Med. 6(9):951-5 (Sep. 2000).

(Continued)

*Primary Examiner* — Janet L Andres
*Assistant Examiner* — Carey Alexander Stuart
(74) *Attorney, Agent, or Firm* — Clark & Elbing LLP

(57) ABSTRACT

A method of preventing or treating HIV in a subject includes selecting two or more HIV CTL epitopes from an HIV proteome that have a network score that meets a threshold value. The network score for a given epitope can be determined by generating at least one network representing protein structure, calculating a set of network parameters, combining the network parameters to determine a network score for each amino acid residue in the protein structure, generating a network score for each of a plurality of epitopes as a weighted linear combination of the amino acid residues of the epitopes, and selecting two or more epitopes according to their network score. An effective amount of a T cell immunogen composition and a pharmaceutically acceptable carrier is administered to the subject. The T cell immunogen composition includes the two or more selected HIV CTL epitopes.

20 Claims, 35 Drawing Sheets

Specification includes a Sequence Listing.

(56) References Cited

OTHER PUBLICATIONS

Nathan et al., "Structure-guided T cell vaccine design for SARS-COV-2 variants and sarbecoviruses," Cell. 184(17): 4401-4413.e10 (Aug. 19, 2021) (25 pages).

* cited by examiner

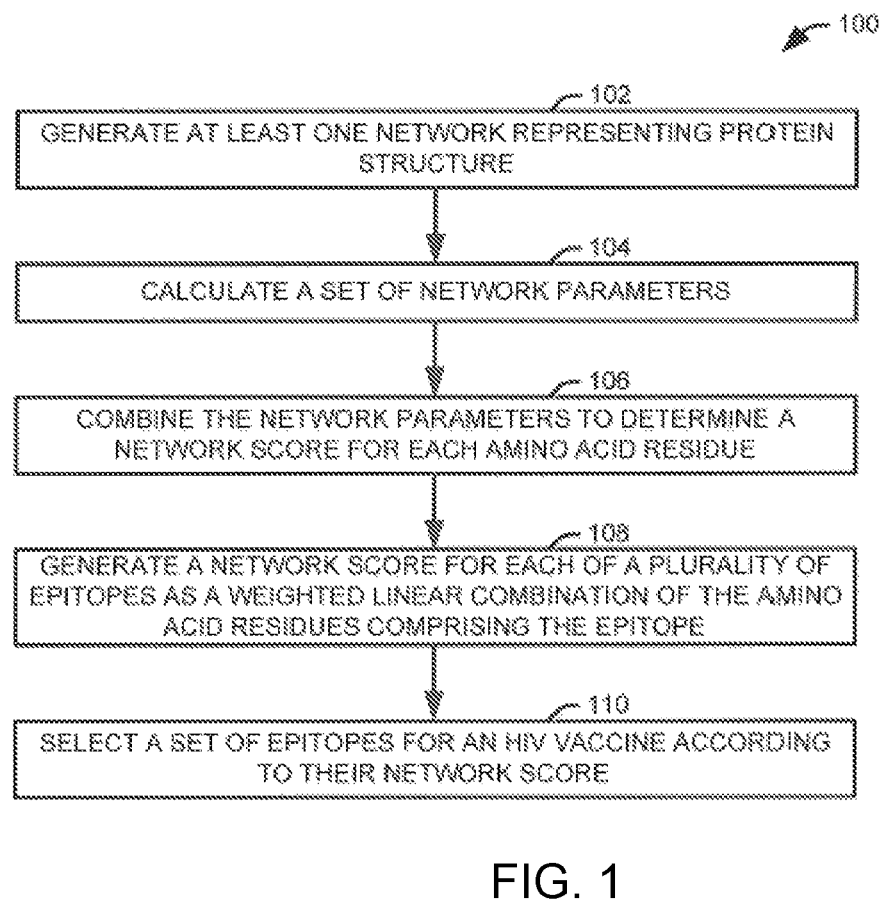

100

102 GENERATE AT LEAST ONE NETWORK REPRESENTING PROTEIN STRUCTURE

104 CALCULATE A SET OF NETWORK PARAMETERS

106 COMBINE THE NETWORK PARAMETERS TO DETERMINE A NETWORK SCORE FOR EACH AMINO ACID RESIDUE

108 GENERATE A NETWORK SCORE FOR EACH OF A PLURALITY OF EPITOPES AS A WEIGHTED LINEAR COMBINATION OF THE AMINO ACID RESIDUES COMPRISING THE EPITOPE

110 SELECT A SET OF EPITOPES FOR AN HIV VACCINE ACCORDING TO THEIR NETWORK SCORE

FIG. 1

Figure 7:
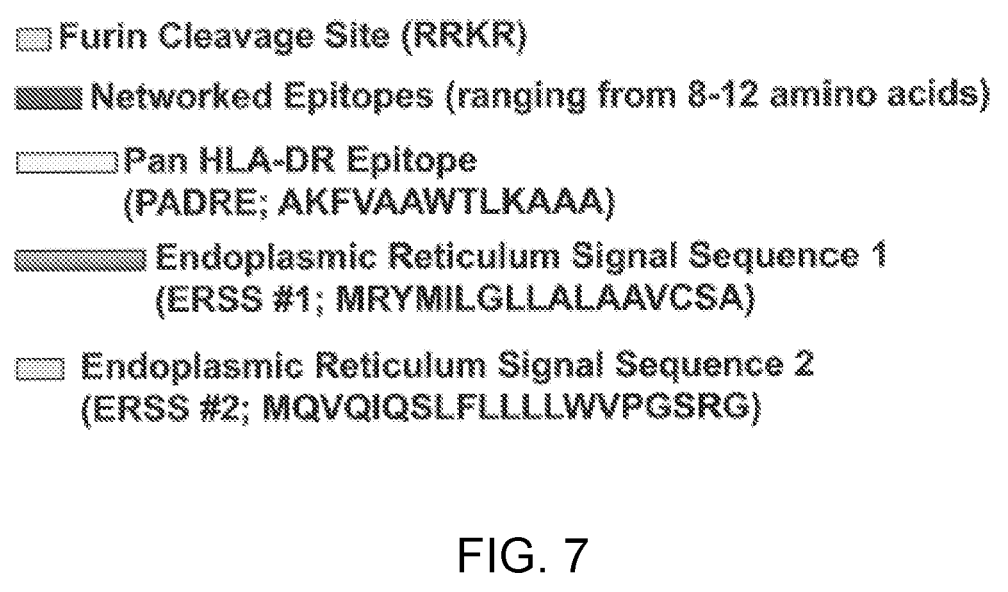

Furin Cleavage Site (RRKR)

Networked Epitopes (ranging from 8-12 amino acids)

Pan HLA-DR Epitope (PADRE; AKFVAAWTLKAAA)

Endoplasmic Reticulum Signal Sequence 1 (ERSS #1; MRYMILGLLALAAVCSA)

Endoplasmic Reticulum Signal Sequence 2 (ERSS #2; MQVQIQSLFLLLLWVPGSRG)

HLA-A2 Multi-Epitope
A*02 KL9 | A*02 SL9 | A*02 YL9 | A*02 IV9 | A*02 VL9 | TAG
ERISS | Furin Cleavage PADRE+ HLA-A2 Multi-Epitope
SS | PADRE | A*02 KL9 | A*02 SL9 | A*02 YL9 | A*02 IV9 | A*02 VL9 | TAG HLA-B57 Multi-Epitope
B*57 KF11 | B*57 IW9 | B*57 HW9 | B*57 QW9 | B*57 TW10 | TAG PADRE+ HLA-B57 Multi-Epitope
SS | PADRE | B*57 KF11 | B*57 IW9 | B*57 HW9 | B*57 QW9 | B*57 TW10 | TAG

B

A
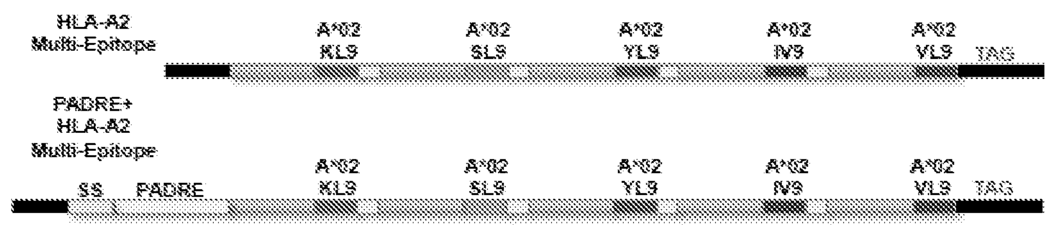
B
2 mRNA Constructs: HLA-A2 Antigen, HLA-A2 Antigen + PADRE
Vaccination: Prime-Boost of 4ug at Days 0 and 14
Analysis: ELISpot at 28 days
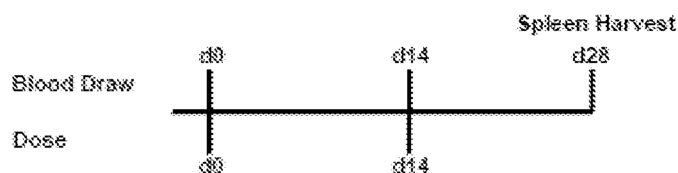
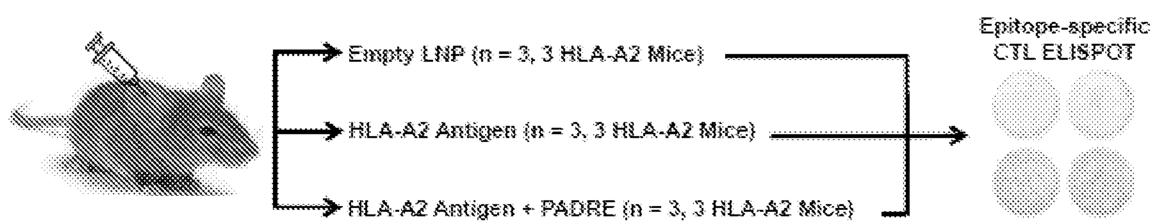
C
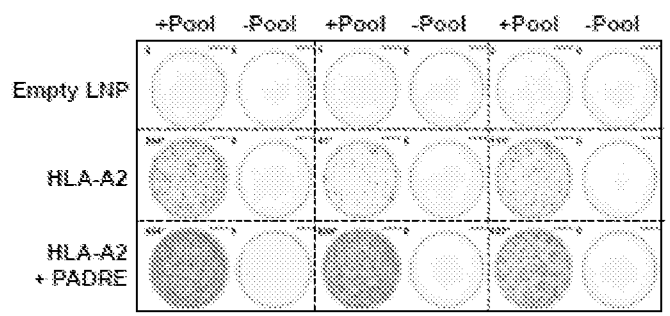
D
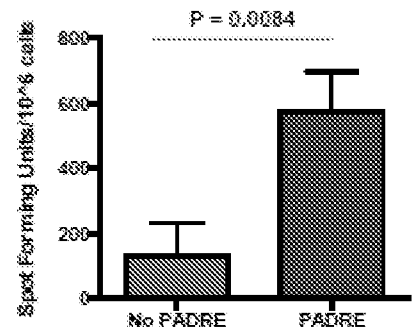
FIG. 16A – FIG. 16D A
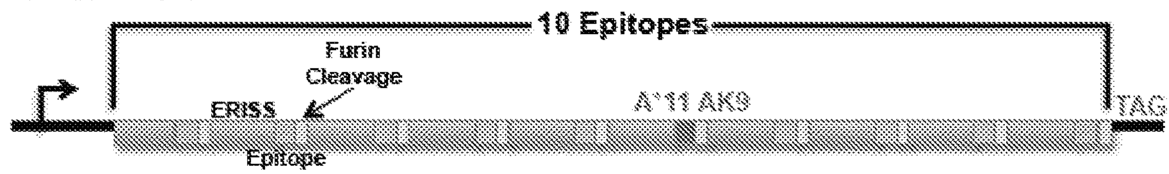
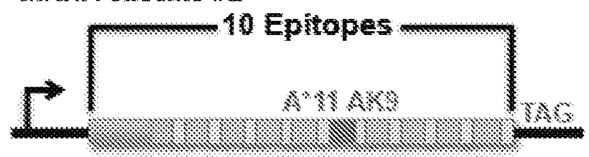
B
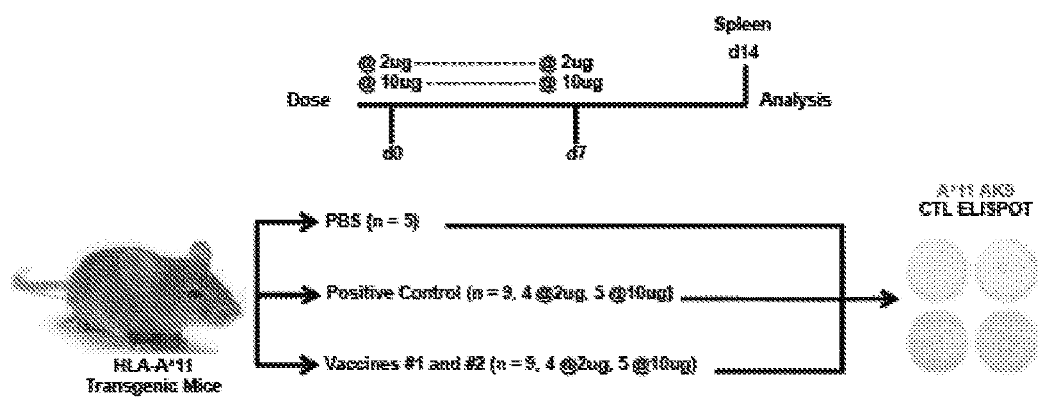
C
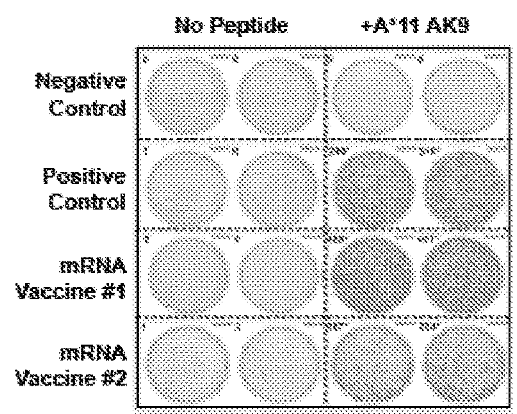
D
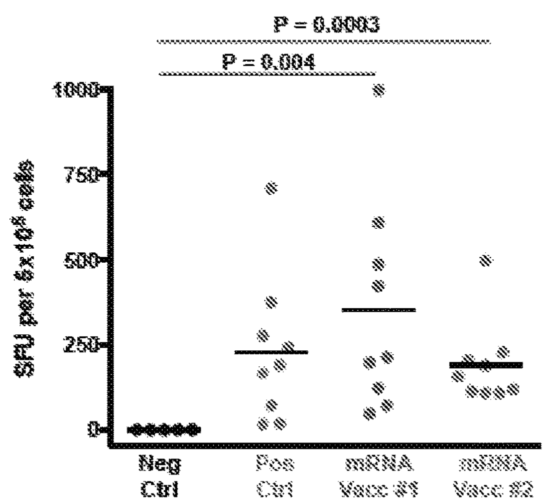
FIG. 20A – FIG. 20D

| | Epitope | Protein | HXB2 start | HXB2 end | Subprotein | HXB2 DNA Contig | Subtype | Species | HLA | Network Score | Normalized Network Score |
|---|---|---|---|---|---|---|---|---|---|---|---|
| SEQ ID NO. 1 | RRGWEVLKY | gp160 | 787 | 795 | gp41(276-284) | 8583..8609 | | human | A*0101 | N/A | N/A |
| SEQ ID NO. 2 | YFPDWQNYT | Nef | 120 | 128 | Nef(120-128) | 9154..9180 | | human | A*0101 | 3.060087534 | 6.086846728 |
| SEQ ID NO. 3 | ISERILSTY* | Rev | 55 | 63 | Rev(55-63) | 8455..8591 | | human | A*0101 | 0.803545805 | 3.830304999 |
| SEQ ID NO. 4 | GSEELRSLY* | Gag | 71 | 79 | p17(71-79) | 999..1026 | | human | A*0101 | 0.14522733 | 3.171986524 |
| SEQ ID NO. 5 | WRFDSRLAFH* | Nef | 183 | 192 | Nef(183-192) | 9343..9369 | | human | A*0101 | -0.353471971 | 2.673287222 |
| SEQ ID NO. 6 | YTAFTIPSV | Pol | 282 | 290 | RT(127-135) | 2928..2954 | | human | A*02 | 2.394567223 | 5.421326417 |
| SEQ ID NO. 7 | FLGKIWPSYK | Gag | 433 | 442 | p2p7p1p6(70-79) | 2086..2115 | | human | A*0201 | N/A | N/A |
| SEQ ID NO. 8 | LLNATDIAV | gp160 | 814 | 822 | gp41(303-311) | 8664..8690 | B | human | A*0201 | N/A | N/A |
| SEQ ID NO. 9 | SLLNATDIAV | gp160 | 813 | 822 | gp41(302-311) | 8661..8690 | B | human | A*0201 | N/A | N/A |
| SEQ ID NO. 10 | PLTFGWCYKL | Nef | 136 | 145 | Nef | 9202..9231 | B | human | A*0201 | 5.746962516 | 8.773721709 |
| SEQ ID NO. 11 | KLTPLCVTL | gp160 | 121 | 129 | gp120(121-129) | 6585..6611 | B | human | A*0201 | 4.960429547 | 7.987188741 |
| SEQ ID NO. 12 | LVGPTPVNI | Pol | 132 | 140 | Protease(76-84) | 2478..2504 | | human | A*0201 | 3.797001102 | 6.823760295 |
| SEQ ID NO. 13 | VIYQYMDDL | Pol | 334 | 342 | RT(179-187) | 3084..3110 | B | human | A*0201 | 3.60095608 | 6.627715273 |
| SEQ ID NO. 14 | RGPGRAFVTI | gp160 | 311 | 320 | gp120(311-320) | 7155..7184 | | human | A*0201 | 1.720592969 | 4.747352163 |
| SEQ ID NO. 15 | AIIRILQQL | Vpr | 59 | 67 | Vpr | 5733..5759 | B | human | A*0201 | 1.661354788 | 4.688113981 |
| SEQ ID NO. 16 | SLYNTVATLY | Gag | 77 | 86 | p17(77-86) | 1018..1047 | B | human | A*0201 | 1.138662033 | 4.165421226 |
| SEQ ID NO. 17 | VLEWRFDSRL | Nef | 180 | 189 | Nef | 9334..9363 | B | human | A*0201 | 1.006003707 | 4.032762901 |
| SEQ ID NO. 18 | ALVEICTEM | Pol | 188 | 196 | RT(33-41) | 2646..2672 | B | human | A*0201 | -0.269150589 | 2.757608605 |
| SEQ ID NO. 19 | ILKEPVHGV | Pol | 464 | 472 | RT(309-317) | 3474..3500 | B | human | A*0201 | -1.400795807 | 1.625963387 |
| SEQ ID NO. 20 | SLYNTVATL | Gag | 77 | 85 | p17(77-85) | 1018..1044 | B | human | A*0201, A*0202, A*0205 | 2.883986479 | 5.910745673 |
| SEQ ID NO. 21 | RIRQGLERA | gp160 | 846 | 854 | gp41(335-343) | 8760..8786 | | human | A*0205 | N/A | N/A |
| SEQ ID NO. 22 | GAFDLSFFL | Nef | 83 | 91 | Nef | 9043..9069 | | human | A*0205 | 0.392004278 | 3.418763472 |
| SEQ ID NO. 23 | YVDRFYKTL | Gag | 296 | 304 | p24(164-172) | 1675..1701 | | human | A*0207 | 6.027027002 | 9.053786196 |
| SEQ ID NO. 24 | GIPHPAGLK | Pol | 248 | 256 | RT(93-101) | 2826..2852 | B | human | A*0301 | 4.43963387 | 7.466393064 |
| SEQ ID NO. 25 | QIYPGIKVR | Pol | 424 | 432 | RT(269-277) | 3354..3380 | B | human | A*0301 | 2.33844146 | 5.365200654 |
| SEQ ID NO. 26 | KLVDFRELNK | Pol | 228 | 237 | RT(73-82) | 2766..2795 | | human | A*0301 | 2.08304127 | 5.109800463 |
| SEQ ID NO. 27 | KTKPPLPSVKK | Vif | 158 | 168 | Vif | 5512..5544 | | human | A*0301 | 1.59079733 | 4.617556524 |
| SEQ ID NO. 28 | RIRTWKSLVK | Vif | 17 | 26 | Vif | 5089..5118 | B | human | A*0301 | 0.971759084 | 3.998518278 |

FIG. 21A

| | | | | | | | | | | | |
|---|---|---|---|---|---|---|---|---|---|---|---|
| SEQ ID NO. 29 | RMRGAHTNDVK | Pol | 511 | 521 | RT(356-366) | 3615..3647 | | human | A*0301 | 0.772966938 | 3.799726131 |
| SEQ ID NO. 30 | RLRPGGKKKY | Gag | 20 | 29 | p17(20-29) | 847..876 | B | human | A*0301 | -0.071375434 | 2.95538376 |
| SEQ ID NO. 31 | HMYISKKAK | Vif | 28 | 36 | Vif | 5122..5148 | | human | A*0301 | -0.341622403 | 2.685136791 |
| SEQ ID NO. 32 | ALVEICTEMEK | Pol | 188 | 198 | RT(33-43) | 2646..2678 | | human | A*0301 | -0.743381207 | 2.283377987 |
| SEQ ID NO. 33 | KIRLRPGGK | Gag | 18 | 26 | p17(18-26) | 841..867 | | human | A*0301 | -1.056320581 | 1.970438613 |
| SEQ ID NO. 34 | RLRPGGKKK | Gag | 20 | 28 | p17(20-28) | 847..873 | | human | A*0301 | -1.191932274 | 1.83482692 |
| SEQ ID NO. 35 | ERILSTYLGR | Rev | 57 | 66 | Rev | 8471..8500 | | human | A*0301 | -1.308339612 | 1.718419582 |
| SEQ ID NO. 36 | TVYYGVPVWK | gp160 | 37 | 46 | gp120(37-46) | 6333..6362 | B | human | A*0301 | -1.673817956 | 1.352941238 |
| SEQ ID NO. 37 | AVFIHNFKRK | Pol | 894 | 903 | Integrase(179-188) | 4764..4793 | B | human | A*0301, A*1101 | 2.605801134 | 5.632560328 |
| SEQ ID NO. 38 | AIFQSSMTK | Pol | 313 | 321 | RT(158-166) | 3021..3047 | B | human | A*0301, A*1101 | 1.992185927 | 5.01894512 |
| SEQ ID NO. 39 | QVPLRPMTYK | Nef | 73 | 82 | Nef | 9013..9042 | B | human | A*0301, A*1101 | -0.295694443 | 2.731064751 |
| SEQ ID NO. 40 | AVDLSHFLK | Nef | 84 | 92 | Nef | 9046..9072 | B | human | A*0301, A*1101 | -0.944994052 | 2.081765142 |
| SEQ ID NO. 41 | RLRDLLLIVTR | gp160 | 770 | 780 | gp41(259-269) | 8532..8564 | B | human | A*0301, A*3101 | N/A | N/A |
| SEQ ID NO. 42 | IIATDIQTK | Pol | 918 | 926 | Integrase(203-211) | 4836..4862 | B | human | A*11 | 0.217647487 | 3.244406681 |
| SEQ ID NO. 43 | ACQGVGGPGHK | Gag | 349 | 359 | p24(217-227) | 1834..1866 | | human | A*1101 | 3.663595212 | 6.690354406 |
| SEQ ID NO. 44 | TLYCVHQK | Gag | 84 | 91 | p17(84-91) | 1039..1062 | | human | A*1101 | 1.572928884 | 4.599688077 |
| SEQ ID NO. 45 | QIIEQLIKK | Pol | 675 | 683 | RT(520-528) | 4107..4133 | B | human | A*1101 | 1.218951391 | 4.245710585 |
| SEQ ID NO. 46 | SVITQACPK | gp160 | 199 | 207 | gp120(199-207) | 6819..6845 | | human | A*1101 | 0.966148089 | 3.992907283 |
| SEQ ID NO. 47 | IYQEPFKNLK | Pol | 496 | 505 | RT(341-350) | 3570..3599 | B | human | A*1101 | 0.917746896 | 3.944506089 |
| SEQ ID NO. 48 | PLRPMTYK | Nef | 75 | 82 | Nef | 9019..9042 | B | human | A*1101 | 0.529379394 | 3.556138587 |
| SEQ ID NO. 49 | VYYDPSKDL | Pol | 472 | 481 | RT(317-325) | 3498…3525 | | human | A*24 | 0.592689363 | 3.619448557 |
| SEQ ID NO. 50 | RYPLTFGW | Nef | 134 | 141 | Nef | 9196..9219 | B | human | A*2402 | 4.7489895 | 7.775748694 |
| SEQ ID NO. 51 | KYKLKHIVW | Gag | 28 | 36 | p17(28-36) | 871..897 | B | human | A*2402 | -0.901341197 | 2.125417996 |
| SEQ ID NO. 52 | LFCASDAKAY | gp160 | 52 | 61 | gp120(52-61) | 6378..6407 | B | human | A*2402 | -1.573842813 | 1.452916381 |
| SEQ ID NO. 53 | RYLKDQQLL** | gp160 | 585 | 593 | gp41(74-82) | 7977..8003 | B | human | A*2402, A23 | -0.69927454 | 2.327484654 |
| SEQ ID NO. 54 | RDYVDRFYKTL | Gag | 294 | 304 | p24(162-172) | 1669..1701 | B | human | A*2402, B*4402 | 4.757708609 | 7.784467803 |
| SEQ ID NO. 55 | QAISPRTLNAW | Gag | 145 | 155 | p24(13-23) | 1222..1254 | B | human | A*2501 | 4.084358383 | 7.111117577 |
| SEQ ID NO. 56 | ETINEEAAEW | Gag | 203 | 212 | p24(71-80) | 1396..1425 | | human | A*2501 | 0.291258508 | 3.318017702 |

FIG. 21B

| | | | | | | | | | | | |
|---|---|---|---|---|---|---|---|---|---|---|---|
| SEQ ID NO. 57 | EIIGDIRQAY | gp160 | 321 | 330 | gp120(321-330) | 7185..7214 | | human | A*2501 | -0.357395982 | 2.669363212 |
| SEQ ID NO. 58 | ETKLGKAGY | Pol | 604 | 612 | RT(449-457) | 3894..3920 | | human | A*2601 | 1.113718738 | 4.140477932 |
| SEQ ID NO. 59 | EVIPMFSAL | Gag | 167 | 175 | p24(35-43) | 1288..1314 | B | human | A*2601, A*2602, A*2603 | 9.044273362 | 12.07103256 |
| SEQ ID NO. 60 | ETFYVDGAANR | Pol | 593 | 603 | RT(438-448) | 3861..3893 | | human | A*2601, A66 | 2.020331586 | 5.04709078 |
| SEQ ID NO. 61 | YFPDWQNYT | Nef | 120 | 128 | Nef | 9154..9180 | B | human | A*29, B*3501, B57, Cw6 | 3.508071216 | 6.534830409 |
| SEQ ID NO. 62 | SFEPIPIHY | gp160 | 209 | 217 | gp120(209-217) | 6849..6875 | B | human | A*2902 | 1.949997119 | 4.976756313 |
| SEQ ID NO. 63 | LYNTVATLY | Gag | 78 | 86 | p17(78-86) | 1021..1047 | | human | A*2902, B*4403 | 1.339010276 | 4.36576947 |
| SEQ ID NO. 64 | LVWASRELERF | Gag | 34 | 44 | p17(34-44) | 889..921 | | human | A*30 | -0.497383983 | 2.529375211 |
| SEQ ID NO. 65 | IVNRNRQGY | gp160 | 704 | 712 | gp41(193-201) | 8334..8360 | B | human | A*3002 | N/A | N/A |
| SEQ ID NO. 66 | KYCWNLLQY | gp160 | 794 | 802 | gp41(283-291) | 8604..8630 | B | human | A*3002 | N/A | N/A |
| SEQ ID NO. 67 | RMRGAHTNDV | Pol | 511 | 520 | RT(356-365) | 3615..3644 | | human | A*3002 | 2.025902863 | 5.052662057 |
| SEQ ID NO. 68 | KLNWASQIY | Pol | 418 | 426 | RT(263-271) | 3336..3362 | B | human | A*3002 | 0.943211808 | 3.969971002 |
| SEQ ID NO. 69 | HIGPGRAFY | gp160 | 310 | 318 | gp120(310-318) | 7152..7178 | | human | A*3002 | 0.80440848 | 3.831167674 |
| SEQ ID NO. 70 | KIQNFRVYY | Pol | 934 | 942 | Integrase(219-227) | 4884..4910 | | human | A*3002 | -1.109143982 | 1.917615212 |
| SEQ ID NO. 71 | RSLYNTVATLY | Gag | 76 | 86 | p17(76-86) | 1015..1047 | B | human | A*3002, B58, B63 | 0.544880913 | 3.571640107 |
| SEQ ID NO. 72 | KQNPDIVIY | Pol | 328 | 336 | RT(173-181) | 3066..3092 | B | human | A*3002, Cw*1202 | 3.50530105 | 6.532060244 |
| SEQ ID NO. 73 | PIQKETWETW | Pol | 547 | 556 | RT(392-401) | 3723..3752 | B | human | A*3201 | 5.58325795 | 8.610017144 |
| SEQ ID NO. 74 | RIKQIINMW | gp160 | 419 | 427 | gp120(419-427) | 7479..7505 | B | human | A*3201 | 4.362159955 | 7.388919148 |
| SEQ ID NO. 75 | TRYPLTFGW | Nef | 133 | 141 | Nef | 9193..9219 | | human | A*33, B*2702 | 5.103234906 | 8.1299941 |
| SEQ ID NO. 76 | EVAQRAYR | gp160 | 831 | 838 | gp41(320-327) | 8715..8738 | | human | A*3303 | N/A | N/A |
| SEQ ID NO. 77 | EYRKILRQR | Vpu | 29 | 37 | Vpu | 6146..6172 | | human | A*3303 | N/A | N/A |
| SEQ ID NO. 78 | VFAVLSIVNR | gp160 | 698 | 707 | gp41(187-196) | 8316..8345 | | human | A*3303 | N/A | N/A |
| SEQ ID NO. 79 | DTWAGVEAIIR | Vpr | 52 | 62 | Vpr | 5712..5744 | | human | A*6801 | 2.878351612 | 5.905110805 |
| SEQ ID NO. 80 | ITKGLGISYGR | Tat | 39 | 49 | Tat | 5945..5977 | | human | A*6801 | 0.735675293 | 3.762434487 |
| SEQ ID NO. 81 | IVTRIVELL | gp160 | 777 | 785 | gp41(266-274) | 8553..8579 | B | human | A*6802 | N/A | N/A |
| SEQ ID NO. 82 | GAETFYVDGA | Pol | 591 | 600 | RT(436-445) | 3855..3884 | | human | A*6802 | 2.734283518 | 5.761042712 |
| SEQ ID NO. 83 | DTVLEEWNL | Pol | 86 | 94 | Protease(30-38) | 2340..2366 | D | human | A*6802 | 2.730626785 | 5.757385978 |
| SEQ ID NO. 84 | ETYGDTWTGV | Vpr | 48 | 57 | Vpr | 5700..5729 | | human | A*6802 | 1.291604894 | 4.318364087 |

FIG. 21C

| | | | | | | | | | | | |
|---|---|---|---|---|---|---|---|---|---|---|---|
| SEQ ID NO. 85 | ITLWQRPLV | Pol | 59 | 67 | Protease(3-11) | 2259..2285 | A, B, D | human | A*6802, A*7401 | -0.527242198 | 2.499516996 |
| SEQ ID NO. 86 | RQDILDLWIY | Nef | 106 | 115 | Nef | 9115..9141 | B | human | B*07 | -0.928833882 | 2.097925312 |
| SEQ ID NO. 87 | IPRRIRQGL | gp160 | 843 | 851 | gp41(332-340) | 8751..8777 | B | human | B*0702 | N/A | N/A |
| SEQ ID NO. 88 | SPRTLNAWV | Gag | 148 | 156 | p24(16-24) | 1231..1257 | | human | B*0702 | 4.184862909 | 7.211622103 |
| SEQ ID NO. 89 | TPQVPLRPM | Nef | 71 | 79 | Nef | 9007..9033 | B | human | B*0702 | 2.723057093 | 5.749816287 |
| SEQ ID NO. 90 | GPGHKARVL | Gag | 355 | 363 | p24(223-231) | 1852..1878 | B | human | B*0702 | 2.076994736 | 5.10375393 |
| SEQ ID NO. 91 | FPVTPQVPLR | Nef | 68 | 77 | Nef | 8998..9027 | B | human | B*0702 | 0.944312509 | 3.971071703 |
| SEQ ID NO. 92 | FPVTPQVPL | Nef | 68 | 76 | Nef | 8998..9024 | | human | B*0702 | 0.450119158 | 3.476878351 |
| SEQ ID NO. 93 | RPNNNTRKSI | gp160 | 298 | 307 | gp120(298-307) | 7116..7145 | B | human | B*0702 | 0.371076289 | 3.397835483 |
| SEQ ID NO. 94 | RPMTYKAAL | Nef | 77 | 85 | Nef | 9025..9051 | B | human | B*0702 | -0.235912996 | 2.790846198 |
| SEQ ID NO. 95 | RPMTYKAAV | Nef | 77 | 85 | Nef | 9025..9051 | B | human | B*0702 | -0.235912996 | 2.790846198 |
| SEQ ID NO. 96 | HPRVSSEVHI | Vif | 48 | 57 | Vif | 5182..5211 | | human | B*0702 | -1.178931331 | 1.847827863 |
| SEQ ID NO. 97 | TPQDLNTML | Gag | 180 | 188 | p24(48-56) | 1327..1353 | B | human | B*0702, B*3910, B*4201, B*8101, Cw*0802 | 8.257391473 | 11.28415067 |
| SEQ ID NO. 98 | TPGPGVRYPL | Nef | 128 | 137 | Nef | 9178..9207 | B | human | B*0702, B*4201, B*4202 | 3.13225933 | 6.159018524 |
| SEQ ID NO. 99 | FPRIWLHGL | Vpr | 34 | 42 | Vpr | 5658..5684 | | human | B*0702, B*8101 | -0.078771235 | 2.947987959 |
| SEQ ID NO. 100 | RVKEKYQHL | gp160 | 2 | 10 | gp120(2-10) | 6228..6254 | | human | B*0801 | N/A | N/A |
| SEQ ID NO. 101 | DCKTILKAL | Gag | 329 | 337 | p24(197-205) | 1774..1800 | B | human | B*0801 | 2.687250263 | 5.714009456 |
| SEQ ID NO. 102 | EIYKRWII | Gag | 260 | 267 | p24(128-135) | 1567..1590 | B | human | B*0801 | 2.516012246 | 5.542771439 |
| SEQ ID NO. 103 | GPKVKQWPL | Pol | 173 | 181 | RT(18-26) | 2601..2627 | B | human | B*0801 | 1.006922099 | 4.033681293 |
| SEQ ID NO. 104 | ELRSLYNTV | Gag | 74 | 82 | p17(74-82) | 1009..1035 | | human | B*0801 | 0.870369234 | 3.897128428 |
| SEQ ID NO. 105 | YLKDQQLL** | gp160 | 586 | 593 | gp41(75-82) | 7980..8003 | | human | B*0801 | -1.271521726 | 1.755237468 |
| SEQ ID NO. 106 | FLKEKGGL | Nef | 90 | 97 | Nef | 9064..9087 | B | human | B*0801 | -1.278149588 | 1.748609605 |
| SEQ ID NO. 107 | GGKKKYKL | Gag | 24 | 31 | p17(24-31) | 859..882 | B | human | B*0801 | -1.947105768 | 1.079653426 |
| SEQ ID NO. 108 | GGKKKYKLK | Gag | 24 | 32 | p17(24-32) | 859..885 | B | human | B*0801 | -1.978743864 | 1.04801533 |
| SEQ ID NO. 109 | WPTVRERM | Nef | 13 | 20 | Nef | 8833..8856 | B | human | B*0801 | -3.026759194 | 0 |
| SEQ ID NO. 110 | RQDILDLWV | Nef | 106 | 114 | Nef | 9112..9138 | | human | B*1302 | -0.728181069 | 2.298578125 |
| SEQ ID NO. 111 | IRYQYNVL | Pol | 297 | 304 | RT(142-149) | 2973..2996 | | human | B*1401 | 3.94483931 | 6.971598504 |

FIG. 21D

| | | | | | | | | | | | |
|---|---|---|---|---|---|---|---|---|---|---|---|
| SEQ ID NO. 112 | DRFYKTLRA | Gag | 298 | 306 | p24(166-174) | 1681..1707 | B | human | B*1402 | 4.829722441 | 7.856481635 |
| SEQ ID NO. 113 | ERYLKDQQL** | gp160 | 584 | 592 | gp41(73-81) | 7974..8000 | | human | B*1402 | -1.31663291 | 1.710126284 |
| SEQ ID NO. 114 | TQGYFPDWQNY | Nef | 117 | 127 | Nef | 9145..9177 | B | human | B*1501 | 2.866901056 | 5.89366025 |
| SEQ ID NO. 115 | LVGKLNWASQIY | Pol | 415 | 426 | RT(260-271) | 3327..3362 | | human | B*1501 | 2.817878007 | 5.8446372 |
| SEQ ID NO. 116 | GLNKIVRMY | Gag | 269 | 277 | p24(137-145) | 1594..1620 | B | human | B*1501, B62 | 4.61863015 | 7.645389344 |
| SEQ ID NO. 117 | ILKEPVHGVY | Pol | 464 | 473 | RT(309-318) | 3474..3503 | B | human | B*1501, Cw*1202 | -0.980635468 | 2.046123725 |
| SEQ ID NO. 118 | FKRKGGIGGY | Pol | 900 | 909 | Integrase(185-194) | 4782..4811 | | human | B*1503 | 3.538421055 | 6.565180249 |
| SEQ ID NO. 119 | VKVIEEKAF | Gag | 156 | 164 | p24(24-32) | 1255..1281 | | human | B*1503 | 2.854409705 | 5.881168899 |
| SEQ ID NO. 120 | VTDSQYALGI | Pol | 651 | 660 | RT(496-505) | 4035..4064 | | human | B*1503 | 2.82368466 | 5.850443854 |
| SEQ ID NO. 121 | IQQEFGIPY | Pol | 850 | 858 | Integrase(135-143) | 4632..4658 | | human | B*1503 | 0.850835335 | 3.877594529 |
| SEQ ID NO. 122 | FQTKGLGISY | Tat | 38 | 47 | Tat | 5942..5971 | | human | B*1503 | -0.052207057 | 2.974552136 |
| SEQ ID NO. 123 | GKKAIGTVL | Pol | 124 | 132 | Protease(68-76) | 2454..2480 | | human | B*1503 | -0.215589875 | 2.811169319 |
| SEQ ID NO. 124 | WRFDSRLAF | Nef | 183 | 191 | Nef | 9343..9369 | | human | B*1503 | -0.746087557 | 2.280671636 |
| SEQ ID NO. 125 | RKAKIIRDY | Pol | 978 | 986 | Integrase(263-271) | 5016..5042 | | human | B*1503 | -1.524556988 | 1.502202206 |
| SEQ ID NO. 126 | YVDRFFKTL | Gag | 296 | 304 | p24(164-172) | 1675..1701 | | human | B*1503, Cw*0303, Cw*0304 | 6.027027002 | 9.053786196 |
| SEQ ID NO. 127 | HQAISPRTL | Gag | 144 | 152 | p24(12-20) | 1219..1245 | | human | B*1510 | 3.860006464 | 6.886765658 |
| SEQ ID NO. 128 | THLEGKIIL | Pol | 781 | 789 | Integrase(66-74) | 4425..4451 | | human | B*1510 | 3.523281584 | 6.550040778 |
| SEQ ID NO. 129 | WHLGHGVSI | Vif | 79 | 87 | Vif | 5275..5301 | | human | B*1510 | 1.810207873 | 4.836967067 |
| SEQ ID NO. 130 | GHQAAMQML | Gag | 193 | 201 | p24(61-69) | 1366..1392 | B | human | B*1510, B*3901 | 5.327947162 | 8.354706356 |
| SEQ ID NO. 131 | SFNCGGEFF | gp160 | 375 | 383 | gp120(375-383) | 7347..7373 | B | human | B*1516, Cw*0401 | 4.581452515 | 7.608211709 |
| SEQ ID NO. 132 | FRDYVDRFYK | Gag | 293 | 302 | p24(161-170) | 1666..1695 | B, D | human | B*1801 | 4.297730568 | 7.324489762 |
| SEQ ID NO. 133 | LADQLIHLHY | Vif | 102 | 111 | Vif | 5344..5373 | | human | B*1801 | 2.172487776 | 5.19924697 |
| SEQ ID NO. 134 | YETEVHNVW | gp160 | 61 | 69 | gp120(61-69) | 6405..6431 | | human | B*1801 | -1.306255035 | 1.720504159 |
| SEQ ID NO. 135 | YPLTFGWCY | Nef | 135 | 143 | Nef | 9199..9225 | B | human | B*1801, B*5301 | 4.176181332 | 7.202940526 |
| SEQ ID NO. 136 | AENLWVTVY | gp160 | 31 | 39 | gp120(31-39) | 6315..6341 | | human | B*1801, B44 | -2.14994542 | 0.876813774 |
| SEQ ID NO. 137 | RRWIQLGLQK | Gag | 263 | 272 | p24(131-140) | 1576..1605 | | human | B*2703 | 3.362411286 | 6.38917048 |
| SEQ ID NO. 138 | LRPMTYKAA | Nef | 76 | 84 | Nef | 9022..9048 | B | human | B*2703 | 1.642838599 | 4.669597793 |
| SEQ ID NO. 139 | GRRGWEALKY | gp160 | 786 | 795 | gp41(275-284) | 8580..8609 | B | human | B*2705 | N/A | N/A |

FIG. 21E

| | | | | | | | | | | | |
|---|---|---|---|---|---|---|---|---|---|---|---|
| SEQ ID NO. 140 | KRKGGIGGY | Pol | 901 | 909 | Integrase(186-194) | 4785..4811 | | human | B*2705 | 7.068360856 | 10.09512005 |
| SEQ ID NO. 141 | KRWIILGLNK | Gag | 263 | 272 | p24(131-140) | 1576..1605 | B | human | B*2705 | 3.362411286 | 6.38917048 |
| SEQ ID NO. 142 | RRQDILDLWI | Nef | 105 | 114 | Nef | 9109..9138 | B | human | B*2705 | 0.003149131 | 3.029908325 |
| SEQ ID NO. 143 | IRLRPGGKK | Gag | 19 | 27 | p17(19-27) | 844..870 | B | human | B*2705 | -1.916825458 | 1.109933736 |
| SEQ ID NO. 144 | NSSKVSQNY | Gag | 124 | 132 | p17(124-132) | 1159..1185 | B | human | B*3501 | N/A | N/A |
| SEQ ID NO. 145 | TAVPWNASW | gp160 | 606 | 614 | gp41(95-103) | 8040..8066 | B | human | B*3501 | N/A | N/A |
| SEQ ID NO. 146 | TVLDVGDAY | Pol | 262 | 270 | RT(107-115) | 2868..2894 | | human | B*3501 | 2.959323975 | 5.986083168 |
| SEQ ID NO. 147 | HPDIVIYQY | Pol | 330 | 338 | RT(175-183) | 3072..3098 | B | human | B*3501 | 2.528561965 | 5.555321159 |
| SEQ ID NO. 148 | NPPIPVGDIY | Gag | 253 | 262 | p24(121-130) | 1546..1575 | | human | B*3501 | 1.579035499 | 4.605794693 |
| SEQ ID NO. 149 | PPIPVGDIY | Gag | 254 | 262 | p24(122-130) | 1549..1575 | B | human | B*3501 | 1.352230045 | 4.378989239 |
| SEQ ID NO. 150 | VPLDEDFRKY | Pol | 273 | 282 | RT(118-127) | 2901..2930 | | human | B*3501 | 0.985543519 | 4.012302713 |
| SEQ ID NO. 151 | VPVWKEATTTL | gp160 | 42 | 52 | gp120(42-52) | 6348..6380 | | human | B*3501 | 0.661113352 | 3.687872546 |
| SEQ ID NO. 152 | VPLRPMTY | Nef | 74 | 81 | Nef | 9016..9039 | B | human | B*3501 | 0.409004646 | 3.43576384 |
| SEQ ID NO. 153 | WASRELERF | Gag | 36 | 44 | p17(36-44) | 895..921 | B | human | B*3501 | 0.011141662 | 3.037900855 |
| SEQ ID NO. 154 | DPNPQEVVL | gp160 | 78 | 86 | gp120(78-86) | 6456..6482 | | human | B*3501 | -1.07181069 | 1.954948504 |
| SEQ ID NO. 155 | IPLTEEAEL | Pol | 448 | 456 | RT(293-301) | 3426..3452 | | human | B*3501, B*5101 | -2.256263963 | 0.77049523 |
| SEQ ID NO. 156 | HPVHAGPIA | Gag | 216 | 224 | p24(84-92) | 1435..1461 | | human | B*3501, B7 | -2.20018454 | 0.826574654 |
| SEQ ID NO. 157 | MHEDIISLW | gp160 | 104 | 112 | gp120(104-112) | 6534..6560 | | human | B*3801 | 4.509421655 | 7.536180849 |
| SEQ ID NO. 158 | WHLGQGVSI | Vif | 79 | 87 | Vif | 5275..5301 | | human | B*3801 | 1.810207873 | 4.836967067 |
| SEQ ID NO. 159 | KELYPLTSL | Gag | 481 | 489 | p2p7p1p6(118-126) | 2230..2256 | | human | B*4001 | N/A | N/A |
| SEQ ID NO. 160 | QELKNSAVSL | gp160 | 805 | 814 | gp41(294-303) | 8637..8666 | B | human | B*4001 | N/A | N/A |
| SEQ ID NO. 161 | SEGATPQDL | Gag | 176 | 184 | p24(44-52) | 1315..1341 | | human | B*4001 | 7.182356664 | 10.20911586 |
| SEQ ID NO. 162 | IEIKDTKEAL | Gag | 92 | 101 | p17(92-101) | 1063..1092 | | human | B*4001 | -1.26096376 | 1.765795434 |
| SEQ ID NO. 163 | IETVPVKL | Pol | 160 | 167 | RT(5-12) | 2562..2585 | | human | B*4001 | -1.874572196 | 1.152186998 |
| SEQ ID NO. 164 | IEELRQHLL | Pol | 357 | 365 | RT(202-210) | 3153..3179 | B | human | B*4001 | -2.008041671 | 1.018717523 |
| SEQ ID NO. 165 | KEKGGLEGL | Nef | 92 | 100 | Nef | 9070..9096 | B | human | B*4001, B*4002 | -0.521847051 | 2.504912143 |
| SEQ ID NO. 166 | LEKHGAITS | Nef | 37 | 45 | Nef | 8905..8931 | | human | B*4001, B50 | N/A | N/A |

FIG. 21F

| | | | | | | | | | | | |
|---|---|---|---|---|---|---|---|---|---|---|---|
| SEQ ID NO. 167 | TERQANFL | Gag | 427 | 434 | p2p7p1p6(64-71) | 2068..2091 | | human | B*4002 | N/A | N/A |
| SEQ ID NO. 168 | GERIVDII | Pol | 912 | 919 | Integrase(197-204) | 4818..4841 | B | human | B*4002 | 4.249598059 | 7.276357253 |
| SEQ ID NO. 169 | IEAEVIPAET | Pol | 799 | 808 | Integrase(84-93) | 4479..4508 | B | human | B*4002 | 2.299576414 | 5.326335608 |
| SEQ ID NO. 170 | GELDRWEKI | Gag | 11 | 19 | p17(11-19) | 820..846 | | human | B*4002 | 0.958466549 | 3.985225743 |
| SEQ ID NO. 171 | KETINEEAA | Gag | 202 | 210 | p24(70-78) | 1393..1419 | | human | B*4002 | -0.285639825 | 2.741119369 |
| SEQ ID NO. 172 | AEWDRVHPV | Gag | 210 | 218 | p24(78-86) | 1417..1443 | | human | B*4002 | -1.446585949 | 1.580173245 |
| SEQ ID NO. 173 | YPGIKVRQL | Pol | 426 | 434 | RT(271-279) | 3360..3386 | B | human | B*4201 | 2.191808127 | 5.21856732 |
| SEQ ID NO. 174 | RPQVPLRPM | Nef | 71 | 79 | Nef | 9007..9033 | | human | B*4201, B*4202 | 2.723057093 | 5.749816287 |
| SEQ ID NO. 175 | LPPIVAKEI | Pol | 743 | 751 | Integrase(28-36) | 4311..4337 | | human | B*4201, B*51 | 1.682731377 | 4.709490571 |
| SEQ ID NO. 176 | AEQASQDVKNW | Gag | 306 | 316 | p24(174-184) | 1705..1737 | B | human | B*4402 | 3.356379443 | 6.383138637 |
| SEQ ID NO. 177 | AENLWVTVYY | gp160 | 31 | 40 | gp120(31-40) | 6315..6344 | | human | B*4402 | -1.638762933 | 1.387996261 |
| SEQ ID NO. 178 | EEKAFSPEV | Gag | 160 | 168 | p24(28-36) | 1267..1293 | | human | B*4415 | 4.930821689 | 7.957580883 |
| SEQ ID NO. 179 | AEAMSQVTNS | Gag | 364 | 373 | p2p7p1p6(1-10) | 1879..1908 | | human | B*4501 | N/A | N/A |
| SEQ ID NO. 180 | VKNWMTETL | Gag | 313 | 321 | p24(181-189) | 1726..1752 | B | human | B*4801 | 4.654672211 | 7.681431405 |
| SEQ ID NO. 181 | RQANFLGKI | Gag | 429 | 437 | p2p7p1p6(66-74) | 2074..2100 | B | human | B*4801, B13 | N/A | N/A |
| SEQ ID NO. 182 | TWEAWWTEYW | Pol | 552 | 561 | RT(397-406) | 3738..3767 | | human | B*49 | 6.810770225 | 9.837529419 |
| SEQ ID NO. 183 | RAIEAQQHL | gp160 | 557 | 565 | gp41(46-54) | 7893..7919 | | human | B*51, Cw*0304, Cw15 | 4.945540279 | 7.972299473 |
| SEQ ID NO. 184 | TAFTIPSI | Pol | 283 | 290 | RT(128-135) | 2931..2954 | | human | B*5101 | 2.251075778 | 5.277834972 |
| SEQ ID NO. 185 | LPCRIKQII | gp160 | 416 | 424 | gp120(416-424) | 7470..7496 | B | human | B*5101 | 1.140935276 | 4.16769447 |
| SEQ ID NO. 186 | RPGGKKKYKL | Gag | 22 | 31 | p17(22-31) | 853..882 | B | human | B*5101 | -2.208144716 | 0.818614478 |
| SEQ ID NO. 187 | WQRPLVTI* | Pol | 62 | 71 | Protease(6-13) | 2268..2295 | | human | B*52 | -0.99986698 | 2.026892214 |
| SEQ ID NO. 188 | RMYSPTSI | Gag | 275 | 282 | p24(143-150) | 1612..1635 | | human | B*5201 | 5.788679777 | 8.815438971 |
| SEQ ID NO. 189 | QASQEVKNW | Gag | 308 | 316 | p24(176-184) | 1711..1737 | B | human | B*5301, B*5701, B*5801 | 4.659431327 | 7.686190521 |
| SEQ ID NO. 190 | HVASGYIEA | Pol | 793 | 801 | Integrase(78-86) | 4461..4487 | B | human | B*5401 | 4.656174 | 7.682933194 |
| SEQ ID NO. 191 | LPQGWKGSPA | Pol | 304 | 313 | RT(149-158) | 2994..3023 | B | human | B*5401 | 3.923727108 | 6.950486301 |
| SEQ ID NO. 192 | FPDWQNYTP | Nef | 121 | 129 | Nef | 9157..9183 | B | human | B*5401 | 1.992075961 | 5.018835155 |
| SEQ ID NO. 193 | FPISPIETV | Pol | 155 | 163 | Protease(99)-RT(8) | 2547..2573 | B | human | B*5401 | -0.979382035 | 2.047377159 |
| SEQ ID NO. 194 | VPVWKEATTT | gp160 | 42 | 51 | gp120(42-51) | 6348..6377 | | human | B*5501 | -0.636061327 | 2.390697867 |

FIG. 21G

| | | | | | | | | | | | |
|---|---|---|---|---|---|---|---|---|---|---|---|
| SEQ ID NO. 195 | IAMESIVIW | Pol | 530 | 538 | RT(375-383) | 3672..3698 | | human | B*57, B*5801 | 7.158544527 | 10.18530372 |
| SEQ ID NO. 196 | KTAVQMAVF | Pol | 888 | 896 | Integrase(173-181) | 4746..4772 | | human | B*5701 | 1.20903708 | 4.235796273 |
| SEQ ID NO. 197 | AVRHFPRIW | Vpr | 30 | 38 | Vpr | 5646..5672 | | human | B*5701 | 0.28671459 | 3.313473784 |
| SEQ ID NO. 198 | IVLPEKDSW | Pol | 399 | 407 | RT(244-252) | 3279..3305 | | human | B*5701 | -0.16042477 | 2.866334424 |
| SEQ ID NO. 199 | ISKKAKGWF | Vif | 31 | 39 | Vif | 5131..5157 | | human | B*5701 | -1.185632414 | 1.841126779 |
| SEQ ID NO. 200 | KAFSPEVI | Gag | 162 | 169 | p24(30-37) | 1273..1296 | B | human | B*5701, B*5703 | 5.50882686 | 8.535586054 |
| SEQ ID NO. 201 | KAFSPEVIPMF | Gag | 162 | 172 | p24(30-40) | 1273..1305 | B | human | B*5701, B*5703, B63 | 5.756210743 | 8.782969937 |
| SEQ ID NO. 202 | TSTLQEQIGW | Gag | 240 | 249 | p24(108-117) | 1507..1536 | B | human | B*5701, B*5801 | 4.622022141 | 7.648781335 |
| SEQ ID NO. 203 | KAVRLIKFLY | Rev | 14 | 23 | Rev | 6009..6038 | B | human | B*5701, B*5801, B63 | 1.532121508 | 4.558880701 |
| SEQ ID NO. 204 | ISPRTLNAW | Gag | 147 | 155 | p24(15-23) | 1228..1254 | | human | B*5701, B63 | 6.139654115 | 9.166413309 |
| SEQ ID NO. 205 | QAVRIIKILY | Rev | 14 | 23 | Rev | 6009..6038 | C | human | B*5703 | 1.532121508 | 4.558880701 |
| SEQ ID NO. 206 | LGHGVSIEW | Vif | 81 | 89 | Vif | 5281..5307 | | human | B*5703 | 1.404908122 | 4.431667316 |
| SEQ ID NO. 207 | AAFDLSFFL | Nef | 83 | 91 | Nef | 9043..9069 | | human | B*5703 | 0.392004278 | 3.418763472 |
| SEQ ID NO. 208 | KAAFDLSFF | Nef | 82 | 90 | Nef | 9040..9066 | | human | B*5703, B*5801 | -0.370042237 | 2.656716957 |
| SEQ ID NO. 209 | HTQGYFPDW | Nef | 116 | 124 | Nef | 9142..9168 | | human | B*5703, B*5801, B57 | 2.545454728 | 5.572213922 |
| SEQ ID NO. 210 | QTRVLAIERYL | gp160 | 577 | 587 | gp41(66-76) | 7953..7985 | C | human | B*5802 | -0.487033355 | 2.539725839 |
| SEQ ID NO. 211 | GQGQWTYQI | Pol | 488 | 496 | RT(333-341) | 3546..3572 | | human | B13 | 3.640472737 | 6.667231931 |
| SEQ ID NO. 212 | GQMREPRGSDI | Gag | 226 | 236 | p24(94-104) | 1465..1497 | | human | B13 | 1.757803657 | 4.78456285 |
| SEQ ID NO. 213 | VQNLQGQMV | Gag | 135 | 143 | p24(3-11) | 1192..1218 | | human | B13 | 0.580018712 | 3.606777906 |
| SEQ ID NO. 214 | RQYDQILIEI | Pol | 113 | 122 | Protease(57-66) | 2421..2450 | | human | B13 | -0.877108676 | 2.149650518 |
| SEQ ID NO. 215 | CRAPRKKGC | Gag | 405 | 413 | p2p7p1p6(42-50) | 2002..2028 | | human | B14 | N/A | N/A |
| SEQ ID NO. 216 | VRMYSPVSI | Gag | 274 | 282 | p24(142-150) | 1609..1635 | | human | B14, Cw18 | 4.226029515 | 7.252788709 |
| SEQ ID NO. 217 | RMRRAEPAA | Nef | 19 | 27 | Nef | 8851..8877 | | human | B15, B62 | -1.774392593 | 1.252366601 |
| SEQ ID NO. 218 | NETPGIRYQY | Pol | 292 | 301 | RT(137-146) | 2958..2987 | | human | B18 | 2.912554325 | 5.939313519 |
| SEQ ID NO. 219 | NPEIVIYQY | Pol | 330 | 338 | RT(175-183) | 3072..3098 | | human | B18 | 2.528561965 | 5.555321159 |
| SEQ ID NO. 220 | RRQDILDLWVY | Nef | 105 | 115 | Nef | 9109..9141 | | human | B18 | -0.200846352 | 2.825912842 |
| SEQ ID NO. 221 | VRHFPRIWL | Vpr | 31 | 39 | Vpr | 5649..5675 | | human | B27 | -0.483008781 | 2.543750413 |
| SEQ ID NO. 222 | RPQVPLRPMTY | Nef | 71 | 81 | Nef | 9007..9039 | B | human | B35 | 0.438985522 | 3.465744716 |

FIG. 21H

| | | | | | | | | | | | |
|---|---|---|---|---|---|---|---|---|---|---|---|
| SEQ ID NO. 223 | VPRRKAKII | Pol | 975 | 983 | Integrase(260-268) | 5007..5033 | | human | B42 | -2.225722943 | 0.801036251 |
| SEQ ID NO. 224 | EEMNLPGRW | Pol | 90 | 98 | Protease(34-42) | 2352..2378 | | human | B44 | -1.420015495 | 1.606743699 |
| SEQ ID NO. 225 | IPLGDAKLII | Vif | 57 | 66 | Vif | 5209..5238 | | human | B51 | 0.473924298 | 3.500683491 |
| SEQ ID NO. 226 | EAVRHFPRI | Vpr | 29 | 37 | Vpr | 5643..5669 | | human | B51 | -0.416887247 | 2.609871947 |
| SEQ ID NO. 227 | TPQDLNMML | Gag | 180 | 188 | p24(48-56) | 1327..1353 | A | human | B53 | 8.257391473 | 11.28415067 |
| SEQ ID NO. 228 | YPLTFGWCF | Nef | 135 | 143 | Nef | 9199..9225 | | human | B53 | 4.176181332 | 7.202940526 |
| SEQ ID NO. 229 | FSPEVIPMF | Gag | 164 | 172 | p24(32-40) | 1279..1305 | | human | B57 | 6.691876505 | 9.718635699 |
| SEQ ID NO. 230 | HTQGYFPDWQ | Nef | 116 | 125 | Nef | 9142..9171 | | human | B57 | 2.71898527 | 5.745744463 |
| SEQ ID NO. 231 | STTVKAACWW | Pol | 838 | 847 | Integrase(123-132) | 4596..4625 | | human | B57 | 1.000814696 | 4.02757389 |
| SEQ ID NO. 232 | KAIGTVLV | Pol | 126 | 133 | Protease(70-77) | 2460..2483 | | human | B57 | 0.560099681 | 3.586858875 |
| SEQ ID NO. 233 | LTFGWCFKL | Nef | 137 | 145 | Nef | 9205..9231 | | human | B57, B63 | 5.059505295 | 8.086264489 |
| SEQ ID NO. 234 | YTPGPGIRY | Nef | 127 | 135 | Nef | 9175..9201 | | human | B57, B63 | 2.149253567 | 5.176012761 |
| SEQ ID NO. 235 | KAYETEVHNVW | gp160 | 59 | 69 | gp120(59-69) | 6399..6431 | | human | B58 | -1.053253904 | 1.973505289 |
| SEQ ID NO. 236 | SPAIFQSSM | Pol | 311 | 319 | RT(156-164) | 3015..3041 | | human | B7 | 2.21383998 | 5.240599174 |
| SEQ ID NO. 237 | RPAEPVPLQL | Rev | 66 | 75 | Rev | 8498..8527 | | human | B7 | -1.261905544 | 1.764853649 |
| SEQ ID NO. 238 | RQDILDLWI | Nef | 106 | 114 | Nef | 9112..9138 | | human | B7, B13 | -0.728181069 | 2.298578125 |
| SEQ ID NO. 239 | RQGLERALL | gp160 | 848 | 856 | gp41(337-345) | 8766..8792 | | human | B8 | N/A | N/A |
| SEQ ID NO. 240 | TPVNIIGRNML | Pol | 136 | 146 | Protease(80-90) | 2490..2522 | | human | B81 | 5.144302829 | 8.171062023 |
| SEQ ID NO. 241 | LFLDGIDKA | Pol | 715 | 723 | RT(560)-Integrase(8) | 4227..4253 | | human | B81 | -0.357100902 | 2.669658292 |
| SEQ ID NO. 242 | NSPTRREL | Pol | 24 | 31 | Gag/Pol-TF(24-31) | 2154..2177 | | human | Cw*0102 | N/A | N/A |
| SEQ ID NO. 243 | VIPMFSAL | Gag | 168 | 175 | p24(36-43) | 1291..1314 | B | human | Cw*0102 | 8.620581488 | 11.64734068 |
| SEQ ID NO. 244 | YSPVSILDI | Gag | 277 | 285 | p24(145-153) | 1618..1644 | CRF01_AE | human | Cw*0102 | 3.182506871 | 6.209266065 |
| SEQ ID NO. 245 | SAEPVPLQL** | Rev | 67 | 75 | Rev | 8501..8527 | B | human | Cw*0501 | -1.930132702 | 1.096626492 |
| SEQ ID NO. 246 | IVTDSQYAL | Pol | 650 | 658 | RT(495-503) | 4032..4058 | | human | Cw*0802 | 4.117171102 | 7.143930295 |
| SEQ ID NO. 247 | AAVDLSHFL | Nef | 83 | 91 | Nef | 9043..9069 | B | human | Cw*0802 | 0.392004278 | 3.418763472 |
| SEQ ID NO. 248 | HLVWASREL | Gag | 33 | 41 | p17(33-41) | 886..912 | | human | Cw*0804 | 2.031971506 | 5.0587307 |

FIG. 21I

| | | | | | | | | | | | |
|---|---|---|---|---|---|---|---|---|---|---|---|
| SEQ ID NO. 249 | CAPAGFAIL | gp160 | 218 | 226 | gp120(218-226) | 6876..6902 | | human | Cw1 | 2.444991089 | 5.471750283 |
| SEQ ID NO. 250 | CCFHCQVC | Tat | 30 | 37 | Tat | 5918..5941 | | human | Cw12 | 2.780822487 | 5.807581681 |
| SEQ ID NO. 251 | LYNTVATL | Gag | 78 | 85 | p17(78-85) | 1021..1044 | | human | Cw14 | 3.007476815 | 6.034236008 |
| SEQ ID NO. 252 | YRLGVGALI | Vpu | 5 | 13 | Vpu | 6074..6100 | C | human | Cw18 | N/A | N/A |
| SEQ ID NO. 253 | FRDYVDRFF | Gag | 293 | 301 | p24(161-169) | 1666..1692 | | human | Cw18 | 4.529069673 | 7.555828866 |
| SEQ ID NO. 254 | VRDQAEHL | Pol | 880 | 887 | Integrase(165-172) | 4722..4745 | | human | Cw18 | -0.050584564 | 2.97617463 |
| SEQ ID NO. 255 | AALDLSHFL | Nef | 83 | 91 | Nef | 9043..9069 | | human | Cw3 | 0.392004278 | 3.418763472 |
| SEQ ID NO. 256 | AEQASQEVKNWM | Gag | 306 | 317 | p24(174-185) | 1705..1740 | | human | Cw5 | 3.203180068 | 6.229939262 |
| SEQ ID NO. 257 | HTDNGSNF | Pol | 829 | 836 | Integrase(114-121) | 4569..4592 | | human | Cw5 | 2.246495887 | 5.273255081 |
| SEQ ID NO. 258 | KRQEILDLWVY | Nef | 105 | 115 | Nef | 9109..9141 | | human | Cw7 | -0.200846352 | 2.825912842 |
| SEQ ID NO. 259 | RAIEAQQHM | gp160 | 557 | 565 | gp41(46-54) | 7893..7919 | | human | Cw8 | 4.945540279 | 7.972299473 |
| SEQ ID NO. 260 | KAAVDLSHFL | Nef | 82 | 91 | Nef | 9040..9069 | | human | Cw8 | -0.356688913 | 2.670070281 |

*Additional Epitopes Screened for the Corresponding HLA allele

**Epitopes contained structural data for <100%, but >50% of residues, which were used to calculate epitope network scores

FIG. 21J

| | Epitope | Protein | HXB2 start | HXB2 end | Subprotein | HXB2 DNA Contig | Subtype | Species | HLA | Network Score | Normalized Network Score |
|---|---|---|---|---|---|---|---|---|---|---|---|
| SEQ ID NO. 261 | SALSEGATP | Gag | 173 | 181 | p24(41-59) | 1306..1332 | B | human | E*101, E*103 | 8.266764899 | 11.29352409 |
| SEQ ID NO. 262 | RMYSPTSIL | Gag | 275 | 283 | p24(143-151) | 1612..1638 | B | human | E*101, E*103 | 3.614012417 | 6.640771611 |
| SEQ ID NO. 263 | PEIVIYQYM | Pol | 331 | 339 | RT(176-184) | 3075..3101 | B | human | E*101, E*103 | 1.888194462 | 4.914953656 |
| SEQ ID NO. 264 | RIRTWKSLV | Vif | 17 | 25 | Vif | 5089..5115 | B | human | E*101, E*103 | 3.78399044 | 6.810749633 |
| SEQ ID NO. 265 | AISPRTLNA | Gag | 146 | 154 | p24(14-22) | 1225..1251 | B | human | E*101, E*103 | 3.359080053 | 6.385839247 |
| SEQ ID NO. 266 | STLQEQIGW | Gag | 241 | 249 | p24(109-117) | 1510..1536 | B | human | E*101, E*103 | 3.205991932 | 6.232751125 |
| SEQ ID NO. 267 | DRWEKIRLR | Gag | 14 | 22 | p17(14-22) | 829..855 | B | human | E*101, E*103 | 0.502222332 | 3.528981526 |
| SEQ ID NO. 268 | EKIRLRPGG | Gag | 17 | 25 | p17(17-25) | 838..864 | B | human | E*101, E*103 | -0.963316117 | 2.063443077 |
| SEQ ID NO. 269 | KAQQAAADT | Gag | 114 | 122 | p17(14-22) | 1129..1155 | B | human | E*101, E*103 | N/A | N/A |
| SEQ ID NO. 270 | HQAISPRTL | Gag | 144 | 152 | p24(12-20) | 1219..1245 | B | human | E*101, E*103 | 3.860006464 | 6.886765658 |
| SEQ ID NO. 271 | VGGHQAAMQ | Gag | 191 | 199 | p24(59-67) | 1360..1386 | B | human | E*101, E*103 | 4.839386427 | 7.86614562 |

FIG. 22

| Protein | PDB | Alignment Data | Measurement | # of Mutations | Reference |
|---|---|---|---|---|---|
| Beta-glucosidase | 1GNX | PF00232 | Enzyme Function | 3000 | Romero et al., PNAS 2015 |
| Beta-lactamase | 1BTL | PF00144 | Growth | 4997 | Stiffler et al., Cell 2015 |
| CCdB | 1X75 | PF01845 | Activity | 1666 | Tripathi et al., MBE 2016 |
| DNA methylase HaeIII | 1DCT | PF00145 | Growth | 1778 | Rockah-Shmuel et al., PLoS Comp Bio 2015 |
| GAL4 (DNA-binding) | 3COQ | PF03902 | Growth | 1196 | Kitzmann et al., Nat Methods 2015 |
| Gene V Protein | 1GVP | PF02303 | Growth | 348 | Terwilligger et al., JMB 1994 |
| Hemagglutinin | 1RVX | PF00509 | Viral Replication | 10717 | Doud et al., Viruses 2016 |
| Hepatitis C NS5A | 3FQM | PF08300, PF08301 | Viral Replication | 1632 | Qi et al.,PLoS Pathogens 2014 |
| HSP90 (ATPase domain) | 2CG9 | PF02518, PF00183 | Growth | 4324 | Mishra et al., Cell Reports 2016 |
| Kanamycin kinase APH(3')-II | 1ND4 | PF01636 | Growth | 4996 | Melnikov et al., NAR 2014 |
| Streptococcus Protein G | 1FCC | PF01378 | Protein Affinity | 1124 | Olson et al., Current Biology 2014 |
| T4 Lysozyme | 2LZM | PF00959 | Enzyme Function | 2119 | Rennell et al., JMB 1991 |
| Ubiquitin | 2OOB | PF00240 | Growth | 1366 | Roscoe et al., JMB 2013 |

FIG. 23

| Protein | AA Mutant | Network Score | Conservation | AA Nuc # | Codon | Mutant | | NL4-3 Forward Primer (Mutant) | | NL4-3 Reverse Primer |
|---|---|---|---|---|---|---|---|---|---|---|
| Gag p24 | P34A | 8.47500558 | 0.048 | 1285...1287 | CCA | GCA | SEQ ID NO. 272 | GGCTTTCAGCgcaGAAGTAATAC | SEQ ID NO. 320 | TTCTCTTCTACTACTTTTACCC |
| Gag p24 | P93A | -1.370325461 | 0.039 | 1462...1464 | CCA | GCA | SEQ ID NO. 273 | GCCTATTGCAgcaGGCCAGATGA | SEQ ID NO. 321 | CCTGCATGCACTGGATGC |
| Gag p24 | P123A | -1.616676961 | 0.543 | 1552...1554 | CCT | GCT | SEQ ID NO. 274 | ACATAATCCAgctATCCCAGTAG | SEQ ID NO. 322 | GTCATCCATCCTATTTGTTC |
| Gag p24 | Q155A | 4.839785307 | 0.021 | 1648...1650 | CAA | GCA | SEQ ID NO. 275 | GGACATAAGAgcaGGACCAAAGGAACC | SEQ ID NO. 323 | AGAATGCTGGTAGGGCTA |
| Gag p24 | Q179A | -2.066073151 | 0.054 | 1720...1722 | CAA | GCA | SEQ ID NO. 276 | GCAAGCTTCAgcaGAGGTAAAAAATTG | SEQ ID NO. 324 | TCGGCTCTTAGAGTTTTATAG |
| Gag p24 | Q4A | 0.359922055 | 0.095 | 1195...1197 | CAG | GCG | SEQ ID NO. 277 | CCCTATAGTGgcgAACCTCCAGG | SEQ ID NO. 325 | TAATTTTGGCTGACCTGG |
| Gag p24 | L211M | 2.304017487 | 0.017 | 1816...1818 | CTA | ATG | SEQ ID NO. 278 | AGGAGCGACAatgGAAGAAATGATG | SEQ ID NO. 326 | GGTCCCAATGCTTTTAAAATAG |
| Gag p24 | L231M | -1.61667696 | 0.03 | 1876...1878 | TTG | ATG | SEQ ID NO. 279 | AGCAAGAGTTatgGCTGAAGCAATGAGC | SEQ ID NO. 327 | TTATGGCCGGGTCCCCCC |
| Gag p24 | L83M | -1.906400244 | 0.67 | 1432...1434 | TTG | ATG | SEQ ID NO. 280 | ATGGGATAGAatgCATCCAGTGC | SEQ ID NO. 328 | TCTGCAGCTTCCTCATTG |
| Gag p24 | E159A | 4.43037672 | 0.018 | 1660...1662 | GAA | GCA | SEQ ID NO. 281 | AGGACCAAAGgcaCCCTTTAGAG | SEQ ID NO. 329 | TGTCTTATGTCCAGAATGC |
| Gag p24 | E187A | -1.084417952 | 0.05 | 1744...1746 | GAA | GCA | SEQ ID NO. 282 | TTGGATGACAgcaACCTTGTTGG | SEQ ID NO. 330 | TTTTTTACCTCTTGTGAAGC |
| Gag p24 | E180A | -2.089330229 | 0.73 | 1723...1725 | GAG | GCG | SEQ ID NO. 283 | AGCTTCACAAgcgGTAAAAAATTGG | SEQ ID NO. 331 | TGCTCGGCTCTTAGAGTT |
| Gag p24 | M118L | 2.451743722 | 0.071 | 1537...1539 | ATG | CTG | SEQ ID NO. 284 | AATAGGATGGctgACACATAATCC | SEQ ID NO. 332 | TGTTCCTGAAGGGTACTAG |
| Gag p24 | M10L | -0.439323064 | 0.08 | 1213...1215 | ATG | CTG | SEQ ID NO. 285 | CCAGGGGCAActgGTACATCAGG | SEQ ID NO. 333 | AGGTTCTGCACTATAGGGTAATTTTG |
| Gag p24 | M96L | -1.227546003 | 0.61 | 1471...1473 | ATG | CTG | SEQ ID NO. 286 | ACCAGGCCAGctgAGAGAACCAAG | SEQ ID NO. 334 | GCAATAGGCCCTGCATGC |
| RT | D186N | 5.099623076 | 0.037 | 3105...3107 | GAT | AAT | SEQ ID NO. 287 | ATACATGGATaatTTGTATGTAGGATC | SEQ ID NO. 335 | TGATAGATGACTATGTCTG |
| RT | D218N | -2.17724351 | 0.071 | 3201...3203 | GAC | AAC | SEQ ID NO. 288 | TACCACACCAaacAAAAAACATC | SEQ ID NO. 336 | AATCCCCACCTCAACAGATG |
| RT | D123N | -0.166155056 | 0.87 | 2916...2918 | GAC | AAC | SEQ ID NO. 289 | CTTAGATAAAaacTTCAGGAAGTATAC | SEQ ID NO. 337 | GGAACTGAAAAATATGCATC |
| RT | T107A | 5.277829124 | 0.065 | 2868...2870 | ACA | GCA | SEQ ID NO. 290 | AAAATCAGTAgcaGTACTGGATG | SEQ ID NO. 338 | TTCTGTTTTAACCCTGCAG |
| RT | T240A | -1.15568718 | 0.017 | 3267...3269 | ACA | GCA | SEQ ID NO. 291 | TGATAAATGGgcaGTACAGCCTA | SEQ ID NO. 339 | GGATGGAGTTCATAACCC |
| RT | T200A | -1.91195689 | 1.046 | 3147...3149 | ACA | GCA | SEQ ID NO. 292 | GCAGCATAGAgcaAAAATAGAGG | SEQ ID NO. 340 | CCTATTTCTAAGTCAGATCC |
| RT | F61Y | 9.403870162 | 0.026 | 2730...2732 | TTT | TAT | SEQ ID NO. 293 | TACTCCAGTAtatGCCATAAAGAAAAAAG | SEQ ID NO. 341 | TTGTATGGATTTTCAGGCC |
| RT | F116Y | -0.566238077 | 0.022 | 2895...2897 | TTT | TAT | SEQ ID NO. 294 | CGATGCATATtatTCAGTTCCCTTAG | SEQ ID NO. 342 | CCCACATCCAGTACTGTTAC |
| RT | F346Y | -2.177199861 | 0.43 | 3585...3587 | TTT | TAT | SEQ ID NO. 295 | TCAAGAGCCAtatAAAAATCTGAAAAC | SEQ ID NO. 343 | TAAATTTGATATGTCCATTGG |
| RT | E438A | 2.589455009 | 0.043 | 3861...3863 | GAA | GCA | SEQ ID NO. 296 | AATAGGAGCAgcaACTTTCTATG | SEQ ID NO. 344 | ATGGGTTCTTTCTCTAAC |
| RT | E546A | -1.133476758 | 0.048 | 4185...4187 | GAA | GCA | SEQ ID NO. 297 | TGGAGGAAATgcaCAAGTAGATG | SEQ ID NO. 345 | ATTCCTTTGTGTGCTGGTAC |
| RT | E248A | -2.177199861 | 0.48 | 3291...3293 | GAA | GCA | SEQ ID NO. 298 | AGTGCTGCCAgcaAAGGACAGCT | SEQ ID NO. 346 | ATAGGCTGTACTGTCCATTTATCAG |
| RT | S489A | 3.18389408 | 0.036 | 4014...4016 | TCG | GCG | SEQ ID NO. 299 | TTTGCAGGATgcgGGATTAGAAG | SEQ ID NO. 347 | GCTAGATGAATTGCTTGTAAC |
| RT | S163A | -1.200944228 | 0.068 | 3036...3038 | AGC | GCC | SEQ ID NO. 300 | ATTCCAGTGTgccATGACAAAAATCTTAG | SEQ ID NO. 348 | ATTGCTGGTGATCCTTTC |
| RT | S68A | -1.529078743 | 0.226 | 2751...2753 | AGT | GCT | SEQ ID NO. 386 | GAAAAAAGACgctACTAAATGGAGAAAATAGATTTC | SEQ ID NO. 349 | TTTATGGCAAATACTGGAG |

FIG. 24A

| | | | | | | | | | | |
|---|---|---|---|---|---|---|---|---|---|---|
| INT | M178V | 1.496723983 | 0.022 | 4761...4763 | ATG | **GTG** | SEQ ID NO. 302 | AGCAGTACAAgtgGCAGTATTCATC | SEQ ID NO. 350 | GTCTTAAGATGTTCAGCCTG |
| INT | M50V | -2.208129686 | 0.014 | 4377...4379 | ATG | **GTG** | SEQ ID NO. 303 | AGGGGAAGCCgtgCATGGACAAG | SEQ ID NO. 351 | TTTAGCTGACATTTATCACAGCTGGC |
| INT | M22V | 1.221237228 | 0.242 | 4293...4295 | ATG | **GTG** | SEQ ID NO. 304 | TTGGAGAGCAgtgGCTAGTGATT | SEQ ID NO. 352 | TTACTGTGATATTTCTCATGTTCTTC |
| INT | V113A | 4.432146381 | 0.008 | 4566...4568 | GTA | GCA | SEQ ID NO. 305 | AGTAAAAACAgcaCATACAGACAATG | SEQ ID NO. 353 | GGCCATCTTCCTGCTAAT |
| INT | V79A | -0.194252349 | 0.041999999 | 4464...4466 | GTA | GCA | SEQ ID NO. 306 | AGCAGTTCATgcaGCCAGTGGAT | SEQ ID NO. 354 | ACCAAGATAACTTTTCCTTCTAAATG |
| INT | V150A | -0.712943097 | 0.214 | 4677...4679 | GTA | GCA | SEQ ID NO. 387 | AAGTCAAGGAgcaATAGAATCTATGAATA | SEQ ID NO. 355 | TGGGGATTGTAGGGAATG |
| INT | A86V | 2.093400331 | 0.03 | 4485...4487 | GCA | GTA | SEQ ID NO. 308 | ATATATAGAAgtaGAAGTAATTCCAGC | SEQ ID NO. 356 | CCACTGGCTACATGAACTG |
| INT | A91V | -0.579589902 | 0.035 | 4500...4502 | GCA | GTA | SEQ ID NO. 309 | AGTAATTCCAgtaGAGACAGGGC | SEQ ID NO. 357 | TCTGCTTCTATATATCCACTGG |
| INT | A205V | -0.483028253 | 0.416999996 | 4842...4844 | GCA | GTA | SEQ ID NO. 310 | AGACATAATAgtaACAGACATACAAAC | SEQ ID NO. 358 | ACTATTCTTTCCCCTGCAC |
| ENV | F382L | 3.05497713 | 0.061000001 | 7358...7360 | TTT | **CTT** | SEQ ID NO. 311 | TGGAGGGGAActtTTCTACTGTA | SEQ ID NO. 359 | CAATTAAAACTGTGCGTTACAATTTC |
| ENV | F383L | -0.879949065 | 0.037 | 7361...7363 | TTC | **CTC** | SEQ ID NO. 312 | AGGGGAATTTctcTACTGTAATTC | SEQ ID NO. 360 | CCACAATTAAAACTGTGC |
| ENV | F396L | -1.070824232 | 2.16 | 7400...7402 | TTT | **CTT** | SEQ ID NO. 313 | TAGTACTTGGcttAATAGTACTTG | SEQ ID NO. 361 | TTAAACAGTTGTGTTGAATTAC |
| ENV | R298A | 2.528420668 | 0.018 | 7106...7108 | AGA | **GCA** | SEQ ID NO. 314 | TAATTGTACAgcaCCCAACAACAATAC | SEQ ID NO. 362 | ATTTCTACAGATGTGTTCAG |
| ENV | R469A | -0.863045718 | 0.051 | 7619...7621 | AGA | **GCA** | SEQ ID NO. 315 | CGAGATCTTCgcaCCTGGAGGAG | SEQ ID NO. 363 | GACCCATTGTTGTTATTAC |
| ENV | R146A | -2.152887322 | 2.58 | 6656...6658 | AGA | **GCA** | SEQ ID NO. 316 | TAGTAGCGGGgcaATGATAATGG | SEQ ID NO. 364 | CTATTGGTATTAGTATCATTCTTC |
| ENV | P253A | 4.631911294 | 0.006 | 6971...6973 | CCA | **GCA** | SEQ ID NO. 317 | TGGAATCAGGgcaGTAGTATCAA | SEQ ID NO. 365 | TGTGTACATTGTACTGTGC |
| ENV | P81A | -1.312155436 | 0.023 | 6461...6463 | CCA | **GCA** | SEQ ID NO. 318 | AGACCCCAACgcaCAAGAAGTAG | SEQ ID NO. 366 | GTGGGTACACAGGCATGT |
| ENV | P183A | -1.820241662 | 1.11 | 6767...6769 | CCA | **GCA** | SEQ ID NO. 319 | TGATATAGTAgcaATAGATAATACC | SEQ ID NO. 367 | AGTTTATAAAAGAATGCATATTCTTTC |

FIG. 24B

| Characteristics | Controllers (VL < 2000) | Intermediate (VL 2000-10000) | Progressors (VL > 10,000) |
|---|---|---|---|
| Number of subjects | 46 | 27 | 43 |
| Age, Mean (range) | 50.6 (26-83) | 45.4 (33-61) | 40.3 (19-61) |
| Gender, Male% | 82% | 88% | 93% |
| Ethnicity, White%, Hispanic%, Black%, Asian%, Unknown% | 64%, 11%, 25%, 0%, 0% | 69%, 15%, 7%, 4%, 4% | 77%, 7%, 14%, 2%, 0% |
| Plasma HIV RNA, copies/mL, Mean (range) | 210.6 (0-1936) | 5454.2 (2450-9010) | 81095 (10096-1000000) |
| CD4+ T cell count, cells/mm^3, Mean (range) | 929.2 (453-1437) | 578.3 (249-990) | 465.5 (98-1005) |
| Protective HLA Allele % | 60% | 57% | 44% |

FIG. 25

SEQUENCE LISTING

```
<160> NUMBER OF SEQ ID NOS: 387

<210> SEQ ID NO 1
<211> LENGTH: 9
<212> TYPE: PRT
<213> ORGANISM: Artificial Sequence
<220> FEATURE:
<223> OTHER INFORMATION: Synthetic Construct

<400> SEQUENCE: 1

Arg Arg Gly Trp Glu Val Leu Lys Tyr
1               5


<210> SEQ ID NO 2
<211> LENGTH: 9
<212> TYPE: PRT
<213> ORGANISM: Artificial Sequence
<220> FEATURE:
<223> OTHER INFORMATION: Synthetic Construct

<400> SEQUENCE: 2

Tyr Phe Pro Asp Trp Gln Asn Tyr Thr
1               5


<210> SEQ ID NO 3
<211> LENGTH: 9
<212> TYPE: PRT
<213> ORGANISM: Artificial Sequence
<220> FEATURE:
<223> OTHER INFORMATION: Synthetic Construct

<400> SEQUENCE: 3

Ile Ser Glu Arg Ile Leu Ser Thr Tyr
1               5


<210> SEQ ID NO 4
```

<211> LENGTH: 9
<212> TYPE: PRT
<213> ORGANISM: Artificial Sequence
<220> FEATURE:
<223> OTHER INFORMATION: Synthetic Construct

<400> SEQUENCE: 4

Gly Ser Glu Glu Leu Arg Ser Leu Tyr
1 5

<210> SEQ ID NO 5
<211> LENGTH: 10
<212> TYPE: PRT
<213> ORGANISM: Artificial Sequence
<220> FEATURE:
<223> OTHER INFORMATION: Synthetic Construct

<400> SEQUENCE: 5

Trp Arg Phe Asp Ser Arg Leu Ala Phe His
1 5 10

<210> SEQ ID NO 6
<211> LENGTH: 9
<212> TYPE: PRT
<213> ORGANISM: Artificial Sequence
<220> FEATURE:
<223> OTHER INFORMATION: Synthetic Construct

<400> SEQUENCE: 6

Tyr Thr Ala Phe Thr Ile Pro Ser Val
1 5

<210> SEQ ID NO 7
<211> LENGTH: 10
<212> TYPE: PRT
<213> ORGANISM: Artificial Sequence
<220> FEATURE:
<223> OTHER INFORMATION: Synthetic Construct

<400> SEQUENCE: 7

Phe Leu Gly Lys Ile Trp Pro Ser Tyr Lys
1 5 10

<210> SEQ ID NO 8
<211> LENGTH: 9
<212> TYPE: PRT
<213> ORGANISM: Artificial Sequence
<220> FEATURE:
<223> OTHER INFORMATION: Synthetic Construct

<400> SEQUENCE: 8

Leu Leu Asn Ala Thr Asp Ile Ala Val
1 5

<210> SEQ ID NO 9
<211> LENGTH: 10
<212> TYPE: PRT
<213> ORGANISM: Artificial Sequence
<220> FEATURE:
<223> OTHER INFORMATION: Synthetic Construct

<400> SEQUENCE: 9

Ser Leu Leu Asn Ala Thr Asp Ile Ala Val
1 5 10

<210> SEQ ID NO 10
<211> LENGTH: 10

<212> TYPE: PRT
<213> ORGANISM: Artificial Sequence
<220> FEATURE:
<223> OTHER INFORMATION: Synthetic Construct

<400> SEQUENCE: 10

Pro Leu Thr Phe Gly Trp Cys Tyr Lys Leu
1 5 10

<210> SEQ ID NO 11
<211> LENGTH: 9
<212> TYPE: PRT
<213> ORGANISM: Artificial Sequence
<220> FEATURE:
<223> OTHER INFORMATION: Synthetic Construct

<400> SEQUENCE: 11

Lys Leu Thr Pro Leu Cys Val Thr Leu
1 5

<210> SEQ ID NO 12
<211> LENGTH: 9
<212> TYPE: PRT
<213> ORGANISM: Artificial Sequence
<220> FEATURE:
<223> OTHER INFORMATION: Synthetic Construct

<400> SEQUENCE: 12

Leu Val Gly Pro Thr Pro Val Asn Ile
1 5

<210> SEQ ID NO 13
<211> LENGTH: 9
<212> TYPE: PRT
<213> ORGANISM: Artificial Sequence
<220> FEATURE:
<223> OTHER INFORMATION: Synthetic Construct

<400> SEQUENCE: 13

Val Ile Tyr Gln Tyr Met Asp Asp Leu
1 5

<210> SEQ ID NO 14
<211> LENGTH: 10
<212> TYPE: PRT
<213> ORGANISM: Artificial Sequence
<220> FEATURE:
<223> OTHER INFORMATION: Synthetic Construct

<400> SEQUENCE: 14

Arg Gly Pro Gly Arg Ala Phe Val Thr Ile
1 5 10

<210> SEQ ID NO 15
<211> LENGTH: 9
<212> TYPE: PRT
<213> ORGANISM: Artificial Sequence
<220> FEATURE:
<223> OTHER INFORMATION: Synthetic Construct

<400> SEQUENCE: 15

Ala Ile Ile Arg Ile Leu Gln Gln Leu
1 5

<210> SEQ ID NO 16
<211> LENGTH: 10
<212> TYPE: PRT

<213> ORGANISM: Artificial Sequence
<220> FEATURE:
<223> OTHER INFORMATION: Synthetic Construct

<400> SEQUENCE: 16

Ser Leu Tyr Asn Thr Val Ala Thr Leu Tyr
1 5 10

<210> SEQ ID NO 17
<211> LENGTH: 10
<212> TYPE: PRT
<213> ORGANISM: Artificial Sequence
<220> FEATURE:
<223> OTHER INFORMATION: Synthetic Construct

<400> SEQUENCE: 17

Val Leu Glu Trp Arg Phe Asp Ser Arg Leu
1 5 10

<210> SEQ ID NO 18
<211> LENGTH: 9
<212> TYPE: PRT
<213> ORGANISM: Artificial Sequence
<220> FEATURE:
<223> OTHER INFORMATION: Synthetic Construct

<400> SEQUENCE: 18

Ala Leu Val Glu Ile Cys Thr Glu Met
1 5

<210> SEQ ID NO 19
<211> LENGTH: 9
<212> TYPE: PRT
<213> ORGANISM: Artificial Sequence
<220> FEATURE:
<223> OTHER INFORMATION: Synthetic Construct

<400> SEQUENCE: 19

Ile Leu Lys Glu Pro Val His Gly Val
1 5

<210> SEQ ID NO 20
<211> LENGTH: 9
<212> TYPE: PRT
<213> ORGANISM: Artificial Sequence
<220> FEATURE:
<223> OTHER INFORMATION: Synthetic Construct

<400> SEQUENCE: 20

Ser Leu Tyr Asn Thr Val Ala Thr Leu
1 5

<210> SEQ ID NO 21
<211> LENGTH: 9
<212> TYPE: PRT
<213> ORGANISM: Artificial Sequence
<220> FEATURE:
<223> OTHER INFORMATION: Synthetic Construct

<400> SEQUENCE: 21

Arg Ile Arg Gln Gly Leu Glu Arg Ala
1 5

<210> SEQ ID NO 22
<211> LENGTH: 9
<212> TYPE: PRT
<213> ORGANISM: Artificial Sequence
<220> FEATURE:
<223> OTHER INFORMATION: Synthetic Construct

<400> SEQUENCE: 22

Gly Ala Phe Asp Leu Ser Phe Phe Leu
1 5

<210> SEQ ID NO 23
<211> LENGTH: 9
<212> TYPE: PRT
<213> ORGANISM: Artificial Sequence
<220> FEATURE:
<223> OTHER INFORMATION: Synthetic Construct

<400> SEQUENCE: 23

Tyr Val Asp Arg Phe Tyr Lys Thr Leu
1 5

<210> SEQ ID NO 24
<211> LENGTH: 9
<212> TYPE: PRT
<213> ORGANISM: Artificial Sequence
<220> FEATURE:
<223> OTHER INFORMATION: Synthetic Construct

<400> SEQUENCE: 24

Gly Ile Pro His Pro Ala Gly Leu Lys
1 5

<210> SEQ ID NO 25
<211> LENGTH: 9
<212> TYPE: PRT
<213> ORGANISM: Artificial Sequence
<220> FEATURE:
<223> OTHER INFORMATION: Synthetic Construct

<400> SEQUENCE: 25

Gln Ile Tyr Pro Gly Ile Lys Val Arg
1 5

<210> SEQ ID NO 26
<211> LENGTH: 10
<212> TYPE: PRT
<213> ORGANISM: Artificial Sequence
<220> FEATURE:
<223> OTHER INFORMATION: Synthetic Construct

<400> SEQUENCE: 26

Lys Leu Val Asp Phe Arg Glu Leu Asn Lys
1 5 10

<210> SEQ ID NO 27
<211> LENGTH: 11
<212> TYPE: PRT
<213> ORGANISM: Artificial Sequence
<220> FEATURE:
<223> OTHER INFORMATION: Synthetic Construct

<400> SEQUENCE: 27

Lys Thr Lys Pro Pro Leu Pro Ser Val Lys Lys
1 5 10

<210> SEQ ID NO 28
<211> LENGTH: 10
<212> TYPE: PRT
<213> ORGANISM: Artificial Sequence
<220> FEATURE:

<223> OTHER INFORMATION: Synthetic Construct

<400> SEQUENCE: 28

Arg Ile Arg Thr Trp Lys Ser Leu Val Lys
1 5 10

<210> SEQ ID NO 29
<211> LENGTH: 11
<212> TYPE: PRT
<213> ORGANISM: Artificial Sequence
<220> FEATURE:
<223> OTHER INFORMATION: Synthetic Construct

<400> SEQUENCE: 29

Arg Met Arg Gly Ala His Thr Asn Asp Val Lys
1 5 10

<210> SEQ ID NO 30
<211> LENGTH: 10
<212> TYPE: PRT
<213> ORGANISM: Artificial Sequence
<220> FEATURE:
<223> OTHER INFORMATION: Synthetic Construct

<400> SEQUENCE: 30

Arg Leu Arg Pro Gly Gly Lys Lys Lys Tyr
1 5 10

<210> SEQ ID NO 31
<211> LENGTH: 9
<212> TYPE: PRT
<213> ORGANISM: Artificial Sequence
<220> FEATURE:
<223> OTHER INFORMATION: Synthetic Construct

<400> SEQUENCE: 31

His Met Tyr Ile Ser Lys Lys Ala Lys
1 5

<210> SEQ ID NO 32
<211> LENGTH: 11
<212> TYPE: PRT
<213> ORGANISM: Artificial Sequence
<220> FEATURE:
<223> OTHER INFORMATION: Synthetic Construct

<400> SEQUENCE: 32

Ala Leu Val Glu Ile Cys Thr Glu Met Glu Lys
1 5 10

<210> SEQ ID NO 33
<211> LENGTH: 9
<212> TYPE: PRT
<213> ORGANISM: Artificial Sequence
<220> FEATURE:
<223> OTHER INFORMATION: Synthetic Construct

<400> SEQUENCE: 33

Lys Ile Arg Leu Arg Pro Gly Gly Lys
1 5

<210> SEQ ID NO 34
<211> LENGTH: 9
<212> TYPE: PRT
<213> ORGANISM: Artificial Sequence
<220> FEATURE:
<223> OTHER INFORMATION: Synthetic Construct

<400> SEQUENCE: 34

Arg Leu Arg Pro Gly Gly Lys Lys Lys
1               5

<210> SEQ ID NO 35
<211> LENGTH: 10
<212> TYPE: PRT
<213> ORGANISM: Artificial Sequence
<220> FEATURE:
<223> OTHER INFORMATION: Synthetic Construct

<400> SEQUENCE: 35

Glu Arg Ile Leu Ser Thr Tyr Leu Gly Arg
1               5                   10

<210> SEQ ID NO 36
<211> LENGTH: 10
<212> TYPE: PRT
<213> ORGANISM: Artificial Sequence
<220> FEATURE:
<223> OTHER INFORMATION: Synthetic Construct

<400> SEQUENCE: 36

Thr Val Tyr Tyr Gly Val Pro Val Trp Lys
1               5                   10

<210> SEQ ID NO 37
<211> LENGTH: 10
<212> TYPE: PRT
<213> ORGANISM: Artificial Sequence
<220> FEATURE:
<223> OTHER INFORMATION: Synthetic Construct

<400> SEQUENCE: 37

Ala Val Phe Ile His Asn Phe Lys Arg Lys
1               5                   10

<210> SEQ ID NO 38
<211> LENGTH: 9
<212> TYPE: PRT
<213> ORGANISM: Artificial Sequence
<220> FEATURE:
<223> OTHER INFORMATION: Synthetic Construct

<400> SEQUENCE: 38

Ala Ile Phe Gln Ser Ser Met Thr Lys
1               5

<210> SEQ ID NO 39
<211> LENGTH: 10
<212> TYPE: PRT
<213> ORGANISM: Artificial Sequence
<220> FEATURE:
<223> OTHER INFORMATION: Synthetic Construct

<400> SEQUENCE: 39

Gln Val Pro Leu Arg Pro Met Thr Tyr Lys
1               5                   10

<210> SEQ ID NO 40
<211> LENGTH: 9
<212> TYPE: PRT
<213> ORGANISM: Artificial Sequence
<220> FEATURE:
<223> OTHER INFORMATION: Synthetic Construct

<400> SEQUENCE: 40

Ala Val Asp Leu Ser His Phe Leu Lys
1               5

<210> SEQ ID NO 41
<211> LENGTH: 11
<212> TYPE: PRT
<213> ORGANISM: Artificial Sequence
<220> FEATURE:
<223> OTHER INFORMATION: Synthetic Construct

<400> SEQUENCE: 41

Arg Leu Arg Asp Leu Leu Leu Ile Val Thr Arg
1               5                   10

<210> SEQ ID NO 42
<211> LENGTH: 9
<212> TYPE: PRT
<213> ORGANISM: Artificial Sequence
<220> FEATURE:
<223> OTHER INFORMATION: Synthetic Construct

<400> SEQUENCE: 42

Ile Ile Ala Thr Asp Ile Gln Thr Lys
1               5

<210> SEQ ID NO 43
<211> LENGTH: 11
<212> TYPE: PRT
<213> ORGANISM: Artificial Sequence
<220> FEATURE:
<223> OTHER INFORMATION: Synthetic Construct

<400> SEQUENCE: 43

Ala Cys Gln Gly Val Gly Gly Pro Gly His Lys
1               5                   10

<210> SEQ ID NO 44
<211> LENGTH: 8
<212> TYPE: PRT
<213> ORGANISM: Artificial Sequence
<220> FEATURE:
<223> OTHER INFORMATION: Synthetic Construct

<400> SEQUENCE: 44

Thr Leu Tyr Cys Val His Gln Lys
1               5

<210> SEQ ID NO 45
<211> LENGTH: 9
<212> TYPE: PRT
<213> ORGANISM: Artificial Sequence
<220> FEATURE:
<223> OTHER INFORMATION: Synthetic Construct

<400> SEQUENCE: 45

Gln Ile Ile Glu Gln Leu Ile Lys Lys
1               5

<210> SEQ ID NO 46
<211> LENGTH: 9
<212> TYPE: PRT
<213> ORGANISM: Artificial Sequence
<220> FEATURE:
<223> OTHER INFORMATION: Synthetic Construct

<400> SEQUENCE: 46

Ser Val Ile Thr Gln Ala Cys Pro Lys
1 5

<210> SEQ ID NO 47
<211> LENGTH: 10
<212> TYPE: PRT
<213> ORGANISM: Artificial Sequence
<220> FEATURE:
<223> OTHER INFORMATION: Synthetic Construct

<400> SEQUENCE: 47

Ile Tyr Gln Glu Pro Phe Lys Asn Leu Lys
1 5 10

<210> SEQ ID NO 48
<211> LENGTH: 8
<212> TYPE: PRT
<213> ORGANISM: Artificial Sequence
<220> FEATURE:
<223> OTHER INFORMATION: Synthetic Construct

<400> SEQUENCE: 48

Pro Leu Arg Pro Met Thr Tyr Lys
1 5

<210> SEQ ID NO 49
<211> LENGTH: 9
<212> TYPE: PRT
<213> ORGANISM: Artificial Sequence
<220> FEATURE:
<223> OTHER INFORMATION: Synthetic Construct

<400> SEQUENCE: 49

Val Tyr Tyr Asp Pro Ser Lys Asp Leu
1 5

<210> SEQ ID NO 50
<211> LENGTH: 8
<212> TYPE: PRT
<213> ORGANISM: Artificial Sequence
<220> FEATURE:
<223> OTHER INFORMATION: Synthetic Construct

<400> SEQUENCE: 50

Arg Tyr Pro Leu Thr Phe Gly Trp
1 5

<210> SEQ ID NO 51
<211> LENGTH: 9
<212> TYPE: PRT
<213> ORGANISM: Artificial Sequence
<220> FEATURE:
<223> OTHER INFORMATION: Synthetic Construct

<400> SEQUENCE: 51

Lys Tyr Lys Leu Lys His Ile Val Trp
1 5

<210> SEQ ID NO 52
<211> LENGTH: 10
<212> TYPE: PRT
<213> ORGANISM: Artificial Sequence
<220> FEATURE:
<223> OTHER INFORMATION: Synthetic Construct

<400> SEQUENCE: 52

```
Leu Phe Cys Ala Ser Asp Ala Lys Ala Tyr
1               5                   10


<210> SEQ ID NO 53
<211> LENGTH: 9
<212> TYPE: PRT
<213> ORGANISM: Artificial Sequence
<220> FEATURE:
<223> OTHER INFORMATION: Synthetic Construct

<400> SEQUENCE: 53

Arg Tyr Leu Lys Asp Gln Gln Leu Leu
1               5


<210> SEQ ID NO 54
<211> LENGTH: 11
<212> TYPE: PRT
<213> ORGANISM: Artificial Sequence
<220> FEATURE:
<223> OTHER INFORMATION: Synthetic Construct

<400> SEQUENCE: 54

Arg Asp Tyr Val Asp Arg Phe Tyr Lys Thr Leu
1               5                   10


<210> SEQ ID NO 55
<211> LENGTH: 11
<212> TYPE: PRT
<213> ORGANISM: Artificial Sequence
<220> FEATURE:
<223> OTHER INFORMATION: Synthetic Construct

<400> SEQUENCE: 55

Gln Ala Ile Ser Pro Arg Thr Leu Asn Ala Trp
1               5                   10


<210> SEQ ID NO 56
<211> LENGTH: 10
<212> TYPE: PRT
<213> ORGANISM: Artificial Sequence
<220> FEATURE:
<223> OTHER INFORMATION: Synthetic Construct

<400> SEQUENCE: 56

Glu Thr Ile Asn Glu Glu Ala Ala Glu Trp
1               5                   10


<210> SEQ ID NO 57
<211> LENGTH: 10
<212> TYPE: PRT
<213> ORGANISM: Artificial Sequence
<220> FEATURE:
<223> OTHER INFORMATION: Synthetic Construct

<400> SEQUENCE: 57

Glu Ile Ile Gly Asp Ile Arg Gln Ala Tyr
1               5                   10


<210> SEQ ID NO 58
<211> LENGTH: 9
<212> TYPE: PRT
<213> ORGANISM: Artificial Sequence
<220> FEATURE:
<223> OTHER INFORMATION: Synthetic Construct

<400> SEQUENCE: 58

Glu Thr Lys Leu Gly Lys Ala Gly Tyr
```

1 5

<210> SEQ ID NO 59
<211> LENGTH: 9
<212> TYPE: PRT
<213> ORGANISM: Artificial Sequence
<220> FEATURE:
<223> OTHER INFORMATION: Synthetic Construct

<400> SEQUENCE: 59

Glu Val Ile Pro Met Phe Ser Ala Leu
1 5

<210> SEQ ID NO 60
<211> LENGTH: 11
<212> TYPE: PRT
<213> ORGANISM: Artificial Sequence
<220> FEATURE:
<223> OTHER INFORMATION: Synthetic Construct

<400> SEQUENCE: 60

Glu Thr Phe Tyr Val Asp Gly Ala Ala Asn Arg
1 5 10

<210> SEQ ID NO 61
<211> LENGTH: 9
<212> TYPE: PRT
<213> ORGANISM: Artificial Sequence
<220> FEATURE:
<223> OTHER INFORMATION: Synthetic Construct

<400> SEQUENCE: 61

Tyr Phe Pro Asp Trp Gln Asn Tyr Thr
1 5

<210> SEQ ID NO 62
<211> LENGTH: 9
<212> TYPE: PRT
<213> ORGANISM: Artificial Sequence
<220> FEATURE:
<223> OTHER INFORMATION: Synthetic Construct

<400> SEQUENCE: 62

Ser Phe Glu Pro Ile Pro Ile His Tyr
1 5

<210> SEQ ID NO 63
<211> LENGTH: 9
<212> TYPE: PRT
<213> ORGANISM: Artificial Sequence
<220> FEATURE:
<223> OTHER INFORMATION: Synthetic Construct

<400> SEQUENCE: 63

Leu Tyr Asn Thr Val Ala Thr Leu Tyr
1 5

<210> SEQ ID NO 64
<211> LENGTH: 11
<212> TYPE: PRT
<213> ORGANISM: Artificial Sequence
<220> FEATURE:
<223> OTHER INFORMATION: Synthetic Construct

<400> SEQUENCE: 64

Leu Val Trp Ala Ser Arg Glu Leu Glu Arg Phe
1 5 10

<210> SEQ ID NO 65
<211> LENGTH: 9
<212> TYPE: PRT
<213> ORGANISM: Artificial Sequence
<220> FEATURE:
<223> OTHER INFORMATION: Synthetic Construct

<400> SEQUENCE: 65

Ile Val Asn Arg Asn Arg Gln Gly Tyr
1 5

<210> SEQ ID NO 66
<211> LENGTH: 9
<212> TYPE: PRT
<213> ORGANISM: Artificial Sequence
<220> FEATURE:
<223> OTHER INFORMATION: Synthetic Construct

<400> SEQUENCE: 66

Lys Tyr Cys Trp Asn Leu Leu Gln Tyr
1 5

<210> SEQ ID NO 67
<211> LENGTH: 10
<212> TYPE: PRT
<213> ORGANISM: Artificial Sequence
<220> FEATURE:
<223> OTHER INFORMATION: Synthetic Construct

<400> SEQUENCE: 67

Arg Met Arg Gly Ala His Thr Asn Asp Val
1 5 10

<210> SEQ ID NO 68
<211> LENGTH: 9
<212> TYPE: PRT
<213> ORGANISM: Artificial Sequence
<220> FEATURE:
<223> OTHER INFORMATION: Synthetic Construct

<400> SEQUENCE: 68

Lys Leu Asn Trp Ala Ser Gln Ile Tyr
1 5

<210> SEQ ID NO 69
<211> LENGTH: 9
<212> TYPE: PRT
<213> ORGANISM: Artificial Sequence
<220> FEATURE:
<223> OTHER INFORMATION: Synthetic Construct

<400> SEQUENCE: 69

His Ile Gly Pro Gly Arg Ala Phe Tyr
1 5

<210> SEQ ID NO 70
<211> LENGTH: 9
<212> TYPE: PRT
<213> ORGANISM: Artificial Sequence
<220> FEATURE:
<223> OTHER INFORMATION: Synthetic Construct

<400> SEQUENCE: 70

Lys Ile Gln Asn Phe Arg Val Tyr Tyr
1 5

<210> SEQ ID NO 71
<211> LENGTH: 11
<212> TYPE: PRT
<213> ORGANISM: Artificial Sequence
<220> FEATURE:
<223> OTHER INFORMATION: Synthetic Construct

<400> SEQUENCE: 71

Arg Ser Leu Tyr Asn Thr Val Ala Thr Leu Tyr
1 5 10

<210> SEQ ID NO 72
<211> LENGTH: 9
<212> TYPE: PRT
<213> ORGANISM: Artificial Sequence
<220> FEATURE:
<223> OTHER INFORMATION: Synthetic Construct

<400> SEQUENCE: 72

Lys Gln Asn Pro Asp Ile Val Ile Tyr
1 5

<210> SEQ ID NO 73
<211> LENGTH: 10
<212> TYPE: PRT
<213> ORGANISM: Artificial Sequence
<220> FEATURE:
<223> OTHER INFORMATION: Synthetic Construct

<400> SEQUENCE: 73

Pro Ile Gln Lys Glu Thr Trp Glu Thr Trp
1 5 10

<210> SEQ ID NO 74
<211> LENGTH: 9
<212> TYPE: PRT
<213> ORGANISM: Artificial Sequence
<220> FEATURE:
<223> OTHER INFORMATION: Synthetic Construct

<400> SEQUENCE: 74

Arg Ile Lys Gln Ile Ile Asn Met Trp
1 5

<210> SEQ ID NO 75
<211> LENGTH: 9
<212> TYPE: PRT
<213> ORGANISM: Artificial Sequence
<220> FEATURE:
<223> OTHER INFORMATION: Synthetic Construct

<400> SEQUENCE: 75

Thr Arg Tyr Pro Leu Thr Phe Gly Trp
1 5

<210> SEQ ID NO 76
<211> LENGTH: 8
<212> TYPE: PRT
<213> ORGANISM: Artificial Sequence
<220> FEATURE:
<223> OTHER INFORMATION: Synthetic Construct

<400> SEQUENCE: 76

Glu Val Ala Gln Arg Ala Tyr Arg
1 5

<210> SEQ ID NO 77
<211> LENGTH: 9
<212> TYPE: PRT
<213> ORGANISM: Artificial Sequence
<220> FEATURE:
<223> OTHER INFORMATION: Synthetic Construct

<400> SEQUENCE: 77

Glu Tyr Arg Lys Ile Leu Arg Gln Arg
1               5

<210> SEQ ID NO 78
<211> LENGTH: 10
<212> TYPE: PRT
<213> ORGANISM: Artificial Sequence
<220> FEATURE:
<223> OTHER INFORMATION: Synthetic Construct

<400> SEQUENCE: 78

Val Phe Ala Val Leu Ser Ile Val Asn Arg
1               5                   10

<210> SEQ ID NO 79
<211> LENGTH: 11
<212> TYPE: PRT
<213> ORGANISM: Artificial Sequence
<220> FEATURE:
<223> OTHER INFORMATION: Synthetic Construct

<400> SEQUENCE: 79

Asp Thr Trp Ala Gly Val Glu Ala Ile Ile Arg
1               5                   10

<210> SEQ ID NO 80
<211> LENGTH: 11
<212> TYPE: PRT
<213> ORGANISM: Artificial Sequence
<220> FEATURE:
<223> OTHER INFORMATION: Synthetic Construct

<400> SEQUENCE: 80

Ile Thr Lys Gly Leu Gly Ile Ser Tyr Gly Arg
1               5                   10

<210> SEQ ID NO 81
<211> LENGTH: 9
<212> TYPE: PRT
<213> ORGANISM: Artificial Sequence
<220> FEATURE:
<223> OTHER INFORMATION: Synthetic Construct

<400> SEQUENCE: 81

Ile Val Thr Arg Ile Val Glu Leu Leu
1               5

<210> SEQ ID NO 82
<211> LENGTH: 10
<212> TYPE: PRT
<213> ORGANISM: Artificial Sequence
<220> FEATURE:
<223> OTHER INFORMATION: Synthetic Construct

<400> SEQUENCE: 82

Gly Ala Glu Thr Phe Tyr Val Asp Gly Ala
1               5                   10

<210> SEQ ID NO 83

<211> LENGTH: 9
<212> TYPE: PRT
<213> ORGANISM: Artificial Sequence
<220> FEATURE:
<223> OTHER INFORMATION: Synthetic Construct

<400> SEQUENCE: 83

Asp Thr Val Leu Glu Glu Trp Asn Leu
1 5

<210> SEQ ID NO 84
<211> LENGTH: 10
<212> TYPE: PRT
<213> ORGANISM: Artificial Sequence
<220> FEATURE:
<223> OTHER INFORMATION: Synthetic Construct

<400> SEQUENCE: 84

Glu Thr Tyr Gly Asp Thr Trp Thr Gly Val
1 5 10

<210> SEQ ID NO 85
<211> LENGTH: 9
<212> TYPE: PRT
<213> ORGANISM: Artificial Sequence
<220> FEATURE:
<223> OTHER INFORMATION: Synthetic Construct

<400> SEQUENCE: 85

Ile Thr Leu Trp Gln Arg Pro Leu Val
1 5

<210> SEQ ID NO 86
<211> LENGTH: 10
<212> TYPE: PRT
<213> ORGANISM: Artificial Sequence
<220> FEATURE:
<223> OTHER INFORMATION: Synthetic Construct

<400> SEQUENCE: 86

Arg Gln Asp Ile Leu Asp Leu Trp Ile Tyr
1 5 10

<210> SEQ ID NO 87
<211> LENGTH: 9
<212> TYPE: PRT
<213> ORGANISM: Artificial Sequence
<220> FEATURE:
<223> OTHER INFORMATION: Synthetic Construct

<400> SEQUENCE: 87

Ile Pro Arg Arg Ile Arg Gln Gly Leu
1 5

<210> SEQ ID NO 88
<211> LENGTH: 9
<212> TYPE: PRT
<213> ORGANISM: Artificial Sequence
<220> FEATURE:
<223> OTHER INFORMATION: Synthetic Construct

<400> SEQUENCE: 88

Ser Pro Arg Thr Leu Asn Ala Trp Val
1 5

<210> SEQ ID NO 89
<211> LENGTH: 9

<212> TYPE: PRT
<213> ORGANISM: Artificial Sequence
<220> FEATURE:
<223> OTHER INFORMATION: Synthetic Construct

<400> SEQUENCE: 89

Thr Pro Gln Val Pro Leu Arg Pro Met
1               5

<210> SEQ ID NO 90
<211> LENGTH: 9
<212> TYPE: PRT
<213> ORGANISM: Artificial Sequence
<220> FEATURE:
<223> OTHER INFORMATION: Synthetic Construct

<400> SEQUENCE: 90

Gly Pro Gly His Lys Ala Arg Val Leu
1               5

<210> SEQ ID NO 91
<211> LENGTH: 10
<212> TYPE: PRT
<213> ORGANISM: Artificial Sequence
<220> FEATURE:
<223> OTHER INFORMATION: Synthetic Construct

<400> SEQUENCE: 91

Phe Pro Val Thr Pro Gln Val Pro Leu Arg
1               5                   10

<210> SEQ ID NO 92
<211> LENGTH: 9
<212> TYPE: PRT
<213> ORGANISM: Artificial Sequence
<220> FEATURE:
<223> OTHER INFORMATION: Synthetic Construct

<400> SEQUENCE: 92

Phe Pro Val Thr Pro Gln Val Pro Leu
1               5

<210> SEQ ID NO 93
<211> LENGTH: 10
<212> TYPE: PRT
<213> ORGANISM: Artificial Sequence
<220> FEATURE:
<223> OTHER INFORMATION: Synthetic Construct

<400> SEQUENCE: 93

Arg Pro Asn Asn Asn Thr Arg Lys Ser Ile
1               5                   10

<210> SEQ ID NO 94
<211> LENGTH: 9
<212> TYPE: PRT
<213> ORGANISM: Artificial Sequence
<220> FEATURE:
<223> OTHER INFORMATION: Synthetic Construct

<400> SEQUENCE: 94

Arg Pro Met Thr Tyr Lys Ala Ala Leu
1               5

<210> SEQ ID NO 95
<211> LENGTH: 9
<212> TYPE: PRT

<213> ORGANISM: Artificial Sequence
<220> FEATURE:
<223> OTHER INFORMATION: Synthetic Construct

<400> SEQUENCE: 95

Arg Pro Met Thr Tyr Lys Ala Ala Val
1 5

<210> SEQ ID NO 96
<211> LENGTH: 10
<212> TYPE: PRT
<213> ORGANISM: Artificial Sequence
<220> FEATURE:
<223> OTHER INFORMATION: Synthetic Construct

<400> SEQUENCE: 96

His Pro Arg Val Ser Ser Glu Val His Ile
1 5 10

<210> SEQ ID NO 97
<211> LENGTH: 9
<212> TYPE: PRT
<213> ORGANISM: Artificial Sequence
<220> FEATURE:
<223> OTHER INFORMATION: Synthetic Construct

<400> SEQUENCE: 97

Thr Pro Gln Asp Leu Asn Thr Met Leu
1 5

<210> SEQ ID NO 98
<211> LENGTH: 10
<212> TYPE: PRT
<213> ORGANISM: Artificial Sequence
<220> FEATURE:
<223> OTHER INFORMATION: Synthetic Construct

<400> SEQUENCE: 98

Thr Pro Gly Pro Gly Val Arg Tyr Pro Leu
1 5 10

<210> SEQ ID NO 99
<211> LENGTH: 9
<212> TYPE: PRT
<213> ORGANISM: Artificial Sequence
<220> FEATURE:
<223> OTHER INFORMATION: Synthetic Construct

<400> SEQUENCE: 99

Phe Pro Arg Ile Trp Leu His Gly Leu
1 5

<210> SEQ ID NO 100
<211> LENGTH: 9
<212> TYPE: PRT
<213> ORGANISM: Artificial Sequence
<220> FEATURE:
<223> OTHER INFORMATION: Synthetic Construct

<400> SEQUENCE: 100

Arg Val Lys Glu Lys Tyr Gln His Leu
1 5

<210> SEQ ID NO 101
<211> LENGTH: 9
<212> TYPE: PRT
<213> ORGANISM: Artificial Sequence
<220> FEATURE:
<223> OTHER INFORMATION: Synthetic Construct

<400> SEQUENCE: 101

Asp Cys Lys Thr Ile Leu Lys Ala Leu
1 5

<210> SEQ ID NO 102
<211> LENGTH: 8
<212> TYPE: PRT
<213> ORGANISM: Artificial Sequence
<220> FEATURE:
<223> OTHER INFORMATION: Synthetic Construct

<400> SEQUENCE: 102

Glu Ile Tyr Lys Arg Trp Ile Ile
1 5

<210> SEQ ID NO 103
<211> LENGTH: 9
<212> TYPE: PRT
<213> ORGANISM: Artificial Sequence
<220> FEATURE:
<223> OTHER INFORMATION: Synthetic Construct

<400> SEQUENCE: 103

Gly Pro Lys Val Lys Gln Trp Pro Leu
1 5

<210> SEQ ID NO 104
<211> LENGTH: 9
<212> TYPE: PRT
<213> ORGANISM: Artificial Sequence
<220> FEATURE:
<223> OTHER INFORMATION: Synthetic Construct

<400> SEQUENCE: 104

Glu Leu Arg Ser Leu Tyr Asn Thr Val
1 5

<210> SEQ ID NO 105
<211> LENGTH: 8
<212> TYPE: PRT
<213> ORGANISM: Artificial Sequence
<220> FEATURE:
<223> OTHER INFORMATION: Synthetic Construct

<400> SEQUENCE: 105

Tyr Leu Lys Asp Gln Gln Leu Leu
1 5

<210> SEQ ID NO 106
<211> LENGTH: 8
<212> TYPE: PRT
<213> ORGANISM: Artificial Sequence
<220> FEATURE:
<223> OTHER INFORMATION: Synthetic Construct

<400> SEQUENCE: 106

Phe Leu Lys Glu Lys Gly Gly Leu
1 5

<210> SEQ ID NO 107
<211> LENGTH: 8
<212> TYPE: PRT
<213> ORGANISM: Artificial Sequence
<220> FEATURE:

<223> OTHER INFORMATION: Synthetic Construct

<400> SEQUENCE: 107

Gly Gly Lys Lys Lys Tyr Lys Leu
1 5

<210> SEQ ID NO 108
<211> LENGTH: 9
<212> TYPE: PRT
<213> ORGANISM: Artificial Sequence
<220> FEATURE:
<223> OTHER INFORMATION: Synthetic Construct

<400> SEQUENCE: 108

Gly Gly Lys Lys Lys Tyr Lys Leu Lys
1 5

<210> SEQ ID NO 109
<211> LENGTH: 8
<212> TYPE: PRT
<213> ORGANISM: Artificial Sequence
<220> FEATURE:
<223> OTHER INFORMATION: Synthetic Construct

<400> SEQUENCE: 109

Trp Pro Thr Val Arg Glu Arg Met
1 5

<210> SEQ ID NO 110
<211> LENGTH: 9
<212> TYPE: PRT
<213> ORGANISM: Artificial Sequence
<220> FEATURE:
<223> OTHER INFORMATION: Synthetic Construct

<400> SEQUENCE: 110

Arg Gln Asp Ile Leu Asp Leu Trp Val
1 5

<210> SEQ ID NO 111
<211> LENGTH: 8
<212> TYPE: PRT
<213> ORGANISM: Artificial Sequence
<220> FEATURE:
<223> OTHER INFORMATION: Synthetic Construct

<400> SEQUENCE: 111

Ile Arg Tyr Gln Tyr Asn Val Leu
1 5

<210> SEQ ID NO 112
<211> LENGTH: 9
<212> TYPE: PRT
<213> ORGANISM: Artificial Sequence
<220> FEATURE:
<223> OTHER INFORMATION: Synthetic Construct

<400> SEQUENCE: 112

Asp Arg Phe Tyr Lys Thr Leu Arg Ala
1 5

<210> SEQ ID NO 113
<211> LENGTH: 9
<212> TYPE: PRT
<213> ORGANISM: Artificial Sequence
<220> FEATURE:
<223> OTHER INFORMATION: Synthetic Construct

<400> SEQUENCE: 113

Glu Arg Tyr Leu Lys Asp Gln Gln Leu
1 5

<210> SEQ ID NO 114
<211> LENGTH: 11
<212> TYPE: PRT
<213> ORGANISM: Artificial Sequence
<220> FEATURE:
<223> OTHER INFORMATION: Synthetic Construct

<400> SEQUENCE: 114

Thr Gln Gly Tyr Phe Pro Asp Trp Gln Asn Tyr
1 5 10

<210> SEQ ID NO 115
<211> LENGTH: 12
<212> TYPE: PRT
<213> ORGANISM: Artificial Sequence
<220> FEATURE:
<223> OTHER INFORMATION: Synthetic Construct

<400> SEQUENCE: 115

Leu Val Gly Lys Leu Asn Trp Ala Ser Gln Ile Tyr
1 5 10

<210> SEQ ID NO 116
<211> LENGTH: 9
<212> TYPE: PRT
<213> ORGANISM: Artificial Sequence
<220> FEATURE:
<223> OTHER INFORMATION: Synthetic Construct

<400> SEQUENCE: 116

Gly Leu Asn Lys Ile Val Arg Met Tyr
1 5

<210> SEQ ID NO 117
<211> LENGTH: 10
<212> TYPE: PRT
<213> ORGANISM: Artificial Sequence
<220> FEATURE:
<223> OTHER INFORMATION: Synthetic Construct

<400> SEQUENCE: 117

Ile Leu Lys Glu Pro Val His Gly Val Tyr
1 5 10

<210> SEQ ID NO 118
<211> LENGTH: 10
<212> TYPE: PRT
<213> ORGANISM: Artificial Sequence
<220> FEATURE:
<223> OTHER INFORMATION: Synthetic Construct

<400> SEQUENCE: 118

Phe Lys Arg Lys Gly Gly Ile Gly Gly Tyr
1 5 10

<210> SEQ ID NO 119
<211> LENGTH: 9
<212> TYPE: PRT
<213> ORGANISM: Artificial Sequence
<220> FEATURE:
<223> OTHER INFORMATION: Synthetic Construct

<400> SEQUENCE: 119

Val Lys Val Ile Glu Glu Lys Ala Phe
1               5

<210> SEQ ID NO 120
<211> LENGTH: 10
<212> TYPE: PRT
<213> ORGANISM: Artificial Sequence
<220> FEATURE:
<223> OTHER INFORMATION: Synthetic Construct

<400> SEQUENCE: 120

Val Thr Asp Ser Gln Tyr Ala Leu Gly Ile
1               5                   10

<210> SEQ ID NO 121
<211> LENGTH: 9
<212> TYPE: PRT
<213> ORGANISM: Artificial Sequence
<220> FEATURE:
<223> OTHER INFORMATION: Synthetic Construct

<400> SEQUENCE: 121

Ile Gln Gln Glu Phe Gly Ile Pro Tyr
1               5

<210> SEQ ID NO 122
<211> LENGTH: 10
<212> TYPE: PRT
<213> ORGANISM: Artificial Sequence
<220> FEATURE:
<223> OTHER INFORMATION: Synthetic Construct

<400> SEQUENCE: 122

Phe Gln Thr Lys Gly Leu Gly Ile Ser Tyr
1               5                   10

<210> SEQ ID NO 123
<211> LENGTH: 9
<212> TYPE: PRT
<213> ORGANISM: Artificial Sequence
<220> FEATURE:
<223> OTHER INFORMATION: Synthetic Construct

<400> SEQUENCE: 123

Gly Lys Lys Ala Ile Gly Thr Val Leu
1               5

<210> SEQ ID NO 124
<211> LENGTH: 9
<212> TYPE: PRT
<213> ORGANISM: Artificial Sequence
<220> FEATURE:
<223> OTHER INFORMATION: Synthetic Construct

<400> SEQUENCE: 124

Trp Arg Phe Asp Ser Arg Leu Ala Phe
1               5

<210> SEQ ID NO 125
<211> LENGTH: 9
<212> TYPE: PRT
<213> ORGANISM: Artificial Sequence
<220> FEATURE:
<223> OTHER INFORMATION: Synthetic Construct

<400> SEQUENCE: 125

Arg Lys Ala Lys Ile Ile Arg Asp Tyr
1 5

<210> SEQ ID NO 126
<211> LENGTH: 9
<212> TYPE: PRT
<213> ORGANISM: Artificial Sequence
<220> FEATURE:
<223> OTHER INFORMATION: Synthetic Construct

<400> SEQUENCE: 126

Tyr Val Asp Arg Phe Phe Lys Thr Leu
1 5

<210> SEQ ID NO 127
<211> LENGTH: 9
<212> TYPE: PRT
<213> ORGANISM: Artificial Sequence
<220> FEATURE:
<223> OTHER INFORMATION: Synthetic Construct

<400> SEQUENCE: 127

His Gln Ala Ile Ser Pro Arg Thr Leu
1 5

<210> SEQ ID NO 128
<211> LENGTH: 9
<212> TYPE: PRT
<213> ORGANISM: Artificial Sequence
<220> FEATURE:
<223> OTHER INFORMATION: Synthetic Construct

<400> SEQUENCE: 128

Thr His Leu Glu Gly Lys Ile Ile Leu
1 5

<210> SEQ ID NO 129
<211> LENGTH: 9
<212> TYPE: PRT
<213> ORGANISM: Artificial Sequence
<220> FEATURE:
<223> OTHER INFORMATION: Synthetic Construct

<400> SEQUENCE: 129

Trp His Leu Gly His Gly Val Ser Ile
1 5

<210> SEQ ID NO 130
<211> LENGTH: 9
<212> TYPE: PRT
<213> ORGANISM: Artificial Sequence
<220> FEATURE:
<223> OTHER INFORMATION: Synthetic Construct

<400> SEQUENCE: 130

Gly His Gln Ala Ala Met Gln Met Leu
1 5

<210> SEQ ID NO 131
<211> LENGTH: 9
<212> TYPE: PRT
<213> ORGANISM: Artificial Sequence
<220> FEATURE:
<223> OTHER INFORMATION: Synthetic Construct

<400> SEQUENCE: 131

Ser Phe Asn Cys Gly Gly Glu Phe Phe
1 5

<210> SEQ ID NO 132
<211> LENGTH: 10
<212> TYPE: PRT
<213> ORGANISM: Artificial Sequence
<220> FEATURE:
<223> OTHER INFORMATION: Synthetic Construct

<400> SEQUENCE: 132

Phe Arg Asp Tyr Val Asp Arg Phe Tyr Lys
1 5 10

<210> SEQ ID NO 133
<211> LENGTH: 10
<212> TYPE: PRT
<213> ORGANISM: Artificial Sequence
<220> FEATURE:
<223> OTHER INFORMATION: Synthetic Construct

<400> SEQUENCE: 133

Leu Ala Asp Gln Leu Ile His Leu His Tyr
1 5 10

<210> SEQ ID NO 134
<211> LENGTH: 9
<212> TYPE: PRT
<213> ORGANISM: Artificial Sequence
<220> FEATURE:
<223> OTHER INFORMATION: Synthetic Construct

<400> SEQUENCE: 134

Tyr Glu Thr Glu Val His Asn Val Trp
1 5

<210> SEQ ID NO 135
<211> LENGTH: 9
<212> TYPE: PRT
<213> ORGANISM: Artificial Sequence
<220> FEATURE:
<223> OTHER INFORMATION: Synthetic Construct

<400> SEQUENCE: 135

Tyr Pro Leu Thr Phe Gly Trp Cys Tyr
1 5

<210> SEQ ID NO 136
<211> LENGTH: 9
<212> TYPE: PRT
<213> ORGANISM: Artificial Sequence
<220> FEATURE:
<223> OTHER INFORMATION: Synthetic Construct

<400> SEQUENCE: 136

Ala Glu Asn Leu Trp Val Thr Val Tyr
1 5

<210> SEQ ID NO 137
<211> LENGTH: 10
<212> TYPE: PRT
<213> ORGANISM: Artificial Sequence
<220> FEATURE:
<223> OTHER INFORMATION: Synthetic Construct

<400> SEQUENCE: 137

Arg Arg Trp Ile Gln Leu Gly Leu Gln Lys 1 5 10

<210> SEQ ID NO 138
<211> LENGTH: 9
<212> TYPE: PRT
<213> ORGANISM: Artificial Sequence
<220> FEATURE:
<223> OTHER INFORMATION: Synthetic Construct

<400> SEQUENCE: 138

Leu Arg Pro Met Thr Tyr Lys Ala Ala
1 5

<210> SEQ ID NO 139
<211> LENGTH: 10
<212> TYPE: PRT
<213> ORGANISM: Artificial Sequence
<220> FEATURE:
<223> OTHER INFORMATION: Synthetic Construct

<400> SEQUENCE: 139

Gly Arg Arg Gly Trp Glu Ala Leu Lys Tyr
1 5 10

<210> SEQ ID NO 140
<211> LENGTH: 9
<212> TYPE: PRT
<213> ORGANISM: Artificial Sequence
<220> FEATURE:
<223> OTHER INFORMATION: Synthetic Construct

<400> SEQUENCE: 140

Lys Arg Lys Gly Gly Ile Gly Gly Tyr
1 5

<210> SEQ ID NO 141
<211> LENGTH: 10
<212> TYPE: PRT
<213> ORGANISM: Artificial Sequence
<220> FEATURE:
<223> OTHER INFORMATION: Synthetic Construct

<400> SEQUENCE: 141

Lys Arg Trp Ile Ile Leu Gly Leu Asn Lys
1 5 10

<210> SEQ ID NO 142
<211> LENGTH: 10
<212> TYPE: PRT
<213> ORGANISM: Artificial Sequence
<220> FEATURE:
<223> OTHER INFORMATION: Synthetic Construct

<400> SEQUENCE: 142

Arg Arg Gln Asp Ile Leu Asp Leu Trp Ile
1 5 10

<210> SEQ ID NO 143
<211> LENGTH: 9
<212> TYPE: PRT
<213> ORGANISM: Artificial Sequence
<220> FEATURE:
<223> OTHER INFORMATION: Synthetic Construct

<400> SEQUENCE: 143

Ile Arg Leu Arg Pro Gly Gly Lys Lys
1 5

<210> SEQ ID NO 144
<211> LENGTH: 9
<212> TYPE: PRT
<213> ORGANISM: Artificial Sequence
<220> FEATURE:
<223> OTHER INFORMATION: Synthetic Construct

<400> SEQUENCE: 144

Asn Ser Ser Lys Val Ser Gln Asn Tyr
1               5

<210> SEQ ID NO 145
<211> LENGTH: 9
<212> TYPE: PRT
<213> ORGANISM: Artificial Sequence
<220> FEATURE:
<223> OTHER INFORMATION: Synthetic Construct

<400> SEQUENCE: 145

Thr Ala Val Pro Trp Asn Ala Ser Trp
1               5

<210> SEQ ID NO 146
<211> LENGTH: 9
<212> TYPE: PRT
<213> ORGANISM: Artificial Sequence
<220> FEATURE:
<223> OTHER INFORMATION: Synthetic Construct

<400> SEQUENCE: 146

Thr Val Leu Asp Val Gly Asp Ala Tyr
1               5

<210> SEQ ID NO 147
<211> LENGTH: 9
<212> TYPE: PRT
<213> ORGANISM: Artificial Sequence
<220> FEATURE:
<223> OTHER INFORMATION: Synthetic Construct

<400> SEQUENCE: 147

His Pro Asp Ile Val Ile Tyr Gln Tyr
1               5

<210> SEQ ID NO 148
<211> LENGTH: 10
<212> TYPE: PRT
<213> ORGANISM: Artificial Sequence
<220> FEATURE:
<223> OTHER INFORMATION: Synthetic Construct

<400> SEQUENCE: 148

Asn Pro Pro Ile Pro Val Gly Asp Ile Tyr
1               5                   10

<210> SEQ ID NO 149
<211> LENGTH: 9
<212> TYPE: PRT
<213> ORGANISM: Artificial Sequence
<220> FEATURE:
<223> OTHER INFORMATION: Synthetic Construct

<400> SEQUENCE: 149

Pro Pro Ile Pro Val Gly Asp Ile Tyr
1               5

<210> SEQ ID NO 150
<211> LENGTH: 10
<212> TYPE: PRT
<213> ORGANISM: Artificial Sequence
<220> FEATURE:
<223> OTHER INFORMATION: Synthetic Construct

<400> SEQUENCE: 150

Val Pro Leu Asp Glu Asp Phe Arg Lys Tyr
1 5 10

<210> SEQ ID NO 151
<211> LENGTH: 11
<212> TYPE: PRT
<213> ORGANISM: Artificial Sequence
<220> FEATURE:
<223> OTHER INFORMATION: Synthetic Construct

<400> SEQUENCE: 151

Val Pro Val Trp Lys Glu Ala Thr Thr Thr Leu
1 5 10

<210> SEQ ID NO 152
<211> LENGTH: 8
<212> TYPE: PRT
<213> ORGANISM: Artificial Sequence
<220> FEATURE:
<223> OTHER INFORMATION: Synthetic Construct

<400> SEQUENCE: 152

Val Pro Leu Arg Pro Met Thr Tyr
1 5

<210> SEQ ID NO 153
<211> LENGTH: 9
<212> TYPE: PRT
<213> ORGANISM: Artificial Sequence
<220> FEATURE:
<223> OTHER INFORMATION: Synthetic Construct

<400> SEQUENCE: 153

Trp Ala Ser Arg Glu Leu Glu Arg Phe
1 5

<210> SEQ ID NO 154
<211> LENGTH: 9
<212> TYPE: PRT
<213> ORGANISM: Artificial Sequence
<220> FEATURE:
<223> OTHER INFORMATION: Synthetic Construct

<400> SEQUENCE: 154

Asp Pro Asn Pro Gln Glu Val Val Leu
1 5

<210> SEQ ID NO 155
<211> LENGTH: 9
<212> TYPE: PRT
<213> ORGANISM: Artificial Sequence
<220> FEATURE:
<223> OTHER INFORMATION: Synthetic Construct

<400> SEQUENCE: 155

Ile Pro Leu Thr Glu Glu Ala Glu Leu
1 5

<210> SEQ ID NO 156
<211> LENGTH: 9
<212> TYPE: PRT
<213> ORGANISM: Artificial Sequence
<220> FEATURE:
<223> OTHER INFORMATION: Synthetic Construct

<400> SEQUENCE: 156

His Pro Val His Ala Gly Pro Ile Ala
1               5

<210> SEQ ID NO 157
<211> LENGTH: 9
<212> TYPE: PRT
<213> ORGANISM: Artificial Sequence
<220> FEATURE:
<223> OTHER INFORMATION: Synthetic Construct

<400> SEQUENCE: 157

Met His Glu Asp Ile Ile Ser Leu Trp
1               5

<210> SEQ ID NO 158
<211> LENGTH: 9
<212> TYPE: PRT
<213> ORGANISM: Artificial Sequence
<220> FEATURE:
<223> OTHER INFORMATION: Synthetic Construct

<400> SEQUENCE: 158

Trp His Leu Gly Gln Gly Val Ser Ile
1               5

<210> SEQ ID NO 159
<211> LENGTH: 9
<212> TYPE: PRT
<213> ORGANISM: Artificial Sequence
<220> FEATURE:
<223> OTHER INFORMATION: Synthetic Construct

<400> SEQUENCE: 159

Lys Glu Leu Tyr Pro Leu Thr Ser Leu
1               5

<210> SEQ ID NO 160
<211> LENGTH: 10
<212> TYPE: PRT
<213> ORGANISM: Artificial Sequence
<220> FEATURE:
<223> OTHER INFORMATION: Synthetic Construct

<400> SEQUENCE: 160

Gln Glu Leu Lys Asn Ser Ala Val Ser Leu
1               5                   10

<210> SEQ ID NO 161
<211> LENGTH: 9
<212> TYPE: PRT
<213> ORGANISM: Artificial Sequence
<220> FEATURE:
<223> OTHER INFORMATION: Synthetic Construct

<400> SEQUENCE: 161

Ser Glu Gly Ala Thr Pro Gln Asp Leu
1               5

<210> SEQ ID NO 162

<211> LENGTH: 10
<212> TYPE: PRT
<213> ORGANISM: Artificial Sequence
<220> FEATURE:
<223> OTHER INFORMATION: Synthetic Construct

<400> SEQUENCE: 162

Ile Glu Ile Lys Asp Thr Lys Glu Ala Leu
1 5 10

<210> SEQ ID NO 163
<211> LENGTH: 8
<212> TYPE: PRT
<213> ORGANISM: Artificial Sequence
<220> FEATURE:
<223> OTHER INFORMATION: Synthetic Construct

<400> SEQUENCE: 163

Ile Glu Thr Val Pro Val Lys Leu
1 5

<210> SEQ ID NO 164
<211> LENGTH: 9
<212> TYPE: PRT
<213> ORGANISM: Artificial Sequence
<220> FEATURE:
<223> OTHER INFORMATION: Synthetic Construct

<400> SEQUENCE: 164

Ile Glu Glu Leu Arg Gln His Leu Leu
1 5

<210> SEQ ID NO 165
<211> LENGTH: 9
<212> TYPE: PRT
<213> ORGANISM: Artificial Sequence
<220> FEATURE:
<223> OTHER INFORMATION: Synthetic Construct

<400> SEQUENCE: 165

Lys Glu Lys Gly Gly Leu Glu Gly Leu
1 5

<210> SEQ ID NO 166
<211> LENGTH: 9
<212> TYPE: PRT
<213> ORGANISM: Artificial Sequence
<220> FEATURE:
<223> OTHER INFORMATION: Synthetic Construct

<400> SEQUENCE: 166

Leu Glu Lys His Gly Ala Ile Thr Ser
1 5

<210> SEQ ID NO 167
<211> LENGTH: 8
<212> TYPE: PRT
<213> ORGANISM: Artificial Sequence
<220> FEATURE:
<223> OTHER INFORMATION: Synthetic Construct

<400> SEQUENCE: 167

Thr Glu Arg Gln Ala Asn Phe Leu
1 5

<210> SEQ ID NO 168
<211> LENGTH: 8

<212> TYPE: PRT
<213> ORGANISM: Artificial Sequence
<220> FEATURE:
<223> OTHER INFORMATION: Synthetic Construct

<400> SEQUENCE: 168

Gly Glu Arg Ile Val Asp Ile Ile
1               5

<210> SEQ ID NO 169
<211> LENGTH: 10
<212> TYPE: PRT
<213> ORGANISM: Artificial Sequence
<220> FEATURE:
<223> OTHER INFORMATION: Synthetic Construct

<400> SEQUENCE: 169

Ile Glu Ala Glu Val Ile Pro Ala Glu Thr
1               5                   10

<210> SEQ ID NO 170
<211> LENGTH: 9
<212> TYPE: PRT
<213> ORGANISM: Artificial Sequence
<220> FEATURE:
<223> OTHER INFORMATION: Synthetic Construct

<400> SEQUENCE: 170

Gly Glu Leu Asp Arg Trp Glu Lys Ile
1               5

<210> SEQ ID NO 171
<211> LENGTH: 9
<212> TYPE: PRT
<213> ORGANISM: Artificial Sequence
<220> FEATURE:
<223> OTHER INFORMATION: Synthetic Construct

<400> SEQUENCE: 171

Lys Glu Thr Ile Asn Glu Glu Ala Ala
1               5

<210> SEQ ID NO 172
<211> LENGTH: 9
<212> TYPE: PRT
<213> ORGANISM: Artificial Sequence
<220> FEATURE:
<223> OTHER INFORMATION: Synthetic Construct

<400> SEQUENCE: 172

Ala Glu Trp Asp Arg Val His Pro Val
1               5

<210> SEQ ID NO 173
<211> LENGTH: 9
<212> TYPE: PRT
<213> ORGANISM: Artificial Sequence
<220> FEATURE:
<223> OTHER INFORMATION: Synthetic Construct

<400> SEQUENCE: 173

Tyr Pro Gly Ile Lys Val Arg Gln Leu
1               5

<210> SEQ ID NO 174
<211> LENGTH: 9
<212> TYPE: PRT

<213> ORGANISM: Artificial Sequence
<220> FEATURE:
<223> OTHER INFORMATION: Synthetic Construct

<400> SEQUENCE: 174

Arg Pro Gln Val Pro Leu Arg Pro Met
1 5

<210> SEQ ID NO 175
<211> LENGTH: 9
<212> TYPE: PRT
<213> ORGANISM: Artificial Sequence
<220> FEATURE:
<223> OTHER INFORMATION: Synthetic Construct

<400> SEQUENCE: 175

Leu Pro Pro Ile Val Ala Lys Glu Ile
1 5

<210> SEQ ID NO 176
<211> LENGTH: 11
<212> TYPE: PRT
<213> ORGANISM: Artificial Sequence
<220> FEATURE:
<223> OTHER INFORMATION: Synthetic Construct

<400> SEQUENCE: 176

Ala Glu Gln Ala Ser Gln Asp Val Lys Asn Trp
1 5 10

<210> SEQ ID NO 177
<211> LENGTH: 10
<212> TYPE: PRT
<213> ORGANISM: Artificial Sequence
<220> FEATURE:
<223> OTHER INFORMATION: Synthetic Construct

<400> SEQUENCE: 177

Ala Glu Asn Leu Trp Val Thr Val Tyr Tyr
1 5 10

<210> SEQ ID NO 178
<211> LENGTH: 9
<212> TYPE: PRT
<213> ORGANISM: Artificial Sequence
<220> FEATURE:
<223> OTHER INFORMATION: Synthetic Construct

<400> SEQUENCE: 178

Glu Glu Lys Ala Phe Ser Pro Glu Val
1 5

<210> SEQ ID NO 179
<211> LENGTH: 10
<212> TYPE: PRT
<213> ORGANISM: Artificial Sequence
<220> FEATURE:
<223> OTHER INFORMATION: Synthetic Construct

<400> SEQUENCE: 179

Ala Glu Ala Met Ser Gln Val Thr Asn Ser
1 5 10

<210> SEQ ID NO 180
<211> LENGTH: 9
<212> TYPE: PRT
<213> ORGANISM: Artificial Sequence
<220> FEATURE:
<223> OTHER INFORMATION: Synthetic Construct

<400> SEQUENCE: 180

Val Lys Asn Trp Met Thr Glu Thr Leu
1               5

<210> SEQ ID NO 181
<211> LENGTH: 9
<212> TYPE: PRT
<213> ORGANISM: Artificial Sequence
<220> FEATURE:
<223> OTHER INFORMATION: Synthetic Construct

<400> SEQUENCE: 181

Arg Gln Ala Asn Phe Leu Gly Lys Ile
1               5

<210> SEQ ID NO 182
<211> LENGTH: 10
<212> TYPE: PRT
<213> ORGANISM: Artificial Sequence
<220> FEATURE:
<223> OTHER INFORMATION: Synthetic Construct

<400> SEQUENCE: 182

Thr Trp Glu Ala Trp Trp Thr Glu Tyr Trp
1               5                   10

<210> SEQ ID NO 183
<211> LENGTH: 9
<212> TYPE: PRT
<213> ORGANISM: Artificial Sequence
<220> FEATURE:
<223> OTHER INFORMATION: Synthetic Construct

<400> SEQUENCE: 183

Arg Ala Ile Glu Ala Gln Gln His Leu
1               5

<210> SEQ ID NO 184
<211> LENGTH: 8
<212> TYPE: PRT
<213> ORGANISM: Artificial Sequence
<220> FEATURE:
<223> OTHER INFORMATION: Synthetic Construct

<400> SEQUENCE: 184

Thr Ala Phe Thr Ile Pro Ser Ile
1               5

<210> SEQ ID NO 185
<211> LENGTH: 9
<212> TYPE: PRT
<213> ORGANISM: Artificial Sequence
<220> FEATURE:
<223> OTHER INFORMATION: Synthetic Construct

<400> SEQUENCE: 185

Leu Pro Cys Arg Ile Lys Gln Ile Ile
1               5

<210> SEQ ID NO 186
<211> LENGTH: 10
<212> TYPE: PRT
<213> ORGANISM: Artificial Sequence
<220> FEATURE:

<223> OTHER INFORMATION: Synthetic Construct

<400> SEQUENCE: 186

Arg Pro Gly Gly Lys Lys Lys Tyr Lys Leu
1 5 10

<210> SEQ ID NO 187
<211> LENGTH: 8
<212> TYPE: PRT
<213> ORGANISM: Artificial Sequence
<220> FEATURE:
<223> OTHER INFORMATION: Synthetic Construct

<400> SEQUENCE: 187

Trp Gln Arg Pro Leu Val Thr Ile
1 5

<210> SEQ ID NO 188
<211> LENGTH: 8
<212> TYPE: PRT
<213> ORGANISM: Artificial Sequence
<220> FEATURE:
<223> OTHER INFORMATION: Synthetic Construct

<400> SEQUENCE: 188

Arg Met Tyr Ser Pro Thr Ser Ile
1 5

<210> SEQ ID NO 189
<211> LENGTH: 9
<212> TYPE: PRT
<213> ORGANISM: Artificial Sequence
<220> FEATURE:
<223> OTHER INFORMATION: Synthetic Construct

<400> SEQUENCE: 189

Gln Ala Ser Gln Glu Val Lys Asn Trp
1 5

<210> SEQ ID NO 190
<211> LENGTH: 9
<212> TYPE: PRT
<213> ORGANISM: Artificial Sequence
<220> FEATURE:
<223> OTHER INFORMATION: Synthetic Construct

<400> SEQUENCE: 190

His Val Ala Ser Gly Tyr Ile Glu Ala
1 5

<210> SEQ ID NO 191
<211> LENGTH: 10
<212> TYPE: PRT
<213> ORGANISM: Artificial Sequence
<220> FEATURE:
<223> OTHER INFORMATION: Synthetic Construct

<400> SEQUENCE: 191

Leu Pro Gln Gly Trp Lys Gly Ser Pro Ala
1 5 10

<210> SEQ ID NO 192
<211> LENGTH: 9
<212> TYPE: PRT
<213> ORGANISM: Artificial Sequence
<220> FEATURE:
<223> OTHER INFORMATION: Synthetic Construct

<400> SEQUENCE: 192

Phe Pro Asp Trp Gln Asn Tyr Thr Pro
1 5

<210> SEQ ID NO 193
<211> LENGTH: 9
<212> TYPE: PRT
<213> ORGANISM: Artificial Sequence
<220> FEATURE:
<223> OTHER INFORMATION: Synthetic Construct

<400> SEQUENCE: 193

Phe Pro Ile Ser Pro Ile Glu Thr Val
1 5

<210> SEQ ID NO 194
<211> LENGTH: 10
<212> TYPE: PRT
<213> ORGANISM: Artificial Sequence
<220> FEATURE:
<223> OTHER INFORMATION: Synthetic Construct

<400> SEQUENCE: 194

Val Pro Val Trp Lys Glu Ala Thr Thr Thr
1 5 10

<210> SEQ ID NO 195
<211> LENGTH: 9
<212> TYPE: PRT
<213> ORGANISM: Artificial Sequence
<220> FEATURE:
<223> OTHER INFORMATION: Synthetic Construct

<400> SEQUENCE: 195

Ile Ala Met Glu Ser Ile Val Ile Trp
1 5

<210> SEQ ID NO 196
<211> LENGTH: 9
<212> TYPE: PRT
<213> ORGANISM: Artificial Sequence
<220> FEATURE:
<223> OTHER INFORMATION: Synthetic Construct

<400> SEQUENCE: 196

Lys Thr Ala Val Gln Met Ala Val Phe
1 5

<210> SEQ ID NO 197
<211> LENGTH: 9
<212> TYPE: PRT
<213> ORGANISM: Artificial Sequence
<220> FEATURE:
<223> OTHER INFORMATION: Synthetic Construct

<400> SEQUENCE: 197

Ala Val Arg His Phe Pro Arg Ile Trp
1 5

<210> SEQ ID NO 198
<211> LENGTH: 9
<212> TYPE: PRT
<213> ORGANISM: Artificial Sequence
<220> FEATURE:
<223> OTHER INFORMATION: Synthetic Construct

<400> SEQUENCE: 198

Ile Val Leu Pro Glu Lys Asp Ser Trp
1 5

<210> SEQ ID NO 199
<211> LENGTH: 9
<212> TYPE: PRT
<213> ORGANISM: Artificial Sequence
<220> FEATURE:
<223> OTHER INFORMATION: Synthetic Construct

<400> SEQUENCE: 199

Ile Ser Lys Lys Ala Lys Gly Trp Phe
1 5

<210> SEQ ID NO 200
<211> LENGTH: 8
<212> TYPE: PRT
<213> ORGANISM: Artificial Sequence
<220> FEATURE:
<223> OTHER INFORMATION: Synthetic Construct

<400> SEQUENCE: 200

Lys Ala Phe Ser Pro Glu Val Ile
1 5

<210> SEQ ID NO 201
<211> LENGTH: 11
<212> TYPE: PRT
<213> ORGANISM: Artificial Sequence
<220> FEATURE:
<223> OTHER INFORMATION: Synthetic Construct

<400> SEQUENCE: 201

Lys Ala Phe Ser Pro Glu Val Ile Pro Met Phe
1 5 10

<210> SEQ ID NO 202
<211> LENGTH: 10
<212> TYPE: PRT
<213> ORGANISM: Artificial Sequence
<220> FEATURE:
<223> OTHER INFORMATION: Synthetic Construct

<400> SEQUENCE: 202

Thr Ser Thr Leu Gln Glu Gln Ile Gly Trp
1 5 10

<210> SEQ ID NO 203
<211> LENGTH: 10
<212> TYPE: PRT
<213> ORGANISM: Artificial Sequence
<220> FEATURE:
<223> OTHER INFORMATION: Synthetic Construct

<400> SEQUENCE: 203

Lys Ala Val Arg Leu Ile Lys Phe Leu Tyr
1 5 10

<210> SEQ ID NO 204
<211> LENGTH: 9
<212> TYPE: PRT
<213> ORGANISM: Artificial Sequence
<220> FEATURE:
<223> OTHER INFORMATION: Synthetic Construct

<400> SEQUENCE: 204

Ile Ser Pro Arg Thr Leu Asn Ala Trp
1 5

<210> SEQ ID NO 205
<211> LENGTH: 10
<212> TYPE: PRT
<213> ORGANISM: Artificial Sequence
<220> FEATURE:
<223> OTHER INFORMATION: Synthetic Construct

<400> SEQUENCE: 205

Gln Ala Val Arg Ile Ile Lys Ile Leu Tyr
1 5 10

<210> SEQ ID NO 206
<211> LENGTH: 9
<212> TYPE: PRT
<213> ORGANISM: Artificial Sequence
<220> FEATURE:
<223> OTHER INFORMATION: Synthetic Construct

<400> SEQUENCE: 206

Leu Gly His Gly Val Ser Ile Glu Trp
1 5

<210> SEQ ID NO 207
<211> LENGTH: 9
<212> TYPE: PRT
<213> ORGANISM: Artificial Sequence
<220> FEATURE:
<223> OTHER INFORMATION: Synthetic Construct

<400> SEQUENCE: 207

Ala Ala Phe Asp Leu Ser Phe Phe Leu
1 5

<210> SEQ ID NO 208
<211> LENGTH: 9
<212> TYPE: PRT
<213> ORGANISM: Artificial Sequence
<220> FEATURE:
<223> OTHER INFORMATION: Synthetic Construct

<400> SEQUENCE: 208

Lys Ala Ala Phe Asp Leu Ser Phe Phe
1 5

<210> SEQ ID NO 209
<211> LENGTH: 9
<212> TYPE: PRT
<213> ORGANISM: Artificial Sequence
<220> FEATURE:
<223> OTHER INFORMATION: Synthetic Construct

<400> SEQUENCE: 209

His Thr Gln Gly Tyr Phe Pro Asp Trp
1 5

<210> SEQ ID NO 210
<211> LENGTH: 11
<212> TYPE: PRT
<213> ORGANISM: Artificial Sequence
<220> FEATURE:
<223> OTHER INFORMATION: Synthetic Construct

<400> SEQUENCE: 210

Gln Thr Arg Val Leu Ala Ile Glu Arg Tyr Leu
1 5 10

<210> SEQ ID NO 211
<211> LENGTH: 9
<212> TYPE: PRT
<213> ORGANISM: Artificial Sequence
<220> FEATURE:
<223> OTHER INFORMATION: Synthetic Construct

<400> SEQUENCE: 211

Gly Gln Gly Gln Trp Thr Tyr Gln Ile
1 5

<210> SEQ ID NO 212
<211> LENGTH: 11
<212> TYPE: PRT
<213> ORGANISM: Artificial Sequence
<220> FEATURE:
<223> OTHER INFORMATION: Synthetic Construct

<400> SEQUENCE: 212

Gly Gln Met Arg Glu Pro Arg Gly Ser Asp Ile
1 5 10

<210> SEQ ID NO 213
<211> LENGTH: 9
<212> TYPE: PRT
<213> ORGANISM: Artificial Sequence
<220> FEATURE:
<223> OTHER INFORMATION: Synthetic Construct

<400> SEQUENCE: 213

Val Gln Asn Leu Gln Gly Gln Met Val
1 5

<210> SEQ ID NO 214
<211> LENGTH: 10
<212> TYPE: PRT
<213> ORGANISM: Artificial Sequence
<220> FEATURE:
<223> OTHER INFORMATION: Synthetic Construct

<400> SEQUENCE: 214

Arg Gln Tyr Asp Gln Ile Leu Ile Glu Ile
1 5 10

<210> SEQ ID NO 215
<211> LENGTH: 9
<212> TYPE: PRT
<213> ORGANISM: Artificial Sequence
<220> FEATURE:
<223> OTHER INFORMATION: Synthetic Construct

<400> SEQUENCE: 215

Cys Arg Ala Pro Arg Lys Lys Gly Cys
1 5

<210> SEQ ID NO 216
<211> LENGTH: 9
<212> TYPE: PRT
<213> ORGANISM: Artificial Sequence
<220> FEATURE:
<223> OTHER INFORMATION: Synthetic Construct

<400> SEQUENCE: 216

Val Arg Met Tyr Ser Pro Val Ser Ile 1 5

<210> SEQ ID NO 217
<211> LENGTH: 9
<212> TYPE: PRT
<213> ORGANISM: Artificial Sequence
<220> FEATURE:
<223> OTHER INFORMATION: Synthetic Construct

<400> SEQUENCE: 217

Arg Met Arg Arg Ala Glu Pro Ala Ala
1 5

<210> SEQ ID NO 218
<211> LENGTH: 10
<212> TYPE: PRT
<213> ORGANISM: Artificial Sequence
<220> FEATURE:
<223> OTHER INFORMATION: Synthetic Construct

<400> SEQUENCE: 218

Asn Glu Thr Pro Gly Ile Arg Tyr Gln Tyr
1 5 10

<210> SEQ ID NO 219
<211> LENGTH: 9
<212> TYPE: PRT
<213> ORGANISM: Artificial Sequence
<220> FEATURE:
<223> OTHER INFORMATION: Synthetic Construct

<400> SEQUENCE: 219

Asn Pro Glu Ile Val Ile Tyr Gln Tyr
1 5

<210> SEQ ID NO 220
<211> LENGTH: 11
<212> TYPE: PRT
<213> ORGANISM: Artificial Sequence
<220> FEATURE:
<223> OTHER INFORMATION: Synthetic Construct

<400> SEQUENCE: 220

Arg Arg Gln Asp Ile Leu Asp Leu Trp Val Tyr
1 5 10

<210> SEQ ID NO 221
<211> LENGTH: 9
<212> TYPE: PRT
<213> ORGANISM: Artificial Sequence
<220> FEATURE:
<223> OTHER INFORMATION: Synthetic Construct

<400> SEQUENCE: 221

Val Arg His Phe Pro Arg Ile Trp Leu
1 5

<210> SEQ ID NO 222
<211> LENGTH: 11
<212> TYPE: PRT
<213> ORGANISM: Artificial Sequence
<220> FEATURE:
<223> OTHER INFORMATION: Synthetic Construct

<400> SEQUENCE: 222

Arg Pro Gln Val Pro Leu Arg Pro Met Thr Tyr
1 5 10

<210> SEQ ID NO 223
<211> LENGTH: 9
<212> TYPE: PRT
<213> ORGANISM: Artificial Sequence
<220> FEATURE:
<223> OTHER INFORMATION: Synthetic Construct

<400> SEQUENCE: 223

Val Pro Arg Arg Lys Ala Lys Ile Ile
1               5

<210> SEQ ID NO 224
<211> LENGTH: 9
<212> TYPE: PRT
<213> ORGANISM: Artificial Sequence
<220> FEATURE:
<223> OTHER INFORMATION: Synthetic Construct

<400> SEQUENCE: 224

Glu Glu Met Asn Leu Pro Gly Arg Trp
1               5

<210> SEQ ID NO 225
<211> LENGTH: 10
<212> TYPE: PRT
<213> ORGANISM: Artificial Sequence
<220> FEATURE:
<223> OTHER INFORMATION: Synthetic Construct

<400> SEQUENCE: 225

Ile Pro Leu Gly Asp Ala Lys Leu Ile Ile
1               5                   10

<210> SEQ ID NO 226
<211> LENGTH: 9
<212> TYPE: PRT
<213> ORGANISM: Artificial Sequence
<220> FEATURE:
<223> OTHER INFORMATION: Synthetic Construct

<400> SEQUENCE: 226

Glu Ala Val Arg His Phe Pro Arg Ile
1               5

<210> SEQ ID NO 227
<211> LENGTH: 9
<212> TYPE: PRT
<213> ORGANISM: Artificial Sequence
<220> FEATURE:
<223> OTHER INFORMATION: Synthetic Construct

<400> SEQUENCE: 227

Thr Pro Gln Asp Leu Asn Met Met Leu
1               5

<210> SEQ ID NO 228
<211> LENGTH: 9
<212> TYPE: PRT
<213> ORGANISM: Artificial Sequence
<220> FEATURE:
<223> OTHER INFORMATION: Synthetic Construct

<400> SEQUENCE: 228

Tyr Pro Leu Thr Phe Gly Trp Cys Phe
1               5

<210> SEQ ID NO 229
<211> LENGTH: 9
<212> TYPE: PRT
<213> ORGANISM: Artificial Sequence
<220> FEATURE:
<223> OTHER INFORMATION: Synthetic Construct

<400> SEQUENCE: 229

Phe Ser Pro Glu Val Ile Pro Met Phe
1 5

<210> SEQ ID NO 230
<211> LENGTH: 10
<212> TYPE: PRT
<213> ORGANISM: Artificial Sequence
<220> FEATURE:
<223> OTHER INFORMATION: Synthetic Construct

<400> SEQUENCE: 230

His Thr Gln Gly Tyr Phe Pro Asp Trp Gln
1 5 10

<210> SEQ ID NO 231
<211> LENGTH: 10
<212> TYPE: PRT
<213> ORGANISM: Artificial Sequence
<220> FEATURE:
<223> OTHER INFORMATION: Synthetic Construct

<400> SEQUENCE: 231

Ser Thr Thr Val Lys Ala Ala Cys Trp Trp
1 5 10

<210> SEQ ID NO 232
<211> LENGTH: 8
<212> TYPE: PRT
<213> ORGANISM: Artificial Sequence
<220> FEATURE:
<223> OTHER INFORMATION: Synthetic Construct

<400> SEQUENCE: 232

Lys Ala Ile Gly Thr Val Leu Val
1 5

<210> SEQ ID NO 233
<211> LENGTH: 9
<212> TYPE: PRT
<213> ORGANISM: Artificial Sequence
<220> FEATURE:
<223> OTHER INFORMATION: Synthetic Construct

<400> SEQUENCE: 233

Leu Thr Phe Gly Trp Cys Phe Lys Leu
1 5

<210> SEQ ID NO 234
<211> LENGTH: 9
<212> TYPE: PRT
<213> ORGANISM: Artificial Sequence
<220> FEATURE:
<223> OTHER INFORMATION: Synthetic Construct

<400> SEQUENCE: 234

Tyr Thr Pro Gly Pro Gly Ile Arg Tyr
1 5

<210> SEQ ID NO 235
<211> LENGTH: 11
<212> TYPE: PRT
<213> ORGANISM: Artificial Sequence
<220> FEATURE:
<223> OTHER INFORMATION: Synthetic Construct

<400> SEQUENCE: 235

Lys Ala Tyr Glu Thr Glu Val His Asn Val Trp
1 5 10

<210> SEQ ID NO 236
<211> LENGTH: 9
<212> TYPE: PRT
<213> ORGANISM: Artificial Sequence
<220> FEATURE:
<223> OTHER INFORMATION: Synthetic Construct

<400> SEQUENCE: 236

Ser Pro Ala Ile Phe Gln Ser Ser Met
1 5

<210> SEQ ID NO 237
<211> LENGTH: 10
<212> TYPE: PRT
<213> ORGANISM: Artificial Sequence
<220> FEATURE:
<223> OTHER INFORMATION: Synthetic Construct

<400> SEQUENCE: 237

Arg Pro Ala Glu Pro Val Pro Leu Gln Leu
1 5 10

<210> SEQ ID NO 238
<211> LENGTH: 9
<212> TYPE: PRT
<213> ORGANISM: Artificial Sequence
<220> FEATURE:
<223> OTHER INFORMATION: Synthetic Construct

<400> SEQUENCE: 238

Arg Gln Asp Ile Leu Asp Leu Trp Ile
1 5

<210> SEQ ID NO 239
<211> LENGTH: 9
<212> TYPE: PRT
<213> ORGANISM: Artificial Sequence
<220> FEATURE:
<223> OTHER INFORMATION: Synthetic Construct

<400> SEQUENCE: 239

Arg Gln Gly Leu Glu Arg Ala Leu Leu
1 5

<210> SEQ ID NO 240
<211> LENGTH: 11
<212> TYPE: PRT
<213> ORGANISM: Artificial Sequence
<220> FEATURE:
<223> OTHER INFORMATION: Synthetic Construct

<400> SEQUENCE: 240

Thr Pro Val Asn Ile Ile Gly Arg Asn Met Leu
1 5 10

<210> SEQ ID NO 241

<211> LENGTH: 9
<212> TYPE: PRT
<213> ORGANISM: Artificial Sequence
<220> FEATURE:
<223> OTHER INFORMATION: Synthetic Construct

<400> SEQUENCE: 241

Leu Phe Leu Asp Gly Ile Asp Lys Ala
1               5

<210> SEQ ID NO 242
<211> LENGTH: 8
<212> TYPE: PRT
<213> ORGANISM: Artificial Sequence
<220> FEATURE:
<223> OTHER INFORMATION: Synthetic Construct

<400> SEQUENCE: 242

Asn Ser Pro Thr Arg Arg Glu Leu
1               5

<210> SEQ ID NO 243
<211> LENGTH: 8
<212> TYPE: PRT
<213> ORGANISM: Artificial Sequence
<220> FEATURE:
<223> OTHER INFORMATION: Synthetic Construct

<400> SEQUENCE: 243

Val Ile Pro Met Phe Ser Ala Leu
1               5

<210> SEQ ID NO 244
<211> LENGTH: 9
<212> TYPE: PRT
<213> ORGANISM: Artificial Sequence
<220> FEATURE:
<223> OTHER INFORMATION: Synthetic Construct

<400> SEQUENCE: 244

Tyr Ser Pro Val Ser Ile Leu Asp Ile
1               5

<210> SEQ ID NO 245
<211> LENGTH: 9
<212> TYPE: PRT
<213> ORGANISM: Artificial Sequence
<220> FEATURE:
<223> OTHER INFORMATION: Synthetic Construct

<400> SEQUENCE: 245

Ser Ala Glu Pro Val Pro Leu Gln Leu
1               5

<210> SEQ ID NO 246
<211> LENGTH: 9
<212> TYPE: PRT
<213> ORGANISM: Artificial Sequence
<220> FEATURE:
<223> OTHER INFORMATION: Synthetic Construct

<400> SEQUENCE: 246

Ile Val Thr Asp Ser Gln Tyr Ala Leu
1               5

<210> SEQ ID NO 247
<211> LENGTH: 9

<212> TYPE: PRT
<213> ORGANISM: Artificial Sequence
<220> FEATURE:
<223> OTHER INFORMATION: Synthetic Construct

<400> SEQUENCE: 247

Ala Ala Val Asp Leu Ser His Phe Leu
1 5

<210> SEQ ID NO 248
<211> LENGTH: 9
<212> TYPE: PRT
<213> ORGANISM: Artificial Sequence
<220> FEATURE:
<223> OTHER INFORMATION: Synthetic Construct

<400> SEQUENCE: 248

His Leu Val Trp Ala Ser Arg Glu Leu
1 5

<210> SEQ ID NO 249
<211> LENGTH: 9
<212> TYPE: PRT
<213> ORGANISM: Artificial Sequence
<220> FEATURE:
<223> OTHER INFORMATION: Synthetic Construct

<400> SEQUENCE: 249

Cys Ala Pro Ala Gly Phe Ala Ile Leu
1 5

<210> SEQ ID NO 250
<211> LENGTH: 8
<212> TYPE: PRT
<213> ORGANISM: Artificial Sequence
<220> FEATURE:
<223> OTHER INFORMATION: Synthetic Construct

<400> SEQUENCE: 250

Cys Cys Phe His Cys Gln Val Cys
1 5

<210> SEQ ID NO 251
<211> LENGTH: 8
<212> TYPE: PRT
<213> ORGANISM: Artificial Sequence
<220> FEATURE:
<223> OTHER INFORMATION: Synthetic Construct

<400> SEQUENCE: 251

Leu Tyr Asn Thr Val Ala Thr Leu
1 5

<210> SEQ ID NO 252
<211> LENGTH: 9
<212> TYPE: PRT
<213> ORGANISM: Artificial Sequence
<220> FEATURE:
<223> OTHER INFORMATION: Synthetic Construct

<400> SEQUENCE: 252

Tyr Arg Leu Gly Val Gly Ala Leu Ile
1 5

<210> SEQ ID NO 253
<211> LENGTH: 9
<212> TYPE: PRT

<213> ORGANISM: Artificial Sequence
<220> FEATURE:
<223> OTHER INFORMATION: Synthetic Construct

<400> SEQUENCE: 253

Phe Arg Asp Tyr Val Asp Arg Phe Phe
1               5

<210> SEQ ID NO 254
<211> LENGTH: 8
<212> TYPE: PRT
<213> ORGANISM: Artificial Sequence
<220> FEATURE:
<223> OTHER INFORMATION: Synthetic Construct

<400> SEQUENCE: 254

Val Arg Asp Gln Ala Glu His Leu
1               5

<210> SEQ ID NO 255
<211> LENGTH: 9
<212> TYPE: PRT
<213> ORGANISM: Artificial Sequence
<220> FEATURE:
<223> OTHER INFORMATION: Synthetic Construct

<400> SEQUENCE: 255

Ala Ala Leu Asp Leu Ser His Phe Leu
1               5

<210> SEQ ID NO 256
<211> LENGTH: 12
<212> TYPE: PRT
<213> ORGANISM: Artificial Sequence
<220> FEATURE:
<223> OTHER INFORMATION: Synthetic Construct

<400> SEQUENCE: 256

Ala Glu Gln Ala Ser Gln Glu Val Lys Asn Trp Met
1               5                   10

<210> SEQ ID NO 257
<211> LENGTH: 8
<212> TYPE: PRT
<213> ORGANISM: Artificial Sequence
<220> FEATURE:
<223> OTHER INFORMATION: Synthetic Construct

<400> SEQUENCE: 257

His Thr Asp Asn Gly Ser Asn Phe
1               5

<210> SEQ ID NO 258
<211> LENGTH: 11
<212> TYPE: PRT
<213> ORGANISM: Artificial Sequence
<220> FEATURE:
<223> OTHER INFORMATION: Synthetic Construct

<400> SEQUENCE: 258

Lys Arg Gln Glu Ile Leu Asp Leu Trp Val Tyr
1               5                   10

<210> SEQ ID NO 259
<211> LENGTH: 9
<212> TYPE: PRT
<213> ORGANISM: Artificial Sequence
<220> FEATURE:
<223> OTHER INFORMATION: Synthetic Construct

<400> SEQUENCE: 259

Arg Ala Ile Glu Ala Gln Gln His Met
1               5

<210> SEQ ID NO 260
<211> LENGTH: 10
<212> TYPE: PRT
<213> ORGANISM: Artificial Sequence
<220> FEATURE:
<223> OTHER INFORMATION: Synthetic Construct

<400> SEQUENCE: 260

Lys Ala Ala Val Asp Leu Ser His Phe Leu
1               5                   10

<210> SEQ ID NO 261
<211> LENGTH: 9
<212> TYPE: PRT
<213> ORGANISM: Artificial Sequence
<220> FEATURE:
<223> OTHER INFORMATION: Synthetic Construct

<400> SEQUENCE: 261

Ser Ala Leu Ser Glu Gly Ala Thr Pro
1               5

<210> SEQ ID NO 262
<211> LENGTH: 9
<212> TYPE: PRT
<213> ORGANISM: Artificial Sequence
<220> FEATURE:
<223> OTHER INFORMATION: Synthetic Construct

<400> SEQUENCE: 262

Arg Met Tyr Ser Pro Thr Ser Ile Leu
1               5

<210> SEQ ID NO 263
<211> LENGTH: 9
<212> TYPE: PRT
<213> ORGANISM: Artificial Sequence
<220> FEATURE:
<223> OTHER INFORMATION: Synthetic Construct

<400> SEQUENCE: 263

Pro Glu Ile Val Ile Tyr Gln Tyr Met
1               5

<210> SEQ ID NO 264
<211> LENGTH: 9
<212> TYPE: PRT
<213> ORGANISM: Artificial Sequence
<220> FEATURE:
<223> OTHER INFORMATION: Synthetic Construct

<400> SEQUENCE: 264

Arg Ile Arg Thr Trp Lys Ser Leu Val
1               5

<210> SEQ ID NO 265
<211> LENGTH: 9
<212> TYPE: PRT
<213> ORGANISM: Artificial Sequence
<220> FEATURE:

<223> OTHER INFORMATION: Synthetic Construct

<400> SEQUENCE: 265

Ala Ile Ser Pro Arg Thr Leu Asn Ala
1 5

<210> SEQ ID NO 266
<211> LENGTH: 9
<212> TYPE: PRT
<213> ORGANISM: Artificial Sequence
<220> FEATURE:
<223> OTHER INFORMATION: Synthetic Construct

<400> SEQUENCE: 266

Ser Thr Leu Gln Glu Gln Ile Gly Trp
1 5

<210> SEQ ID NO 267
<211> LENGTH: 9
<212> TYPE: PRT
<213> ORGANISM: Artificial Sequence
<220> FEATURE:
<223> OTHER INFORMATION: Synthetic Construct

<400> SEQUENCE: 267

Asp Arg Trp Glu Lys Ile Arg Leu Arg
1 5

<210> SEQ ID NO 268
<211> LENGTH: 9
<212> TYPE: PRT
<213> ORGANISM: Artificial Sequence
<220> FEATURE:
<223> OTHER INFORMATION: Synthetic Construct

<400> SEQUENCE: 268

Glu Lys Ile Arg Leu Arg Pro Gly Gly
1 5

<210> SEQ ID NO 269
<211> LENGTH: 9
<212> TYPE: PRT
<213> ORGANISM: Artificial Sequence
<220> FEATURE:
<223> OTHER INFORMATION: Synthetic Construct

<400> SEQUENCE: 269

Lys Ala Gln Gln Ala Ala Ala Asp Thr
1 5

<210> SEQ ID NO 270
<211> LENGTH: 9
<212> TYPE: PRT
<213> ORGANISM: Artificial Sequence
<220> FEATURE:
<223> OTHER INFORMATION: Synthetic Construct

<400> SEQUENCE: 270

His Gln Ala Ile Ser Pro Arg Thr Leu
1 5

<210> SEQ ID NO 271
<211> LENGTH: 9
<212> TYPE: PRT
<213> ORGANISM: Artificial Sequence
<220> FEATURE:
<223> OTHER INFORMATION: Synthetic Construct

<400> SEQUENCE: 271

Val Gly Gly His Gln Ala Ala Met Gln
1 5

<210> SEQ ID NO 272
<211> LENGTH: 23
<212> TYPE: DNA
<213> ORGANISM: Artificial Sequence
<220> FEATURE:
<223> OTHER INFORMATION: Synthetic Construct

<400> SEQUENCE: 272
ggctttcagc gcagaagtaa tac 23

<210> SEQ ID NO 273
<211> LENGTH: 23
<212> TYPE: DNA
<213> ORGANISM: Artificial Sequence
<220> FEATURE:
<223> OTHER INFORMATION: Synthetic Construct

<400> SEQUENCE: 273
gcctattgca gcaggccaga tga 23

<210> SEQ ID NO 274
<211> LENGTH: 23
<212> TYPE: DNA
<213> ORGANISM: Artificial Sequence
<220> FEATURE:
<223> OTHER INFORMATION: Synthetic Construct

<400> SEQUENCE: 274
acataatcca gctatcccag tag 23

<210> SEQ ID NO 275
<211> LENGTH: 27
<212> TYPE: DNA
<213> ORGANISM: Artificial Sequence
<220> FEATURE:
<223> OTHER INFORMATION: Synthetic Construct

<400> SEQUENCE: 275
ggacataaga gcaggaccaa aggaacc 27

<210> SEQ ID NO 276
<211> LENGTH: 27
<212> TYPE: DNA
<213> ORGANISM: Artificial Sequence
<220> FEATURE:
<223> OTHER INFORMATION: Synthetic Construct

<400> SEQUENCE: 276
gcaagcttca gcagaggtaa aaaattg 27

<210> SEQ ID NO 277
<211> LENGTH: 23
<212> TYPE: DNA
<213> ORGANISM: Artificial Sequence
<220> FEATURE:
<223> OTHER INFORMATION: Synthetic Construct

<400> SEQUENCE: 277
ccctatagtg gcgaacctcc agg 23

<210> SEQ ID NO 278
<211> LENGTH: 25
<212> TYPE: DNA
<213> ORGANISM: Artificial Sequence
<220> FEATURE:
<223> OTHER INFORMATION: Synthetic Construct

<400> SEQUENCE: 278
aggagcgaca atggaagaaa tgatg 25

<210> SEQ ID NO 279
<211> LENGTH: 28
<212> TYPE: DNA
<213> ORGANISM: Artificial Sequence
<220> FEATURE:
<223> OTHER INFORMATION: Synthetic Construct

<400> SEQUENCE: 279
agcaagagtt atggctgaag caatgagc 28

<210> SEQ ID NO 280
<211> LENGTH: 23
<212> TYPE: DNA
<213> ORGANISM: Artificial Sequence
<220> FEATURE:
<223> OTHER INFORMATION: Synthetic Construct

<400> SEQUENCE: 280
atgggataga atgcatccag tgc 23

<210> SEQ ID NO 281
<211> LENGTH: 23
<212> TYPE: DNA
<213> ORGANISM: Artificial Sequence
<220> FEATURE:
<223> OTHER INFORMATION: Synthetic Construct

<400> SEQUENCE: 281
aggaccaaag gcacccttta gag 23

<210> SEQ ID NO 282
<211> LENGTH: 23
<212> TYPE: DNA
<213> ORGANISM: Artificial Sequence
<220> FEATURE:
<223> OTHER INFORMATION: Synthetic Construct

<400> SEQUENCE: 282
ttggatgaca gcaaccttgt tgg 23

<210> SEQ ID NO 283
<211> LENGTH: 25
<212> TYPE: DNA
<213> ORGANISM: Artificial Sequence
<220> FEATURE:
<223> OTHER INFORMATION: Synthetic Construct

<400> SEQUENCE: 283
agcttcacaa gcggtaaaaa attgg 25

<210> SEQ ID NO 284
<211> LENGTH: 24
<212> TYPE: DNA
<213> ORGANISM: Artificial Sequence
<220> FEATURE:
<223> OTHER INFORMATION: Synthetic Construct

<400> SEQUENCE: 284
aataggatgg ctgacacata atcc 24

<210> SEQ ID NO 285
<211> LENGTH: 23
<212> TYPE: DNA
<213> ORGANISM: Artificial Sequence
<220> FEATURE:
<223> OTHER INFORMATION: Synthetic Construct

<400> SEQUENCE: 285
ccaggggcaa ctggtacatc agg 23

<210> SEQ ID NO 286
<211> LENGTH: 24
<212> TYPE: DNA
<213> ORGANISM: Artificial Sequence
<220> FEATURE:
<223> OTHER INFORMATION: Synthetic Construct

<400> SEQUENCE: 286
accaggccag ctgagagaac caag 24

<210> SEQ ID NO 287
<211> LENGTH: 27
<212> TYPE: DNA
<213> ORGANISM: Artificial Sequence
<220> FEATURE:
<223> OTHER INFORMATION: Synthetic Construct

<400> SEQUENCE: 287
atacatggat aatttgtatg taggatc 27

<210> SEQ ID NO 288
<211> LENGTH: 23
<212> TYPE: DNA
<213> ORGANISM: Artificial Sequence
<220> FEATURE:
<223> OTHER INFORMATION: Synthetic Construct

<400> SEQUENCE: 288
taccacacca aacaaaaaac atc 23

<210> SEQ ID NO 289
<211> LENGTH: 27
<212> TYPE: DNA
<213> ORGANISM: Artificial Sequence
<220> FEATURE:
<223> OTHER INFORMATION: Synthetic Construct

<400> SEQUENCE: 289
cttagataaa aacttcagga agtatac 27

<210> SEQ ID NO 290
<211> LENGTH: 23
<212> TYPE: DNA
<213> ORGANISM: Artificial Sequence
<220> FEATURE:
<223> OTHER INFORMATION: Synthetic Construct

<400> SEQUENCE: 290
aaaatcagta gcagtactgg atg 23

<210> SEQ ID NO 291
<211> LENGTH: 23

<212> TYPE: DNA
<213> ORGANISM: Artificial Sequence
<220> FEATURE:
<223> OTHER INFORMATION: Synthetic Construct

<400> SEQUENCE: 291
tgataaatgg gcagtacagc cta 23

<210> SEQ ID NO 292
<211> LENGTH: 23
<212> TYPE: DNA
<213> ORGANISM: Artificial Sequence
<220> FEATURE:
<223> OTHER INFORMATION: Synthetic Construct

<400> SEQUENCE: 292
gcagcataga gcaaaaatag agg 23

<210> SEQ ID NO 293
<211> LENGTH: 29
<212> TYPE: DNA
<213> ORGANISM: Artificial Sequence
<220> FEATURE:
<223> OTHER INFORMATION: Synthetic Construct

<400> SEQUENCE: 293
tactccagta tatgccataa agaaaaaag 29

<210> SEQ ID NO 294
<211> LENGTH: 26
<212> TYPE: DNA
<213> ORGANISM: Artificial Sequence
<220> FEATURE:
<223> OTHER INFORMATION: Synthetic Construct

<400> SEQUENCE: 294
cgatgcatat tattcagttc ccttag 26

<210> SEQ ID NO 295
<211> LENGTH: 27
<212> TYPE: DNA
<213> ORGANISM: Artificial Sequence
<220> FEATURE:
<223> OTHER INFORMATION: Synthetic Construct

<400> SEQUENCE: 295
tcaagagcca tataaaaatc tgaaaac 27

<210> SEQ ID NO 296
<211> LENGTH: 23
<212> TYPE: DNA
<213> ORGANISM: Artificial Sequence
<220> FEATURE:
<223> OTHER INFORMATION: Synthetic Construct

<400> SEQUENCE: 296
aataggagca gcaactttct atg 23

<210> SEQ ID NO 297
<211> LENGTH: 23
<212> TYPE: DNA
<213> ORGANISM: Artificial Sequence
<220> FEATURE:
<223> OTHER INFORMATION: Synthetic Construct

<400> SEQUENCE: 297
tggaggaaat gcacaagtag atg 23

<210> SEQ ID NO 298
<211> LENGTH: 23
<212> TYPE: DNA
<213> ORGANISM: Artificial Sequence
<220> FEATURE:
<223> OTHER INFORMATION: Synthetic Construct

<400> SEQUENCE: 298
agtgctgcca gcaaaggaca gct 23

<210> SEQ ID NO 299
<211> LENGTH: 23
<212> TYPE: DNA
<213> ORGANISM: Artificial Sequence
<220> FEATURE:
<223> OTHER INFORMATION: Synthetic Construct

<400> SEQUENCE: 299
tttgcaggat gcgggattag aag 23

<210> SEQ ID NO 300
<211> LENGTH: 29
<212> TYPE: DNA
<213> ORGANISM: Artificial Sequence
<220> FEATURE:
<223> OTHER INFORMATION: Synthetic Construct

<400> SEQUENCE: 300
attccagtgt gccatgacaa aaatcttag 29

<210> SEQ ID NO 301
<211> LENGTH: 40
<212> TYPE: DNA
<213> ORGANISM: Artificial Sequence
<220> FEATURE:
<223> OTHER INFORMATION: Synthetic Construct

<400> SEQUENCE: 301
gaaaaaagac gctactaaat ggagaaaatt agtagatttc 40

<210> SEQ ID NO 302
<211> LENGTH: 25
<212> TYPE: DNA
<213> ORGANISM: Artificial Sequence
<220> FEATURE:
<223> OTHER INFORMATION: Synthetic Construct

<400> SEQUENCE: 302
agcagtacaa gtggcagtat tcatc 25

<210> SEQ ID NO 303
<211> LENGTH: 23
<212> TYPE: DNA
<213> ORGANISM: Artificial Sequence
<220> FEATURE:
<223> OTHER INFORMATION: Synthetic Construct

<400> SEQUENCE: 303
aggggaagcc gtgcatggac aag 23

<210> SEQ ID NO 304
<211> LENGTH: 23
<212> TYPE: DNA
<213> ORGANISM: Artificial Sequence
<220> FEATURE:
<223> OTHER INFORMATION: Synthetic Construct

<400> SEQUENCE: 304
ttggagagca gtggctagtg att 23

<210> SEQ ID NO 305
<211> LENGTH: 26
<212> TYPE: DNA
<213> ORGANISM: Artificial Sequence
<220> FEATURE:
<223> OTHER INFORMATION: Synthetic Construct

<400> SEQUENCE: 305
agtaaaaaca gcacatacag acaatg 26

<210> SEQ ID NO 306
<211> LENGTH: 23
<212> TYPE: DNA
<213> ORGANISM: Artificial Sequence
<220> FEATURE:
<223> OTHER INFORMATION: Synthetic Construct

<400> SEQUENCE: 306
agcagttcat gcagccagtg gat 23

<210> SEQ ID NO 307
<211> LENGTH: 32
<212> TYPE: DNA
<213> ORGANISM: Artificial Sequence
<220> FEATURE:
<223> OTHER INFORMATION: Synthetic Construct

<400> SEQUENCE: 307
aagtcaagga gcaatagaat ctatgaataa ag 32

<210> SEQ ID NO 308
<211> LENGTH: 27
<212> TYPE: DNA
<213> ORGANISM: Artificial Sequence
<220> FEATURE:
<223> OTHER INFORMATION: Synthetic Construct

<400> SEQUENCE: 308
atatatagaa gtagaagtaa ttccagc 27

<210> SEQ ID NO 309
<211> LENGTH: 23
<212> TYPE: DNA
<213> ORGANISM: Artificial Sequence
<220> FEATURE:
<223> OTHER INFORMATION: Synthetic Construct

<400> SEQUENCE: 309
agtaattcca gtagagacag ggc 23

<210> SEQ ID NO 310
<211> LENGTH: 27
<212> TYPE: DNA
<213> ORGANISM: Artificial Sequence
<220> FEATURE:
<223> OTHER INFORMATION: Synthetic Construct

<400> SEQUENCE: 310
agacataata gtaacagaca tacaaac 27

<210> SEQ ID NO 311
<211> LENGTH: 23
<212> TYPE: DNA
<213> ORGANISM: Artificial Sequence
<220> FEATURE:
<223> OTHER INFORMATION: Synthetic Construct

<400> SEQUENCE: 311
tggaggggaa cttttctact gta 23

<210> SEQ ID NO 312
<211> LENGTH: 24
<212> TYPE: DNA
<213> ORGANISM: Artificial Sequence
<220> FEATURE:
<223> OTHER INFORMATION: Synthetic Construct

<400> SEQUENCE: 312
aggggaattt ctctactgta attc 24

<210> SEQ ID NO 313
<211> LENGTH: 24
<212> TYPE: DNA
<213> ORGANISM: Artificial Sequence
<220> FEATURE:
<223> OTHER INFORMATION: Synthetic Construct

<400> SEQUENCE: 313
tagtacttgg cttaatagta cttg 24

<210> SEQ ID NO 314
<211> LENGTH: 27
<212> TYPE: DNA
<213> ORGANISM: Artificial Sequence
<220> FEATURE:
<223> OTHER INFORMATION: Synthetic Construct

<400> SEQUENCE: 314
taattgtaca gcacccaaca acaatac 27

<210> SEQ ID NO 315
<211> LENGTH: 23
<212> TYPE: DNA
<213> ORGANISM: Artificial Sequence
<220> FEATURE:
<223> OTHER INFORMATION: Synthetic Construct

<400> SEQUENCE: 315
cgagatcttc gcacctggag gag 23

<210> SEQ ID NO 316
<211> LENGTH: 23
<212> TYPE: DNA
<213> ORGANISM: Artificial Sequence
<220> FEATURE:
<223> OTHER INFORMATION: Synthetic Construct

<400> SEQUENCE: 316
tagtagcggg gcaatgataa tgg 23

<210> SEQ ID NO 317
<211> LENGTH: 23
<212> TYPE: DNA
<213> ORGANISM: Artificial Sequence
<220> FEATURE:
<223> OTHER INFORMATION: Synthetic Construct

<400> SEQUENCE: 317
tggaatcagg gcagtagtat caa 23

<210> SEQ ID NO 318
<211> LENGTH: 23
<212> TYPE: DNA
<213> ORGANISM: Artificial Sequence
<220> FEATURE:
<223> OTHER INFORMATION: Synthetic Construct

<400> SEQUENCE: 318
agaccccaac gcacaagaag tag 23

<210> SEQ ID NO 319
<211> LENGTH: 25
<212> TYPE: DNA
<213> ORGANISM: Artificial Sequence
<220> FEATURE:
<223> OTHER INFORMATION: Synthetic Construct

<400> SEQUENCE: 319
tgatatagta gcaatagata atacc 25

<210> SEQ ID NO 320
<211> LENGTH: 22
<212> TYPE: DNA
<213> ORGANISM: Artificial Sequence
<220> FEATURE:
<223> OTHER INFORMATION: Synthetic Construct

<400> SEQUENCE: 320
ttctcttcta ctacttttac cc 22

<210> SEQ ID NO 321
<211> LENGTH: 18
<212> TYPE: DNA
<213> ORGANISM: Artificial Sequence
<220> FEATURE:
<223> OTHER INFORMATION: Synthetic Construct

<400> SEQUENCE: 321
cctgcatgca ctggatgc 18

<210> SEQ ID NO 322
<211> LENGTH: 20
<212> TYPE: DNA
<213> ORGANISM: Artificial Sequence
<220> FEATURE:
<223> OTHER INFORMATION: Synthetic Construct

<400> SEQUENCE: 322
gtcatccatc ctatttgttc 20

<210> SEQ ID NO 323
<211> LENGTH: 18
<212> TYPE: DNA
<213> ORGANISM: Artificial Sequence
<220> FEATURE:
<223> OTHER INFORMATION: Synthetic Construct

<400> SEQUENCE: 323
agaatgctgg tagggcta 18

<210> SEQ ID NO 324

<211> LENGTH: 21
<212> TYPE: DNA
<213> ORGANISM: Artificial Sequence
<220> FEATURE:
<223> OTHER INFORMATION: Synthetic Construct

<400> SEQUENCE: 324
tcggctctta gagttttata g 21

<210> SEQ ID NO 325
<211> LENGTH: 18
<212> TYPE: DNA
<213> ORGANISM: Artificial Sequence
<220> FEATURE:
<223> OTHER INFORMATION: Synthetic Construct

<400> SEQUENCE: 325
taattttggc tgacctgg 18

<210> SEQ ID NO 326
<211> LENGTH: 22
<212> TYPE: DNA
<213> ORGANISM: Artificial Sequence
<220> FEATURE:
<223> OTHER INFORMATION: Synthetic Construct

<400> SEQUENCE: 326
ggtcccaatg cttttaaaat ag 22

<210> SEQ ID NO 327
<211> LENGTH: 18
<212> TYPE: DNA
<213> ORGANISM: Artificial Sequence
<220> FEATURE:
<223> OTHER INFORMATION: Synthetic Construct

<400> SEQUENCE: 327
ttatggccgg gtcccccc 18

<210> SEQ ID NO 328
<211> LENGTH: 18
<212> TYPE: DNA
<213> ORGANISM: Artificial Sequence
<220> FEATURE:
<223> OTHER INFORMATION: Synthetic Construct

<400> SEQUENCE: 328
tctgcagctt cctcattg 18

<210> SEQ ID NO 329
<211> LENGTH: 19
<212> TYPE: DNA
<213> ORGANISM: Artificial Sequence
<220> FEATURE:
<223> OTHER INFORMATION: Synthetic Construct

<400> SEQUENCE: 329
tgtcttatgt ccagaatgc 19

<210> SEQ ID NO 330
<211> LENGTH: 20
<212> TYPE: DNA
<213> ORGANISM: Artificial Sequence
<220> FEATURE:
<223> OTHER INFORMATION: Synthetic Construct

<400> SEQUENCE: 330 tttttacct cttgtgaagc 20

<210> SEQ ID NO 331
<211> LENGTH: 18
<212> TYPE: DNA
<213> ORGANISM: Artificial Sequence
<220> FEATURE:
<223> OTHER INFORMATION: Synthetic Construct

<400> SEQUENCE: 331
tgctcggctc ttagagtt 18

<210> SEQ ID NO 332
<211> LENGTH: 19
<212> TYPE: DNA
<213> ORGANISM: Artificial Sequence
<220> FEATURE:
<223> OTHER INFORMATION: Synthetic Construct

<400> SEQUENCE: 332
tgttcctgaa gggtactag 19

<210> SEQ ID NO 333
<211> LENGTH: 26
<212> TYPE: DNA
<213> ORGANISM: Artificial Sequence
<220> FEATURE:
<223> OTHER INFORMATION: Synthetic Construct

<400> SEQUENCE: 333
aggttctgca ctatagggta attttg 26

<210> SEQ ID NO 334
<211> LENGTH: 18
<212> TYPE: DNA
<213> ORGANISM: Artificial Sequence
<220> FEATURE:
<223> OTHER INFORMATION: Synthetic Construct

<400> SEQUENCE: 334
gcaataggcc ctgcatgc 18

<210> SEQ ID NO 335
<211> LENGTH: 19
<212> TYPE: DNA
<213> ORGANISM: Artificial Sequence
<220> FEATURE:
<223> OTHER INFORMATION: Synthetic Construct

<400> SEQUENCE: 335
tgatagatga ctatgtctg 19

<210> SEQ ID NO 336
<211> LENGTH: 20
<212> TYPE: DNA
<213> ORGANISM: Artificial Sequence
<220> FEATURE:
<223> OTHER INFORMATION: Synthetic Construct

<400> SEQUENCE: 336
aatccccacc tcaacagatg 20

<210> SEQ ID NO 337
<211> LENGTH: 20
<212> TYPE: DNA

<213> ORGANISM: Artificial Sequence
<220> FEATURE:
<223> OTHER INFORMATION: Synthetic Construct

<400> SEQUENCE: 337
ggaactgaaa aatatgcatc 20

<210> SEQ ID NO 338
<211> LENGTH: 19
<212> TYPE: DNA
<213> ORGANISM: Artificial Sequence
<220> FEATURE:
<223> OTHER INFORMATION: Synthetic Construct

<400> SEQUENCE: 338
ttctgtttta accctgcag 19

<210> SEQ ID NO 339
<211> LENGTH: 18
<212> TYPE: DNA
<213> ORGANISM: Artificial Sequence
<220> FEATURE:
<223> OTHER INFORMATION: Synthetic Construct

<400> SEQUENCE: 339
ggatggagtt cataaccc 18

<210> SEQ ID NO 340
<211> LENGTH: 20
<212> TYPE: DNA
<213> ORGANISM: Artificial Sequence
<220> FEATURE:
<223> OTHER INFORMATION: Synthetic Construct

<400> SEQUENCE: 340
cctatttcta agtcagatcc 20

<210> SEQ ID NO 341
<211> LENGTH: 19
<212> TYPE: DNA
<213> ORGANISM: Artificial Sequence
<220> FEATURE:
<223> OTHER INFORMATION: Synthetic Construct

<400> SEQUENCE: 341
ttgtatggat tttcaggcc 19

<210> SEQ ID NO 342
<211> LENGTH: 20
<212> TYPE: DNA
<213> ORGANISM: Artificial Sequence
<220> FEATURE:
<223> OTHER INFORMATION: Synthetic Construct

<400> SEQUENCE: 342
cccacatcca gtactgttac 20

<210> SEQ ID NO 343
<211> LENGTH: 21
<212> TYPE: DNA
<213> ORGANISM: Artificial Sequence
<220> FEATURE:
<223> OTHER INFORMATION: Synthetic Construct

<400> SEQUENCE: 343
taaatttgat atgtccattg g 21

<210> SEQ ID NO 344
<211> LENGTH: 18
<212> TYPE: DNA
<213> ORGANISM: Artificial Sequence
<220> FEATURE:
<223> OTHER INFORMATION: Synthetic Construct

<400> SEQUENCE: 344
atgggttctt tctctaac 18

<210> SEQ ID NO 345
<211> LENGTH: 20
<212> TYPE: DNA
<213> ORGANISM: Artificial Sequence
<220> FEATURE:
<223> OTHER INFORMATION: Synthetic Construct

<400> SEQUENCE: 345
attcctttgt gtgctggtac 20

<210> SEQ ID NO 346
<211> LENGTH: 25
<212> TYPE: DNA
<213> ORGANISM: Artificial Sequence
<220> FEATURE:
<223> OTHER INFORMATION: Synthetic Construct

<400> SEQUENCE: 346
ataggctgta ctgtccattt atcag 25

<210> SEQ ID NO 347
<211> LENGTH: 21
<212> TYPE: DNA
<213> ORGANISM: Artificial Sequence
<220> FEATURE:
<223> OTHER INFORMATION: Synthetic Construct

<400> SEQUENCE: 347
gctagatgaa ttgcttgtaa c 21

<210> SEQ ID NO 348
<211> LENGTH: 18
<212> TYPE: DNA
<213> ORGANISM: Artificial Sequence
<220> FEATURE:
<223> OTHER INFORMATION: Synthetic Construct

<400> SEQUENCE: 348
attgctggtg atcctttc 18

<210> SEQ ID NO 349
<211> LENGTH: 19
<212> TYPE: DNA
<213> ORGANISM: Artificial Sequence
<220> FEATURE:
<223> OTHER INFORMATION: Synthetic Construct

<400> SEQUENCE: 349
tttatggcaa atactggag 19

<210> SEQ ID NO 350
<211> LENGTH: 20
<212> TYPE: DNA
<213> ORGANISM: Artificial Sequence
<220> FEATURE:

<223> OTHER INFORMATION: Synthetic Construct

<400> SEQUENCE: 350
gtcttaagat gttcagcctg 20

<210> SEQ ID NO 351
<211> LENGTH: 26
<212> TYPE: DNA
<213> ORGANISM: Artificial Sequence
<220> FEATURE:
<223> OTHER INFORMATION: Synthetic Construct

<400> SEQUENCE: 351
tttagctgac atttatcaca gctggc 26

<210> SEQ ID NO 352
<211> LENGTH: 26
<212> TYPE: DNA
<213> ORGANISM: Artificial Sequence
<220> FEATURE:
<223> OTHER INFORMATION: Synthetic Construct

<400> SEQUENCE: 352
ttactgtgat atttctcatg ttcttc 26

<210> SEQ ID NO 353
<211> LENGTH: 18
<212> TYPE: DNA
<213> ORGANISM: Artificial Sequence
<220> FEATURE:
<223> OTHER INFORMATION: Synthetic Construct

<400> SEQUENCE: 353
ggccatcttc ctgctaat 18

<210> SEQ ID NO 354
<211> LENGTH: 26
<212> TYPE: DNA
<213> ORGANISM: Artificial Sequence
<220> FEATURE:
<223> OTHER INFORMATION: Synthetic Construct

<400> SEQUENCE: 354
accaagataa cttttccttc taaatg 26

<210> SEQ ID NO 355
<211> LENGTH: 18
<212> TYPE: DNA
<213> ORGANISM: Artificial Sequence
<220> FEATURE:
<223> OTHER INFORMATION: Synthetic Construct

<400> SEQUENCE: 355
tggggattgt agggaatg 18

<210> SEQ ID NO 356
<211> LENGTH: 19
<212> TYPE: DNA
<213> ORGANISM: Artificial Sequence
<220> FEATURE:
<223> OTHER INFORMATION: Synthetic Construct

<400> SEQUENCE: 356
ccactggcta catgaactg 19

<210> SEQ ID NO 357
<211> LENGTH: 22
<212> TYPE: DNA
<213> ORGANISM: Artificial Sequence
<220> FEATURE:
<223> OTHER INFORMATION: Synthetic Construct

<400> SEQUENCE: 357
tctgcttcta tatatccact gg 22

<210> SEQ ID NO 358
<211> LENGTH: 19
<212> TYPE: DNA
<213> ORGANISM: Artificial Sequence
<220> FEATURE:
<223> OTHER INFORMATION: Synthetic Construct

<400> SEQUENCE: 358
actattcttt cccctgcac 19

<210> SEQ ID NO 359
<211> LENGTH: 26
<212> TYPE: DNA
<213> ORGANISM: Artificial Sequence
<220> FEATURE:
<223> OTHER INFORMATION: Synthetic Construct

<400> SEQUENCE: 359
caattaaaac tgtgcgttac aatttc 26

<210> SEQ ID NO 360
<211> LENGTH: 18
<212> TYPE: DNA
<213> ORGANISM: Artificial Sequence
<220> FEATURE:
<223> OTHER INFORMATION: Synthetic Construct

<400> SEQUENCE: 360
ccacaattaa aactgtgc 18

<210> SEQ ID NO 361
<211> LENGTH: 22
<212> TYPE: DNA
<213> ORGANISM: Artificial Sequence
<220> FEATURE:
<223> OTHER INFORMATION: Synthetic Construct

<400> SEQUENCE: 361
ttaaacagtt gtgttgaatt ac 22

<210> SEQ ID NO 362
<211> LENGTH: 20
<212> TYPE: DNA
<213> ORGANISM: Artificial Sequence
<220> FEATURE:
<223> OTHER INFORMATION: Synthetic Construct

<400> SEQUENCE: 362
atttctacag atgtgttcag 20

<210> SEQ ID NO 363
<211> LENGTH: 19
<212> TYPE: DNA
<213> ORGANISM: Artificial Sequence
<220> FEATURE:
<223> OTHER INFORMATION: Synthetic Construct

<400> SEQUENCE: 363
gacccattgt tgttattac 19

<210> SEQ ID NO 364
<211> LENGTH: 24
<212> TYPE: DNA
<213> ORGANISM: Artificial Sequence
<220> FEATURE:
<223> OTHER INFORMATION: Synthetic Construct

<400> SEQUENCE: 364
ctattggtat tagtatcatt cttc 24

<210> SEQ ID NO 365
<211> LENGTH: 19
<212> TYPE: DNA
<213> ORGANISM: Artificial Sequence
<220> FEATURE:
<223> OTHER INFORMATION: Synthetic Construct

<400> SEQUENCE: 365
tgtgtacatt gtactgtgc 19

<210> SEQ ID NO 366
<211> LENGTH: 18
<212> TYPE: DNA
<213> ORGANISM: Artificial Sequence
<220> FEATURE:
<223> OTHER INFORMATION: Synthetic Construct

<400> SEQUENCE: 366
gtgggtacac aggcatgt 18

<210> SEQ ID NO 367
<211> LENGTH: 27
<212> TYPE: DNA
<213> ORGANISM: Artificial Sequence
<220> FEATURE:
<223> OTHER INFORMATION: Synthetic Construct

<400> SEQUENCE: 367
agtttataaa agaatgcata ttctttc 27

<210> SEQ ID NO 368
<211> LENGTH: 498
<212> TYPE: PRT
<213> ORGANISM: Artificial Sequence
<220> FEATURE:
<223> OTHER INFORMATION: Synthetic Construct

<400> SEQUENCE: 368

```
Met Gly Ala Arg Ala Ser Val Leu Ser Gly Gly Lys Leu Asp Ala Trp
1               5                   10                  15

Glu Lys Ile Arg Leu Arg Pro Gly Gly Lys Lys Lys Tyr Arg Leu Lys
            20                  25                  30

His Leu Val Trp Ala Ser Arg Glu Leu Glu Arg Phe Ala Leu Asn Pro
        35                  40                  45

Gly Leu Leu Glu Thr Ala Glu Gly Cys Gln Gln Ile Met Gly Gln Leu
    50                  55                  60

Gln Pro Ala Leu Gln Thr Gly Thr Glu Glu Leu Arg Ser Leu Tyr Asn
65                  70                  75                  80

Thr Val Ala Thr Leu Tyr Cys Val His Gln Arg Ile Glu Val Lys Asp
                85                  90                  95
```

```
Thr Lys Glu Ala Leu Asp Lys Ile Glu Glu Glu Gln Asn Lys Ser Gln
            100                 105                 110

Gln Lys Thr Gln Gln Ala Ala Ala Asp Lys Gly Asp Ser Ser Gln Val
        115                 120                 125

Ser Gln Asn Tyr Pro Ile Val Gln Asn Leu Gln Gly Gln Met Val His
    130                 135                 140

Gln Ala Ile Ser Pro Arg Thr Leu Asn Ala Trp Val Lys Val Val Glu
145                 150                 155                 160

Glu Lys Ala Phe Ser Pro Glu Val Ile Pro Met Phe Ser Ala Leu Ser
                165                 170                 175

Glu Gly Ala Thr Pro Gln Asp Leu Asn Thr Met Leu Asn Thr Val Gly
            180                 185                 190

Gly His Gln Ala Ala Met Gln Met Leu Lys Asp Thr Ile Asn Glu Glu
        195                 200                 205

Ala Ala Glu Trp Asp Arg Leu His Pro Val His Ala Gly Pro Ile Pro
    210                 215                 220

Pro Gly Gln Met Arg Glu Pro Arg Gly Ser Asp Ile Ala Gly Thr Thr
225                 230                 235                 240

Ser Thr Leu Gln Glu Gln Ile Gly Trp Met Thr Ser Asn Pro Pro Ile
                245                 250                 255

Pro Val Gly Glu Ile Tyr Lys Arg Trp Ile Ile Leu Gly Leu Asn Lys
            260                 265                 270

Ile Val Arg Met Tyr Ser Pro Val Ser Ile Leu Asp Ile Arg Gln Gly
        275                 280                 285

Pro Lys Glu Pro Phe Arg Asp Tyr Val Asp Arg Phe Phe Lys Thr Leu
    290                 295                 300

Arg Ala Glu Gln Ala Thr Gln Asp Val Lys Asn Trp Met Thr Asp Thr
305                 310                 315                 320

Leu Leu Val Gln Asn Ala Asn Pro Asp Cys Lys Thr Ile Leu Lys Ala
                325                 330                 335

Leu Gly Pro Gly Ala Thr Leu Glu Glu Met Met Thr Ala Cys Gln Gly
            340                 345                 350

Val Gly Gly Pro Gly His Lys Ala Arg Val Leu Ala Glu Ala Met Ser
        355                 360                 365

Gln Val Thr Asn Ala Asn Ile Met Met Gln Arg Gly Asn Phe Lys Gly
    370                 375                 380

Pro Arg Arg Ile Val Lys Cys Phe Asn Cys Gly Lys Glu Gly His Ile
385                 390                 395                 400

Ala Arg Asn Cys Arg Ala Pro Arg Lys Lys Gly Cys Trp Lys Cys Gly
                405                 410                 415

Lys Glu Gly His Gln Met Lys Asp Cys Thr Glu Arg Gln Ala Asn Phe
            420                 425                 430

Leu Gly Lys Ile Trp Pro Ser Asn Lys Gly Arg Pro Gly Asn Phe Leu
        435                 440                 445

Gln Ser Arg Pro Glu Pro Thr Ala Pro Pro Ala Glu Ser Phe Gly Phe
    450                 455                 460

Gly Glu Glu Ile Thr Pro Ser Pro Lys Gln Glu Pro Lys Asp Lys Glu
465                 470                 475                 480

Leu Tyr Pro Leu Ala Ser Leu Lys Ser Leu Phe Gly Ser Asp Pro Leu
                485                 490                 495

Ser Gln
```

<210> SEQ ID NO 369
<211> LENGTH: 829
<212> TYPE: PRT
<213> ORGANISM: Artificial Sequence
<220> FEATURE:
<223> OTHER INFORMATION: Synthetic Construct

<400> SEQUENCE: 369

```
Met Arg Val Met Gly Ile Gln Arg Asn Cys Gln His Leu Trp Arg Trp
1               5                   10                  15

Gly Ile Leu Ile Phe Gly Met Leu Ile Ile Cys Ser Ala Ala Glu Asn
            20                  25                  30

Leu Trp Val Thr Val Tyr Tyr Gly Val Pro Val Trp Lys Glu Ala Asn
        35                  40                  45

Thr Thr Leu Phe Cys Ala Ser Asp Ala Lys Ala Tyr Asp Thr Glu Val
    50                  55                  60

His Asn Val Trp Ala Thr His Ala Cys Val Pro Thr Asp Pro Asn Pro
65                  70                  75                  80

Gln Glu Ile Val Leu Glu Asn Val Thr Glu Asn Phe Asn Met Trp Lys
                85                  90                  95

Asn Asn Met Val Glu Gln Met His Glu Asp Ile Ile Ser Leu Trp Asp
            100                 105                 110

Gln Ser Leu Lys Pro Cys Val Lys Leu Thr Pro Leu Cys Val Thr Leu
        115                 120                 125

Asn Cys Thr Asp Val Asn Ala Thr Asn Asn Thr Thr Asn Asn Glu Glu
    130                 135                 140

Ile Lys Asn Cys Ser Phe Asn Ile Thr Thr Glu Ile Arg Asp Lys Lys
145                 150                 155                 160

Lys Lys Val Tyr Ala Leu Phe Tyr Lys Leu Asp Val Val Pro Ile Asp
                165                 170                 175

Asp Asn Asn Ser Tyr Arg Leu Ile Asn Cys Asn Thr Ser Ala Ile Thr
            180                 185                 190

Gln Ala Cys Pro Lys Val Ser Phe Glu Pro Ile Pro Ile His Tyr Cys
        195                 200                 205

Ala Pro Ala Gly Phe Ala Ile Leu Lys Cys Asn Asp Lys Lys Phe Asn
    210                 215                 220

Gly Thr Gly Pro Cys Lys Asn Val Ser Thr Val Gln Cys Thr His Gly
225                 230                 235                 240

Ile Lys Pro Val Val Ser Thr Gln Leu Leu Leu Asn Gly Ser Leu Ala
                245                 250                 255

Glu Glu Glu Ile Ile Ile Arg Ser Glu Asn Ile Thr Asn Asn Ala Lys
            260                 265                 270

Thr Ile Ile Val Gln Leu Asn Glu Ser Val Glu Ile Asn Cys Thr Arg
        275                 280                 285

Pro Asn Asn Asn Thr Arg Lys Ser Ile Arg Ile Gly Pro Gly Gln Ala
    290                 295                 300

Phe Tyr Ala Thr Gly Asp Ile Ile Gly Asp Ile Arg Gln Ala His Cys
305                 310                 315                 320

Asn Ile Ser Arg Thr Lys Trp Asn Lys Thr Leu Gln Gln Val Ala Lys
                325                 330                 335

Lys Leu Arg Glu His Phe Asn Lys Thr Ile Ile Phe Asn Pro Ser Ser
            340                 345                 350

Gly Gly Asp Leu Glu Ile Thr Thr His Ser Phe Asn Cys Gly Gly Glu
        355                 360                 365

Phe Phe Tyr Cys Asn Thr Ser Glu Leu Phe Asn Ser Thr Trp Asn Gly
```

```
    370                 375                 380

Thr Asn Asn Thr Ile Thr Leu Pro Cys Arg Ile Lys Gln Ile Ile Asn
385                 390                 395                 400

Met Trp Gln Gly Val Gly Gln Ala Met Tyr Ala Pro Pro Ile Glu Gly
                405                 410                 415

Lys Ile Arg Cys Thr Ser Asn Ile Thr Gly Leu Leu Leu Thr Arg Asp
            420                 425                 430

Gly Gly Asn Asn Asn Thr Glu Thr Phe Arg Pro Gly Gly Gly Asp Met
        435                 440                 445

Arg Asp Asn Trp Arg Ser Glu Leu Tyr Lys Tyr Lys Val Val Lys Ile
    450                 455                 460

Glu Pro Leu Gly Val Ala Pro Thr Lys Ala Lys Arg Arg Val Val Glu
465                 470                 475                 480

Arg Glu Lys Arg Ala Val Gly Ile Gly Ala Val Phe Leu Gly Phe Leu
                485                 490                 495

Gly Ala Ala Gly Ser Thr Met Gly Ala Ala Ser Ile Thr Leu Thr Val
            500                 505                 510

Gln Ala Arg Gln Leu Leu Ser Gly Ile Val Gln Gln Gln Ser Asn Leu
        515                 520                 525

Leu Arg Ala Ile Glu Ala Gln Gln His Leu Leu Gln Leu Thr Val Trp
    530                 535                 540

Gly Ile Lys Gln Leu Gln Ala Arg Val Leu Ala Val Glu Arg Tyr Leu
545                 550                 555                 560

Lys Asp Gln Gln Leu Leu Gly Ile Trp Gly Cys Ser Gly Lys Leu Ile
                565                 570                 575

Cys Thr Thr Asn Val Pro Trp Asn Ser Ser Trp Ser Asn Lys Ser Gln
            580                 585                 590

Asp Glu Ile Trp Asp Asn Met Thr Trp Met Glu Trp Asp Lys Glu Ile
        595                 600                 605

Asn Asn Tyr Thr Asp Ile Ile Tyr Ser Leu Ile Glu Glu Ser Gln Asn
    610                 615                 620

Gln Gln Glu Lys Asn Glu Gln Glu Leu Leu Ala Leu Asp Lys Trp Ala
625                 630                 635                 640

Ser Leu Trp Asn Trp Phe Asp Ile Thr Asn Trp Leu Trp Tyr Ile Lys
                645                 650                 655

Ile Phe Ile Met Ile Val Gly Gly Leu Ile Gly Leu Arg Ile Val Phe
            660                 665                 670

Ala Val Leu Ser Ile Val Asn Arg Val Arg Gln Gly Tyr Ser Pro Leu
        675                 680                 685

Ser Phe Gln Thr Leu Ile Pro Asn Pro Arg Gly Pro Asp Arg Pro Glu
    690                 695                 700

Gly Ile Glu Glu Glu Gly Gly Glu Gln Asp Arg Asp Arg Ser Ile Arg
705                 710                 715                 720

Leu Val Asn Gly Phe Leu Ala Leu Ala Trp Asp Asp Leu Arg Ser Leu
                725                 730                 735

Cys Leu Phe Ser Tyr His Arg Leu Arg Asp Leu Ile Leu Ile Ala Ala
            740                 745                 750

Arg Thr Val Glu Leu Leu Gly Arg Arg Gly Trp Glu Ala Leu Lys Tyr
        755                 760                 765

Leu Trp Asn Leu Leu Gln Tyr Trp Gly Gln Glu Leu Lys Asn Ser Ala
    770                 775                 780

Ile Ser Leu Leu Asp Thr Thr Ala Ile Ala Val Ala Glu Gly Thr Asp
785                 790                 795                 800
```

```
Arg Val Ile Glu Val Val Gln Arg Val Cys Arg Ala Ile Leu Asn Ile
                805                 810                 815

Pro Arg Arg Ile Arg Gln Gly Phe Glu Arg Ala Leu Leu
            820                 825


<210> SEQ ID NO 370
<211> LENGTH: 206
<212> TYPE: PRT
<213> ORGANISM: Artificial Sequence
<220> FEATURE:
<223> OTHER INFORMATION: Synthetic Construct

<400> SEQUENCE: 370

Met Gly Gly Lys Trp Ser Lys Ser Ser Ile Val Gly Trp Pro Ala Val
1               5                   10                  15

Arg Glu Arg Met Arg Arg Thr Ala Pro Ala Ala Glu Gly Val Gly Ala
            20                  25                  30

Val Ser Gln Asp Leu Asp Lys His Gly Ala Ile Thr Ser Ser Asn Thr
        35                  40                  45

Ala Ala Thr Asn Ala Asp Cys Ala Trp Leu Glu Ala Gln Glu Glu Glu
    50                  55                  60

Glu Val Gly Phe Pro Val Arg Pro Gln Val Pro Leu Arg Pro Met Thr
65                  70                  75                  80

Tyr Lys Ala Ala Phe Asp Leu Ser His Phe Leu Lys Glu Lys Gly Gly
                85                  90                  95

Leu Asp Gly Leu Ile Tyr Ser Lys Lys Arg Gln Glu Ile Leu Asp Leu
            100                 105                 110

Trp Val Tyr His Thr Gln Gly Tyr Phe Pro Asp Trp Gln Asn Tyr Thr
        115                 120                 125

Pro Gly Pro Gly Ile Arg Tyr Pro Leu Thr Phe Gly Trp Cys Phe Lys
    130                 135                 140

Leu Val Pro Val Asp Pro Glu Glu Val Glu Glu Ala Asn Glu Gly Glu
145                 150                 155                 160

Asn Asn Cys Leu Leu His Pro Met Cys Gln His Gly Met Glu Asp Glu
                165                 170                 175

Glu Arg Glu Val Leu Met Trp Lys Phe Asp Ser Arg Leu Ala Leu Arg
            180                 185                 190

His Ile Ala Arg Glu Leu His Pro Glu Phe Tyr Lys Asp Cys
        195                 200                 205


<210> SEQ ID NO 371
<211> LENGTH: 1002
<212> TYPE: PRT
<213> ORGANISM: Artificial Sequence
<220> FEATURE:
<223> OTHER INFORMATION: Synthetic Construct

<400> SEQUENCE: 371

Phe Phe Arg Glu Asn Leu Ala Phe Gln Gln Gly Glu Ala Arg Glu Phe
1               5                   10                  15

Ser Ser Glu Gln Thr Arg Ala Asn Ser Pro Thr Ser Arg Glu Leu Arg
            20                  25                  30

Val Arg Gly Gly Asp Asn Pro Leu Ser Glu Ala Gly Ala Glu Arg Gln
        35                  40                  45

Gly Thr Val Ser Phe Ser Phe Pro Gln Ile Thr Leu Trp Gln Arg Pro
    50                  55                  60

Leu Val Thr Ile Lys Ile Gly Gly Gln Leu Arg Glu Ala Leu Leu Asp
```

```
65                  70                  75                  80

Thr Gly Ala Asp Asp Thr Val Leu Glu Glu Ile Asn Leu Pro Gly Lys
                85                  90                  95

Trp Lys Pro Lys Met Ile Gly Gly Ile Gly Gly Phe Ile Lys Val Arg
            100                 105                 110

Gln Tyr Asp Gln Ile Leu Ile Glu Ile Cys Gly Lys Lys Ala Ile Gly
        115                 120                 125

Thr Val Leu Val Gly Pro Thr Pro Val Asn Ile Ile Gly Arg Asn Met
    130                 135                 140

Leu Thr Gln Ile Gly Cys Thr Leu Asn Phe Pro Ile Ser Pro Ile Glu
145                 150                 155                 160

Thr Val Pro Val Lys Leu Lys Pro Gly Met Asp Gly Pro Lys Val Lys
                165                 170                 175

Gln Trp Pro Leu Thr Glu Glu Lys Ile Lys Ala Leu Thr Glu Ile Cys
            180                 185                 190

Thr Glu Met Glu Lys Glu Gly Lys Ile Ser Lys Ile Gly Pro Glu Asn
        195                 200                 205

Pro Tyr Asn Thr Pro Val Phe Ala Ile Lys Lys Lys Asp Ser Thr Lys
    210                 215                 220

Trp Arg Lys Leu Val Asp Phe Arg Glu Leu Asn Lys Arg Thr Gln Asp
225                 230                 235                 240

Phe Trp Glu Val Gln Leu Gly Ile Pro His Pro Ala Gly Leu Lys Lys
                245                 250                 255

Lys Lys Ser Val Thr Val Leu Asp Val Gly Asp Ala Tyr Phe Ser Val
            260                 265                 270

Pro Leu Asp Glu Asp Phe Arg Lys Tyr Thr Ala Phe Thr Ile Pro Ser
        275                 280                 285

Ile Asn Asn Glu Thr Pro Gly Ile Arg Tyr Gln Tyr Asn Val Leu Pro
    290                 295                 300

Gln Gly Trp Lys Gly Ser Pro Ala Ile Phe Gln Ser Ser Met Thr Lys
305                 310                 315                 320

Ile Leu Glu Pro Phe Arg Thr Lys Asn Pro Glu Ile Val Ile Tyr Gln
                325                 330                 335

Tyr Met Asp Asp Leu Tyr Val Gly Ser Asp Leu Glu Ile Gly Gln His
            340                 345                 350

Arg Ala Lys Ile Glu Glu Leu Arg Glu His Leu Leu Arg Trp Gly Phe
        355                 360                 365

Thr Thr Pro Asp Lys Lys His Gln Lys Glu Pro Pro Phe Leu Trp Met
    370                 375                 380

Gly Tyr Glu Leu His Pro Asp Lys Trp Thr Val Gln Pro Ile Gln Leu
385                 390                 395                 400

Pro Glu Lys Asp Ser Trp Thr Val Asn Asp Ile Gln Lys Leu Val Gly
                405                 410                 415

Lys Leu Asn Trp Ala Ser Gln Ile Tyr Pro Gly Ile Lys Val Lys Gln
            420                 425                 430

Leu Cys Lys Leu Leu Arg Gly Ala Lys Ala Leu Thr Asp Ile Val Pro
        435                 440                 445

Leu Thr Glu Glu Ala Glu Leu Glu Leu Ala Glu Asn Arg Glu Ile Leu
    450                 455                 460

Lys Glu Pro Val His Gly Val Tyr Tyr Asp Pro Ser Lys Asp Leu Ile
465                 470                 475                 480

Ala Glu Ile Gln Lys Gln Gly Gln Asp Gln Trp Thr Tyr Gln Ile Tyr
                485                 490                 495
```

```
Gln Glu Pro Phe Lys Asn Leu Lys Thr Gly Lys Tyr Ala Lys Met Arg
            500                 505                 510

Ser Ala His Thr Asn Asp Val Lys Gln Leu Thr Glu Ala Val Gln Lys
        515                 520                 525

Ile Ala Thr Glu Ser Ile Val Ile Trp Gly Lys Thr Pro Lys Phe Arg
    530                 535                 540

Leu Pro Ile Gln Lys Glu Thr Trp Glu Thr Trp Trp Thr Glu Tyr Trp
545                 550                 555                 560

Gln Ala Thr Trp Ile Pro Glu Trp Glu Phe Val Asn Thr Pro Pro Leu
                565                 570                 575

Val Lys Leu Trp Tyr Gln Leu Glu Lys Glu Pro Ile Val Gly Ala Glu
            580                 585                 590

Thr Phe Tyr Val Asp Gly Ala Ala Asn Arg Glu Thr Lys Leu Gly Lys
        595                 600                 605

Ala Gly Tyr Val Thr Asp Arg Gly Arg Gln Lys Val Val Ser Leu Thr
    610                 615                 620

Glu Thr Thr Asn Gln Lys Thr Glu Leu Gln Ala Ile His Leu Ala Leu
625                 630                 635                 640

Gln Asp Ser Gly Ser Glu Val Asn Ile Val Thr Asp Ser Gln Tyr Ala
                645                 650                 655

Leu Gly Ile Ile Gln Ala Gln Pro Asp Lys Ser Glu Ser Glu Leu Val
            660                 665                 670

Asn Gln Ile Ile Glu Gln Leu Ile Lys Lys Glu Lys Val Tyr Leu Ser
        675                 680                 685

Trp Val Pro Ala His Lys Gly Ile Gly Gly Asn Glu Gln Val Asp Lys
    690                 695                 700

Leu Val Ser Ser Gly Ile Arg Lys Val Leu Phe Leu Asp Gly Ile Asp
705                 710                 715                 720

Lys Ala Gln Glu Glu His Glu Lys Tyr His Ser Asn Trp Arg Ala Met
                725                 730                 735

Ala Ser Asp Phe Asn Leu Pro Pro Val Val Ala Lys Glu Ile Val Ala
            740                 745                 750

Ser Cys Asp Lys Cys Gln Leu Lys Gly Glu Ala Met His Gly Gln Val
        755                 760                 765

Asp Cys Ser Pro Gly Ile Trp Gln Leu Asp Cys Thr His Leu Glu Gly
    770                 775                 780

Lys Val Ile Leu Val Ala Val His Val Ala Ser Gly Tyr Ile Glu Ala
785                 790                 795                 800

Glu Val Ile Pro Ala Glu Thr Gly Gln Glu Thr Ala Tyr Phe Ile Leu
                805                 810                 815

Lys Leu Ala Gly Arg Trp Pro Val Lys Val Ile His Thr Asp Asn Gly
            820                 825                 830

Ser Asn Phe Thr Ser Ala Ala Val Lys Ala Ala Cys Trp Trp Ala Gly
        835                 840                 845

Ile Gln Gln Glu Phe Gly Ile Pro Tyr Asn Pro Gln Ser Gln Gly Val
    850                 855                 860

Val Glu Ser Met Asn Lys Glu Leu Lys Lys Ile Ile Gly Gln Val Arg
865                 870                 875                 880

Asp Gln Ala Glu His Leu Lys Thr Ala Val Gln Met Ala Val Phe Ile
                885                 890                 895

His Asn Phe Lys Arg Lys Gly Gly Ile Gly Gly Tyr Ser Ala Gly Glu
            900                 905                 910
```

```
Arg Ile Ile Asp Ile Ile Ala Thr Asp Ile Gln Thr Lys Glu Leu Gln
        915                 920                 925

Lys Gln Ile Thr Lys Ile Gln Asn Phe Arg Val Tyr Tyr Arg Asp Ser
    930                 935                 940

Arg Asp Pro Ile Trp Lys Gly Pro Ala Lys Leu Leu Trp Lys Gly Glu
945                 950                 955                 960

Gly Ala Val Val Ile Gln Asp Asn Ser Glu Ile Lys Val Val Pro Arg
                965                 970                 975

Arg Lys Ala Lys Ile Ile Arg Asp Tyr Gly Lys Gln Met Ala Gly Asp
            980                 985                 990

Asp Cys Val Ala Gly Arg Gln Asp  Glu Asp
        995                 1000


<210> SEQ ID NO 372
<211> LENGTH: 119
<212> TYPE: PRT
<213> ORGANISM: Artificial Sequence
<220> FEATURE:
<223> OTHER INFORMATION: Synthetic Construct

<400> SEQUENCE: 372

Met Ala Gly Arg Ser Gly Asp Ser Asp Glu Glu Leu Leu Lys Ala Val
1               5                   10                  15

Arg Ile Ile Lys Ile Leu Tyr Gln Ser Asn Pro Tyr Pro Lys Pro Glu
            20                  25                  30

Gly Thr Arg Gln Ala Arg Arg Asn Arg Arg Arg Arg Trp Arg Ala Arg
        35                  40                  45

Gln Arg Gln Ile His Ser Ile Ser Glu Arg Ile Leu Ser Thr Cys Leu
    50                  55                  60

Gly Arg Pro Ala Glu Pro Val Pro Leu Gln Leu Pro Pro Leu Glu Arg
65                  70                  75                  80

Leu His Leu Asp Cys Ser Glu Asp Cys Gly Thr Ser Gly Thr Gln Gln
                85                  90                  95

Gly Thr Gly Val Gly Ser Pro Gln Ile Ser Val Glu Ser Ser Ala Val
            100                 105                 110

Leu Gly Ser Gly Thr Lys Glu
        115


<210> SEQ ID NO 373
<211> LENGTH: 192
<212> TYPE: PRT
<213> ORGANISM: Artificial Sequence
<220> FEATURE:
<223> OTHER INFORMATION: Synthetic Construct

<400> SEQUENCE: 373

Met Glu Asn Arg Trp Gln Val Met Ile Val Trp Gln Val Asp Arg Met
1               5                   10                  15

Arg Ile Arg Thr Trp Lys Ser Leu Val Lys His His Met Tyr Val Ser
            20                  25                  30

Lys Lys Ala Lys Gly Trp Phe Tyr Arg His His Tyr Glu Ser Ser His
        35                  40                  45

Pro Lys Ile Ser Ser Glu Val His Ile Pro Leu Gly Asp Ala Arg Leu
    50                  55                  60

Val Val Thr Thr Tyr Trp Gly Leu His Thr Gly Glu Arg Asp Trp His
65                  70                  75                  80

Leu Gly Gln Gly Val Ser Ile Glu Trp Arg Gln Arg Arg Tyr Ser Thr
                85                  90                  95
```

```
Gln Val Asp Pro Gly Leu Ala Asp Gln Leu Ile His Met His Tyr Phe
            100                 105                 110

Asp Cys Phe Ser Glu Ser Ala Ile Arg Lys Ala Ile Leu Gly His Ile
        115                 120                 125

Val Ser Pro Arg Cys Asp Tyr Gln Ala Gly His Asn Lys Val Gly Ser
    130                 135                 140

Leu Gln Tyr Leu Ala Leu Thr Ala Leu Ile Thr Pro Lys Lys Thr Lys
145                 150                 155                 160

Pro Pro Leu Pro Ser Val Arg Lys Leu Val Glu Asp Arg Trp Asn Lys
                165                 170                 175

Pro Gln Lys Thr Arg Gly His Arg Gly Ser His Thr Met Asn Gly His
            180                 185                 190


<210> SEQ ID NO 374
<211> LENGTH: 82
<212> TYPE: PRT
<213> ORGANISM: Artificial Sequence
<220> FEATURE:
<223> OTHER INFORMATION: Synthetic Construct

<400> SEQUENCE: 374

Met Leu Ser Leu Glu Ile Leu Ala Ile Val Ala Leu Val Val Ala Leu
1               5                   10                  15

Ile Ile Ala Ile Val Val Trp Thr Ile Val Tyr Ile Glu Tyr Arg Lys
            20                  25                  30

Leu Ile Arg Gln Arg Lys Ile Asp Arg Leu Ile Asp Arg Ile Arg Glu
        35                  40                  45

Arg Ala Glu Asp Ser Gly Asn Glu Ser Asp Gly Asp Thr Glu Glu Leu
    50                  55                  60

Ser Ala Leu Val Glu Met Gly His Leu Asp Leu Trp Asp Val Asp Ser
65                  70                  75                  80

Lys Lys


<210> SEQ ID NO 375
<211> LENGTH: 101
<212> TYPE: PRT
<213> ORGANISM: Artificial Sequence
<220> FEATURE:
<223> OTHER INFORMATION: Synthetic Construct

<400> SEQUENCE: 375

Met Glu Pro Val Asp Pro Asn Leu Glu Pro Trp Asn His Pro Gly Ser
1               5                   10                  15

Gln Pro Lys Thr Ala Cys Asn Lys Cys Tyr Cys Lys Lys Cys Cys Tyr
            20                  25                  30

His Cys Gln Val Cys Phe Leu Lys Lys Gly Leu Gly Ile Ser Tyr Gly
        35                  40                  45

Arg Lys Lys Arg Arg Gln Arg Arg Arg Thr Pro Gln Ser Ser Lys Asp
    50                  55                  60

His Gln Asp Pro Ile Pro Lys Gln Pro Leu Ser Gln Thr Arg Gly Asp
65                  70                  75                  80

Pro Thr Gly Pro Glu Glu Ser Lys Lys Lys Val Glu Ser Lys Thr Glu
                85                  90                  95

Thr Asp Pro Phe Asp
            100


<210> SEQ ID NO 376
```

<211> LENGTH: 96
<212> TYPE: PRT
<213> ORGANISM: Artificial Sequence
<220> FEATURE:
<223> OTHER INFORMATION: Synthetic Construct

<400> SEQUENCE: 376

```
Met Glu Gln Ala Pro Glu Asp Gln Gly Pro Gln Arg Glu Pro Tyr Asn
1               5                   10                  15

Glu Trp Thr Leu Glu Leu Leu Glu Glu Leu Lys Asn Glu Ala Val Arg
            20                  25                  30

His Phe Pro Arg Pro Trp Leu His Gly Leu Gly Gln His Ile Tyr Asn
        35                  40                  45

Thr Tyr Gly Asp Thr Trp Glu Gly Val Glu Ala Ile Ile Arg Ile Leu
    50                  55                  60

Gln Gln Leu Leu Phe Ile His Phe Arg Ile Gly Cys Gln His Ser Arg
65                  70                  75                  80

Ile Gly Ile Ile Arg Gln Arg Arg Val Arg Asn Gly Ala Ser Arg Ser
                85                  90                  95
```

<210> SEQ ID NO 377
<211> LENGTH: 9
<212> TYPE: PRT
<213> ORGANISM: Artificial Sequence
<220> FEATURE:
<223> OTHER INFORMATION: Synthetic Construct

<400> SEQUENCE: 377

```
Gly Ile Pro His Pro Ala Phe Leu Lys
1               5
```

<210> SEQ ID NO 378
<211> LENGTH: 4
<212> TYPE: PRT
<213> ORGANISM: Artificial Sequence
<220> FEATURE:
<223> OTHER INFORMATION: Synthetic Construct

<400> SEQUENCE: 378

```
Arg Arg Lys Arg
1
```

<210> SEQ ID NO 379
<211> LENGTH: 11
<212> TYPE: PRT
<213> ORGANISM: Artificial Sequence
<220> FEATURE:
<223> OTHER INFORMATION: Synthetic Construct

<400> SEQUENCE: 379

```
Lys Ala Phe Ser Glu Pro Val Ile Met Pro Phe
1               5                   10
```

<210> SEQ ID NO 380
<211> LENGTH: 13
<212> TYPE: PRT
<213> ORGANISM: Artificial Sequence
<220> FEATURE:
<223> OTHER INFORMATION: Synthetic Construct

<400> SEQUENCE: 380

```
Ala Lys Phe Val Ala Ala Trp Thr Leu Lys Ala Ala Ala
1               5                   10
```

```
<210> SEQ ID NO 381
<211> LENGTH: 5
<212> TYPE: PRT
<213> ORGANISM: Artificial Sequence
<220> FEATURE:
<223> OTHER INFORMATION: Synthetic Construct

<400> SEQUENCE: 381

Gly Pro Gly Pro Gly
1               5


<210> SEQ ID NO 382
<211> LENGTH: 17
<212> TYPE: PRT
<213> ORGANISM: Artificial Sequence
<220> FEATURE:
<223> OTHER INFORMATION: Synthetic Construct

<400> SEQUENCE: 382

Met Arg Tyr Met Ile Leu Gly Leu Leu Ala Leu Ala Ala Val Cys Ser
1               5                   10                  15

Ala


<210> SEQ ID NO 383
<211> LENGTH: 20
<212> TYPE: PRT
<213> ORGANISM: Artificial Sequence
<220> FEATURE:
<223> OTHER INFORMATION: Synthetic Construct

<400> SEQUENCE: 383

Met Gln Val Gln Ile Gln Ser Leu Phe Leu Leu Leu Leu Trp Val Pro
1               5                   10                  15

Gly Ser Arg Gly
            20


<210> SEQ ID NO 384
<211> LENGTH: 15
<212> TYPE: PRT
<213> ORGANISM: Artificial Sequence
<220> FEATURE:
<223> OTHER INFORMATION: Synthetic Construct

<400> SEQUENCE: 384

Gly Ile Arg Tyr Pro Leu Thr Phe Gly Trp Cys Phe Lys Leu Val
1               5                   10                  15


<210> SEQ ID NO 385
<211> LENGTH: 14
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (3)..(3)
<223> OTHER INFORMATION: F or H
<220> FEATURE:
<221> NAME/KEY: VARIANT
<222> LOCATION: (8)..(8)
<223> OTHER INFORMATION: K or M
<220> FEATURE:
<221> NAME/KEY: VARIANT
<222> LOCATION: (12)..(12)
<223> OTHER INFORMATION: D or E

<400> SEQUENCE: 385

Leu Ser Xaa Phe Leu Lys Glu Xaa Gly Gly Leu Xaa Gly Leu
```

-continued

```
1               5                   10


<210> SEQ ID NO 386
<211> LENGTH: 36
<212> TYPE: DNA
<213> ORGANISM: Artificial Sequence
<220> FEATURE:
<223> OTHER INFORMATION: Synthetic Construct

<400> SEQUENCE: 386

gaaaaaagac gctactaaat ggagaaaata gatttc                              36


<210> SEQ ID NO 387
<211> LENGTH: 29
<212> TYPE: DNA
<213> ORGANISM: Artificial Sequence
<220> FEATURE:
<223> OTHER INFORMATION: Synthetic Construct

<400> SEQUENCE: 387

aagtcaagga gcaatagaat ctatgaata                                      29
```

HIGHLY NETWORKED IMMUNOGEN COMPOSITION

CROSS-REFERENCE TO RELATED APPLICATION(S)

This application relates to and claims priority from U.S. Patent Application No. 62/817,094 filed on Mar. 12, 2019, the entire disclosure of which is incorporated herein by reference.

STATEMENT OF RIGHTS TO INVENTIONS MADE UNDER FEDERALLY SPONSORED RESEARCH

This invention was made with government support under AI060354 awarded by the National Institutes of Health. The government has certain rights in the invention.

INCORPORATION BY REFERENCE STATEMENT

This application contains a Sequence Listing which has been submitted electronically in ASCII format and is hereby incorporated by reference in its entirety. Said ASCII copy, created on Apr. 7, 2025, is named 51490-002002_Sequence_Listing_4_7_25_ST25 and is 102,610 bytes in size.

BACKGROUND

The development of an effective vaccine for human immunodeficiency virus (HIV) is a critical global health priority. A major challenge to HIV vaccine design is the high rate of viral mutation, which allows the virus to escape from vaccine-induced and host immune responses. This is particularly notable for the cytotoxic T lymphocyte response, in which the virus is able to mediate escape through the introducing of mutations within viral epitopes targeted by cytotoxic T cells. In order to combat this issue, there is a need for methods to systematically identify specific HIV proteome epitopes, which are resistant to mutation and thereby allow for persistent recognition and killing of virally infected cells by cytotoxic T lymphocytes in vivo.

SUMMARY

Implementations described herein relate to highly networked HIV CTL epitopes and methods of identifying highly networked HIV CTL epitopes using a structure-based network analysis algorithm as well as to methods of treating a subject having or at risk of having an HIV infection through the use of T cell-based immunogens that incorporate the identified highly networked HIV CTL epitopes.

In certain implementations, a multi-epitope T cell immunogen composition comprising two or more highly networked HIV CTL epitopes is provided, wherein the two or more highly networked HIV CTL epitopes each have a network score of at least 3.06, and wherein the highly networked HIV CTL epitopes are restricted by one or more HLA alleles when expressed on the surface of a cell, e.g., an antigen presenting cell.

In other implementations, a multi-epitope T cell immunogen composition comprising two or more highly networked HIV CTL epitope variants is provided, wherein the two or more highly networked HIV CTL epitope variants each have a network score of at least 3.06, and the highly networked HIV CTL epitope variant has at least about 65% to about 99% homology to a consensus Group M HIV CTL epitope.

In other implementations, the multi-epitope T cell immunogen composition comprises two highly networked HIV CTL epitopes restricted by HLA-B*57, including HLA-B*57 KAFSPEVIPMF (KF11) (SEQ ID NO: 201) and HLA-B*57 TSTLQEQIGW (TW10) (SEQ ID NO: 202) or a highly networked HIV CTL epitope having at least about 65% to about 99% homology to the amino acid sequence of HLA-B*57 KF11 (SEQ ID NO: 201) or HLA-B*57 TW10 (SEQ ID NO: 202).

In other implementations, the multi-epitope T cell immunogen further comprises HIV CTL epitopes HLA-A*02 SLYNTVATL (SL9) (SEQ ID NO: 20), HLA-A*02 ILKEPVHGV (IV9) (SEQ ID NO: 19), and HLA-B*57 HTQGYFPDW (HW9) (SEQ ID NO: 209).

In other implementations, the multi-epitope T cell immunogen composition comprises three highly networked HIV CTL epitopes restricted by HLA-A*02, including HLA-A*02 KLTPLCVTL (KL9) (SEQ ID NO: 11), HLA-A*02 YVDRFYKTL (YL9) (SEQ ID NO: 23), and HLA-A*02 VIYQYMDDL (VL9) (SEQ ID NO: 13) or a highly networked HIV CTL epitope having at least about 65% to about 99% homology to the amino acid sequence of HLA-A*02 KLTPLCVTL (KL9) (SEQ ID NO: 11), HLA-A*02 YVDRFYKTL (YL9) (SEQ ID NO: 23), or HLA-A*02 VIYQYMDDL (VL9) (SEQ ID NO: 13).

In other implementations, the multi-epitope T cell immunogen composition comprises at least ten HIV CTL epitopes, wherein the ten HIV CTL epitopes are HLA-A*11 AVDLSHFLK (AK9) (SEQ ID NO: 40) and highly networked HIV CTL epitopes restricted by HLA-A*02, HLA-A*03, HLA-A*11 or HLA-B*07, including HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*02 KLTPLCVTL. (KL9) (SEQ ID NO: 11), HLA-B*07 SPRTLNAWV (SV9) (SEQ ID NO: 88), HLA-A*02 PLTFGWCYKL (PL10) (SEQ ID NO: 10), and B*07 TPGPGVRYPL (TL10) (SEQ ID NO: 98) or a HIV CTL epitope having at least about 65% to about 99% homology to the amino acid sequence of HLA-A*11 AVDLSHFLK (AK9) (SEQ ID NO: 40), or a highly networked HIV CTL epitope having at least about 65% to about 99% homology to the amino acid sequence of HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*02 KLTPLCVTL (KL9) (SEQ ID NO: 11), HLA-B*07 SPRTLNAWV (SV9) (SEQ ID NO: 88), HLA-A*02 PLTFGWCYKL (PL10) (SEQ ID NO: 10), or B*07 TPGPGVRYPL (TL10) (SEQ ID NO: 98).

In other implementations, the multi-epitope T cell immrunogen composition comprises two highly networked HIV CTL epitopes restricted by HLA-E*101 and HLA-E*103, including HLA-E*101/E*103 SALSEGATP (SEQ ID NO: 261), HLA-E*101/E*103 RMYSPTSIL (SEQ ID NO: 262), HLA-E*101/E*103 RIRTWKSLV (SEQ ID NO: 264), HLA-E*101/E*103 AISPRTLNA (SEQ ID NO: 265), HLA-E*101/E*103 STLQEQIGW (SEQ ID NO: 266), HLA-E*101/E*103 HQAISPRTL (SEQ ID NO: 270) and HLA-E*101/E*103 VGGHQAAMQ (SEQ ID NO: 271).

In other implementations, a method of preventing HIV infection in a subject is provided. The method includes administering to the subject a prophylactically effective amount of a multi-epitope T cell immunogen composition comprising two or more highly networked HIV CTL epitopes, wherein the two or more highly networked HIV CTL epitopes each have a network score of at least 3.06, and wherein the highly networked HIV CTL epitopes are restricted by one or more HLA alleles and a pharmaceutically acceptable carrier, thereby preventing HIV infection in the subject.

In certain implementations, a method of treating HIV in a subject is provided. The method includes selecting two or more HIV CTL epitopes from an HIV proteome that have a network score that meets a threshold value. The network score for a given epitope can be determined by generating at least one network representing protein structure, calculating a set of network parameters, combining the network parameters to determine a network score for each amino acid residue in the protein structure, generating a network score for each of a plurality of epitopes as a weighted linear combination of the amino acid residues of the epitopes, and selecting two or more epitopes according to their network score. The method also includes administering to the subject a therapeutically effective amount of a T cell immunogen composition and a pharmaceutically acceptable carrier. The T cell immunogen composition includes the two or more selected HIV CTL epitopes.

In other implementations, a method of preventing HIV infection in a subject is provided. The method includes selecting two or more HIV CTL epitopes from an HIV proteome that have a network score that meets a threshold value. The network score for a given epitope can be determined by generating at least one network representing protein structure, calculating a set of network parameters, combining the network parameters to determine a network score for each amino acid residue in the protein structure, generating a network score for each of a plurality of epitopes as a weighted linear combination of the amino acid residues of the epitopes, and selecting two or more epitopes according to their network score. The method also includes administering to the subject a prophylactically effective amount of a T cell immunogen composition and a pharmaceutically acceptable carrier. The T cell immunogen composition includes the two or more selected HIV CTL epitopes.

BRIEF DESCRIPTION OF THE DRAWINGS

FIG. 1 is a flow chart illustrating an exemplary sequence of steps for selecting epitopes for an HIV vaccine.

FIG. 7 is an illustration of elements utilized in the composition of T cell immunogens in certain implementations. The elements utilized include a furin cleavage site (RRKR (SEQ ID NO: 378)), networked epitopes that range in size from 8-12 amino acids, pan HLA-DR epitope (PA- DRE), and two endoplasmic reticulum signal sequences which promote HLA class I presentation. The sequences of SEQ ID NOs: 380, 382, and 383 are shown.

FIG. 16 (A) depicts in vivo immunogenicity of multi-epitope immunogens, lipid-encapsulated RNA replicons encoding highly networked HLA-A2 epitopes with or without PADRE (4 ug), and FIG. 16 (B) depicts the schematic of the in vivo immunogenicity experiments where lipid nanoparticle encapsulated RNA replicons are delivered to HLA-A2 transgenic mice by intra-muscular injection (CB6F1-Tg (HLA-A*0201/H2-Kb)A*0201; Taconic Biosciences) on day 0 and day 14, prior to assessment of IFN-γ CD8+ T cell responses. FIG. 16 (C) depicts IFN-γ ELISpot responses in the mice vaccinated with one of the HLA-A2 encoding. immunogens. FIG. 16 (D) depicts de novo CTL responses; the CD4+ T cell helper epitope PADRE enhances the induction of CD8+ T cell responses.

In FIGS. 18 (B) and 20 (C), no significant difference in the induction of VL9-specific CD8+ T cell responses was detected.

FIG. 20 (A) depicts constructs containing ten epitopes, which included highly networked epitopes restricted by HLA-A*02, HLA-A*03, HLA-A*11 and HLA-B*07. FIG. 20 (B) depicts the schematic of the experiment in which the constructs (2 ug or 10 ug) are delivered at day 0 and day 7 to HLA-A*11 transgenic mice. FIGS. 20 (C) and 20 (D) depict a statistically significant induction of IFN-γ ELISpot response in comparison to negative control immunized animals.

FIG. 21A to FIG. 21J depict the composite network scores correlated against functional datasets obtained from high and low-throughput mutagenesis studies. Epitopes with the sequence of SEQ ID NO:1 to SEQ ID NO:260 are shown, FIG. 22 depicts the non-HIV model proteins and characteristics of the functional mutagenesis datasets that were utilized to assess the ability of structure-based network analysis to identify amino acid residues of low mutational tolerance. The sequences of SEQ ID NO: 261 to SEQ ID NO: 271 are shown.

FIG. 23 depicts individual mutants within the NL4-3 plasmid.

FIG. 24A and FIG. 24B depict conserved residues of high and low network scores matched for amino acid identity and protein of origin. The sequences of SEQ ID NO: 272 to SEQ ID NO: 300, SEQ ID NO: 302 to SEQ ID NO: 306, SEQ ID NO: 308 to SEQ ID NO: 367, SEQ ID NO: 386, and SEQ ID NO: 387 are shown.

FIG. 25 depicts a cohort of 114 untreated HIV-positive individuals was evaluated, with elite or viremic control (viral load <2000 copies/mL), intermediate viral loads (2000-10000 copies/mL) or viral progression (viral load >10000 copies/mL), who also had a diverse representation of protective and non-protective HLA alleles.

Figure 2:
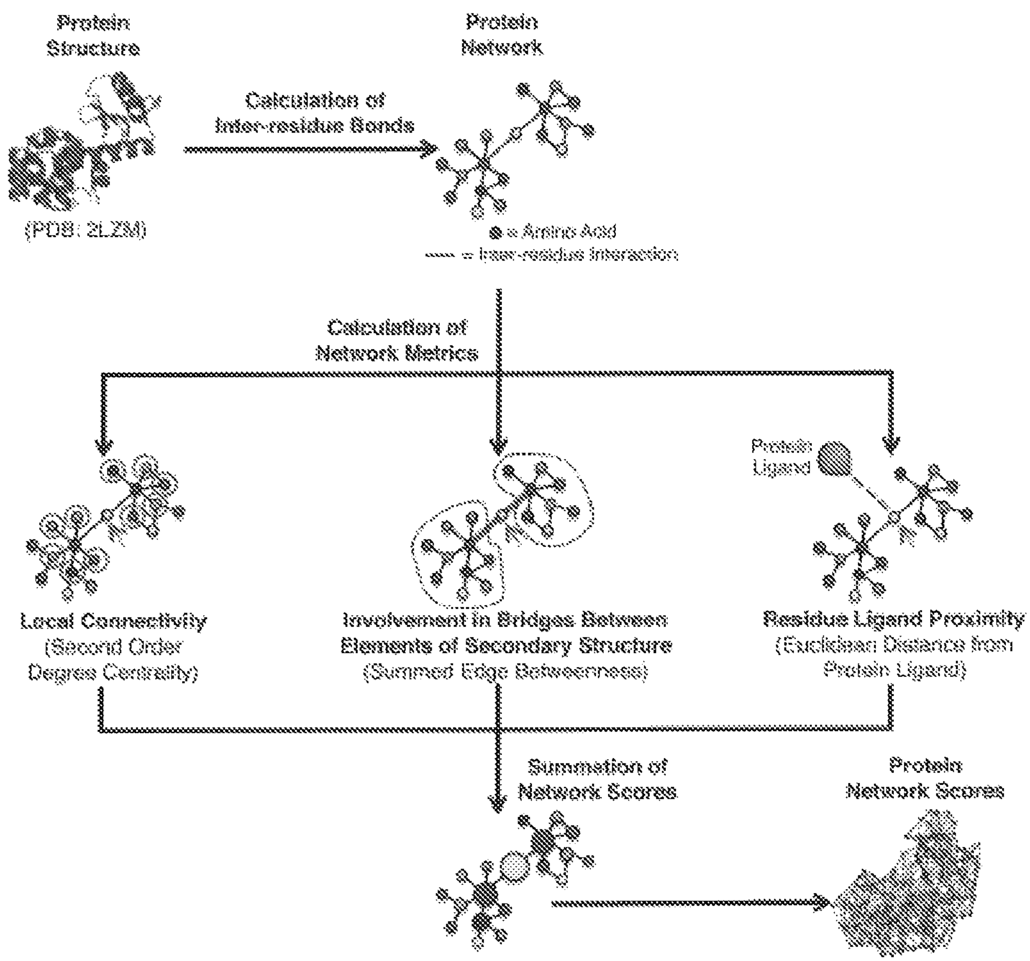
FIG. 2 is a schematic illustrating a structure based network analysis in accordance with one implementation of the present invention. Atomic coordinates from PDB files (T4 Lysozyme, PDB: 2LZM) are utilized to determine inter-residue interactions using established 1) energy potentials and angle and distance thresholds and 2) distances between side-chain centers of mass. This edge-based representation of the protein is used for the application of the network centrality measures (second order degree centrality, summed node edge betweenness centrality and residue ligand proximity), as has been demonstrated in the network schematic for the central node. These values are then converted to Z-scores and summed to generate composite network scores for each amino acid residue in the protein, which is visually depicted by the size of the residue. The final output is a network-based representation of the protein on the Cα backbone of the PDB file.

The following Detailed Description, given by way of example, but not intended to limit the invention to specific embodiments described, may be understood in conjunction with the accompanying figures, incorporated herein by reference.

DETAILED DESCRIPTION

All scientific and technical terms used in this application have meanings commonly used in the art unless otherwise specified. The definitions provided herein are to facilitate understanding of certain terms used frequently herein and are not meant to limit the scope of the application.

The articles "a" and "an" are used herein to refer to one or to more than one (i.e., to at least one) of the grammatical object of the article. By way of example, "an element" means one element or more than one element. The terms "comprise," "comprising," "include," "including," "have," and "having" are used in the inclusive, open sense, meaning that additional elements may be included. The terms "such as", "e.g.", as used herein are non-limiting and are for illustrative purposes only. "Including" and "including but not limited to" are used interchangeably.

The term "or" as used herein should be understood to mean "and/or", unless the context clearly indicates otherwise.

As used herein, the term "about" or "approximately" refers to a quantity, level, value, number, frequency, percentage, dimension, size, amount, weight or length that varies by as much as 15%, 10%, 9%, 8%, 7%, 6%, 5%, 4%, 3%, 2% or 1% to a reference quantity, level, value, number, frequency, percentage, dimension, size, amount, weight or length. In one embodiment, the term "about" or "approximately" refers a range of quantity, level, value, number, frequency, percentage, dimension, size, amount, weight or length±15%, ±10%, ±9%, ±8%, ±7%, ±6%, ±5%, ±4%, ±3%, ±2%, or ±1% about a reference quantity, level, value, number, frequency, percentage, dimension, size, amount, weight or length.

The term "vector" refers to a nucleic acid molecule capable of transporting another nucleic acid to which it has been linked. Preferred vectors are those capable of one or more of, autonomous replication and expression of nucleic acids to which they are linked. Vectors capable of directing the expression of genes to which they are operatively linked are referred to herein as "expression vectors".

The term "variant" refers to a single or a grouping of sequences (e.g., in an amino acid sequence) that have undergone changes as referenced against a particular species or sub-populations within a particular species due to mutations, recombination/crossover or genetic drift. Examples of types of variants include, but are not limited to: single nucleotide polymorphisms (SNPs), copy number variations (CNVs), insertions/deletions (indels), single nucleotide variant (SNVs), multiple nucleotide variants (MNVs), inversions, etc. Variants may have homology to native (unmutated) amino acid sequences, including about 65% to about 99% homology to the amino acid sequence, about 75% to about 99% homology to the amino acid sequence, about 85% to about 99% homology to the amino acid sequence, about 90% to about 99% homology to the amino acid sequence, or about 95% to about 99% homology to the amino acid sequence.

As used herein, the terms "treatment," "treating," and the like, refer to obtaining a desired pharmacologic or physiologic effect. The effect may be therapeutic in terms of a partial or complete cure for a disease or an adverse effect attributable to the disease. "Treatment," as used herein, covers any treatment of a disease in a mammal, particularly in a human, and can include inhibiting the disease or condition, i.e., arresting its development; and relieving the disease, i.e., causing regression of the disease. "Treatment," as used herein, covers both prophylactic or preventive treatment (that prevents and/or slows the development of a targeted pathologic condition or disorder) and curative, therapeutic or disease-modifying treatment In certain embodiments, the term "treatment" can include inhibiting or preventing the development or establishment of an HIV infection in a subject, e.g., by vaccination using a preventative vaccine including antigenic material described herein to stimulate a subject's immune system to develop adaptive immunity to HIV.

"Highly networked" refers to an epitope having a composite epitope network score greater than 3.06. Highly networked is a quantitative description of an individual epitope based on the output from the structure-based network analysis method, which is derived from its position of the epitope within the three-dimensional structure of the HIV protein. A network score greater than a score in the range of 3.04 to 3.10 is encompassed by "highly networked" because the assignment of hydrogen atoms can differ slightly from one determination to another.

"Multi-networked" is a description of a nucleic acid or protein product (i.e. a T cell immunogen) that contains 2 or more highly networked epitopes.

Implementations described herein relate to methods of identifying mutation resistant HIV CTL epitopes using a structure-based network analysis algorithm as well as to methods of treating a subject in need thereof through the use of T cell-based immunogens that incorporate the identified mutation resistant HIV CTL epitopes. It has been shown that a structure-based network analysis algorithm employing protein structure data and network theory metrics allows for the calculation of a network score for individual amino acid residues across the HIV proteome thereby allowing for the identification of optimal mutation resistant cytotoxic T cell epitopes by summation of the individual amino acid residue network scores.

Accordingly, an aspect of the invention relates to a method of identifying and selecting mutation resistant HIV CTL epitopes for use in a HIV vaccine. FIG. 1 illustrates one example of a method 100 for selecting epitopes for an HIV vaccine. The method employs a structure-based network analysis, which utilizes protein structure data to quantify the topological importance of each amino acid residue to a protein's tertiary and quaternary structure. The method 100 models the relationship between residue topology and mutational tolerance by focusing on interactions made by atoms unique to an amino acid's identity. This was accomplished by using atomic level coordinate data from the Protein Data Bank to build networks comprising nodes, representing amino acid residues, and edges, representing non-covalent interactions between the amino acid residues. These inter-residue interactions were calculated between pairs of amino acids using energy potentials and established distance thresholds and summed to generate the protein network.

Using the network-based representation, an array of network centrality metrics, representing the relative importance of the various residues in a given network topology, are employed to provide a quantitative measure of the topological importance of individual amino acid residues through an assessment of their local connectivity to other residues, their involvement as bridges between higher order protein elements, such as secondary structure, tertiary and quaternary structure interfaces, and their proximity to known protein ligands. These metrics are integrated into a network score that quantifies the relative contribution of each amino acid residue to the protein's topological structure.

At 102, at least one network representing protein structure is generated. An energetic approach, representing non-covalent interactions between individual atoms of amino acid residues, can be applied to generate one network. Non-covalent interactions considered in determining edge weights can include van der Waals interactions, hydrogen bonds, salt bridges, disulfide bonds, pi-pi interactions, pi-cation interactions, metal coordinated bonds and local hydrophobic packing. Each energetic protein network is then constructed by defining each individual amino acid residue within the protein structure as a node and defining weighted edges as the sum of all intermolecular bond energies between residues. Energies for each bond type were defined using previously established values in kJ/mol. The values for edges were then summed over the atoms in each amino acid residue to transform the edge list from a list of atom-atom interactions to a list of residue-residue interactions.

In an example implementation, the energetic network can be filtered to consider only those edges that are between terminal atoms to provide a second network focusing on residue-specific interactions. In this network, edges within the energetic network for which neither of the two participating atoms are a terminal atom are removed.

A centroid approach can be used to generate another network, representing the contribution of hydrophobic packing to protein folding. The centroid approach can be performed as an alternative or a supplement to the energetic approach. Each centroid network, the side chain center of mass for each amino acid residue is calculated and bonds are defined based on a distance threshold cutoff between centroids of 8.5 angstroms. Centroid protein networks were then constructed by defining each amino acid residue as a node and defining edges as binary interactions that meet the defined 8.5 angstrom threshold for centroid-to-centroid distance. Edges to immediately neighboring amino acid residues were not included in either approach due to presence of covalent peptide bonds between these residues.

At 104, a set of network parameters are calculated. A first parameter represents the involvement of the residue in bridging different higher order protein structures. In the example implementation, higher order protein structures were identified in two ways, a classical method, for example as might be generated using the publicly available software tool Stride, and a random walk approach whereby tightly connected communities are identified and distinguished. One example of this is the Walktrap algorithm. For higher order structure filters, no edges were considered between residues within the same structural motif. The first parameter can be determined as a number of second order interactions between resides from different higher order structures, using either or both of the classical method and the random walk approach to identify the higher order structures.

A second order internodular degree can be determined by determining, for each node, a number of nodes on different higher order structures within two degrees of separation of the network. This is referred to herein as the second order intermodular degree. In the example implementation, four separate values for the second order modulation degree can be determined for each node, using the three networks defined above and the two sets of secondary structure. Each second order internodular degree value is obtained by summing, for each neighbor of the node associated with another secondary structure module, a number of edges associated with the neighboring node, with the links between the node and the secondary structure modules defined by different methods described above. If multimeric protein structure data is utilized, this metric can be considered for the multimer prior to normalization.

A first value represents the second order intermodular degree for each node in the energetic network using the classically defined secondary structure. A second value represents the second order intermodular degree for each node in the energetic network, filtered to include only edges between terminal atoms, using the classically defined secondary structure. A third value represents the second order intermodular degree for each node in the centroid network using the classically defined secondary structure. A fourth value represents the second order intermodular degree for each node in the centroid network using the secondary structure defined via the random walk approach. Each of the first, second, third, and fourth values can be standardized across all nodes to provide a standardized value, and a mean value across the first, second, third, and fourth values provides an overall value representing the second order intermodular degree, SD, for each node.

A node edge betweenness represents the frequency with which a node's edges were utilized as a shortest path between all pairs of nodes in the network, weighted by edge weight. For each edge in the network bridging two nodes in different higher order structures, it is determined the number of times that the edge is used in a shortest path between a pair of nodes in the network, determined over all unique node pairs in the network as an edge betweenness. In the example implementation, the classically defined secondary structure is used to define the higher order structures. Once a value is determined for each edge, the edge betweenness for each edge associated with a node can be summed to provide a betweenness value for the node. In the example implementation, this is performed for each of the energetic network and the terminal filtered energetic network to provide two betweenness values, the values are standardized across all nodes, and then averaged to provide the final node edge betweenness value, NEB, If a multimeric version of the protein exists, then the maximum node edge betweenness is taken between the monomeric and multimeric conformations.

A Euclidean distance from centroid to ligand can be determined as the distance in angstroms of a residue's centroid to the center of mass of the protein's ligand. The centroid is defined as the center of mass of a residue's sidechain, weighted by atomic weight. The center of mass of the ligand was calculated using all atoms. The resulting Euclidean distance from centroid to ligand, ED, is the distance between these two centers of mass, standardized across all residues.

At 106, the network parameters are combined to provide a network score for each node. In practice, each network parameter can be standardized across all nodes and combined in a weighted linear combination to provide a final network score. In the example implementation using the three network parameters described above, the final network score can be determined as:

$$SD+\mathrm{NEB}-\mathrm{ED} \qquad \text{Eq. 1}$$

At 108, a network score for each of a plurality of epitopes are determined as a weighted linear combination of the amino acid residues comprising the epitope. In the example implementation, the network score for each epitope is the sum of the network scores of the residues comprising the network. At 110, a set of epitopes are selected for use in the HIV vaccine based upon their network score. In one implementation, a set of epitopes with the highest network scores are selected. In another implementation, all epitopes have a network score meeting a threshold value can be utilized. It will be appreciated that the threshold value can vary with the implementation, but in the example implementation, a threshold value of 3.06 can be used, with all epitopes over that threshold being selected.

Once identified and selected, delivery of selected multi-networked optimal HIV CTL epitopes to a subject can be accomplished through the use of a T cell immunogen composition. Optimal mutation resistant multi-networked HIV CTL epitopes selected in accordance with a method described herein can be incorporated into a T cell-based immunogen for use in generating an effective prophylactic and therapeutic T cell vaccine for HIV. In certain implementations, a T cell immunogen composition can include two or more selected optimal HIV CTL epitopes capable of inducing de nova cytotoxic T cell responses in the subject.

In one aspect of the invention, a method of treating a subject for HIV infection is provided. The method includes administering to the subject a T cell immunogen composition including two or more optimal HIV CTL epitopes, wherein the two of more optimal HIV CTL epitopes have been identified and selected using a structure-based network analysis as described above. In some embodiments, the HIV CIT. epitopes are restricted on the surface of an antigen presenting cell by one or more HLA alleles.

In some implementations, a T cell immunogen composition for use in an HIV vaccine can include a recombinant vector including a nucleic acid sequence encoding two or more optimal CTL epitopes. Optimal CTL epitopes are highly networked, each having a network score of at least 3.06, or at least 3.04 to 3.10, when selected using the structure-based network analysis described herein. In sore implementations, the optimal CTL epitopes selected using the structure-based network analysis described herein are CTL epitopes involved as either HLA anchor, TCR contact or peptide processing residues.

The HIV CTL epitopes described herein are restricted by a particular HLA allele in vivo. "Restricted by" refers to the immunologic concept of HLA restriction, whereby certain epitopes are able to bind to specific HLA class I alleles and not others, and subsequently be recognized by T cells as a combined epitope-HLA complex. The phrase "the highly networked HIV CTL epitopes are restricted by one or more HLA alleles" indicates that a potential highly networked T cell vaccine product could include multiple highly networked epitopes that bind to one HLA allele or several HLA alleles in vivo.

In other implementations, the optimal CTL epitope comprises two or more highly networked HIV CTL epitope variants, wherein the two or more highly networked HIV CTL epitope variants each have a network score of at least 3.06, and the highly networked HIV CTL epitope variant has at least about 65% to about 99% homology, or at least 75% to 85% homology, to a consensus Group M HIV CTL epitope within the following sequences

```
                                        (SEQ ID NO: 368)
GAG: MGARASVLSGGKLDAWEKIRLRPGGKKKYRLKHLVWASRELERFAL

NPGLLETAEGCQQIMGQLQPALQTGTEELRSLYNTVATLYCVHQRIEVKD

TKEALDKIEEEQNKSQQKTQQAAADKGDSSQVSQNYPIVQNLQGQMVHQA

ISPRTLNAWVKVVEEKAFSPEVIPMFSALSEGATPQDLNTMLNTVGGHQA

AMQMLKDTINEEAAEWDRLHPVHAGPIPPGQMREPRGSDIAGTTSTLQEQ

IGWMTSNPPIPVGEIYKRWIILGLNKIVRMYSPVSILDIRQGPKEPFRDY

VDRFFKTLRAEQATQDVKNWMTDTLLVQNANPDCKTILKALGPGATLEEM

MTACQGVGGPGHKARVLAEAMSQVTNANIMMQRGNFKGPRRIVKCFNCGK

EGHIARNCRAPRKKGCWKCGKEGHQMKDCTERQANFLGKIWPSNKGRPGN

FLQSRPEPTAPPAESFGFGEEITPSPKQEPKDKELYPLASLKSLYGSDPL

SQ

                                        (SEQ ID NO: 369)
ENV: MRVMGIQRNCQHLWRWGILIFGMLIICSAAENLWVTVYYGVPVWKE

ANTTLFCASDAKAYDTEVHNVWATHACVPTDPNPQEIVLENVTENFNMWK
```

-continued

NNMVEQMHEDIISLWDQSLKPCVKLTPLCVTLNCTDVNATNNTTNNEEIK

NCSFNITTEIRDKKKKVYALFYKLDVVPIDDNNSYRLINCNTSAITQACP

KVSFEPIPIHYCAPAGFAILKCNDKKFNGTGPCKNVSTVQCTHGIKPVVS

TQLLLNGSLAEEEIIIRSENITNNAKTIIVQLNESVEINCTRPNNNTRKS

IRIGPGQAFYATGDIIGDIRQAHCNISRTKWNKTLQQVAKKLREHFNKTI

IFNPSSGGDLEITTHSFNCGGEFFYCNTSELFNSTWNGTNNTITLPCRIK

QIINMWQGVGQAMYAPPIEGKIRCTSNITGLLLTRDGGNNNTETFRPGGG

DMRDNWRSELYKYKVVKIELPLGVAPTKAKRRVVEREKRAVGIGAVFLGF

LGAAGSTMGAASITLTVQARQLLSGIVQQQSNLLRAIEAQQHLLQLTVWG

IKQLQARVLAVERYLKDQQLLGIWGCSGKLICTTNVPWNSSWSNKSQDEI

WDNMTWMEWDKEINNYTDIIYSLIEESQNQQEKNEQELLALDKWASLWNW

FDITNWLWYIKIFIMIVGGLIGLRIVFAVLSIVNRVRQGYSPLSFQTLIP

NPRGPDRPEGIEEEGGEQDRDRSIRLVNGFLALAWDDLRSLCLFSTHLRR

DLILIAARTVELLGRRGWEALKYLWNLLQYWGQELKNSAISLLDTTAIAV

AEGTDRVIEVVQRVCRAILNIPRRIRQGFERALL (SEQ ID NO: 370)

NEF: MGGKWSKSSIVGWPAVRERMRRTAPAAGVGAVSQDLDKHGAITSS

NTAATNADCAWLEAQEEEEVGFPVRPQVPLRPMTYKAAFDLSHFLREKGG

LDGLIYSKKRQEILDLWVYHTQGYFPDWQNYTPGPGIRYPLTFGWCFKLV

PVDPEEVEEANEGENNCLLHPMCQHGMEDEEREVLMWKFDSRLALRHIAR

ELHPEFYKDC (SEQ ID NO: 371)

POL: FFRENLAFQQGEAREFSSEQTRANSPTSRELRVRGGDNPLSEAGAE

RQGTVSFSFPQITLWQRPLVTIKIGGQLREALLDTGADDTVLEEINLPGK

WKPKMIGGIGGFIKVRQYDQILIEICGKKAIGTVLVGPTPVNIIGRNMLT

QIGCTLNFPISPIETVPVKLKPGMDGPKVIKQWPLTEEKIKALTEICTEM

EKEGKISKIGPENPYNTPVFAIKKKDSTKWRKLVDFRELNKRTQDFWEVQ

LGIPHPAGLKKKKSVTVLDVGDAYFSVPLDEDFRKYTAFTIPSINNETPG

IRXQYNYLPQGWKGSPAIFQSSMTKILEPFRTKNPEIVIYQYMDDLYVGS

DLEIGQHRAKIEELREHLLRWGFTTPDKKHQKEPPFLWMGYELHPDKWTV

QPIQLPEKDSWTVNDIQKLVGKLNWASQIYPGIKVKQLCKLLRGAKALTD

IVPLTEEAELELAENREILKEPVHGVYYDPSKDLIAEIQKQGQDQWTYQI

YQEPFKNLKTGKYAKMRSAHTNDVKQLTEAVQKIATESIVIWGKTPKFRL

PIQKETWETWWTEYWQATWIPEWEFVNTPPLVKLWYQLEKEPIVGAETFY

VDGAANRETKLGKAGYVTDRGRQKVVSLTETTNQKTELQAIHLALQDSGS

EVNIVTDSQYALGIIQAQPDKSESELVNQIIEQLIKKEKVYLSWVPAHKG

IGGNEQVDKLVSSGIRKVLFLDGIDKAQEEHEKYHSNWRAMASDFNLPPV

VAKEIVASCDKCQLKGEAMHGQVDCSPGIWQLDCTHLEGKVILVAVHVAS

GYIEAEVIPAETGQETAYFILKLAGRWPVKVIHTDNGSNFTSAAVKAACW

WAGIQQEFGIPYNPQSQGVVESMNKELKKIIGQVRDQAEHLKTAVQMAVF

-continued

IHNFKRKGGIGGYSAGERIIDIIATDIQTKELQKQITKIQNFRVYYRDSR

DPIWKGPAKLLWKGEGAVVIQDNSEIKVVPRRKAKIIRDYGKQMAGDDCV

AGRQDED (SEQ ID NO: 372)

REV: MAGRSGDSDEELLKAVRIIKILYQSNPYPKPEGTRQARRNRRRRWR

ARQRQIHSISERILSTCLGRPAEPVPLQLPPLERLHLDCSEDCGTSGTQQ

GTGVGSNISVESSAVLGSGTKE (SEQ ID NO: 373)

TAT: MEPVDPNLEPWNHPGSQPKTACNKCYCKKCCYHCQVCFLKKGLGIS

YGRKKRRQRRRTPQSSKDHQDPIPKQPLSQTRGDPTGPFFSKKKVESKTE

TDPFD

VIF: MENRWQVMIVWQVDRMRIRTWKSLVKHHMYVSKKAKGWFYRHHY

ESSHPKISSEVHIPLGDARLVVTTYWGLHTGERDWHLGQGVSIEWRQRRY

STQVDPGLADQLIHMHYFDCFSESAIRKAILGHIVSPRCDYQAGHNKVGS

LQYLALTALITPKKTKPPLPSVRKLVEDRWNKPQKTRGHRGSHTMNGH (SEQ ID NO: 374)

VPR: MEQAPEDQGPQREPYNEWTLELLEELKNEAVRHFPRPWLHGLGQHI

YNTYGDTWEGVEAIIRILQQLLFIHFRIGCQHSRIGIIRQRRVRNGASRS

VPU: MLSLEILAIVALVVALIIAIVVWTIVYIEYRKLIRQRKIDRLIDRI

RERAEDSGNESDGDTEELSALVEMGHLDLWDVDSKK

In an exemplary implementation, the optimal HIV CTL epitopes are restricted by HLA-A*0201 and/or HLA-B*57. Optimal HIV CTL epitopes restricted by HLA-B*57 include HLA-B*57 KAFSPEVIPMF (KF11) (SEQ ID NO: 201) and HLA-B*57 TSTLQEQIGW (TW10) (SEQ ID NO: 202) or a HIV CTL epitope variant having at least about 65% to about 99% homology to the amino acid sequence of HLA-B*57 KF11 (SEQ ID NO: 201) or HLA-B*57 TW10 (SEQ ID NO: 202).

In other exemplary implementations, optimal HIV CTL epitopes restricted by HLA-A*02 include HLA-A*02 KLTPLCVTL (KL9) (SEQ ID NO: 11), HLA-A*02 YVDRFYKTL (YL9) (SEQ ID NO: 23). and HLA-A*02 VIYQYMDDL (VL9) (SEQ ID NO: 13) or a HIV CTL epitope variant having at least about 65% to about 99% homology to the amino acid sequence of HLA-A*02 KLTPLCVTL (KL9) (SEQ ID NO: 11), HLA-A*02 YVDRFYKTL (YL9) (SEQ ID NO: 23), or HLA-A*02 VIYQYMDDL (VL9) (SEQ ID NO: 13).

In other exemplary implementations, optimal HIV CTL epitopes are HLA-A*11 AVDLSHFLK (AK9) (SEQ ID NO: 40) and HIV CTL epitopes restricted by HLA-A*02, HLA-A*03, HLA-A*11 or HLA-B*07, including HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*02 KLTPLCVTL (KL9) (SEQ ID NO: 11), HLA-B*07 SPRTLNAWV (SV9) (SEQ ID NO: 88), HLA-A*02 PLTFGWCYKL (PL10) (SEQ ID NO: 10), and B*07 TPGPGVRYPL (TL10) (SEQ ID NO: 98) or a HIV CTL epitope having at least about 5% to about 95% homology to the amino acid sequence of HLA-A*11 AVDLSHFLK (AK9) (SEQ ID NO: 40), or a highly networked HIV CTL epitope having at least about 5% to about 99% homology to the amino acid sequence of HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*02 KLTPLCVTL (KL9) (SEQ ID NO: 11), HLA-B*07 SPRTLNAWV (SV9) (SEQ ID NO: 88), HLA-A*02 PLTFGWCYKL (PL10) (SEQ ID NO: 10), or B*07 TPGPGVRYPL (TL10) (SEQ ID NO: 98).

In other exemplary implementations, optimal HIV CTL epitopes are restricted by HLA-E*101 and HLA-E*103, including SALSEGATP (SEQ ID NO: 261), RMYSPTSIL (SEQ ID NO: 262), RIRTWKSLV (SEQ ID NO: 264), AISPRTLNA (SEQ ID NO: 265), STLQEQIGW (SEQ ID NO: 266), HQAISPRTL (SEQ ID NO: 270), and VGGHQAAMQ (SEQ ID NO: 271).

The optimal HIV CTL epitopes can be linked directly to one another with a linker. In some implementations, in some aspects, the linker is selected from the group consisting of: (1) consecutive glycine residues, at least 2, 3, 4, 5, 6, 7, 8, 9, or 10 residues in length; (2) consecutive alanine residues, at least 2, 3, 4, 5, 6, 7, 8, 9, or 10 residues in length; (3) two arginine residues (RR); (4) alanine, alanine, tyrosine (AAY); (5) a consensus sequence at least 2, 3, 4, 5, 6, 7, 8, 9, or 10 amino acid residues in length that is processed efficiently by a mammalian proteasome; and (6) one or more native sequences flanking the antigen derived from the cognate protein of origin and that is at least 2, 3, 4, 5, 6, 7, 8, 9, 10, 11, 12, 13, 14, 15, 16, 17, 18, 19, 20, or 2-20 amino acid residues in length. In some implementations, the linker comprises the sequence GPGPG (SEQ ID NO: 381).

The HIV CTL epitopes described herein can be linked, operably or directly, to a separate or contiguous sequence that enhances the expression, stability, cell trafficking, processing and presentation, and/or immunogenicity of the epitope. The HIV CTL sequence may include at least one of: an immunoglobulin signal sequence (e.g., IgK), a major histocompatibility class I sequence, lysosomal-associated membrane protein (LAMP)-1, human dendritic cell lysosomal-associated membrane protein, and a major histocompatibility class II sequence.

In other implementations, at least one HIV CTL epitope is linked, operably or directly, to a separate or contiguous sequence that enhances the expression, stability, cell trafficking, processing and presentation, and/or immunogenicity of the plurality. The separate or contiguous sequence can comprise at least one of: a ubiquitin sequence, a ubiquitin sequence modified to increase proteasome targeting (e.g., the ubiquitin sequence contains a Gly to Ala substitution at position 76 or Gly to Val substitution at position 76), an immunoglobulin signal sequence (e.g., IgK), a major histocompatibility class I sequence, lysosomal-associated membrane protein (LAMP)-1, human dendritic cell lysosomal-associated membrane protein, and a major histocompatibility class II sequence; optionally wherein the ubiquitin sequence modified to increase proteasome targeting is A76 or V76.

The optimal HIV CTL epitopes may be delivered to and expressed in a subject's cells by incorporating a nucleic acid encoding a two or more optimal HIV CTL epitopes into an expression vector. As used herein, "expression vector" refers to a vector that comprises a recombinant polynucleotide including expression control sequences operatively linked to a nucleotide sequence to be expressed. An expression vector comprises sufficient cis-acting elements for expression; other elements for expression can be supplied by the host cell or in an in vitro expression system. In some implementations, a recombinant expression vector can include additional immune-enhancer elements to increase epitope expression and/or de novo cytotoxic T cell responses in a subject. Immune-enhancer elements can include, but are not limited to, endoplasmic reticulum signal sequences (ERSS) to promote HLA class I presentation, sequences encoding a furin cleavage site (e.g., RRKR (SEQ ID NO: 378)), and/or a universal T-helper epitope such as a pan ILA-DR epitope (PADRE).

Expression vectors include all those known in the art, such as cosmids, plasmids (e.g., naked or contained in liposomes), retrotransposons (e.g. piggyback, sleeping beauty), and viruses (e.g., lentiviruses, retroviruses, adenoviruses, and adeno-associated viruses) that can incorporate and deliver the recombinant polynucleotide.

Methods for producing viral vectors are known in the art. Typically, a disclosed virus is produced in a suitable host cell line using conventional techniques including culturing a transfected or infected host cell under suitable conditions so as to allow the production of infectious viral particles. Nucleic acids encoding viral genes and/or sequence(s) encoding two or more optimal HIV CTL epitopes can be incorporated into plasmids and introduced into host cells through conventional transfection or transformation techniques. Exemplary suitable host cells for production of disclosed viruses include human cell lines such as HeLa, Hela-S3, HEK293, 911, A549, HER96, or PER-C6 cells. Specific production and purification conditions will vary depending upon the virus and the production system employed.

In some implementations, producer cells may be directly administered to a subject, however, in other implementations, following production, infectious viral particles are recovered from the culture and optionally purified. Typical purification steps may include plaque purification, centrifugation, e.g., cesium chloride gradient centrifugation, clarification, enzymatic treatment, e.g., benzonase or protease treatment, chromatographic steps, e.g., ion exchange chromatography or filtration steps.

In certain implementations, the expression vector is a viral vector. The term "virus" is used herein to refer any of the obligate intracellular parasites having no protein-synthesizing or energy-generating mechanism. Exemplary viral vectors include retroviral vectors (e.g., lentiviral vectors), adenoviral vectors, adeno-associated viral vectors, herpesviruses vectors, epstein-barr virus (EBV) vectors, polyomavirus vectors (e.g., simian vacuolating virus 40 (SV40) vectors), poxvirus vectors, and pseudotype virus vectors.

The virus may be a RNA virus (having a genome that is composed of RNA) or a DNA virus (having a genome composed of DNA). In certain implementations, the viral vector is a DNA virus vector. Exemplary DNA viruses include parvoviruses (e.g., adeno-associated viruses), adenoviruses, asfarviruses, herpesviruses (e.g., herpes simplex virus 1 and 2 (HSV-1 and HSV-2), epstein-barr virus (EBV), cytomegalovirus (CMV)), papillomoviruses (e.g., HPV), polyomaviruses (e.g., simian vacuolating virus 40 (SV40)), and poxviruses (e.g., vaccinia virus, cowpox virus, smallpox virus, fowlpox virus, sheeppox virus, myxoma virus). In certain implementations, the viral vector is a RNA virus vector. Exemplary RNA viruses include bunyaviruses (e.g., hantavirus), coronaviruses, ebolaviruses, flaviviruses (e.g., yellow fever virus, west nile virus, dengue virus), hepatitis viruses (e.g., hepatitis A virus, hepatitis C virus, hepatitis E virus), influenza viruses (e.g., influenza virus type A, influenza virus type B, influenza virus type C), measles virus, mumps virus, noroviruses (e.g., Norwalk virus), poliovirus, respiratory syncytial virus (RSV), retroviruses (e.g., human immunodeficiency virus-1 (HIV-1)) and toroviruses.

In certain implementations, the expression vector comprises a regulatory sequence or promoter operably linked to the nucleotide sequence encoding the two or more selected optimal HIV CTL epitopes. The term "operably linked" refers to a linkage of polynucleotide elements in a functional relationship. A nucleic acid sequence is "operably linked" when it is placed into a functional relationship with another nucleic acid sequence. For instance, a promoter or enhancer is operably linked to a gene if it affects the transcription of the gene. Operably linked nucleotide sequences are typically contiguous. However, as enhancers generally function when separated from the promoter by several kilobases and intronic sequences may be of variable lengths, some polynucleotide elements may be operably linked but not directly flanked and may even function in trans from a different allele or chromosome.

Nucleic acid sequences encoding two or more selected optimal HIV CTL epitopes preferably have strong promoters that are active in a variety of cell types. The promoters for eukaryotic nucleic acid sequences are typically present within the structural sequences encoding the two or more optimal HIV CTL epitopes itself. Although there are elements which regulate transcriptional activity within the 5' upstream region, the length of an active transcriptional unit may be considerably less than 500 base pairs.

Additional exemplary promoters which may be employed include, but are not limited to, the retroviral LTR, the SV40 promoter, the human cytomegalovirus (CMV) promoter, the U6 promoter, or any other promoter (e.g., cellular promoters such as eukaryotic cellular promoters including, but not limited to, the histone, pol III, and j-actin promoters). Other viral promoters which may be employed include, but are not limited to, adenovirus promoters, TK promoters, and B19 parvovirus promoters. The selection of a suitable promoter will be apparent to those skilled in the art from the teachings contained herein.

In certain implementations, an expression vector is an adeno-associated virus (AAV) vector. AAV is a small, non-enveloped icosahedral virus of the genus Dependoparvovirus and family Parvovirus. AAV has a single-stranded linear DNA genome of approximately 4.7 kb. AAV is capable of infecting both dividing and quiescent cells of several tissue types, with different AAV serotypes exhibiting different tissue tropism.

AAV includes numerous serologically distinguishable types including serotypes AAV-1 to AAV-12, as well as more than 100 serotypes from nonhuman primates (See, e.g., Srivastava (2008) J. Cell Biochem., 105(1): 17-24, and Gao et al. (2004) J. Virol., 78(12), 6381-6388). The serotype of the AAV vector used in the present invention can be selected by a skilled person in the art based on the efficiency of delivery, tissue tropism, and immunogenicity. For example, AAV-1, AAV-2, AAV-4, AAV-5, AAV-8, and AAV-9 can be used for delivery to the central nervous system; AAV-1, AAV-8, and AAV-9 can be used for delivery to the heart; AAV-2 can be used for delivery to the kidney; AAV-7, AAV-8, and AAV-9 can be used for delivery to the liver; AAV-4, AAV-5, AAV-6, AAV-9 can be used for delivery to the lung, AAV-8 can be used for delivery to the pancreas, AAV-2, AAV-5, and AAV-8 can be used for delivery to the photoreceptor cells; AAV-1, AAV-2, AAV-4, AAV-5, and AAV-8 can be used for delivery to the retinal pigment epithelium; AAV-1, AAV-6, AAV-7, AAV-8, and AAV-9 can be used for delivery to the skeletal muscle. In certain implementations, the AAV capsid protein comprises a sequence as disclosed in U.S. Pat. No. 7,198,951, such as, but not limited to, AAV-9 (SEQ ID NOs: 1-3 of U.S. Pat. No. 7,198,951), AAV-2 (SEQ ID NO: 4 of U.S. Pat. No. 7,198,951), AAV-1 (SEQ ID NO: 5 of U.S. Pat. No. 7,198,951), AAV-3 (SEQ ID NO: 6 of U.S. Pat. No. 7,198,951), and AAV-8 (SEQ ID NO: 7 of U.S. Pat. No. 7,198,951). AAV serotypes identified from rhesus monkeys, e.g., rh.8, rh.10, rh.39, rh.43, and rh.74, are also contemplated in the instant invention. Besides the natural AAV serotypes, modified AAV capsids have been developed for improving efficiency of delivery, tissue tropism, and immunogenicity. Exemplary natural and modified AAV capsids are disclosed in U.S. Pat. Nos. 7,906,111, 9,493,788, and 7,198,951, and PCT Publication No. WO2017189964A2.

The wild-type AAV genome contains two 145 nucleotide inverted terminal repeats (ITRs), which contain signal sequences directing AAV replication, genome encapsidation and integration. In addition to the ITRs, three AAV promoters, p5, p19, and p40, drive expression of two open reading frames encoding rep and cap genes. Two rep promoters, coupled with differential splicing of the single AAV intron, result in the production of four rep proteins (Rep 78, Rep 68, Rep 52, and Rep 40) from the rep gene. Rep proteins are responsible for genomic replication. The Cap gene is expressed from the p40 promoter, and encodes three capsid proteins (VP1, VP2, and VP3) which are splice variants of the cap gene. These proteins form the capsid of the AAV particle.

Because the cis-acting signals for replication, encapsidation, and integration are contained within the ITRs, some or all of the 4.3 kb internal genome may be replaced with foreign DNA, for example, an expression cassette for an exogenous nucleic acid sequence of interest encoding two or more optimal HIV CTL epitopes. Accordingly, in certain implementations, the AAV vector comprises a genome comprising an expression cassette for an exogenous nucleic acid sequence encoding two or more optimal HIV CTL epitopes flanked by a 5' ITR and a 3' ITR. The ITRs may be derived from the same serotype as the capsid or a derivative thereof. Alternatively, the ITRs may be of a different serotype from the capsid, thereby generating a pseudotyped AAV. In certain implementations, the ITRs are derived from AAV-2. In certain implementations, the ITRs are derived from AAV-5. At least one of the ITRs may be modified to mutate or delete the terminal resolution site, thereby allowing production of a self-complementary AAV vector.

The rep and cap proteins can be provided in trans, for example, on a plasmid, to produce an AAV vector. A host cell line permissive of AAV replication must express the rep and cap genes, the ITR-flanked expression cassette, and helper functions provided by a helper virus, for example adenoviral genes E1a, E1b55K, E2a, E4orf6, and VA (Weitzman et al., Adeno-associated virus biology. Adeno-Associated Virus: Methods and Protocols, pp. 1-23, 2011). Methods for generating and purifying AAV vectors have been described in detail (See e.g., Mueller et al., (2012) Current Protocols in Microbiology, 14D.1.1-14D.1.21, Production and Discovery of Novel Recombinant Adeno-Associated Viral Vectors). Numerous cell types are suitable for producing AAV vectors, including HEK293 cells, COS cells, HeLa cells, BHK cells, Vero cells, as well as insect cells (See e.g. U.S. Pat. Nos. 6,156,303, 5,387,484, 5,741,683, 5,691,176, 5,688,676, and 8,163,543, U.S. Patent Publication No. 20020081721, and PCT Publication Nos. WO00/47757, WO00/24916, and WO96/17947). AAV vectors are typically produced in these cell types by one plasmid containing the ITR-flanked expression cassette, and one or more additional plasmids providing the additional AAV and helper virus genes.

AAV of any serotype may be used in the present invention. Similarly, it is contemplated that any adenoviral type may be used, and a person of skill in the art will be able to identify AAV and adenoviral types suitable for the production of their desired recombinant AAV vector (rAAV). AAV particles may be purified, for example by affinity chromatography, iodixonal gradient, or CsCl gradient.

AAV vectors may have single-stranded genomes that are 4.7 kb in size, or are larger or smaller than 4.7 kb, including oversized genomes that are as large as 5.2 kb, or as small as 3.0 kb. Thus, where the exogenous gene of interest to be expressed from the AAV vector is small, the AAV genome may comprise a stuffer sequence. Further, vector genomes may be substantially self-complementary thereby allowing for rapid expression in the cell. In certain implementations, the genome of a self-complementary AAV vector comprises from 5' to 3': a 5' ITR; a first nucleic acid sequence comprising a promoter and/or enhancer operably linked to a nucleic acid sequence encoding two or more optimal HIV CTL epitopes; a modified ITR that does not have a functional terminal resolution site; a second nucleic acid sequence complementary or substantially complementary to the first nucleic acid sequence; and a 3' ITR. AAV vectors containing genomes of all types are suitable for use in the method of the present invention.

Non-limiting examples of AAV vectors include pAAV-MCS (Agilent Technologies), pAAVK-EF1α-MCS (System Bio Catalog #AAV502A-1), pAAVK-EF1α-MCS1-CMV-MCS2 (System Bio Catalog #AAV503A-1), pAAV-ZsGreen1 (Clontech Catalog #6231), pAAV-MCS2 (Addgene Plasmid #46954), AAV-Stuffer (Addgene Plasmid #106248), pAAVscCBPIGpluc (Addgene Plasmid #35645), AAVS1_Puro_PGK1_3xFLAG_Twin_Strep (Addgene Plasmid #68375), pAAV-RAM-d2TTA::TRE-MCS-WPRE-pA (Addgene Plasmid #63931), pAAV-UbC (Addgene Plasmid #62806), pAAVS1-P-MCS (Addgene Plasmid #80488), pAAV-Gateway (Addgene Plasmid #32671), pAAV-Puro_siKD (Addgene Plasmid #86695), pAAVS1-Nst-MCS (Addgene Plasmid #80487), pAAVS1-Nst-CAG-DEST (Addgene Plasmid #80489), pAAVS1-P-CAG-DEST (Addgene Plasmid #80490), pAAVf-EnhCB-lacZnls (Addgene Plasmid #35642), and pAAVS1-shRNA (Addgene Plasmid #82697). These vectors can be modified to be suitable for therapeutic use. For example, an exogenous nucleic acid sequence of interest encoding two or more selected optimal HIV CTL epitopes can be inserted in a multiple cloning site, and a selection marker (e.g., puro or a gene encoding a fluorescent protein) can be deleted or replaced with another (same or different) exogenous gene of interest. Further examples of AAV vectors are disclosed in U.S. Pat. Nos. 5,871,982, 6,270,996, 7,238,526, 6,943,019, 6,953,690, 9,150,882, and 8,298,818, U.S. Patent Publication No. 2009/0087413, and PCT Publication Nos. WO2017075335A1, WO2017075338A2, and WO2017201258A1.

In certain implementations, the viral vector can be a retroviral vector. Examples of retroviral vectors include moloney murine leukemia virus vectors, spleen necrosis virus vectors, and vectors derived from retroviruses such as rous sarcoma virus, harvey sarcoma virus, avian leukosis virus, human immunodeficiency virus, myeloproliferative sarcoma virus, and mammary tumor virus. Retroviral vectors are useful as agents to mediate retroviral-mediated gene transfer into eukaryotic cells.

In certain implementations, the retroviral vector is a lentiviral vector. In certain implementations, the recombinant retroviral vector is a lentiviral vector including nucleic acids sequences encoding the two or more optimal epitopes. In an exemplary implementation, sequences encoding five optimal HIV CTL epitopes (KAFSPEVIPMF (KF11) (SEQ ID NO: 201), SLYNTVATL (SL9) (SEQ ID NO: 20), HTQGYFPDW (HW9) (SEQ ID NO: 209), ILKEPVHGV (IV9) (SEQ ID NO: 19), and TSTLQEQIGW (TW10) (SEQ ID NO: 202) are included in a lentiviral vector flanked by ERSS and furin cleavage sites (see FIG. 7*a*).

Exemplary lentiviral vectors include vectors derived from human immunodeficiency virus-1 (HIV-1), human immunodeficiency virus-2 (HIV-2), simian immunodeficiency virus (SIV), feline immunodeficiency virus (FIV), bovine immunodeficiency virus (BIV), Jembrana Disease Virus (JDV), equine infectious anemia virus (EIAV), and caprine arthritis encephalitis virus (CAEV).

Retroviral vectors typically are constructed such that the majority of sequences coding for the structural genes of the virus are deleted and replaced by the gene(s) of interest. Most often, the structural genes (i.e., gag, pol, and env), are removed from the retroviral backbone using genetic engineering techniques known in the art. This may include digestion with the appropriate restriction endonuclease or, in some instances, with Bal 31 exonuclease to generate fragments containing appropriate portions of the packaging signal. Accordingly, a minimum retroviral vector comprises from 5' to 3': a 5' long terminal repeat (LTR), a packaging signal, an optional exogenous promoter and/or enhancer, an exogenous gene of interest, and a 3' LTR. If no exogenous promoter is provided, gene expression is driven by the 5' LTR, which is a weak promoter and requires the presence of Tat to activate expression. The structural genes can be provided in separate vectors for manufacture of the lentivirus, rendering the produced virions replication-defective. Specifically, with respect to lentivirus, the packaging system may comprise a single packaging vector encoding the Gag, Pol, Rev, and Tat genes, and a third, separate vector encoding the envelope protein Env (usually VSV-G due to its wide infectivity). To improve the safety of the packaging system, the packaging vector can be split, expressing Rev from one vector, Gag and Pol from another vector. Tat can also be eliminated from the packaging system by using a retroviral vector comprising a chimeric 5' LTR, wherein the U3 region of the 5' LTR is replaced with a heterologous regulatory element.

These new genes can be incorporated into the proviral backbone in several general ways. The most straightforward constructions are ones in which the structural genes of the retrovirus are replaced by a single gene which then is transcribed under the control of the viral regulatory sequences within the LTR. Retroviral vectors have also been constructed which can introduce more than one gene into target cells. Usually, in such vectors one gene is under the regulatory control of the viral LTR, while the second gene is expressed either off a spliced message or is under the regulation of its own, internal promoter.

Accordingly, the new gene(s) are flanked by 5' and 3' LTRs, which serve to promote transcription and polyadenylation of the virion RNAs, respectively. The term "long terminal repeat" or "LTR" refers to domains of base pairs located at the ends of retroviral DNAs which, in their natural sequence context, are direct repeats and contain U3, R and U5 regions. LTRs generally provide functions fundamental to the expression of retroviral genes (e.g., promotion, initiation and polyadenylation of gene transcripts) and to viral replication. The LTR contains numerous regulatory signals including transcriptional control elements, polyadenylation signals, and sequences needed for replication and integration of the viral genome. The U3 region contains the enhancer and promoter elements. The U5 region is the sequence between the primer binding site and the R region and contains the polyadenylation sequence. The R (repeat) region is flanked by the U3 and U5 regions. In certain implementations, the R region comprises a trans-activation response (TAR) genetic element, which interacts with the trans-activator (tat) genetic element to enhance viral replication. This element is not required in implementations wherein the U3 region of the 5' LTR is replaced by a heterologous promoter.

In certain implementations, the retroviral vector comprises a modified 5' LTR and/or 3' LTR. Modifications of the 3' LTR are often made to improve the safety of lentiviral or retroviral systems by rendering viruses replication-defective. In specific implementations, the retroviral vector is a self-inactivating (SIN) vector. As used herein, a SIN retroviral vector refers to a replication-defective retroviral vector in which the 3' LTR U3 region has been modified (e.g., by deletion or substitution) to prevent viral transcription beyond the first round of viral replication. This is because the 3' LTR U3 region is used as a template for the 5' LTR U3 region during viral replication and, thus, the viral transcript cannot be made without the U3 enhancer-promoter. In a further implementation, the 3' LTR is modified such that the U5 region is replaced, for example, with an ideal polyadenylation sequence. It should be noted that modifications to the LTRs such as modifications to the 3' LTR, the 5' LTR, or both 3' and 5' LTRs, are also included in the invention.

In certain implementations, the U3 region of the 5' LTR is replaced with a heterologous promoter to drive transcription of the viral genome during production of viral particles. Examples of heterologous promoters which can be used include, for example, viral simian virus 40 (SV40) (e.g., early or late), cytomegalovirus (CMV) (e.g., immediate early), Moloney murine leukemia virus (MoMLV), Rous sarcoma virus (RSV), and herpes simplex virus (HSV) (thymidine kinase) promoters. Typical promoters are able to drive high levels of transcription in a Tat-independent manner. This replacement reduces the possibility of recombination to generate replication-competent virus, because there is no complete U3 sequence in the virus production system.

Adjacent to the 5' LTR are sequences necessary for reverse transcription of the genome and for efficient packaging of viral RNA into particles (the Psi site). As used herein, the term "packaging signal" or "packaging sequence" refers to sequences located within the retroviral genome which are required for encapsidation of retroviral RNA strands during viral particle formation (see e.g., Clever et al., 1995 J. Virology, 69(4):2101-09). The packaging signal may be a minimal packaging signal (also referred to as the psi [Ψ] sequence) needed for encapsidation of the viral genome.

In certain implementations, the retroviral vector (e.g., lentiviral vector) further comprises a FLAP. As used herein, the term "FLAP" refers to a nucleic acid whose sequence includes the central polypurine tract and central termination sequences (cPPT and CTS) of a retrovirus, e.g., HIV-1 or HIV-2. Suitable FLAP elements are described in U.S. Pat. No. 6,682,907 and in Zennou et al. (2000) Cell 101:173. During reverse transcription, central initiation of the plus-strand DNA at the cPPT and central termination at the CTS lead to the formation of a three-stranded DNA structure: a central DNA flap. While not wishing to be bound by any theory, the DNA flap may act as a cis-active determinant of lentiviral genome nuclear import and/or may increase the titer of the virus. In particular implementations, the retroviral vector backbones comprise one or more FLAP elements upstream or downstream of the heterologous nucleic acid sequence of interest in the vectors. For example, in particular implementations, a transfer plasmid includes a FLAP element. In one implementation, a vector of the invention comprises a FLAP element isolated from HIV-1.

In certain implementations, the retroviral vector (e.g., lentiviral vector) further comprises an export element. In one implementation, retroviral vectors comprise one or more export elements. The term "export element" refers to a cis-acting post-transcriptional regulatory element which regulates the transport of an RNA transcript from the nucleus to the cytoplasm of a cell. Examples of RNA export elements include, but are not limited to, the human immunodeficiency virus (HIV) RRE (see e.g., Cullen et al., (1991) J. Virol. 65: 1053; and Cullen et al., (1991) Cell 58: 423) and the hepatitis B virus post-transcriptional regulatory element (HPRE). Generally, the RNA export element is placed within the 3' UTR of a gene, and can be inserted as one or multiple copies.

In certain implementations, the retroviral vector (e.g., lentiviral vector) further comprises a posttranscriptional regulatory element. A variety of posttranscriptional regulatory elements can increase expression of a heterologous nucleic acid, e.g., woodchuck hepatitis virus posttranscriptional regulatory element (WPRE; see Zufferey et al., (1999) J. Virol., 73:2886); the posttranscriptional regulatory element present in hepatitis B virus (HPRE) (Huang et al., Mol. Cell. Biol., 5:3864); and the like (Liu et al., (1995), Genes Dev., 9:1766). The posttranscriptional regulatory element is generally positioned at the 3' end the heterologous nucleic acid sequence. This configuration results in synthesis of an mRNA transcript whose 5' portion comprises the heterologous nucleic acid coding sequences and whose 3' portion comprises the posttranscriptional regulatory element sequence. In certain implementations, vectors of the invention lack or do not comprise a posttranscriptional regulatory element such as a WPRE or HPRE, because in some instances these elements increase the risk of cellular transformation and/or do not substantially or significantly increase the amount of mRNA transcript or increase mRNA stability. Therefore, in certain implementations, vectors of the invention lack or do not comprise a WPRE or HPRE as an added safety measure.

Elements directing the efficient termination and polyadenylation of the heterologous nucleic acid transcripts increase heterologous gene expression. Transcription termination signals are generally found downstream of the polyadenylation signal. Accordingly, in certain implementations, the retroviral vector (e.g., lentiviral vector) further comprises a polyadenylation signal. The term "polyadenylation signal" or "polyadenylation sequence" as used herein denotes a DNA sequence which directs both the termination and polyadenylation of the nascent RNA transcript by RNA polymerase H. Efficient polyadenylation of the recombinant transcript is desirable as transcripts lacking a polyadenylation signal are unstable and are rapidly degraded. Illustrative examples of polyadenylation signals that can be used in a vector of the invention, includes an ideal polyadenylation sequence (e.g., AATAAA, ATTAAA, AGTAAA), a bovine growth hormone polyadenylation sequence (BGHpA), a rabbit β-globin polyadenylation sequence (rpgpA), or another suitable heterologous or endogenous polyadenylation sequence known in the art.

In certain implementations, a retroviral vector further comprises an insulator element. Insulator elements may contribute to protecting retrovirus-expressed sequences, e.g., therapeutic nucleic acid sequences, from integration site effects, which may be mediated by cis-acting elements present in genomic DNA and lead to deregulated expression of transferred sequences (i.e., position effect; see, e.g., Burgess-Beusse et al., (2002) Proc. Natl. Acad. Sci., USA, 99:16433; and Zhan et al., 2001, Hum. Genet., 109:471). In certain implementations, the retroviral vector comprises an insulator element in one or both LTRs or elsewhere in the region of the vector that integrates into the cellular genome. Suitable insulators for use in the invention include, but are not limited to, the chicken β-globin insulator (see Chung et al., (1993). Cell 74:505; Chung et al., (1997) Proc. Natl. Acad. Sci., USA 94:575; and Bell et al., 1999. Cell 98:387). Examples of insulator elements include, but are not limited to, an insulator from a β-globin locus, such as chicken HS4.

Non-limiting examples of lentiviral vectors include pLVX-EF1alpha-AcGFP1-C1 (Clontech Catalog #631984), pLVX-EF1alpha-IRES-mCherry (Clontech Catalog #631987), pLVX-Puro (Clontech Catalog #632159), pLVX-IRES-Puro (Clontech Catalog #632186), pLenti6/V5-DEST™ (Thermo Fisher), pLenti6.2/V5-DEST™ (Thermo Fisher), pLKO.1 (Plasmid #10878 at Addgene), pLKO.3G (Plasmid #14748 at Addgene), pSico (Plasmid #11578 at Addgene), pLJM1-EGFP (Plasmid #19319 at Addgene), FUGW (Plasmid #14883 at Addgene), pLVTHM (Plasmid #12247 at Addgene), pLVUT-tTR-KRAB (Plasmid #11651 at Addgene), pLL3.7 (Plasmid #11795 at Addgene), pLB (Plasmid #11619 at Addgene), pWPXL (Plasmid #12257 at Addgene), pWPI (Plasmid #12254 at Addgene), EF.CMV.RFP (Plasmid #17619 at Addgene), pLenti CMV Puro DEST (Plasmid #17452 at Addgene), pLenti-puro (Plasmid #39481 at Addgene), pULTRA (Plasmid #24129 at Addgene), pLX301 (Plasmid #25895 at Addgene), pHIV-EGFP (Plasmid #21373 at Addgene), pLV-mCherry (Plasmid #36084 at Addgene), pLionII (Plasmid #1730 at Addgene), pInducer10-mir-RUP-PheS (Plasmid #44011 at Addgene). These vectors can be modified to be suitable for therapeutic use. For example, a selection marker (e.g., puro, EGFP, or mCherry) can be deleted or replaced with a second exogenous nucleic acid sequence of interest. Further examples of lentiviral vectors are disclosed in U.S. Pat. Nos. 7,629,153, 7,198,950, 8,329,462, 6,863,884, 6,682,907, 7,745,179, 7,250,299, 5,994,136, 6,287,814, 6,013,516, 6,797,512, 6,544,771, 5,834,256, 6,958,226, 6,207,455, 6,531,123, and 6,352,694, and PCT Publication No. WO2017/091786.

In some implementations, the viral vector can be an adenoviral vector. Adenoviruses are medium-sized (90-100 nm), non-enveloped (naked), icosahedral viruses composed of a nucleocapsid and a double-stranded linear DNA genome. The term "adenovirus" refers to any virus in the genus Adenoviridiae including, but not limited to, human, bovine, ovine, equine, canine, porcine, murine, and simian adenovirus subgenera. Typically, an adenoviral vector is generated by introducing one or more mutations (e.g., a deletion, insertion, or substitution) into the adenoviral genome of the adenovirus so as to accommodate the insertion of a non-native nucleic acid sequence, for example, for gene transfer, into the adenovirus.

A human adenovirus can be used as the source of the adenoviral genome for the adenoviral vector. For instance, an adenovirus can be of subgroup A (e.g., serotypes 12, 18, and 31), subgroup B (e.g., serotypes 3, 7, 11, 14, 16, 21, 34, 35, and 50), subgroup C (e.g., serotypes 1, 2, 5, and 6), subgroup D (e.g., serotypes 8, 9, 10, 13, 15, 17, 19, 20, 22-30, 32, 33, 36-39, and 42-48), subgroup E (e.g., serotype 4), subgroup F (e.g., serotypes 40 and 41), an unclassified serogroup (e.g., serotypes 49 and 51), or any other adenoviral serogroup or serotype. in an exemplary implementation, the adenovirus vector is a serotype 5 adenovirus vector.

Adenoviral serotypes 1 through 51 are available from the American Type Culture Collection (ATCC, Manassas, Virginia). Non-group C adenoviral vectors, methods of producing non-group C adenoviral vectors, and methods of using non-group C adenoviral vectors are disclosed in, for example, U.S. Pat. Nos. 5,801,030, 5,837,511, and 5,849,561, and PCT Publication Nos. WO1997/012986 and WO1998/053087.

Non-human adenovirus (e.g., ape, simian, avian, canine, ovine, or bovine adenoviruses) can be used to generate the adenoviral vector (i.e., as a source of the adenoviral genome for the adenoviral vector). For example, the adenoviral vector can be based on a simian adenovirus, including both new world and old world monkeys (see, e.g., Virus Taxonomy: VHIth Report of the International Committee on Taxonomy of Viruses (2005)). A phylogeny analysis of adenoviruses that infect primates is disclosed in, e.g., Roy et al. (2009) PLoS Pathog. 5(7):e1000503. A gorilla adenovirus can be used as the source of the adenoviral genome for the adenoviral vector. Gorilla adenoviruses and adenoviral vectors are described in, e.g., PCT Publication Nos. WO2013/052799, WO2013/052811, and WO2013/052832. The adenoviral vector can also comprise a combination of subtypes and thereby be a "chimeric" adenoviral vector.

The adenoviral vector can be replication-competent, conditionally replication-competent, or replication-deficient. A replication-competent adenoviral vector can replicate in typical host cells, i.e., cells typically capable of being infected by an adenovirus. A conditionally-replicating adenoviral vector is an adenoviral vector that has been engineered to replicate under pre-determined conditions. For example, replication-essential gene functions, e.g., gene functions encoded by the adenoviral early regions, can be operably linked to an inducible, repressible, or tissue-specific transcription control sequence, e.g., a promoter. Conditionally-replicating adenoviral vectors are further described in U.S. Pat. No. 5,998,205. A replication-deficient adenoviral vector is an adenoviral vector that requires complementation of one or more gene functions or regions of the adenoviral genome that are required for replication, as a result of, for example, a deficiency in one or more replication-essential gene function or regions, such that the adenoviral vector does not replicate in typical host cells, especially those in a human to be infected by the adenoviral vector.

Preferably, the adenoviral vector is replication-deficient, such that the replication-deficient adenoviral vector requires complementation of at least one replication-essential gene function of one or more regions of the adenoviral genome for propagation (e.g., to form adenoviral vector particles). The adenoviral vector can be deficient in one or more replication-essential gene functions of only the early regions (i.e., E1-E4 regions) of the adenoviral genome, only the late regions (i.e., L1-L5 regions) of the adenoviral genome, both the early and late regions of the adenoviral genome, or all adenoviral genes (i.e., a high capacity adenovector (HC-Ad)). See, e.g., Morsy et al. (1998) Proc. Natl. Acad. Sci. USA 95: 965-976, Chen et al. (1997) Proc. Natl. Acad. Sci. USA 94: 1645-1650, and Kochanek et al. (1999) Hum. Gene Ther. 10(15):2451-9. Examples of replication-deficient adenoviral vectors are disclosed in U.S. Pat. Nos. 5,837,511, 5,851,806, 5,994,106, 6,127,175, 6,482,616, and 7,195,896, and PCT Publication Nos. WO1994/028152, WO1995/002697, WO1995/016772, WO1995/034671, WO1996/022378, WO1997/012986, WO1997/021826, and WO2003/022311.

The replication-deficient adenoviral vector of the invention can be produced in complementing cell lines that provide gene functions not present in the replication-deficient adenoviral vector, but required for viral propagation, at appropriate levels in order to generate high titers of viral vector stock. Such complementing cell lines are known and include, but are not limited to, 293 cells (described in, e.g., Graham et al. (1977) J. Gen. Virol. 36: 59-72), PER.C6 cells (described in, e.g., PCT Publication No. WO1997/000326, and U.S. Pat. Nos. 5,994,128 and 6,033,908), and 293-ORF6 cells (described in, e.g., PCT Publication No. WO1995/034671 and Brough et al. (1997) J. Virol. 71: 9206-9213). Other suitable complementing cell lines to produce the replication-deficient adenoviral vector of the invention include complementing cells that have been generated to propagate adenoviral vectors encoding transgenes whose expression inhibits viral growth in host cells (see, e.g., U.S. Patent Publication No. 2008/0233650). Additional suitable complementing cells are described in, for example, U.S. Pat. Nos. 6,677,156 and 6,682,929, and PCT Publication No. WO2003/020879. Formulations for adenoviral vector-containing compositions are further described in, for example, U.S. Pat. Nos. 6,225,289, and 6,514,943, and PCT Publication No. WO2000/034444.

Additional exemplary adenoviral vectors, and/or methods for making or propagating adenoviral vectors are described in U.S. Pat. Nos. 5,559,099, 5,837,511, 5,846,782, 5,851,806, 5,994,106, 5,994,128, 5,965,541, 5,981,225, 6,040,174, 6,020,191, 6,083,716, 6,113,913, 6,303,362, 7,067,310, and 9,073,980.

Commercially available adenoviral vector systems include the ViraPower™ Adenoviral Expression System available from Thermo Fisher Scientific, the AdEasy™ adenoviral vector system available from Agilent Technologies, and the Adeno-X™ Expression System 3 available from Takara Bio USA, Inc.

In certain implementations, the viral vector can be a Herpes Simplex Virus plasmid vector. Herpes simplex virus type-1 (HSV-1) has been demonstrated as a potential useful gene delivery vector system for gene therapy. HSV-1 vectors have been used for transfer of genes to muscle, and have been used for murine brain tumor treatment. Helper virus dependent mini-viral vectors have been developed for easier operation and their capacity for larger insertion (up to 140 kb). Replication incompetent HSV amplicons have been constructed in the art. These HSV amplicons contain large deletions of the HSV genome to provide space for insertion of exogenous DNA. Typically, they comprise the HSV-1 packaging site, the HSV-1 "ori S" replication site and the IE 4/5 promoter sequence. These virions are dependent on a helper virus for propagation.

Figure 8A:
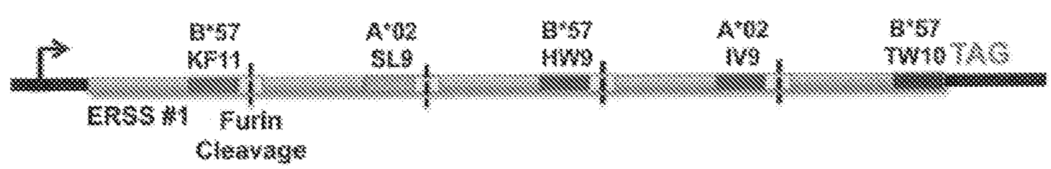
FIGS. 8(A-B) are illustrations and images showing the lentiviral transduction of LCL.221 cells expressing HLA class I alleles with a representative T cell immunogen and the subsequent recognition of HLA-expressing LCL.221 cells by epitope specific CTLs.

In some implementations, the recombinant vector is a self-amplifying alphavirus-based RNA replicon including nucleic acids sequences encoding the two or more selected optimal epitopes. In certain implementations, nucleic acid sequences encoding five selected optimal HIV CTL epitopes are included in a self-amplifying alphavirus-based RNA replicon flanked by ERSS and furin cleavage sites with or without a PADRE epitope sequence AKFVAAWTLKAAA (SEQ ID NO: 380) (See FIG. 8*a*). In an exemplary implementation, the five optimal HIV CTL epitopes selected are KLTPLCVTL (KL9) (SEQ ID NO: 11), SLYNTVATL (SL9) (SEQ ID NO: 20), YVDRFYKTL (YL9) (SEQ ID NO: 23), ILKEPVHGV (IV9) (SEQ ID NO: 19), and VIYQYMDDL (VL9) (SEQ ID NO: 13). In another exemplary implementation, the five optimal HIV CTL epitopes include KAFSPEVIPMF (KF11) (SEQ ID NO: 201), ISPRTLNAW (IW9) (SEQ ID NO: 204), HTQGYFPDW (HW9) (SEQ ID NO: 209), QASQEVKNW (QW9) (SEQ ID NO: 189), and TSTLQEQIGW (TW10) (SEQ ID NO: 202).

In some implementations, the recombinant vector is a Vaccinia vector. Vaccinia are recombinant vaccines typically are used as vectors for expression of foreign genes within a host, in order to generate an in vivo immune response. In certain implementations, a Vaccinia vector for use in an immunogen composition described herein is a highly attenuated strain of a Vaccinia virus, such as Modified Vaccinia Ankara (MVA) virus. MVA can encode more than one foreign antigen and thus can effectively function as a multivalent vaccine. In animal models, MVA vector vaccines have been found to have intrinsic adjuvant capacities and be immunogenic and protective against various infectious agents including immunodeficiency viruses, Compared to replicating Vaccinia viruses, MVA provides similar or higher levels of recombinant gene expression even in non-permissive cells.

In some implementations, the recombinant vector can include an mRNA vector. One advantage of an mRNA vector is that mRNA vector vaccines are capable of inducing a balanced immune response including both cellular and humoral immunity while not subject to MHC haplotype restriction. In addition, mRNA vaccines can be designed to be self-adjuvanting. Alternatively, mRNA vaccines can be supplemented with one or more additional adjuvant molecules such as additional mRNAs encoding auxiliary adjuvant molecules.

Functional synthetic mRNA may be obtained by in vitro transcription of a cDNA template, typically plasmid DNA (pDNA), using a bacteriophage RNA polymerase. Synthetic mRNA for use in an mRNA vector immunogen composition described herein can include a protein-encoding open reading frame (ORF) flanked at the minimum by two elements essential for the function of mature eukaryotic mRNA: a "cap," i.e., a 7-methyl-guanosine residue joined to the 5'-end via a 5'-5' triphosphate, and a poly(A) tail at the 3'-end.

Therefore, in some implementations, a pDNA template can include a bacteriophage promoter, an ORF, optionally a poly(d(A/T)) sequence transcribed into poly(A) and a unique restriction site for linearization of the plasmid to ensure defined termination of transcription. A linearized pDNA template can be transcribed into mRNA in a mixture including recombinant RNA polymerase (T7, T3 or SP6) and nucleoside triphosphates. To obtain capped mRNA by transcription a cap analog like the dinucleotide $m^7G(5')$-ppp-(5')G may be included in the reaction. If the cap analog is in excess of GTP, transcription initiates with the cap analog rather than GTP, yielding capped mRNA. Alternatively, the cap may be added enzymatically post transcription. A poly(A) tail may also be added post transcription if it is not provided by the pDNA template. Following transcription, the pDNA template as well as contaminating bacterial DNA is digested by DNase. The resultant mRNA transcript can be purified by a combination of precipitation and extraction steps.

In order to be translated and elicit an antigen-specific immune response, an mRNA-vaccine has to reach the cytosol of target cells. However, as opposed to DNA vaccines, RNA vaccines only have to cross the plasma membrane, but not the nuclear envelope which may improve the probability of successful in vivo transfection. While locally administered naked mRNA can be taken up by cells, the efficacy of mRNA vaccines may benefit significantly from complexing agents which protect RNA from degradation. Complexing agents can be tailored to the specific route of delivery. Complexation may also enhance uptake by cells and/or improve delivery to the translation machinery in the cytoplasm. Thus, in some implementations, mRNA for use in an immunogen composition can be complexed with either lipids or polymers.

In some implementations, the recombinant vector can include a self-amplifying RNA (saRNA also called "replicon RNA"). A saRNA can be engineered and derived from genomes of positive-strand, non-segmented RNA viruses such as alphaviruses or flaviviruses. In certain implementations, the saRNA is derived from an alphavirus. The alphaviral genome is divided into two ORFs: the first ORF encodes proteins for the RNA dependent RNA polymerase (replicase), and the second ORF encodes structural proteins. In saRNA vaccine constructs, the ORF encoding viral structural proteins is replaced with any antigen of choice, while the viral replicase remains an integral part of the vaccine and drives intracellular amplification of the RNA after immunization. Therefore, in some implementations, the recombinant vector can include a saRNA vaccine construct where the ORF encoding viral structural proteins have been replaced with two or more selected optimal HIV CTL epitopes.

As an alternative to direct injection of mRNA, an immune response may also be induced by vaccination with APCs transfected with mRNA ex vivo where the APCs (e.g., dendritic cells or DCs) are infused into the subject in need thereof. Transfection of DCs with mRNA encoding two or more optimal HIV CTL epitopes can be accomplished with the use of a cationic lipid, i.e., DOTAP, or electroporation.

Typically, approaches for DC-based vaccination are mainly based on antigen loading on in vitro-generated DCs from monocytes or CD34' cells, activating them with different TLR ligands, cytokine combinations, and injecting them back to a subject in need thereof. DCs can be loaded through incubation with peptides (such as peptide-based vaccine compositions described below), proteins, RNA, or autologous/allogeneic tumor cells. Peptides can loaded directly on the MHC molecules on the surface of the DCs. In addition to RNA electroporation, antigens can be loaded into DCs using bacterial or viral vector transduction. Peptides or proteins can be loaded into DCs and provided one or more maturation stimuli such as proinflammatory cytokines, CD40L and/or TLR agonists.

In some implementations, bacterial or viral vectors can be used to target DCs with antigens. Exemplary vectors used to target DCs can include, but are not limited to vectors derived from bacteria such as BCG, *Listeria monocytogenes, Salmonella*, and *Shigella*, and viruses including Canarypox virus, Newcastle disease virus, vaccinia virus, Sindbis virus, yellow fever virus, human papillomavirus, adenovirus, adeno-associated virus, and lentiviruses.

In certain implementations, the number of antigen loaded DCs administered to a subject can range from about $0.3\times10^6$ cells to about $200\times10^6$ cells per administration. A typical DC vaccination schedule can range from once every 2 weeks vs 3-4 doses or even up to 10 doses given every 3-4 weeks). The route of antigen loaded DC administration to a subject in need thereof can include injection, for example, subcutaneous, intradermal, intranodal, intravenous, or even intratumoral injection. In some implementations, administration strategies include administration of DC vaccines via more than one route, i.e., intradermally plus intravenously to induce a systemic response, and/or administration directly into the lymph nodes (intranodally).

In some implementations, a T cell immunogen composition can include a peptide-based vaccine. For example, two or more selected optimal HIV CTL epitope recombinant peptides for vaccination can be produced by expressing the immunogenic peptides in a heterologous expression system, e.g., a yeast expression system. Once purified, recombinant immunogenic peptides are typically administered to a subject with an adjuvant to boost the immune response. Delivery systems used for peptide vaccine use are typically able to protect protease-sensitive epitopes from degradation, and also allow for co-deliver of additional vaccine components such as an adjuvant. Exemplary peptide vaccine delivery systems can include, but are not limited to polymers, lipids (including liposomes), inorganic particles, microparticles, nanoparticles, and carbon nanotubes.

As described in more detail below, the T cell immunogen composition can be used to form a therapeutic composition, such as a vaccine or pharmaceutical composition. While it is possible that a vaccine can comprise the T cell immunogen composition in a pure or substantially pure form, it will be appreciated that the vaccine can additionally or optionally include the T cell immunogen composition and a pharmaceutically acceptable carrier or other therapeutic agent.

For example, the pharmaceutically acceptable carrier can include a physiologically acceptable diluent, such as sterile water or sterile isotonic saline. As used herein, the term "pharmaceutically acceptable carrier" can refer to any and all solvents, dispersion media, coatings, antibacterial and antifungal agents, isotonic and absorption delaying agents, and the like.

Additional components that may be present with the T cell immunogen composition can include adjuvants, preservatives, chemical stabilizers, and/or other proteins. It will be appreciated that the T cell immunogen composition can be conjugated with one or more lipoproteins, administered in liposomal form, or with an adjuvant. For example, to be efficient, vaccines can include a strong adjuvant supplying a signal for the initiation and support of the adaptive immune response in addition to an appropriate antigen, e.g., two or more selected optimal HIV CTL epitopes.

Typically, stabilizers, adjuvants, and preservatives are optimized to determine the best formulation for efficacy in a subject. Exemplary preservatives can include, but are not limited to, chlorobutanol, potassium sorbate, sorbic acid, sulfur dioxide, propyl gallate, the parabens, ethyl vanillin, glycerin, phenol, and parachlorophenol. Suitable stabilizing ingredients can include, for example, casamino acids, sucrose, gelatin, phenol red, N-Z amine, monopotassium diphosphate, lactose, lactalbumin hydrolysate, and dried milk. Other examples of pharmaceutically acceptable carriers are known in the art and described below.

A T cell immunogen composition described herein administered to a subject as an HIV vaccine can be used either prophylactically or therapeutically. In some implementations, a subject administered a T cell immunogen composition described herein is an HIV-infected subject having a viral load ranging from about <50 to about 10,000 copies of viral RNA/ml. In some implementations, the HIV-positive subject has elite or viremic control (viral load <2000 copies/ml). In some implementations, the HIV-positive subject has an intermediate viral load (viral load <2000 copies/ml). In other implementations, the HIV-positive subject is experiencing viral progression (viral load >10,000 copies/ml).

When provided prophylactically, the vaccine can be provided in advance of any evidence of an active HIV infection and thereby attenuate or prevent HIV infection. For example, a human subject at high risk for HIV infection can be prophylactically treated with a vaccine comprising the T cell immunogen composition and a pharmaceutically acceptable carrier. When provided therapeutically, the vaccine can be used to enhance a subject's own immune response to the antigens present as a result of HIV infection. Thus, in some implementations, a therapeutically and/or prophylactically effective amount of T cell immunogen composition described herein is an amount that elicits an immune response to two or more optimal HIV CTL epitopes and thereby prevents or inhibits HIV infection in the subject.

Inhibiting a viral infection can refer to inhibiting the onset of a viral infection, inhibiting an increase in an existing viral infection, or reducing the severity of the viral infection. In this regard, one of ordinary skill in the art will appreciate that while complete inhibition of the onset of a viral infection is desirable, any degree of inhibition of the onset of a viral infection is beneficial. Likewise, one of ordinary skill in the art will appreciate that while elimination of viral infection is desirable, any degree of inhibition of an increase in an existing viral infection or any degree of a reduction of a viral infection is beneficial.

Inhibition of a viral infection can be assayed by methods known in the art, such as by assessing viral load. Viral loads can be measured by methods known in the art, such as by using PCR to detect the presence of viral nucleic acids or antibody-based assays to detect the presence of viral protein in a sample (e.g., blood) from a subject. Alternatively, the number of CD4+ T cells in a viral-infected subject can be measured. A treatment that inhibits an initial or further decrease in CD4+ T cells in a viral-infected subject, or that results in an increase in the number of CD4+ T cells in a viral-infected subject, for example, may be considered an efficacious or therapeutic treatment.

Optimal dosages to be administered may be readily determined by those skilled in the art, and will vary with the particular compound used, the strength of the preparation, the mode of administration, and the advancement of the disease condition. In addition, factors associated with the particular patient being treated, including patient age, weight, diet and time of administration, will result in the need to adjust dosages.

In some implementations, a pharmaceutical composition administered to a subject includes a therapeutically effective amount of the T cell immunogen composition and another therapeutic agent useful in the treatment of HIV infection, such as a component used for highly active antiretroviral therapy (HAART) or immunotoxins.

As noted above, compositions described herein may be combined with one or more additional therapeutic agents useful in the treatment of HIV infection. It will be understood that the scope of combinations of the compounds of this invention with HIV/AIDS antivirals, immunomodulators, anti-infectives or vaccines is not limited to the following list, and includes in principle any combination with any pharmaceutical composition useful for the treatment of AIDS. The HIV/AIDS antivirals and other agents will typically be employed in these combinations in their conventional dosage ranges and regimens as reported in the art.

Examples of antiviral agents include (but not restricted) ANTIVIRALS Manufacturer (Tradename and/or Drug Name Location) Indication (Activity): abacavir GlaxoSmithKline HIV infection, AIDS, ARC GW 1592 (ZIAGEN) (nRTI); 1592U89 abacavir+GlaxoSmithKline HIV infection, AIDS, ARC (nnRTI); lamivudine+(TRIZIVIR) zidovudine acemannan Carrington Labs ARC (Irving, Tex.) ACH 126443 Achillion Pharm. HIV infections, AIDS, ARC (nucleoside reverse transcriptase inhibitor); acyclovir Burroughs Wellcome HIV infection, AIDS, ARC, in combination with AZT AD-439 Tanox Biosystems HIV infection, AIDS, ARC AD-519 Tanox Biosystems HIV infection, AIDS, ARC adefovir dipivoxil Gilead HIV infection, AIDS, ARC GS 840 (RTI); AL-721 Ethigen ARC, PGL, HIV positive, (Los Angeles, Calif.), AIDS alpha interferon GlaxoSmithKline Kaposi's sarcoma, HIV, in combination w/Retrovir AMD3100 AnorMed HIV infection, AIDS, ARC (CXCR4 antagonist); amprenavir GlaxoSmithKline HIV infection, AIDS, 141 W94 (AGENERASE) ARC (PI); GW 141 VX478 (Vertex) ansamycin Adria Laboratories ARC LM 427 (Dublin, Ohio) Erbamont (Stamford, Conn.) antibody which neutralizes; Advanced Biotherapy AIDS, ARC pH labile alpha aberrant Concepts (Rockville, Interferon Md.) AR177 Aronex Pharm HIV infection, AIDS, ARC atazanavir (BMS 232632) Bristol-Myers-Squibb HIV infection, AIDS, ARC (ZRIVADA) (PI); beta-fluoro-ddA Nat'l Cancer Institute AIDS-associated diseases BMS-232623 Bristol-Myers Squibb/HIV infection, AIDS, (CGP-73547) Novartis ARC (PI); BMS-234475 Bristol-Myers Squibb/HIV infection, AIDS, (CGP-61755) Novartis ARC (PI); capravirine Pfizer HIV infection, AIDS, (AG-1549, S-1153) ARC (nnRTI); CI-1012 Warner-Lambert HIV-1 infection cidofovir Gilead Science CMV retinitis, herpes, papillomavirus curdlan sulfate AJI Pharma USA HIV infection cytomegalovirus immune MedImmune CMV retinitis globin cytovene Syntex sight threatening CMV ganciclovir peripheral CMV retinitis delavirdine Pharmacia-Upjohn HIV infection, AIDS, (RESCRIPTOR) ARC (nnRTI); dextran Sulfate Ueno Fine Chem. Ind. AIDS, ARC, HIV Ltd. (Osaka, Japan) positive asymptomatic ddC Hoffman-La Roche HIV infection, AIDS, ARC (zalcitabine, (HMD) (nRTI); dideoxycytidine ddl Bristol-Myers Squibb HIV infection, AIDS, ARC; Dideoxyinosine (VIDEX) combination with AZT/d4T (nRTI) DPC 681 & DPC 684 DuPont HIV infection, AIDS, ARC (PI) DPC 961 & DPC 083 DuPont HIV infection AIDS, ARC (nnRTRI); emvirine Triangle Pharmaceuticals HIV infection, AIDS, ARC (COACTINON) (non-nucleoside reverse transcriptase inhibitor); EL10 Elan Corp, PLC HIV infection (Gainesville, Ga.) efavirenz DuPont HIV infection, AIDS, (DMP 266) (SUSTIVA) ARC (nnRTI); Merck (STOCRIN) famciclovir Smith Kline herpes zoster, herpes simplex emtricitabine Triangle Pharmaceuticals HIV infection, AIDS, ARC FTC (COVIRACIL) (nRTI); Emory University emvirine Triangle Pharmaceuticals HIV infection, AIDS, ARC (COACTINON) (non-nucleoside reverse transcriptase inhibitor); HBY097 Hoechst Marion Roussel HIV infection, AIDS, ARC (nnRTI); hypericin VIMRx Pharm. HIV infection, AIDS, ARC recombinant human; Triton Biosciences AIDS, Kaposi's sarcoma, interferon beta (Almeda, Calif.); ARC interferon alfa-n3 Interferon Sciences ARC, AIDS indinavir; Merck (CRIXIVAN) HIV infection, AIDS, ARC, asymptomatic HIV positive, also in combination with AZT/ddI/ddC (PI); ISIS 2922 ISIS Pharmaceuticals CMV retinitis JE2147/AG1776; Agouron HIV infection, AIDS, ARC (PI); KNI-272 Nat'l Cancer Institute HIV-assoc. diseases lamivudine; 3TC Glaxo Wellcome HIV infection, AIDS, (EPIVIR) ARC; also with AZT (nRTI); lobucavir Bristol-Myers Squibb CMV infection; lopinavir (ABT-378) Abbott HIV infection, AIDS, ARC (PI); lopinavir+ritonavir Abbott (KALETRA) HIV infection, AIDS, ARC (ABT-378/r) (PI); mozenavir AVID (Camden, N.J.) HIV infection, AIDS, ARC (DMP-450) (PI); nelfinavir Agouron HIV infection, AIDS, (VIRACEPT) ARC (PI); nevirapine Boeheringer HIV infection, AIDS, Ingleheim ARC (nnRTI); (VIRAMUNE) novapren Novaferon Labs, Inc. HIV inhibitor (Akron, Ohio); pentafusaide Trimeris HIV infection, AIDS, ARC T-20 (fusion inhibitor); peptide T Peninsula Labs AIDS octapeptide (Belmont, Calif.) sequence PRO 542 Progenics HIV infection, AIDS, ARC (attachment inhibitor); PRO 140 Progenics HIV infection, AIDS, ARC (CCR5 co-receptor inhibitor); trisodium Astra Pharm. Products, CMV retinitis, HIV infection, phosphonoformate Inc other CMV infections; PNU-140690 Pharmacia Upjohn HIV infection, AIDS, ARC (PI); probucol Vyrex HIV infection, AIDS; RBC-CD4Sheffield Med. Tech HIV infection, AIDS, (Houston Tex.) ARC; ritonavir Abbott HIV infection, AIDS, (ABT-538) (RITONAVIR) ARC (PI); saquinavir Hoffmann-LaRoche HIV infection, AIDS, (FORTOVASE) ARC (PI); stavudine d4T Bristol-Myers Squibb HIV infection, AIDS, ARC didehydrodeoxy-(ZERIT.) (nRTI); thymidine T-1249 Trimeris HIV infection, AIDS, ARC (fusion inhibitor); TAK-779 Takeda HIV infection, AIDS, ARC (injectable CCR5 receptor antagonist); tenofovir Gilead (VIREAD) HIV infection, AIDS, ARC (nRTI); tipranavir (PNU-140690) Boehringer Ingelheim HIV infection, AIDS, ARC (PI); TMC-120 & TMC-125 Tibotec HIV infections, AIDS, ARC (nnRTI); TMC-126 Tibotec HIV infection, AIDS, ARC (PI); valaciclovir GlaxoSmithKline genital HSV & CMV infections virazole Viratek/ICN (Costa asymptomatic HIV positive, ribavirin Mesa, Calif.) LAS, ARC; zidovudine; AZT GlaxoSmithKline HIV infection, AIDS, ARC, (RETROVIR) Kaposi's sarcoma in combination with other therapies (nRTI); [PI=protease inhibitor nnRTI=non-nucleoside reverse transcriptase inhibitor NRTI=nucleoside reverse transcriptase inhibitor].

The additional therapeutic agent may be used individually, sequentially, or in combination with one or more other such therapeutic agents described herein (e.g., a reverse transcriptase inhibitor used for HAART, a protease inhibitor used for HAART, an HIV-1 protein derived from the subject and/or an activator of latent HIV expression). Administration to a subject may be by the same or different route of administration or together in the same pharmaceutical formulation.

According to this implementation, a T cell immunogen composition described herein may be coadministered with any HAART regimen or component thereof. The current standard of care using HAART is usually a combination of at least three nucleoside reverse transcriptase inhibitors and frequently includes a protease inhibitor, or alternatively a non-nucleoside reverse transcriptase inhibitor. Subjects who have low $CD4^+$ cell counts or high plasma RNA levels may require more aggressive HAART. For subjects with relatively normal $CD4^+$ cell counts and low to non-measurable levels of plasma HIV RNA over prolonged periods (i.e., slow or non-progressors) may require less aggressive HAART. For antiretroviral-naive subject who are treated with initial antiretroviral regimen, different combinations (or cocktails) of antiretroviral drugs can be used.

Thus, in some implementations, a pharmaceutical composition comprising a T cell immunogen composition may be coadministered to the subject with a "cocktail" of nucleoside reverse transcriptase inhibitors, non-nucleoside HIV reverse transcriptase inhibitors, and protease inhibitors. For example, a pharmaceutical composition including the T cell immunogen composition and an HDAC inhibitor may be coadministered with a cocktail of two nucleoside reverse transcriptase inhibitors (e.g., ZIDOVUDINE (AZT) and LAMIVUDINE (3TC)), and one protease inhibitor (e.g., INDINAVIR (MK-639)).

Coadministration in the context of this invention is defined to mean the administration of more than one therapeutic agent in the course of a coordinated treatment to achieve an improved clinical outcome. Such coadministration may also be coextensive, that is, occurring during overlapping periods of time.

Pharmaceutical compositions described herein can be formulated by standard techniques using one or more physiologically acceptable carriers or excipients. Suitable pharmaceutical carriers are described herein and in "Remington's Pharmaceutical Sciences" by E. W. Martin. The small molecule compounds of the present invention and their physiologically acceptable salts and solvates can be formulated for administration by any suitable route, including via inhalation, topically, nasally, orally, parenterally, or rectally. Thus, the administration of the pharmaceutical composition may be made by intradermal, subdermal, intravenous, intramuscular, intranasal, intracerebral, intratracheal, intraarterial, intraperitoneal, intravesical, intrapleural, intracoronary or intratumoral injection, with a syringe or other devices. Transdermal administration is also contemplated, as are inhalation or aerosol administration. Tablets and capsules can be administered orally, rectally or vaginally.

For oral administration, a pharmaceutical composition or a medicament can take the form of, for example, a tablets or a capsule prepared by conventional means with a pharmaceutically acceptable excipient. Preferred are tablets and gelatin capsules comprising the active ingredient, i.e., a small molecule compound of the present invention, together with (a) diluents or fillers, e.g., lactose, dextrose, sucrose, mannitol, sorbitol, cellulose (e.g., ethyl cellulose, microcrystalline cellulose), glycine, pectin, polyacrylates and/or calcium hydrogen phosphate, calcium sulfate; (b) lubricants, e.g., silica, talcum, stearic acid, its magnesium or calcium salt, metallic stearates, colloidal silicon dioxide, hydrogenated vegetable oil, corn starch, sodium benzoate, sodium acetate and/or polyethyleneglycol; for tablets also (c) binders, e.g., magnesium aluminum silicate, starch paste, gelatin, tragacanth, methylcellulose, sodium carboxymethylcellulose, polyvinylpyrrolidone and/or hydroxypropyl methylcellulose; if desired (d) disintegrants, e.g., starches (e.g., potato starch or sodium starch), glycolate, agar, alginic acid or its sodium salt, or effervescent mixtures; (e) wetting agents, e.g., sodium lauryl sulphate, and/or (f) absorbents, colorants, flavors and sweeteners.

Tablets may be either film coated or enteric coated according to methods known in the art. Liquid preparations for oral administration can take the form of, for example, solutions, syrups, or suspensions, or they can be presented as a dry product for constitution with water or other suitable vehicle before use. Such liquid preparations can be prepared by conventional means with pharmaceutically acceptable additives, for example, suspending agents, for example, sorbitol syrup, cellulose derivatives, or hydrogenated edible fats; emulsifying agents, for example, lecithin or acacia; non-aqueous vehicles, for example, almond oil, oily esters, ethyl alcohol, or fractionated vegetable oils; and preservatives, for example, methyl or propyl-p-hydroxybenzoates or sorbic acid. The preparations can also contain buffer salts, flavoring, coloring, and/or sweetening agents as appropriate. If desired, preparations for oral administration can be suitably formulated to give controlled release of the active compound.

Pharmaceutical compositions described herein can be formulated for parenteral administration by injection, for example by bolus injection or continuous infusion. Formulations for injection can be presented in unit dosage form, for example, in ampoules or in multi-dose containers, with an added preservative. Injectable compositions are preferably aqueous isotonic solutions or suspensions, and suppositories are preferably prepared from fatty emulsions or suspensions. The compositions may be sterilized and/or contain adjuvants, such as preserving, stabilizing, wetting or emulsifying agents, solution promoters, salts for regulating the osmotic pressure and/or buffers. Alternatively, the active ingredient can be in powder form for constitution with a suitable vehicle, for example, sterile pyrogen-free water, before use. In addition, they may also contain other therapeutically valuable substances. The compositions are prepared according to conventional mixing, granulating or coating methods, respectively, and contain about 0.1 to 75%, preferably about 1 to 50%, of the active ingredient.

For administration by inhalation, the compounds may be conveniently delivered in the form of an aerosol spray presentation from pressurized packs or a nebulizer, with the use of a suitable propellant, for example, dichlorodifluoromethane, trichlorofluoromethane, dichlorotetrafluoroethane, carbon dioxide, or other suitable gas. In the case of a pressurized aerosol, the dosage unit can be determined by providing a valve to deliver a metered amount. Capsules and cartridges of, for example, gelatin for use in an inhaler or insufflator can be formulated containing a powder mix of the compound and a suitable powder base, for example, lactose or starch.

Suitable formulations for transdermal application include an effective amount of a compound of the present invention with carrier. Preferred carriers include absorbable pharmacologically acceptable solvents to assist passage through the skin of the host. For example, transdermal devices are in the form of a bandage comprising a backing member, a reservoir containing the compound optionally with carriers, optionally a rate controlling barrier to deliver the compound to the skin of the host at a controlled and predetermined rate over a prolonged period of time, and means to secure the device to the skin. Matrix transdermal formulations may also be used.

Suitable formulations for topical application, e.g., to the skin and eyes, are preferably aqueous solutions, ointments, creams or gels well-known in the art. Such may contain solubilizers, stabilizers, tonicity enhancing agents, buffers and preservatives.

A pharmaceutical composition for use in a method described herein can also be formulated in rectal compositions, for example, suppositories or retention enemas, for example, containing conventional suppository bases, for example, cocoa butter or other glycerides.

Furthermore, the pharmaceutical compositions can be formulated as a depot preparation. Such long-acting formulations can be administered by implantation (for example, subcutaneously or intramuscularly) or by intramuscular injection. Thus, for example, the compounds can be formulated with suitable polymeric or hydrophobic materials (for example as an emulsion in an acceptable oil) or ion exchange resins, or as sparingly soluble derivatives, for example, as a sparingly soluble salt.

The compositions can, if desired, be presented in a pack or dispenser device that can contain one or more unit dosage forms containing the active ingredient. The pack can, for example, comprise metal or plastic foil, for example, a blister pack. The pack or dispenser device can be accompanied by instructions for administration.

In one implementation, a pharmaceutical composition is administered to a subject, preferably a human, at a therapeutically effective dose to prevent, treat, or control a condition or disease as described herein, such as HIV.

The dosage of pharmaceutical compositions administered is dependent on the species of warm-blooded animal (mammal), the body weight, age, individual condition, surface area of the area to be treated and on the form of administration. The size of the dose also will be determined by the existence, nature, and extent of any adverse effects that accompany the administration of a particular small molecule compound in a particular subject. Typically, a dosage of the active compounds of the present invention is a dosage that is sufficient to achieve the desired effect. Optimal dosing schedules can be calculated from measurements of compound accumulation in the body of a subject. In general, dosage may be given once or more daily, weekly, or monthly. Persons of ordinary skill in the art can easily determine optimum dosages, dosing methodologies and repetition rates.

In another implementation, a pharmaceutical composition including a T cell immunogen composition described herein is administered in a daily dose in the range from about 0.1 mg per kg of subject weight (0.1 mg/kg) to about 1 g/kg for multiple days. In another implementation, the daily dose is a dose in the range of about 5 mg/kg to about 500 mg/kg. In yet another implementation, the daily dose is about 10 mg/kg to about 250 mg/kg. In yet another implementation, the daily dose is about 25 mg/kg to about 150 mg/kg. A preferred dose is about 10 mg/kg. The daily dose can be administered once per day or divided into subdoses and administered in multiple doses, e.g., twice, three times, or four times per day.

To achieve the desired therapeutic effect, compositions described herein may be administered for multiple days at the therapeutically effective daily dose. Thus, therapeutically effective administration of a pharmaceutical composition for use as an HIV vaccine described herein in a subject requires periodic (e.g., daily) administration that continues for a period ranging from three days to two weeks or longer. Typically, a pharmaceutical composition will be administered for at least three consecutive days, often for at least five consecutive days, more often for at least ten, and sometimes for 20, 30, 40 or more consecutive days. While consecutive daily doses are a preferred route to achieve a therapeutically effective dose, a therapeutically beneficial effect can be achieved even if the pharmaceutical compositions are not administered daily, so long as the administration is repeated frequently enough to maintain a therapeutically effective concentration of the T cell immunogen composition in the subject. For example, one can administer a pharmaceutical composition every other day, every third day, or, if higher dose ranges are employed and tolerated by the subject, once a week. A preferred dosing schedule, for example, can include administering daily for a week, one week off and repeating this cycle dosing schedule for 3-4 cycles.

Optimum dosages, toxicity, and therapeutic efficacy of a pharmaceutical composition described herein may vary depending on the relative potency of individual compounds and can be determined by standard pharmaceutical procedures in cell cultures or experimental animals, for example, by determining the $LD_{50}$ (the dose lethal to 50% of the population) and the $ED_{50}$ (the dose therapeutically effective in 50% of the population). The dose ratio between toxic and therapeutic effects is the therapeutic index and can be expressed as the ratio, $LD_{50}/ED_{50}$. T cell immunogen compositions that exhibit large therapeutic indices are preferred.

While compositions that exhibit toxic side effects can be used, care should be taken to design a delivery system that targets such compounds to the HIV infected cells to minimize potential damage to normal cells and, thereby, reduce side effects.

The data obtained from, for example, cell culture assays and animal studies can be used to formulate a dosage range for use in humans. The dosage of the T cell immunogens in a pharmaceutical composition described herein preferably within a range of circulating concentrations that include the $ED_{50}$ with little or no toxicity. The dosage can vary within this range depending upon the dosage form employed and the route of administration. For any compositions used in the methods of the invention, the therapeutically effective dose can be estimated initially from cell culture assays. A dose can be formulated in animal models to achieve a circulating plasma concentration range that includes the $IC_{50}$ (the concentration of the test compound that achieves a half-maximal inhibition of symptoms) as determined in cell culture. Such information can be used to more accurately determine useful doses in humans. Levels in plasma can be measured, for example, by high performance liquid chromatography (HPLC).

Following successful treatment, it may be desirable to have the subject undergo maintenance therapy to prevent the recurrence of the condition or disease treated.

As can be appreciated from the disclosure above, the present invention has a wide variety of applications. The invention is further illustrated by the following examples, which are only illustrative and are not intended to limit the definition and scope of the invention in any way.

Example 1

Materials and Methods of the Structure-Based Network Analysis

This approach consists of protein network construction and protein network analysis. For network construction, we used two approaches to infer interactions between individual atoms of amino acid residues: an energetic network and a centroid network. In the energetic network, non-covalent interactions, which include van der Waals interactions, hydrogen bonds, waterbridged bonds, salt bridges, disulfide bonds, pi-pi interactions, pi-cation interactions and metal coordinated bonds, were calculated between pairs of residues based on energy potentials and appropriate angle and distance thresholds using the atomic coordinates found in the Protein Data Bank file (PDB). Protein networks were then constructed by defining each individual amino acid residue within the protein structure as a node and defining weighted edges as the sum of all intermolecular bond energies between residues. Energies for each bond type were defined using previously established values in kJ/mol. For the centroid network, we calculated the side chain center of mass for each amino acid residue and defined bonds based on a distance threshold cutoff between centroids of 8.5 angstroms. The purpose of including the centroid network was to account for the contribution of hydrophobic packing to protein folding. Centroid protein networks were then constructed by defining each amino acid residue as a node and defining edges as binary interactions that meet the defined 8.5 angstrom threshold for centroid-to-centroid distance. Edges to immediately neighboring amino acids (n−1, n+1) were not included in either approach due to presence of covalent peptide bonds between these residues. All calculations were carried out in Python.

For protein network analysis, a number filters was applied to calculate network parameters. First, in the energetic network, all edges were considered as well as those strictly between terminal atoms, as previously described, in order to focus on residue-specific interactions. Thus. for an edge to be included, one of the two participating atoms needed to be a terminal atom, Edges were then summed over an amino acid residue to transform the edge list from a list of atom-atom interactions to a list of residue-residue interactions, Second, a filter to calculate network parameters on edges that bridge residues from different higher order protein structures was applied. Higher order protein structures were identified in two ways. First, classical secondary structure was utilized using the publicly available software tool Stride, Second, network-defined higher order structures were inferred based on a random walk approach whereby tightly connected communities are identified and distinguished (Walktrap). For higher order structure filters, no edges were considered between residues within the same structural motif. Together, these filters were used to calculate three network parameters prior to summation of the final network score. The network parameters are as follows: 1. Second Order Intermodular Degree: the number of second order interactions (two degrees of separation) between residues from different higher order structures, as an average of classical secondary structure and Walktrap definitions.

$$\text{Second order intermodular degree}(SD) = \frac{\left(\sum_{i=1}^{n} k_i + \sum_{i=1}^{n} ks_i\right)_{energetic} + \left(\sum_{i=1}^{n} k_i + \sum_{i=1}^{n} w_i\right)_{centroid}}{4}$$

where a node has n neighbors in different modules and ki and ksi are the degrees (number of edges) of those neighbors i for the regular energetic network and the terminal atom filtered energetic network, respectively, with higher order structures defined by secondary structure. These values are summed for neighbors 1 through n. If multimeric protein structure data were available, this metric was considered only for the multimer prior to normalization. These calculations were then calculated for the centroid network, where modules defined by both secondary structure (ki) and Walktrap (wi) were used. Each individual value (ki, ksi, wi) was standard normalized before summing. The final SD value was then obtained for each amino acid in the network as an average of the 4 described calculations. The purpose of taking an average of 4 different estimates of second order intermodular degree was to capture the unique contributions of the energetic network, the terminal atom filter, the coarse-grained centroid network and the Walktrap higher order structure definition.

2. Node Edge Betweenness: the summed frequency that a node's edges were utilized as a shortest path between all pairs of nodes in the network, weighted by edge weight $$\text{Edge intermodular betweenness }(EB) = \sum_{j=1,k=1,j\neq k}^{j=n,k=n,j\neq k} e_{jk}$$

where ejk=1 if edge ejk is used in the shortest path between nodes j and k, otherwise ejk=0. Only edges between nodes of different higher order structure were allowed, and here the structures were defined by secondary structure. These counts were then summed for all pairs of nodes 1 through n. This edge parameter is then converted into a node parameter:

$$\text{Node edge intermodular betweenness } (NEB) = \frac{\sum_{i=1}^{n} EB_i + \sum_{i=1}^{n} EBS_i}{2}$$

where EB was the edge betweenness for each edge i for a node with n neighbors and EBS was the same metric but for the network filtered on sidechain interactions. These metrics are standard normalized and then averaged. If a multimeric version of the protein exists, then the maximum node edge betweenness is taken between the monomeric and multimeric conformations.

3. Euclidean Distance from Centroid to Ligand: the distance in angstroms of a residue's centroid to the center of mass of the protein's ligand. Centroid was defined as the center of mass of a residue's sidechain, weighted by atomic weight, as described previously:

$$\text{Centroid } (C) = \frac{\sum_{x=1}^{s} a_x(x, y, z)}{s}$$

$$\text{Ligand Distance } (LD) = |C - ligand_{center\ of\ mass}|$$

where ax is the atomic weight for atom x in a protein's sidechain for atoms 1 through s. The (x,y,z) 3-dimensional coordinates were defined in the PDB file. The center of mass of the ligand was calculated using all atoms. The final centroid value was standard normalized and averaged. Final network score was a sum of the aforementioned terms, which had been individually normalized:

$$SD + \text{NEB} - \text{LD} = \text{final network score}$$

These values were calculated in R with the assistance of the iGraph package to load networks.

PDB Structures: For the validation dataset, the following PDB files were used: HSP90 (2CG9; Chains A and B and ATP ligand), Hepatitis C NS5A (3FQM: chains A and B), CCdB toxin (1X75; chains C and D and DNA gyrase ligand), Hemagglutinin (IRVX; chains A, B, C, D, E, F); Gene V Protein (1GVP; chains A, B), Beta-Glucosidase (1GNX; chains A and B), ubiquitin (200B; Chains A and B and Cbl-b ubiquitin ligase ligand), Kanamycin Kinase (1ND4; chains A and B and Kanamycin ligand), DNA binding protein Gal4 (3COQ; chains A and B and DNA ligand); DNA Methylase (IDCT; chain A and DNA ligand), Beta-lactamase (IBTL; chain A), streptococcal protein G (iFCC; chains A and B and IGG1 Fc protein ligand), T4 lysozyme (2LZM: chain A). For the analysis of the HIV proteome, the following PDB files were utilized: Gag p24 Monomer (5HGL, Chain A), Gag p24 Pentamer (3P05; Chains A, B, C, D, E), Gag p24 Hexamer (5HGL, Chains A, C, F, G, 1, K; 5HGN, Chains A, C, E, G, 1, K), Gag p24 CTD-CTD Dimer (3J34, Chains F and 1, residues 144-231), Gag p24 CTD-CTD Trimer (134, Chains B, F and M, residues 144-231), Gag p24 NTD-CTD Inter-subunit Dimer (3J34, Chains A and F, residues 62-231), Gag p17 Monomer (2G0L, Chain A), Gag p17 Trimer (1H1W, Chains A-C), RT p66 (3KJV, Chain A), RT p51 (3KJV, Chain B), RT p66/p51 Heterodimer (3KJV, Chains A and B), Integrase Monomer (1K6Y, Chain A and IWNK, Chain A), Integrase Tetrarmer (1K6Y, Chains A-D), Protease Monomer (1HXW, Chain A), Protease Dimer (1HXW, Chains A and B), GP120 Trimer (3J70, Chains D, P and U; 5T3X, Chains A, O and C), GP41 Trimer (3VTP, Chains A, D, F, 1, K and N), Nef Monomer (4EN2, Chain A; 2XI1, Chain A), Nef Dimer (2XI1, Chains A and B), Rev Dimer (2X7L; Chains M and N), Tat Monomer (4OR5, Chain C), Tat Dimer (4OR5, Chains C and H), Vif Monomer (4N9F, Chain b) and Vpr Monomer (1M8L, Chain A).

Calculation of Network Scores for Multimeric Proteins: For multimeric proteins, degree-based network values (second order degree, ligand binding) in the protein's highest oligomeric state were utilized prior to calculation of a normalized Z-score. For node edge betweenness metrics, the maximum normalized Z-score from monomer, multimeric or inter-multimeric conformations was incorporated into the final network score calculation. Mutated residues engineered to stabilize protein conformations (e.g. 5HGL, Cys14 and Cys45, engineered disulfide bond) were excluded from the analysis. For analyses with multiple structures utilized to capture different conformational states for the same oligomeric structure (e.g. 5HGL and 5 HGN, open and closed conformations), network Z-scores were averaged. All molecular assemblies were generated using the online server PDBePISA.

Correlation of Network Scores with Functional Datasets: Composite network scores were correlated against functional datasets obtained from high and low-throughput mutagenesis studies (FIG. 21). For TEM-1 Beta-lactamase, network scores were correlated against functional mutant values obtained from the Ampicillin 2500 μg/mL dataset, which was the maximum concentration utilized in the study. For DNA methylase HaeIII, correlations were made using the dataset after the full 17 rounds of mutagenesis. For NS5A, we utilized the dataset for the virus under selection with Daclatasvir. For Kanamycin Kinase, the 1:8 Kanamycin dilution dataset was used. For the remaining proteins, the single supplementary datasets provided were utilized for correlative studies. Each set of functional scores for a given protein was standard normalized by subtracting the mean and dividing by the standard deviation.

Calculation of Shannon Entropy: Multiple sequence alignments were downloaded from PFAM. Using the protein sequence derived from the protein's PDB structure as a reference in each protein sequence alignment, we tabulated amino acid frequencies at each amino acid position in the corresponding aligned orthologous proteins. We then calculated Shannon entropy H(p) based on the following formula: $H(p) = -\Sigma_a p_a \log_2(p_a)$ where $p_a$ is the proportion of amino acid a at a given position and $q_a$ is the background frequency of amino acid a. Residues with uncertain alignment per PFAM were excluded from downstream analyses. The background frequencies used were the frequencies of each amino acid across the entire alignment.

Calculation of Relative Solvent Accessibility: Relative Solvent Accessibility (RSA) values were calculated by using the following formula: RSA=Accessible Solvent Area (ASA)/Maximum ASA, with ASA values calculated using the publicly available software tool Stride and utilizing previously reported MaxASA values.

Receiver Operator Curves: Receiver Operator Curves (ROC) were plotted and calculated in R using the pROC library to determine the predictive ability of network scores, Shannon entropy and relative solvent accessibility values to determine the top 10% of residues ranked by mutational intolerance.

Calculation of HIV Sequence Entropy: Values for HIV sequence entropy were obtained from the LANL HIV Sequence Database Genome Browser. The number of sequences utilized for each genomic region of HIV were as follows (delineated in parentheses): Gag (5,430), Pol (2,843), Nef (3,699), Env (6,635), Rev (2,234), Tat (2,156), Vif (3,128) and Vpr (3,021). Viral sequence entropy values ranged from 0.01 (conserved) to ~2.7 (hypervariable).

Calculation of Epitope Network Scores: Network scores from individual amino acid residues within and neighboring a CD8+ T cell epitope were combined and averaged based on their involvement as either an HLA anchor, TCR contact or peptide processing residues. HLA anchor residues were defined based on previous delineations for each HLA allele. Putative TCR contact residues were considered to be all remaining non-HLA anchor residues, excluding position 1, based on previously reported frequencies of TCR-peptide contacts. Flanking residues were defined as the five residues N-terminal and C-terminal to the epitope (ten in total). These three quantities were then summed to generate an overall composite network score for each CD8+ T cell epitope. The normalized epitope network score (FIG. 21) was calculated by subtracting the lowest epitope network score from all epitope scores, such that all values were greater than or equal to zero. The normalized network score was utilized when comparing patient responses such that no CTL response would be assigned a negative value.

Generation of NL4-3 Mutants: HIV-1 strain NL4-3 (Cat #: 114, NIH AIDS Research and Reference Reagent Program) was modified to express one of several individual mutations using the Q5 Site Directed Mutagenesis Kit (New England Biolabs) according to the manufacturer's instructions. Back-to-back 5'oligonucleotide primers were utilized to engineer individual mutants (FIG. 23) within the NL4-3 plasmid. Confirmation of successful mutagenesis was accomplished by complete plasmid sequencing (MGH Sequencing Core). One Shot Stbl3 cells (Life Technologies) were used to propagate full-length viral plasmids, and DNA plasmid stocks were prepared using a QiaPrep spin miniprep kit (Qiagen).

Generation of Viral Stocks: Viral stocks were generated by transfection of HEK293T cells with 4 μg of plasmid mutant or wild-type NL4-3 (in media (Dulbecco's Modified Eagle Media with 10% fetal bovine serum; D10) using Lipofectamine 3000 (Life Technologies). Supernatants were harvested 48 h after transfection and frozen aliquots stored at −80° C. Viral concentrations were quantified by p24 enzyme-linked immunosorbent assay (ELISA) using the Alliance HIV-1 p24 ELISA kit (Perkin-Elmer) and reverse transcriptase activity using the EnzChek Reverse Transcriptase assay kit (Thermo-Fisher).

Viral Infectivity Assay: Tzm-bl reporter cells (Cat #: 8129, NIH AIDS Research and Reference Reagent Program) were seeded at a. density of 1×105 cells/mL into a 12-well plate one day prior to infection with wildtype or variant virus at a multiplicity of infection (MOI) of 0.01 in D10. Two hours following infection, an additional 1 mL of D10 was added and cells were cultured at 37° C. and 5% CO2. After 48 hours, luciferase activity was measured using the Bright-Glo™ Luciferase Assay System (Promega) according the manufacturer's instructions. Luminescence was measured using a BioTek Synergy Luminometer.

Viral Spreading Assay: 1×106 CEM cells transduced with an LTR-GFP (CEM-GXR) were pelleted and resuspended with wild-type or variant virus at a multiplicity of infection (MOI) of 0.01 in a total volume of 3 mL of media (RPMI 1640 supplemented with glutamine+10% fetal bovine serum; R10) and cultured at 37° C. and 5% CO2. 500 μL aliquots of culture were harvested at day 2, 5 and 7 and fixed in phosphate-buffered saline containing 2% paraformaldehyde, and GFP expression was determined using flow cytometry.

Human Subjects: HIV+ subjects were recruited from outpatient clinics at local Boston area clinics and from outside Boston. The Institutional Review Board of Massachusetts General Hospital approved the studies of cells derived from human blood samples. All human subjects gave written, informed consent. Peripheral blood mononuclear cells (PBMCs) from HIV+ individuals were collected by Ficoll gradient separation from ACD tubes or leukapheresis samples, then were cryopreserved and stored in liquid nitrogen for future use. Controller status was classified as previously described. Intermediate status was applied to individuals with a viral load greater than 2000, but less than 10,000 copies/uL. Progressor status was assigned to individuals with a viral load of 10,000 copies/uL or greater.

CTL Proliferation Assay: PBMCs were suspended at 1×106/mL in PBS and incubated at 37° C. for 20 min with 0.5 uM carboxyfluorescein succinimidyl ester (CFSE; Life Technologies), After the addition of serum and washes with PBS, cells were resuspended at 1×106/mL and plated into 96-well U-bottom plates (Corning) at 200 uL volumes. Individual optimal HIV epitope peptides. matched to the each patient's HLA haplotype, were added at a final concentration of 1 ug/mL. On day 6, cells were harvested, washed with PBS+2% Fetal Bovine Serum, and stained with anti-CD3 Alexa Fluor 700 (clone OKT3; BioLegend), anti-CD8 APC (clone RPA-T8; BioLegend), and LIVE/DEAD violet viability dye (Life Technologies). Cells were washed and fixed in 2% paraformaldehyde, prior to flow cytonetric analysis on a BD LSR If (BD Biosciences). A positive response was defined as one with a percentage of CD3+ CD8+ CFSE low cells at least 1.5× greater than the highest of three negative-control wells.

Viral Epitope Sequencing: Viral plasma RNA was extracted using ultracentrifugation and Qiaamp Viral RNA Mini Kit (Qiagen) according to the manufacturer's instructions. HIV genomes were amplified using a nested 3 amplicon approach as previously described. For deep sequencing, the PCR amplicons were fragmented and barcoded using NexteraXT DNA Library Prep Kit, as per the manufacturer's protocol (Illumina, San Diego, CA). Samples were pooled and sequenced on an Illumina MiSeq platform, using a 2×250 bp V2 reagent kit, Paired-end reads were assembled into an HIV-1 clade B consensus sequence using the VICUNA de novo assembler software and finished with V-FAT v1.0. Reads were mapped back to the consensus using Mosaik v2.1.73, and variants called by V-Phaser v2.0. Viral sequencing data depicted using WebLogo3.

Statistical Analysis: The generation of dot plots, nonparametric statistical analysis and correlations (Spearman) were performed using the statistical programs in Graphpad Prism version 6.0. Differences between groups were evaluated using the Mann-Whitney t-test or ANOVA as indicated. Paired analyses were performed using the Wilcoxon matched pairs rank test.

Example 2

Multi-Networked Epitope Vaccine for Universal HIV Protection

In this Example, a T cell-based immunogen was developed that incorporates mutation resistant epitopes that have been identified through an algorithm known as structure-based network analysis algorithm. The epitopes identified by this analysis are known as networked epitopes.

The structure-based network analysis algorithm utilizes protein structure data and network theory metrics to quantify the topological importance of each amino acid residue to a protein's tertiary and quaternary structure. This is accomplished by using atomic level coordinate data from protein crystal structures to build networks of amino acid residues (nodes) and non-covalent interactions (edges), which included van der Waals interactions, hydrogen bonds, salt bridges, disulfide bonds, pi-pi interactions, pi-cation interactions, metal coordinated bonds and local hydrophobic packing. These inter-residue interactions were calculated between pairs of amino acids using energy potentials and established distance thresholds and summed to generate the protein network. Using this network-based representation, a number of network centrality metrics (measures of relative importance in a given network topology) are calculated, which leads to a quantitative measure of the topological importance of individual amino acid residues through an assessment of a residue's (i) local connectivity to other residues, (ii) involvement as a bridge between higher order protein elements (secondary structure, tertiary and quaternary structure interfaces) and (iii) proximity to known protein ligands. Integration of these metrics into a single value generates a network score that quantifies the contribution of each amino acid residue to the protein's topological structure (FIG. 2).

Figures 3A, 3B, 3C:
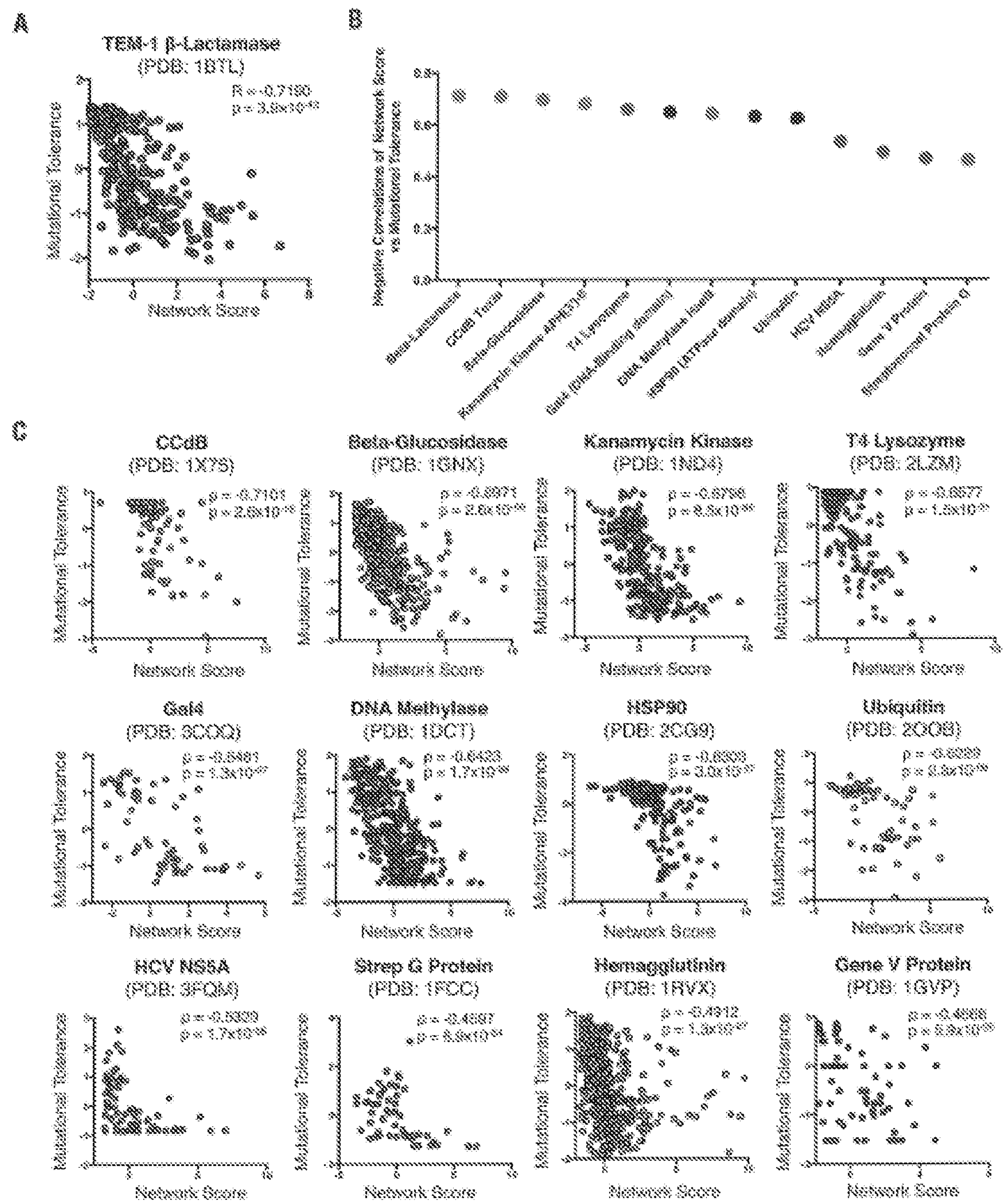
FIGS. 3(A-C) are graphs illustrating the correlation of network scores with experimental mutational tolerance scores. (A) Correlation of average mutational tolerance and network score for each residue in TEM-1 β-Lactamase. Correlation statistic calculated using Spearman correlation. Residues Ser70, Lys73, Gflu66 and Asn 170 denote the enzyme's active site and were among the highest scoring residues. (B) Composite Spearman correlation coefficients of network score versus average mutational tolerance for 13 control proteins used for validation. (C) Individual plots of correlations between network score and mutational tolerance. Spearman correlation coefficients and p-values depicted with each plot.
Figures 4A, 4B, 4C:
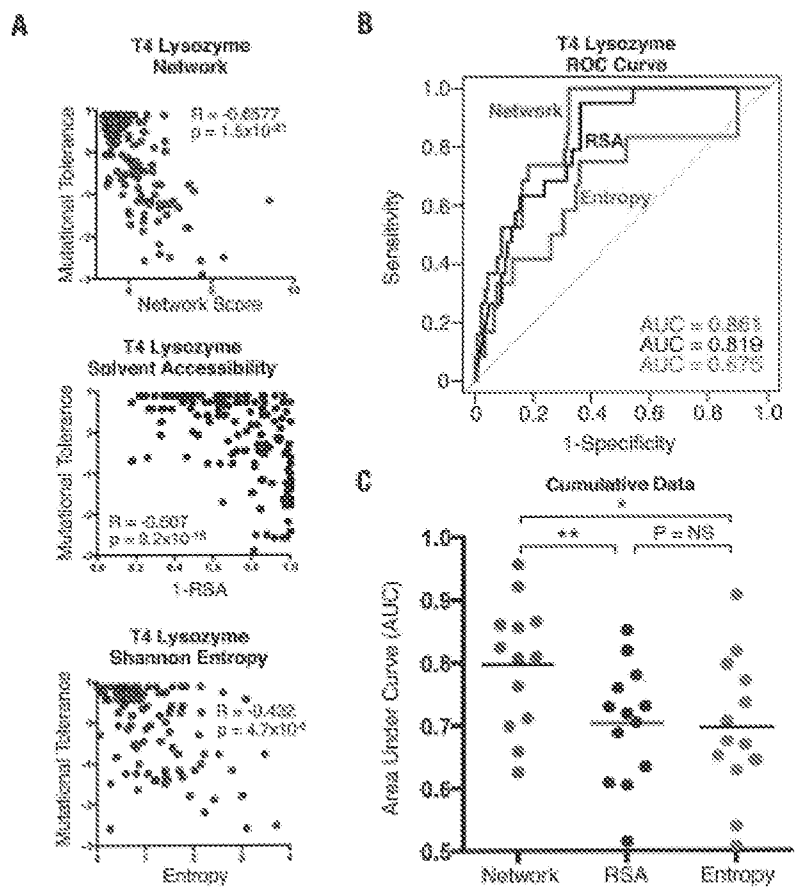
FIGS. 4(A-C) are graphs illustrating of predictive ability of network score, relative solvent accessibility and sequence conservation to identify residues of low mutational tolerance. (A) Correlations of Network Score, relative solvent accessibility (RSA) and Shannon entropy with mutational tolerance values for T4 Lysozyme. Spearman correlation coefficients and p-values depicted with each plot. (B) Comparative ROC curves and corresponding AUC characteristics for network score, RSA and sequence entropy for their predictive ability to identify the top 10% of mutationally intolerant residues. (C) Comparison of AUC values of network score, RSA and Shannon entropy across the 13 proteins used for validation. P-values calculated by Wilcoxon matched pairs test (*, $P<0.05$; **, $P<0.01$).

The ability of the algorithm to define residues resistant to mutation was validated on a set of thirteen proteins with functional outcomes from comprehensive, high-throughput mutagenesis experiments, of which ten proteins were derived from a bacterial or viral source. This revealed strong inverse correlations between computationally derived network scores and experimentally derived mutational tolerance values across all experimental datasets (FIG. 3). In addition, comparative assessment of the capacity of structure-based network analysis algorithm to identify residues of low mutational tolerance (top 10% of residues resistant to mutation) revealed a significantly superior predictive ability relative to sequence conservation or relative solvent accessibility (FIG. 4).

The structure-based network analysis algorithm was applied to twelve HIV proteins for which high resolution structural data was available (Gag p24, Gag p17, Reverse Transcriptase, Protease, Integrase, gp120, gp41, Nef, Rev, Tat, Vif and Vpr) to generate network scores for residues across the HIV proteome. This allowed for calculation of a network score for 89% of all known optimal cytotoxic T cell epitopes (Llano et al. 2013) by summation of residue network scores involved as either I-LA anchor, TCR contact or peptide processing residues. Specifically, HLA anchor residues were defined based on previous delineations for each HLA allele (Walker 2016), Putative TCR contact residues were considered to be all remaining non-HLA anchor intra-epitope residues, excluding position one (Calis, de Boer, and Ke mir 2012). Peptide processing residues were defined as the five residues N-terminal and C-terminal that flank the cytotoxic T lymphocyte epitope (ten in total).

Based on the assignment of network scores to cytotoxic T cell epitopes, a number of networked epitopes were identified which were presented by a wide variety of HLA alleles with broad representation in the global population. These epitopes represent those that are present in topologically important regions of HIV proteins (FIG. 21).

Figures 5A, 5B, 5C, 5D:
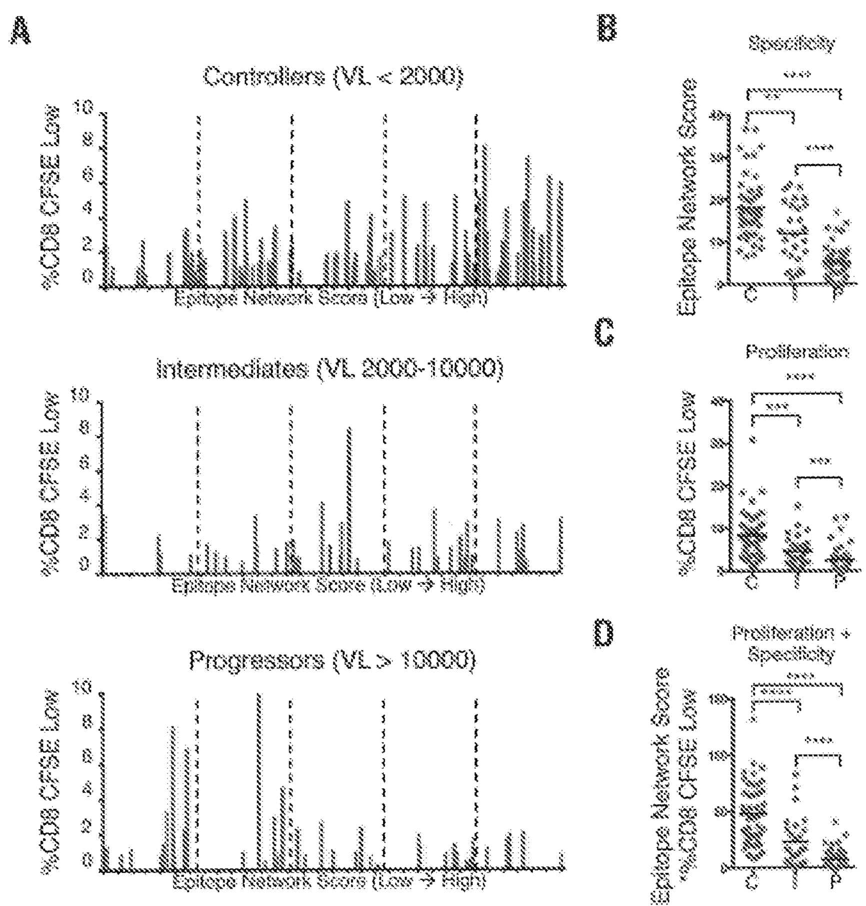
FIGS. 5(A-D) are graphs showing targeting of topologically important viral epitopes distinguishes HIV controllers from progressors. (A) Controllers, intermediate phenotype and progressors were assessed for functional CTL response by HLA-matched optimal epitopes and 6-day CFSE proliferation assay. The x-axis depicts all CTL epitopes ranked by epitope network score from lowest to highest. The y-axis depicts the magnitude of CTL responses by % CFSE-low CD3+ CD8+ T cells directed against a specific epitope following six-day proliferation. (B) Composite differences in summed epitope network scores for all targeted CTL epitopes between controllers (C), intermediates (I) and progressors (P). Statistical comparisons between individual patient groups are performed by Mann-Whitney test. (C) Composite differences in summed magnitude of proliferative CTL response between controllers (C), intermediates (I) and progressors (P). Statistical comparisons between patient groups are accomplished by Mann-Whitney test. (D) Composite differences in summed epitope network score scaled by magnitude of proliferative CTL response between controllers (C), intermediates (I) and progressors (P). Statistical comparisons between patient groups are performed by Mann-Whitney test.
Figures 6A, 6B:
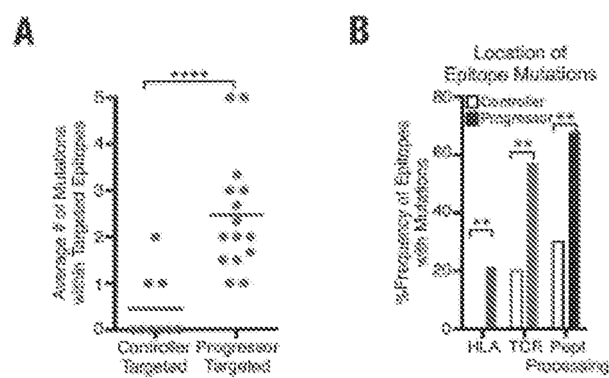
FIGS. 6(A-B) are graphs illustrating that topologically important CTL epitopes are infrequently mutated in vivo. (A) Comparison of high network scoring and low network scoring epitopes by number of overall mutations. Statistical comparison performed by non-parametric Mann-Whitney test. (B) Comparison of the percent frequency of mutations at HLA anchor, TCR contact and flanking residues between high network scoring (open bars) and low network scoring epitopes (filled bars). Statistical comparisons performed by non-parametric Mann-Whitney tests. Calculated p-values indicated as follows (*, $p<0.05$; , $p<0.01$; *, $p<0.001$; ****, $p<0.0001$).

Evaluation of cytotoxic T cell responses within a cohort of 114 untreated HIV-positive individuals with elite or viremic control (viral load <2000 copies/mL), intermediate viral loads (2000-10000 copies/mL) or viral progression (viral load >10000 copies/mL), revealed that targeting networked epitopes with proliferative cytotoxic T cells was significantly associated with immune control (FIG. 5), Moreover, networked epitopes were enriched for markedly fewer mutations in comparison to non-networked epitopes despite similar levels of cytotoxic T lymphocyte targeting (FIG. 6).

Incorporation of networked epitopes into a multi-networked epitope T cell immunogen for delivery and induction of de novo cytotoxic T cell responses is accomplished by utilizing several multi-epitope immunogen compositions. These compositions include a combination of elements such as endoplasmic reticulum signal sequences (ERSS) (Hayashi et al. 2007), furin cleavage sites and the pan HLA-DR epitope (PADRE) (FIG. 7) (Alexander et al. 2000). To assess the efficiency of epitope processing and presentation, model constructs were generated using a combination of HIV cytotoxic T lymphocyte epitopes restricted by HLA-A*0201 and HLA-B*57 (A*02 KLTPLCVTL (SEQ ID NO: 11), A*02 VIYQYMDDL (SEQ ID NO: 13), A*02 YVDRFYKTL (SEQ ID NO: 23), A*02 SLYNTVATL (SEQ ID NO: 20), A*02 ILKEPVHGV (SEQ ID NO: 19), B*57 KAFSEPVIMPF (SEQ ID NO: 379), B*57 HTQGYFPDW (SEQ ID NO: 209), B*57 ISPRTLNAW (SEQ ID NO: 204), B*57 QASQEVKNW (SEQ ID NO: 189), and B*57 TSTLQEQIGW (SEQ ID NO: 202)) with the presence and absence of these various aforementioned elements. These epitopes were incorporated into a T cell immunogen in which epitopes were flanked by ERSS and furin cleavage sites within a transgene in a VSV-G pseudotyped lentivirus vector or as an alphavirus-based replicon RNA construct.

Figure 8B:
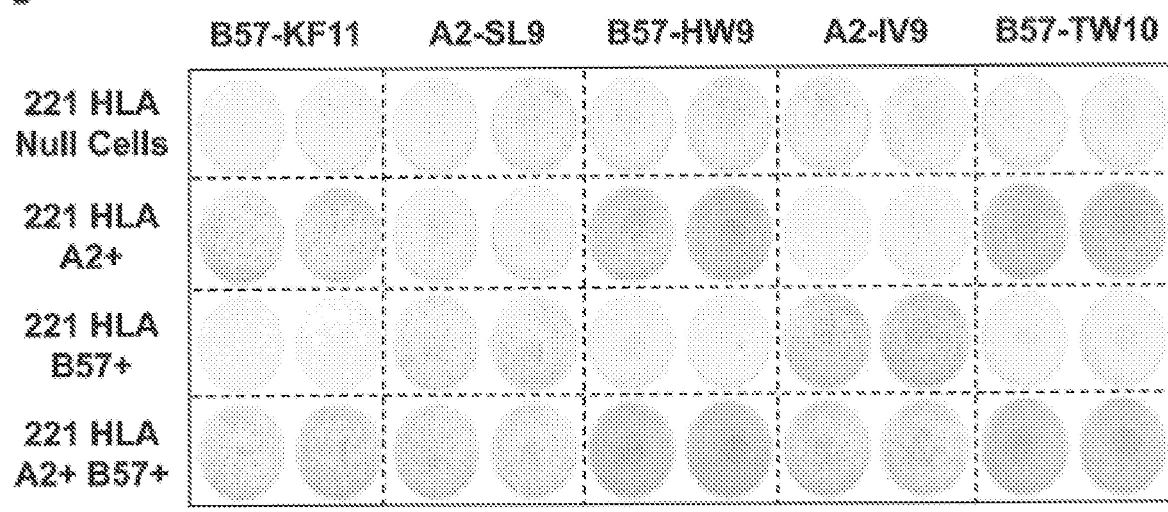
Figures 9A, 9B:
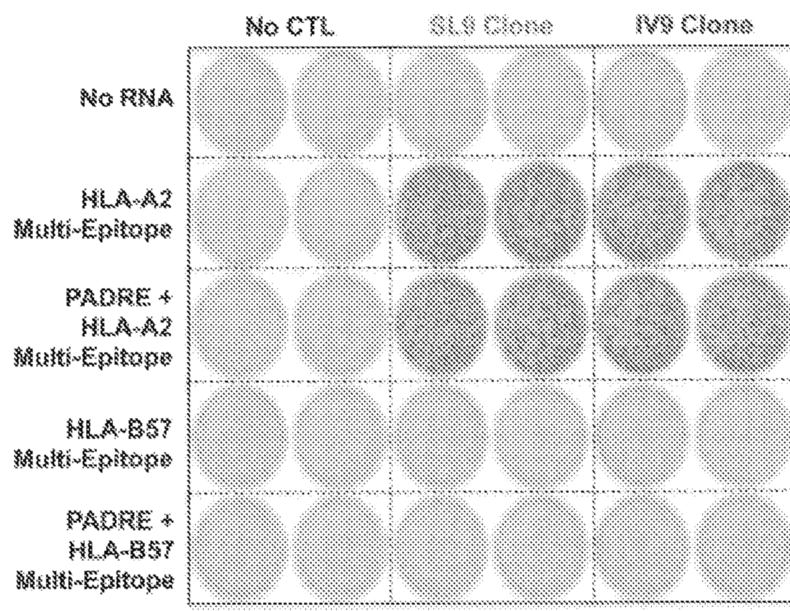
FIGS. 9(A-B) are illustrations and images showing delivery of alphavirus-based RNA replicons to HLA-A*0201+ HepG2 cells leads to successful translation, processing, presentation of HLA class I epitopes and subsequent recognition by epitope-specific CTLs. (A) Four multiple-epitope immunogens were designed incorporating HLA-A2 epitopes and HLA-B57 epitopes with and without PADRE. The SL9 and IV9 epitopes in the HLA-A2 multi-epitope immunogen were incorporated given the availability of SL9- and IV9-specific CTL clones for downstream T cell recognition assays. These epitopes were also positioned as the $2^{nd}$ and $4^{th}$ epitopes in the immunogen in order to fully assess translation, processing, translocation of the epitopes to the ER and successful for HLA class I presentation. (B) HepG2 cells (1×10^5) were incubated with Lipofectamine-RNA Replicon complexes of all 4 immunogens for 36 hours. The cells were washed vigorously and then co-incubated with either no CTL, an SL9-specific CTL clone or IV9-specific CTL clone for 16 hours. T cell recognition was determined by IFN-gamma ELISPOT. Based on these results, the SL9 and IV9 epitopes were successfully translated, processed, translocated to ER, and loaded onto HLA-A2 molecules for presentation to T cells.

Lentiviral vectors encoding the T cell immunogens were delivered to LCL.221 cells expressing either no HLA alleles, HLA*0201, HLA*5701 or both HLA*0201 and HLA*B5701. Co-incubation of lentivirally transduced cells with a representative T cell immunogen with epitope-specific cytotoxic T lymphocyte clones led to detectable interferon-gamma release by ELISpot, indicating effective recognition of transduced cells in a HLA-restricted manner (FIG. 8). Alphavirus-based RNA replicons encoding a T cell immunogen with HLA-A*0201 epitopes (A*02 KLTPLCVTL (SEQ ID NO: 11), A*02 VIYQYMDDL (SEQ ID NO: 13), A*02 YVDRFYKTL (SEQ ID NO: 23), A*02 SLYNTVATL (SEQ ID NO: 20), A*02 ILKEPVHGV (SEQ ID NO: 19)) were delivered to HLA-A*0201+ HepG2 cells using Lipofectamine and this also led to effective recognition by epitope-specific cytotoxic T lymphocyte clones following co-incubation (FIG. 9). RNA replicons with non-HLA A*0201 epitopes (i.e. B*5701 epitopes) elicited no detectable epitope-specific cytotoxic T lymphocyte response following delivery and co-incubation. These data demonstrate that multi-networked epitope immunogens can be delivered in vitro using multiple modalities (i.e. lentivirus and RNA replicon) and this successfully leads to efficient processing and presentation of networked epitopes onto HLA class I molecules for subsequent recognition by epitope-specific cytotoxic T lymphocytes.

Example 3

Structural Topology Defines Protective CD8+ T Cell Epitopes in the HIV Proteome Mutationally constrained epitopes of highly variable pathogens represent promising targets for vaccine design, but measures of amino acid sequence conservation have not reliably identified such sites. Here a structural approach was employed—structure-based network analysis—that applies network theory to protein structure data to quantitatively determine the topological importance of individual amino acids to the structure and function of HIV proteins. Residues that occupied important network positions disproportionately impaired viral replication when mutated and occurred with high frequency in T cell epitopes presented by protective HLA class I alleles. Moreover, $CD8^+$ T cell targeting of highly networked epitopes distinguished individuals who spontaneously control HIV without antiretroviral therapy, even in the absence of protective HLA alleles. This approach provides a means to identify T cell epitopes of topological importance within the proteome of highly variable pathogens and thereby, guidance for rational design of immunogens, including a T cell-based HIV vaccine.

The development of an effective prophylactic vaccine for human immunodeficiency virus (HIV) is a critical global health priority. An important component of this effort is focused on defining immune responses of individuals who exhibit natural viral control (2), with the aim of inducing these same responses by vaccination in the population at-large. Genome wide association studies (GWAS) have identified strong associations of HIV control with certain human leukocyte antigen (HLA) class I alleles (e.g. B*57, B*27) and specific amino acids that line the HLA-peptide binding pocket. While this would suggest a key role for viral epitope specificity, the extent to which targeting specific epitopes by cytotoxic T lymphocytes (CTLs) influences viral control, and the distinguishing features of protective epitopes, remain poorly understood.

CD8+ T cell epitopes comprised of sequence-conserved residues have been considered optimal targets of efficacious cellular immune responses against HIV, However, recent work has demonstrated that targeting conserved viral epitopes is not uniquely associated with immunologic control. Moreover, while amino acid sequence conservation has been a presumed proxy for mutational fitness cost, only a subset of sequence-conserved residues exact a substantial change in viral replicative capacity when mutated, Higher order sequence analysis of couplings between viral mutations within the conserved Gag protein of HIV using random matrix theory or quantitative fitness landscapes has demonstrated that constraints on viral evolution are multi-dimensional in nature, and restrictions on viral escape are more accurately captured by epistasis between protein residues rather than viral sequence entropy alone. These computationally defined multi-dimensional constraints predicted regions of vulnerability, presumed to be due to interdependencies of residues within the three-dimensional structure of viral proteins and protein assemblies, and were preferentially presented by protective HLA alleles. Moreover, the location of mutations under immune selection pressure has also been shown to be predictable, further suggesting a role for structural constraints on viral evolution. However, systematic means to directly evaluate viral protein structure and quantitate mutational constraint, particularly for highly variable viral proteins, have not been defined.

To address this, an alternative approach was developed, structure-based network analysis, which utilizes protein structure data and network theory to quantify the topological importance of each amino acid residue to a protein's tertiary and quaternary structure. While structural topology has been demonstrated to be a key attribute of residues involved in protein folding, hydrophobic packing and host-pathogen interactions, the network approach was specifically optimized to model the relationship between residue topology and mutational tolerance by focusing on interactions made by atoms unique to an amino acid's identity. This was accomplished by using atomic level coordinate data from the Protein Data Bank to build networks of amino acid residues (nodes) and non-covalent interactions (edges), which included van der Waals interactions, hydrogen bonds, salt bridges, disulfide bonds, pi-pi interactions, pication interactions, metal coordinated bonds and local hydrophobic packing. These inter-residue interactions were calculated between pairs of amino acids using energy potentials and established distance thresholds and summed to generate the protein network (FIG. 2). Using this network-based representation, an array of network centrality metrics was calculated (measures of relative importance in a given network topology), which led to a quantitative measure of the topological importance of individual amino acid residues through an assessment of (i) their local connectivity to other residues, (ii) their involvement as bridges between higher order protein elements (secondary structure, tertiary and quaternary structure interfaces) and (iii) their proximity to known protein ligands (FIG. 2). Integration of these metrics into a single value generated a network score (range from −5.99 to 10.02, from lowest to highest value) that quantified the relative contribution of each amino acid residue to the protein's topological structure (see Methods for details).

Figures 11A, 11B, 11C, 11D, 11E, 11F, 11G, 11H, 11I, 11J:
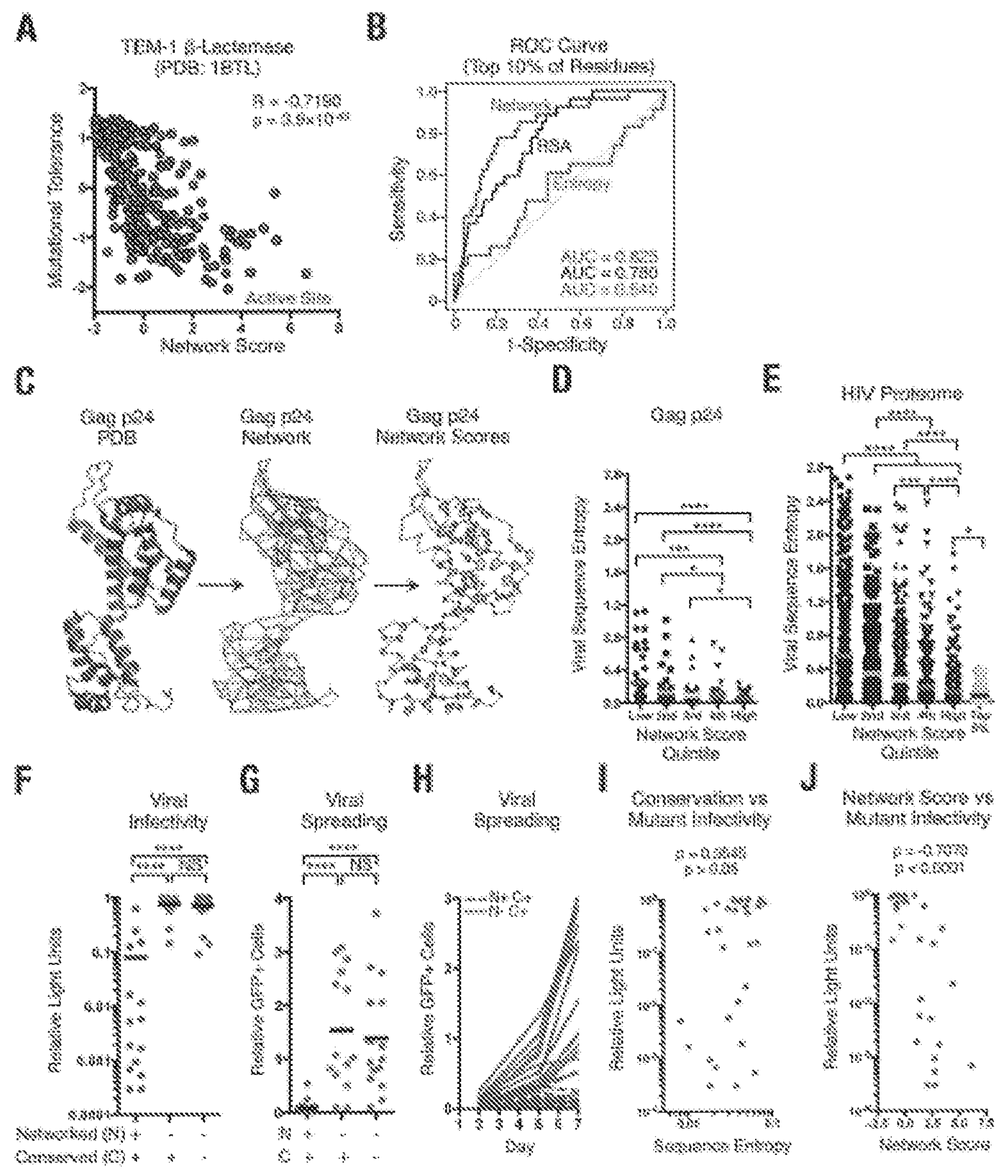
FIGS. 11(A-J) illustrates a structure-based Network Analysis of the HIV proteome identifies residues with low mutational tolerance. (A) Correlation of average mutational tolerance and network score for each residue in TEM-1 b-Lactamase. Correlation statistic calculated using Spearman correlation. Residues Ser70, Lys73, Glu166 and Asn 170 denote the enzyme's active site and were among the highest scoring residues. (B) Comparative receiver operator curves (ROC) curves and corresponding area under the curve (AUC) characteristics for network score, RSA and sequence entropy for their predictive ability to identify the top 10% of mutationally intolerant residues in TEM-1 b-Lactamase. (C) Schematic of structure-based network analysis method. Crystal structure data (Gag p24, PDB: 3J34) is transformed into a network-based protein representation of amino acid residues (nodes) and non-covalent, inter-residue interactions (edges), with width of each edge indicating the strength of the interaction (Gag p24 Network). Network analysis of the protein network is then performed to yield network scores for each residue, with node size corresponding to relative network score (Gag p24Network Scores). (D) Comparison of Gag p24 residue network scores binned by quintile (Low, 2nd, 3rd, 4th, High) with viral sequence entropy values from 5,430 clade B sequences. Statistical analysis performed by Mann-Whitney test between groups. (E) Comparison of network scores of residues across the HIV proteome binned by quintile (Low, 2nd, 3rd, 4th, High) with viral sequence entropy values from clade B sequences. Entropy scores for residues with the top 5% of network scores depicted in gray. Statistical analysis performed by Mann-Whitney test between groups. (F) Comparison of the effect on viral infectivity conferred by mutation of conserved, high network scoring residues, conserved, low network scoring residues and non-conserved, low network scoring residues two days following infection of Tzm-bl cells. Statistical analysis of relative light units performed by one-way ANOVA and individual comparisons by Wilcoxon matched pairs test. (G) Comparison of the effect on viral spreading conferred by mutation of conserved, high network scoring residues, conserved, low network scoring residues and non-conserved, low network scoring residues 7 days following infection of CEM-GXR cells. Statistical analysis of relative % GFP positive cells (in comparison to day 5 NL4-3 wild-type virus) performed by one-way ANOVA and individual comparison by Wilcoxon matched pairs test. (H) Comparison of viral spreading in CEM-GXR cells over 7 days between viral mutants of conserved, high network scoring residues and conserved, low network scoring residues. (I) Comparison of conservation with viral infectivity of mutant viruses (Spearman r=0.3545, p>0.05). (J) Correlation of network score with viral infectivity of mutant viruses (Spearman r=−0.7008, p<0.0001). Calculated p-values indicated as follows (*: p<0.05; : p<0.01; *: p<0.001; ****: p<0.0001).

This approach was validated on a set of thirteen proteins with functional outcomes from comprehensive, high-throughput mutagenesis experiments, of which ten proteins were derived from a bacterial or viral source (FIG. 23). This revealed strong inverse correlations between computationally derived network scores and experimentally derived mutational tolerance values across all experimental datasets (Spearman's r=−0.46 to −0.71, p=6.9×10-4 to $2.6\times10^{-66}$) (FIG. 11A for TEM-1 b-Lactamase and FIG. S2 for the remaining). In each case, a highly significant correlation was found between network scores and experimental data linked to an essential process (for example, protection from DNA degradation by methyltransferase activity; beta-lactamase and ampicillin resistance; kanamycin kinase and kanamycin resistance), suggesting a strong relationship between the topological importance of a residue to its protein network and its functional importance (e.g. TEM-1b-Lactamase active site residues, FIG. 11A). In addition, comparative assessment of the capacity of structure-based network analysis to identify residues of low mutational tolerance (top 10% of mutationally intolerant residues) revealed a significantly superior predictive ability relative to sequence conservation or relative solvent accessibility (FIG. 11B and FIG. 4).

The ability of this approach was assessed to define mutational constraints of HIV residues and optimal CTL epitopes, for which epitope sequence and HLA restriction have been rigorously defined. Network scores were first calculated for the Gag p24 protein of HIV using structural data from monomeric (FIG. 11C) and higher order p24 conformations. Network scores were binned into quintiles and compared with viral sequence entropy values from 5,430 (lade B Gag p24 viral sequences (FIG. 11D). Residues within the highest network score quintile exhibited the lowest levels of viral sequence entropy, while residues within quintiles of moderate and low network scores had statistically higher entropy levels (mean Shannon entropy of highest quintile=0.05, mean Shannon entropy of lowest quintile=0.19, rank-sum p<0.0001), illustrating a strong inverse relationship between the network measure of topological importance and mutational frequency.

The analysis was extended to eleven additional HIV proteins for which high quality structural data were available (Gag p17, Reverse Transcriptase, Protease, Integrase, gp120, gp4l, Nef, Rev, Tat, Vif and Vpr) and found a similar inverse relationship (mean Shannon entropy of highest quintile=0.11, mean Shannon entropy of lowest quintile=0.55, rank sum p<0.0001) (FIG. 11E), suggesting that this finding was broadly applicable across the HIV proteome and further validating the importance of a viral residue's structural topology to its mutational tolerance. Importantly, while residues from low network score quintiles on average had higher viral sequence entropy, the spread of entropy values within this quintile was large with a number of poorly networked residues exhibiting very low viral sequence entropy. This distinction revealed that sequence-conserved residues could be further distinguished on the basis of network score.

To determine whether conserved, high network scoring residues (network score >1, range 1.03 to 6.16, mean=2.70) differed from conserved, low network scoring residues (network score <1, range −1.38 to 0.65, mean=−0.52) in terms of their mutational tolerance, fifteen pairs of conserved residues of high and low network scores matched for amino acid identity and protein of origin were selected (e.g. Proline 34 and Proline 93 from Gag p24; FIG. 24). An additional fifteen matched residues were included that were non-conserved and had low network scores (range −1.46 to 0.58, mean=−0.91), providing a positive control for mutational tolerance, as these would be predicted to accommodate mutations without affecting viral fitness (e.g. Proline 123). Mutations were engineered with the HIV molecular clone NL4-3 for each triplet of amino acids, in which the parental residue was mutated to the same amino acid (e.g. P34A, P93A, P123A), in order to induce the same controlled biochemical change, prior to the assessment of virion infectivity and spreading of the viral mutants.

Applying this approach to four HIV proteins (Gag p24, RT, Integrase, gp120), in which both conservative and non-conservative mutations were introduced, it was found that mutation of conserved, highly networked residues led to a substantial impairment of viral infection at 2 days using the established Tzm-B1 infectivity assay, while mutation of residues with low network scores, regardless of conservation, had little impact on viral infectivity (FIG. 11F). Differences in viral spreading between conserved, high network scoring and conserved, low network scoring mutants were evident at 5 days after infection, and were even more pronounced over the course of the 7-day assay (FIGS. 11G and H). Moreover, there was a strong correlation between viral infectivity and network score, whereas no significant correlation was observed for viral sequence entropy (FIGS. 11, I and J), indicating that the topological importance of a residue provides an additional level of resolution above conventional sequence conservation analysis.

Figures 12A, 12B, 12C, 12D, 12E, 12F, 12G, 12H, 12I:
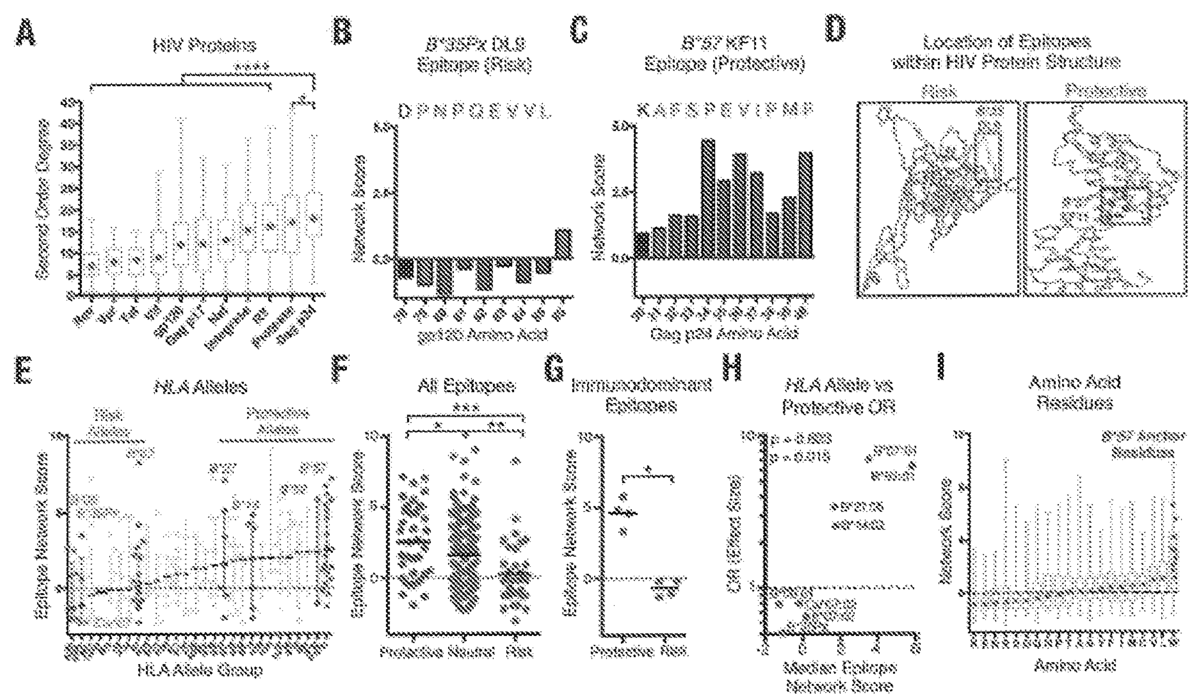
FIGS. 12(A-I) are graphs showing the evaluation of HIV proteins and CTL epitopes by network score distinguishes protective from neutral and risk-associated HLA alleles. (A) Second order degree centrality values of residues from individual proteins in HIV ranked from lowest median value (Vpr) to highest (Gag p24). Median second order degree centrality values, interquartile ranges (boxes) and extreme values (whiskers) are indicated for each HIV protein. Statistical comparisons of residue network centrality measurements between proteins made by Mann-Whitney test. (B) Residue network scores for risk allele (B*35Px) immunodominant epitope DL9 (Nef 77-86). The sequence of SEQ ID NO: 154 is shown. (C) Individual residue network scores for protective allele (B*57) immunodominant epitope KF11 (Gag p24 30-40). The sequence of SEQ ID NO: 201 is shown. (D) Network based depiction of gp120 (PDB: 3J70) with B*35Px DL9 epitope and network-based depiction of the Gag p24 monomer (PDB: 3J34) B*57 KF11 epitope. The size of nodes reflects the relative magnitude of network score. (E) Epitope network scores for individual HLA allele groups are depicted with median epitope network score values (horizontal lines) and interquartile ranges (vertical lines). HLA groups ordered from left to right by lowest to highest median epitope network score. (F) Comparison of epitope network scores of all optimal epitopes presented by protective, neutral and risk HLA alleles. Statistical analysis performed by one-way ANOVA and individual comparisons by Mann-Whitney test. (G) Correlation of GWAS-defined protective HLA allele odds ratios (OR) to median epitope network score. Correlation statistics calculated by Spearman correlation. (H) Comparison of epitope network scores of immunodominant epitopes presented by HLA alleles associated with protection (blue-B*5701 TW10, B*5201 RI8, B*2705 KK10, B*1402 DA9) and risk (B*0801 FL8, B*3501 DL9, B*0702 RV9, Cw*07 RY11). Statistical analysis performed by Mann-Whitney test. (I) Network scores of individual amino acids across the HIV proteome ranked by median network score from lowest (K, Lysine) to highest (W, Tryptophan). Median network scores (dots), interquartile ranges (boxes) and extreme values (whiskers) are indicated for each HIV protein. Calculated p-values indicated as follows (*: p<0.05; : p<0.01; *: p<0.001; ****: p<0.0001).

Comparative assessment of individual HIV proteins using a standardized network metric (second order degree centrality, a measure of second order residue contacts) allowed us to rank the proteins from highest (Gag p24) to lowest (Rev) based on median residue connectivity (FIG. 12A). The significantly elevated second order degree centrality of residues in Gag p24 results from extensive multimeric and inter-multimeric interactions that are necessary for capsid formation and likely accounts for its unique mutational fragility among proteins in the viral proteome. This network centrality-based hierarchy of HIV proteins was also consistent with previous observations linking CTL response breadth to Gag with lower viral loads, and CTL targeting of accessory and envelope proteins with higher viral loads. This suggests mechanistically that targeting epitopes from proteins with a greater density and frequency of interconnected residues (i.e. Gag and Pol proteins) may provide increased stochastic probability of controlling viral replication.

The network scores of residues were evaluated within two representative CTL epitopes presented by HLA alleles with disparate effects on viral load in untreated individuals: the risk allele B*35Px (B*3502, B*3503) and the protective allele B*57. While the B*35Px DL9 epitope (gp120 78-86) was primarily comprised of low network scoring residues on the surface of the HIV envelope protein (FIG. 12B, 12D), the B*57 KF11 epitope (Gag p24 30 40) was enriched for high scoring residues in the core of the Gag p24 monomer (FIG. 12C, 12D), consistent with previous evidence illustrating the limited options of residues within KF11 to tolerate mutagenesis and escape from CTL pressure.

Interestingly, it was determined that the high scoring residues within KF11 occupied immunologically important sites within the epitope (i.e. HLA anchor and T cell receptor contact sites), leading us to hypothesize that protective HLA alleles may preferentially present epitopes with topologically important, and therefore mutationally constrained residues at positions that can ensure durable HLA presentation and recognition by CTLs. To investigate this further, an epitope network score was computed for all optimally defined CTL epitopes with high quality structural data (~89.2%) by summing the average network scores of residues involved in HLA binding, T cell receptor (TCR) contact and peptide processing regions (FIG. 21, described in Methods). These residues were chosen in order to account for described mechanisms of viral escape from CTLs (28-30). Ranking of HLA allele groups by median epitope network score revealed that protective alleles, as defined by GWAS (B *14, B*27, B*52, B3*57), disproportionately targeted epitopes with high network scores in comparison to either neutral alleles or risk alleles (B*07, B*08, B*35Px. Cw*07) (FIGS. 12, E and F). These data suggested that differences in protective/risk HLA allele odds ratios could potentially be explained by the likelihood of targeting a high network scoring epitope.

Next, the respective odds ratio of GWAS-defined protective and risk HLA alleles was assessed with their median epitope network score and a strong positive correlation was found (FIG. 12G, Spearman r=0.762, p=0.037). Moreover, when the comparison of epitope network scores focused exclusively on immunodominant epitopes, rather than the median epitope network score of all presented epitopes, the magnitude of difference between protective and risk alleles became even more pronounced (FIG. 12H). Closer examination of HLA-B*57 revealed that a strikingly high percentage of epitopes presented by this allele were highly networked relative to other HLA alleles (defined as within the top decile of epitopes, 6 of 22, ~27.2%), consistent with its preferential enrichment within HIV controllers across diverse cohorts. Interestingly, when the 20 distinct amino acids were ranked by median network score, the most highly networked was tryptophan (Trp, W) (FIG. 12I), which is a common carboxy-terminal HLA anchor residue for B*57-restricted epitopes, and is only rarely utilized by other HLA alleles. Indeed, tryptophan residues that serve as B*57 anchors were amongst the highest scoring throughout the entire HIV proteome.

While the relative enrichment of epitopes with high network scores distinguished protective from risk HLA alleles (FIG. 12F), several epitopes restricted by neutral HLA alleles were also found to be highly networked (FIG. 12F). This finding provided the opportunity to investigate whether functional CTL targeting of epitopes with high network scores was associated with viral control, independent of protective LLA alleles. A cohort of 114 untreated HIV-positive individuals was evaluated, with elite or viremic control (viral load <2000 copies/mL), intermediate viral loads (2000-10000 copies/mL) or viral progression (viral load >10000 copies/mL), who also had a diverse representation of protective and non-protective HLA alleles (FIG. 25). Specificity of CTL responses was determined by assessment of CT. proliferation following 6-day incubation of peripheral blood mononuclear cells (PBMCs) with all of the optimal epitopes restricted by the patient's HLA haplotype. CTL proliferation was the focus, rather than interferon-gamma release, due to its significantly stronger relationship with T cell functionality and immune control.

Figures 13A, 13O:
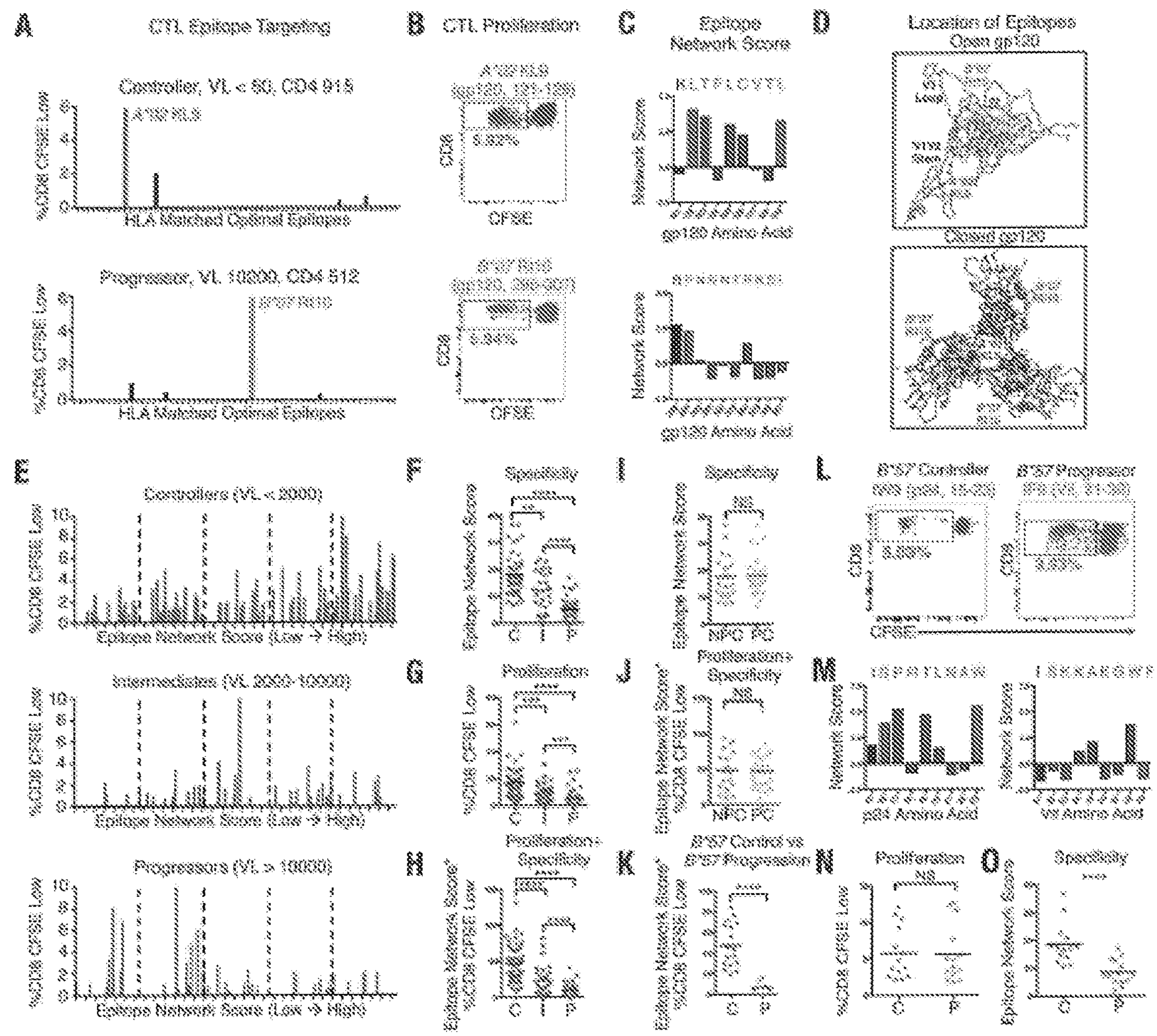
FIGS. 13 (A-O) are graphs showing targeting of topologically important viral epitopes distinguishes HIV controllers from progressors irrespective of HLA allele. (A) Mapping of proliferative CTL responses in a representative controller and progressor by assessment of carboxyfluorescein N-hydroxysuccinimidyl ester (CFSE) dye dilution after incubation of CFSE-loaded PBMCs for 6 days with all individual optimal epitopes matched to the patient's HLA haplotype (n=35, for controller, n=56 for progressor). (B) CFSE dilution of immunodominant CTL responses from a controller (upper panel) and progressor (lower panel). Protein of origin and AA coordinates of epitopes indicated. (C) Network scores of residues in A*02 KL9 and B*07 RI10 CTL epitopes targeted by controller and progressor, respectively. The sequences of SEQ ID NO: 11 (top) and SEQ ID NO: 93 (bottom) are shown. (D) Network-based depiction of gp120 (PDB: 3J70) with A*02 KL9 epitope and B*07 RI10 epitope. The size of nodes reflects the relative magnitude of network score. (E) Controllers, intermediate phenotype and progressors were assessed for functional CTL response by HLA-matched optimal epitopes and 6-day CFSE proliferation assay. The x-axis depicts all CTL epitopes ranked by epitope network score from lowest to highest. The y-axis depicts the magnitude of CTL responses by % CFSE-low CD3+CD8+ T cells directed against a specific epitope following six-day proliferation. (F) Composite differences in summed epitope network scores for all targeted CTL epitopes between controllers (C), intermediates (I) and progressors (P). Statistical comparisons between individual patient groups are performed by Mann-Whitney test. (G) Composite differences in summed magnitude of proliferative CTL response between controllers (C), intermediates (I) and progressors (P). Statistical comparisons between patient groups are accomplished by Mann-Whitney test. (H) Composite differences in summed epitope network score scaled by magnitude of proliferative CTL response between controllers (C), intermediates (I) and progressors (P). Statistical comparisons between patient groups are performed by Mann-Whitney test. (I) Comparison of the sum of all epitope network scores targeted by CTL responses between controllers with non protective alleles (NPC) and protective alleles (PC). Statistical comparisons between patient groups are performed by Mann-Whitney test. (J) Comparison of sum of all epitope network scores targeted by CTL responses scaled by magnitude of CTL proliferation between controllers with non-protective alleles (NPC) and protective alleles (PC). Statistical comparisons between patient groups are performed by Mann-Whitney test. (K) Comparison of sum of all epitope network scores targeted by CTL responses scaled by magnitude of CTL proliferation between B*57+ controllers (C) and B*57+ progressors (P). Statistical comparisons between patient groups are performed by Mann-Whitney test. (L) CFSE dilution of immunodominant CTL responses from a B*57+ controller and B*57+ progressor. (M) Network scores of residues in B*57 IW9 (Gag p24 15-23) and B*57 IF9 (Vif 31-39) CTL epitopes targeted by controller and progressor. The sequences of SEQ ID NO: 204 (left) and SEQ ID NO: 199 (right) are shown. (N) Comparison of magnitude of CTL proliferation between a subset of controllers (C) and progressors (P) selected for having similar proliferative responses. Statistical comparisons between patient groups are performed by Mann-Whitney test. (O) Comparison of summed epitope network scores between the same subset of controllers (C) and progressors (P). Statistical comparisons between patient groups are performed by Mann-Whitney test. Calculated p-values indicated as follows (*: p<0.05; : p<0.01; *: p<0.001; ****: p<0.0001).

Evaluation of a representative controller and progressor, with similar magnitude of proliferative CTL responses, revealed a striking difference in the network scores of the targeted epitopes (FIG. 13A, B). The A*02 KL9 epitope (gp120 121-129), which was immunodominant in the controller (FIG. 1313, upper), contained highly networked residues in both HLA anchor and TCR contact sites (FIG. 13C, upper), consistent with the role of these residues in mediating critical bridging interactions within the V1V2 stem of gp120 (FIG. 13D). In contrast, the B*07 RHO epitope (gp120 298-307) targeted by the progressor (FIG. 13B, lower) is comprised of low scoring residues that occupy the highly flexible V3 loop (FIG. 13C, D, lower). This suggested that the differences in viral control between these two individuals could be attributed to the specificity of their CTL responses, and more precisely, to the relative topological importance of these epitopes within the native viral protein structure, even in the absence of a response restricted by a protective HLA allele.

Figure 10:
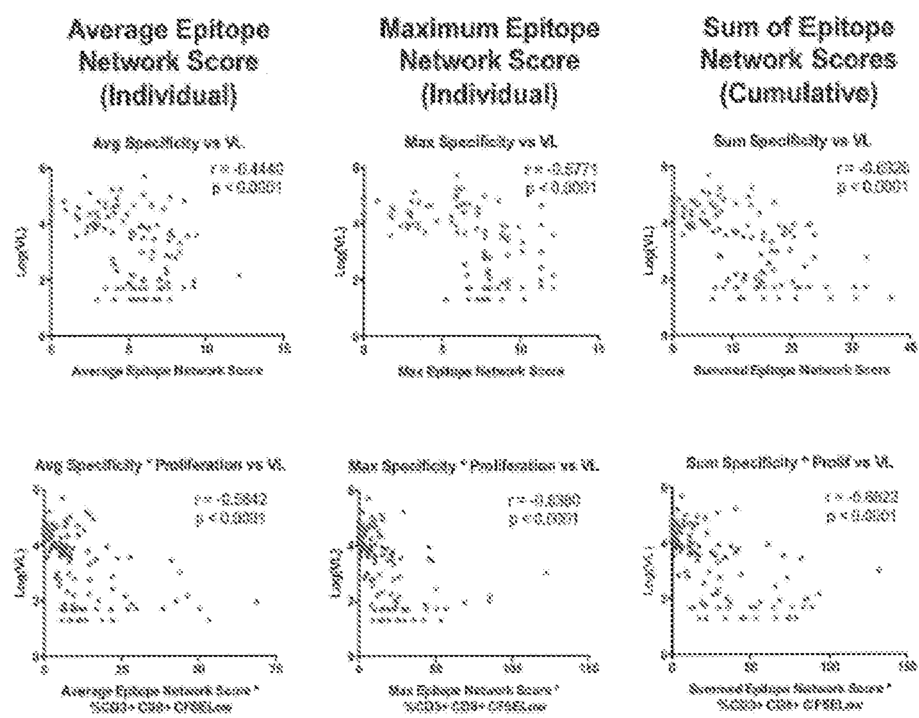
FIG. 10 is a series of graphs showing the correlation of CTL response metrics and epitope network scores of controller, intermediate and progressor patients with viral loads. (Top row) Correlation of average epitope network score, maximum epitope network score and sum of epitope network scores of patient responses with viral load. (Bottom row) Correlation of average epitope network score, maximum epitope network score and sum of epitope network scores scaled by CD8+ T cell proliferation reveals improvements in the predictive capability of viral load and continues to support the role of cumulative epitope responses as a better predictor of viral control than individual epitope response metrics. Correlation statistics calculated by Spearman correlation.
Figures 15A, 15B:
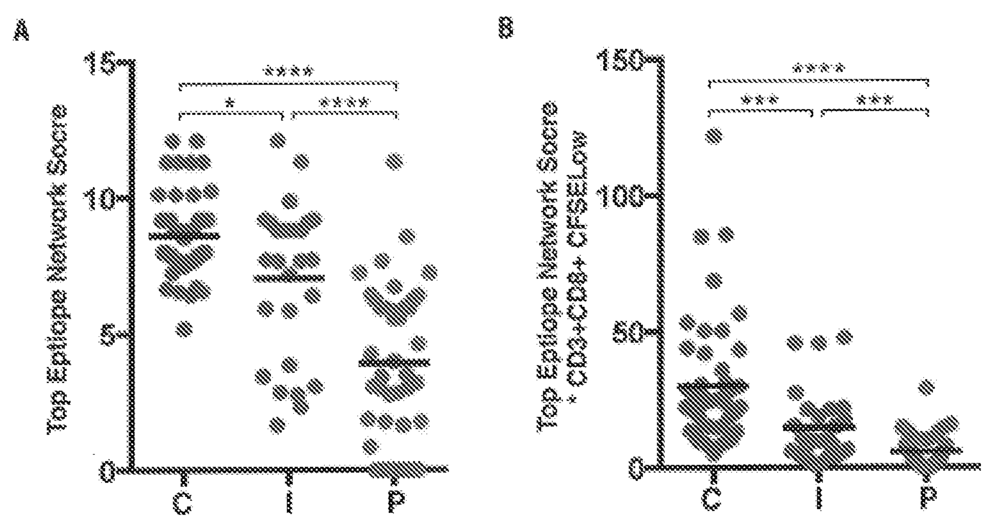
FIG. 15 (A-B). Comparison of Maximum Epitope Network Scores between Individuals of Controller, Intermediate and Progressor phenotype. (A) Composite differences in the maximum epitope network scores for all targeted CTL epitopes between controllers (C), intermediates (I) and progressors (P). Statistical comparisons between individual patient groups are performed by Mann Whitney U test. (B) Composite differences in maximum epitope network score scaled by magnitude of proliferative CTL response between controllers (C), intermediates (I) and progressors (P). Statistical comparisons between patient groups were made using Mann Whitney U test. Calculated p-values indicated as follows: NS, not significant; *, p<0.05; , p<0.01; *, p<0.001; ****, p<0.0001.

Cumulative assessment of all patients in the cohort revealed that controllers preferentially targeted epitopes with high network scores with their proliferative CD8+ T cell responses, while individuals with intermediate or high viral loads had weak or absent responses against highly networked epitopes (FIG. 13E). Among the novel high network scoring epitopes targeted by multiple controllers were A*29/Cw*06 YT9 (Nef 120-128), A*26 EL9 (Gag p24 35-43), B*S1/Cw*03/Cw*15 RL9 (gp41 46-54) and A *24 RW8 (Nef 134-141). In addition, the highest magnitude responses found in progressors were primarily directed against epitopes with the lowest network scores (FIG. 13E), which included A *02 IV9 (RT 309-317), A*30 KYY9 (Integrase 219-227) and Cw*07 RY11 (Nef 105-115). Statistical analysis confirmed that epitope network score significantly differentiated controllers from progressors (FIG. 13F), which has not previously been accomplished by sequence conservation analysis. Epitope network score also distinguished controllers from intermediate patients, and intermediate patients from progressors (FIG. 13F). While these patients could be differentiated by CTL proliferation alone (FIG. 13G), they became further distinguished when the magnitude of CTL proliferation for each response was adjusted by the epitope network score of the targeted epitope (FIG. 13H), suggesting a key role for both the function and specificity of CTL responses in immunologic control of HIV. A similar differentiation of the three patient groups was observed when their CTL responses were normalized and compared based on their single highest scoring epitope (FIG. 15). Moreover, we also observed a strong inverse correlation between summed epitope network and viral load (Spearman's r=−0.63, p<0.0001) (FIG. 10).

To further explore the relationship between immunologic control and the targeting of topologically important epitopes, three additional sub-analyses were performed. First, controllers were compared with protective HLA alleles to those with non-protective HLA alleles and found no significant difference in the network scores of targeted epitopes when analyzed alone (FIG. 13I) or when the magnitude of epitope-specific CTL proliferation was incorporated (FIG. 13J), indicating that viral control through the targeting of networked epitopes does not require the expression of protective HLA alleles. Second, the controllers and progressors in our cohort expressing HLA-B*57 were evaluated and a significant difference in epitope network scores scaled by magnitude of proliferative CD8+ T cell response (FIG. 13K) was observed. A representative example involves a HLA-B*57+ controller with an immunodominant response to the high network scoring IW9 epitope (Gag p24 15-23), which mediates N-terminal domain-N-terminal domain interface interactions involved in p24 multimerization, and a HLA-B57+ progressor with immunodominant targeting of the low network scoring 1F9 epitope located at the surface of the accessory protein Vif (31-39) (FIGS. 13, L and M). This was consistent with the observation that while the HLA-B*57 allele strongly increases the likelihood of immune control, it is not sufficient on its own and additionally requires the targeting of a topologically important epitope. Third, to control for differences in T cell functionality, a subset of controllers and progressors were compared, with statistically similar magnitudes of proliferative CTL responses (FIG. 13N), and a significant difference in the sum of network scores of targeted epitopes was detected (FIG. 13O). Collectively, these sub-analyses demonstrated that CTL targeting of high network scoring epitopes was an important component of immune control across diverse HLA alleles and distinct from CTL function.

Figures 14A, 14B, 14C, 14D, 14E, 14F, 14G, 14H, 14I:
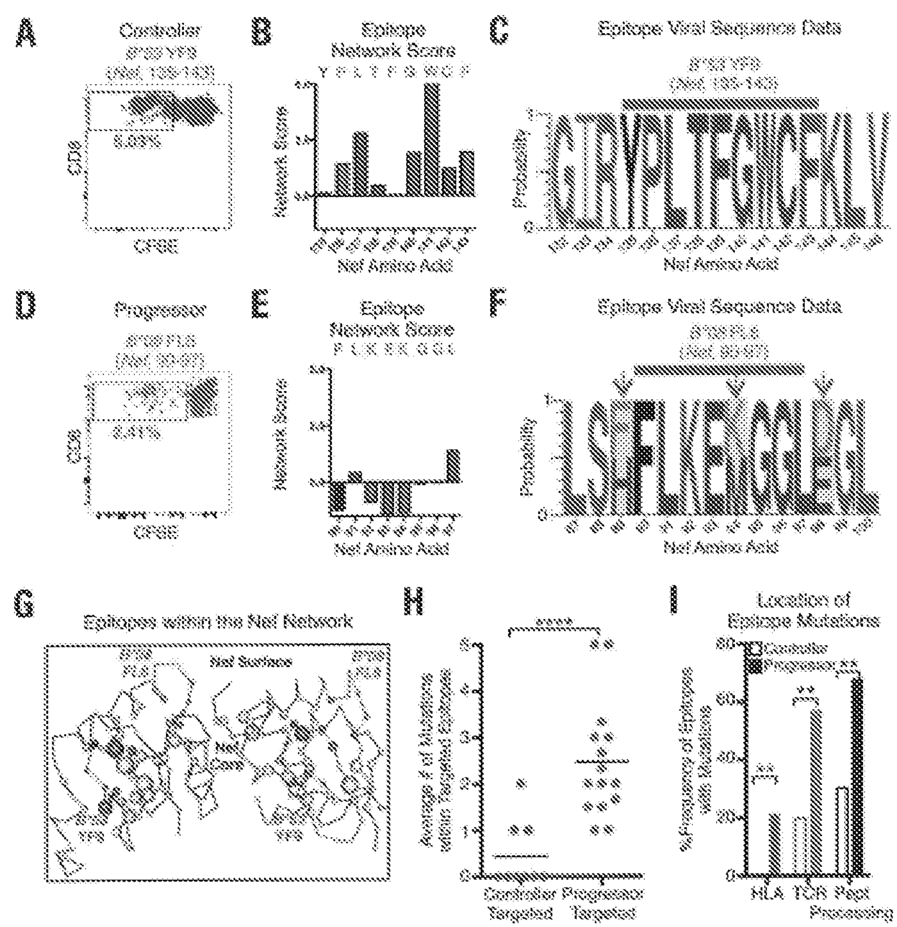
FIGS. 14 (A-I) are a series of graphs and a schematic showing that topologically important CTL epitopes targeted by HIV controllers are infrequently mutated in vivo. (A) CFSE dilution of immunodominant CTL response targeting the B*53 YF9 epitope from a controller. (B) Network scores of residues in the B*53 YF9 epitope. The sequence of SEQ ID NO: 228 is shown. (C) Weblogo of B*53 YF9 epitope sequence data obtained from plasma virus isolated from controller with B*53 YF9 response. Location of epitope indicated by bar. The sequence of SEQ ID NO: 384 is shown. (D) CFSE dilution of immunodominant CTL response targeting the B*08 FL8 epitope from a progressor. (E) Network scores of residues in the B*08 FL8 epitope. The sequence of SEQ ID NO: 106 is shown. (F) Weblogo of B*08 FL8 epitope sequence data obtained from plasma virus isolated from progressor with B*08 FL8 response. Location of epitope indicated by bar. Mutations within the epitope denoted by arrows and shading. The sequence of SEQ ID NO: 385 is shown. (G) Network representation of the B*08 FL8 and B*53 YF9 epitopes within the Nef dimer (PDB: 2XI1). (H) Comparison of high network scoring and low network scoring epitopes by number of overall mutations. Statistical comparison performed by nonparametric Mann-Whitney test. (I) Comparison of the percent frequency of mutations at HLA anchor, TCR contact and flanking residues between high network scoring (open bars) and low network scoring epitopes (filled bars). Statistical comparisons performed by non-parametric Mann-Whitney tests. Calculated p-values indicated as follows (*, p<0.05; , p<0.01; *, p<0.001; ****, p<0.0001).

To determine whether high and low network scoring epitopes had distinct evolutionary constraints, plasma viral sequence analysis of targeted epitopes from 9 controllers and 15 progressors was performed, who were selected based on having proliferative CD8+ T cell responses of similar magnitude and expression of both protective and non-protective alleles. A representative example of these data for two epitopes from Nef (B*53 YF9, 135-143; B*08 FL8, 90-97; FIG. 14, A. D) revealed no sequence variation in the high network scoring B*53 YF9 epitope (FIG. B and C), but numerous mutations in the low network scoring B*08 FL8 epitope (FIGS. 14 E and F), which led to the abrogation of epitope-specific CTL reactivity. The fact that the YF9 epitope did not incur any mutations, despite robust CTL targeting (FIG. 14A), demonstrated the link between its topological importance within both subunits of the Nef dimer and its mutational constraint (FIG. 14G). Assessment of viral epitope sequence data from the group of controllers and progressors revealed statistically significant differences in overall mutation frequency (FIG. 14H), and specifically at HLA anchor and TCR contact sites (FIG. 14I). Notably, only 3 of the 9 epitopes targeted by controllers were restricted by protective HLA alleles.

Here, a new approach was applied—structure-based network analysis—to define the topological importance of residues and CTL epitopes across the HIV proteome. The unique perspective provided by this analysis indicates that CTL targeting of epitopes that contain topologically important viral residues at HLA anchor, TCR contact and flanking epitope sites is a broad mechanism to achieve immune control. Moreover, the identification of high network scoring epitopes that are presented by non-protective HLA alleles, but which constitute major HLA supertypes (e.g. HLA-A *02, A*03, B*07 etc.) provides the basis for the rational design of a CTL-based 1V vaccine with global relevance and coverage. These data demonstrate that a component of prophylactic and therapeutic vaccination can focus functional CTL responses against topologically important epitopes, presented by both protective and non-protective alleles, which are subdominant and not commonly targeted during natural infection.

Example 4

Cumulative Epitope Responses Lead to Better HIV Control than Single Epitope Responses To assess whether combinations of epitopes are more potent at inducing and predicting HIV control, a subanalysis of CD8+ T cell targeting data was performed with the network scores of targeted epitopes from 114 patients with diverse clinical phenotypes (Controllers [VL<2000]=45, Intermediate [VL 2000-1000]=26, Progressors [VL >10000]=43). This data was used to assess whether individual epitope metrics (such as the average epitope network score or maximum epitope network score) or a cumulative epitope network score metric (sum of the combination of epitope network scores) better correlated with clinical viral load. As seen in FIG. 10, in both the presence and absence of proliferative CD8+ T cell data, cumulative epitope network scores had higher Spearman correlation coefficients with viral load than either average or maximum epitope network score values across the entire cohort of patients. This suggests that functional CD8+ T cell responses against a combination of networked epitopes are better able to induce and predict viral control than responses to individual epitopes. These findings, coupled with the broader population coverage provided by combinations of networked epitopes, additionally supports the advantage of combinations of epitopes over individual epitopes.

Example 5

Multi-Epitope Immunogens Elicit De Novo CD8+ T Cell Responses In Vivo

Figures 17A, 17B:
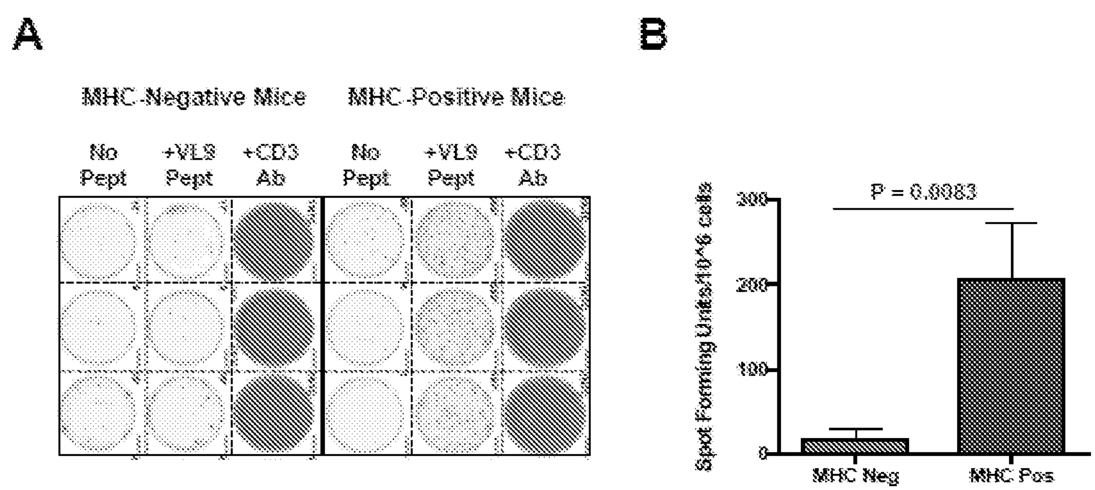
FIGS. 17 (A) and (B) depicts statistically significant induction of VL9-specific IFN-γ responses only in the MHC positive mice, but not in MHC negative mice.

Next, a number of LNP-replicons were generated encoding multi-epitope immunogens encoding either highly networked HLA-A2 or non-HLA-A2 epitopes, and with or without the universal helper epitope PADRE (FIG. 17A). This was accomplished by cloning these constructs into a Venezuelan Equine Encephalitis (VEE) alphavirus replicon vector, followed by performing in vitro transcription to generate RNA molecules and encapsulation into lipid nanoparticles. To test the importance of lipid encapsulation, a RNA replicon encoding the mCherry reporter protein (2 ug) was delivered to HLA-A2+ HepG2 cells for 36 hours with and without lipid encapsulation. As determined by flow cytometry, only lipid-encapsulated mCherry encoded replicon RNA led to measurable intracellular mCherry protein expression (FIG. 17B). Based on these results, lipid encapsulated multi-epitope immunogen constructs (2 ug) were delivered to HLA-A2+ HepG2 cells for 36 hours, prior to co-incubation with epitope-specific CTL clones targeting two of the central epitopes in the multi-epitope immunogen (A*02 SL9, A*02 IV9). This led to robust IFN-γ ELISpot responses only for the multi-epitope immunogens that encoded HLA-A2 epitopes, and not for those that encoded non-HLA-A2 epitopes (FIG. 17C). This demonstrated that highly networked epitopes could be successfully incorporated into a nucleic acid-based platform, delivered to HLA-expressing cells, be translated from RNA to protein and processed intracellularly, and then be presented on the appropriate HLA class I molecules prior to epitope-specific CTL recognition.

To test the in vivo immunogenicity of these multi-epitope immunogens, lipid-encapsulated RNA replicons encoding highly networked HLA-A2 epitopes with or without PADRE (4 ug) (FIG. 16A), and an empty lipid nanoparticle group, were delivered to HLA-A2 transgenic mice by intra-muscular injection (CB6F1-Tg(HLA-A*0201/H2-Kb)A*0201; Taconic Biosciences) on day 0 and day 14 (FIG. 16B). On day 28, spleens from immunized mice were isolated and processed to obtain splenocytes. To determine whether de novo CTL responses to highly networked epitopes had been elicited by RNA replicon immunization, 1×106 splenocytes were incubated in the presence and absence of a pool of peptides that match the highly networked HLA-A2 epitopes incorporated into the replicon immunogen. This led to robust IFN-γ ELISpot responses only in the mice vaccinated with one of the HLA-A2 encoding immunogens (FIG. 16C). Additionally, these studies demonstrated that highly networked epitopes could be incorporated with a universal CD4+ T cell help epitope into a multi-epitope immunogen and elicit de novo CTL responses, with the CD4+ T cell helper epitope actually enhancing the induction of CD8+ T cell responses (FIG. 16D).

To validate that highly networked epitopes were being presented in the appropriate MHC context, MHC-positive mice (C57Bl/6, which have MHC with high affinity for highly networked A2+ VL9 epitope) and MHC-negative mice (Balb/C, which have MHC with negligible affinity for highly networked A2+VL9 epitope) were immunized with a five-epitope RNA replicon immunogen containing highly networked HLA-A2 epitopes and the PADRE epitope. Immunization with 4 μg of replicon RNA took place on day 0 and 14, and spleens were harvested on day 28. Isolated splenocytes (1×10^6) were then incubated with no peptide, highly networked VL9 peptide or anti-mouse CD3 antibody (positive control). This led to a statistically significant induction of VL9-specific IFN-γ responses only in the MHC positive mice, but not in MHC negative mice (FIG. 17A, 17B), indicating the highly networked epitopes were inducing epitope-specific responses in the appropriate MHC context.

Figures 18A, 18B, 18C:
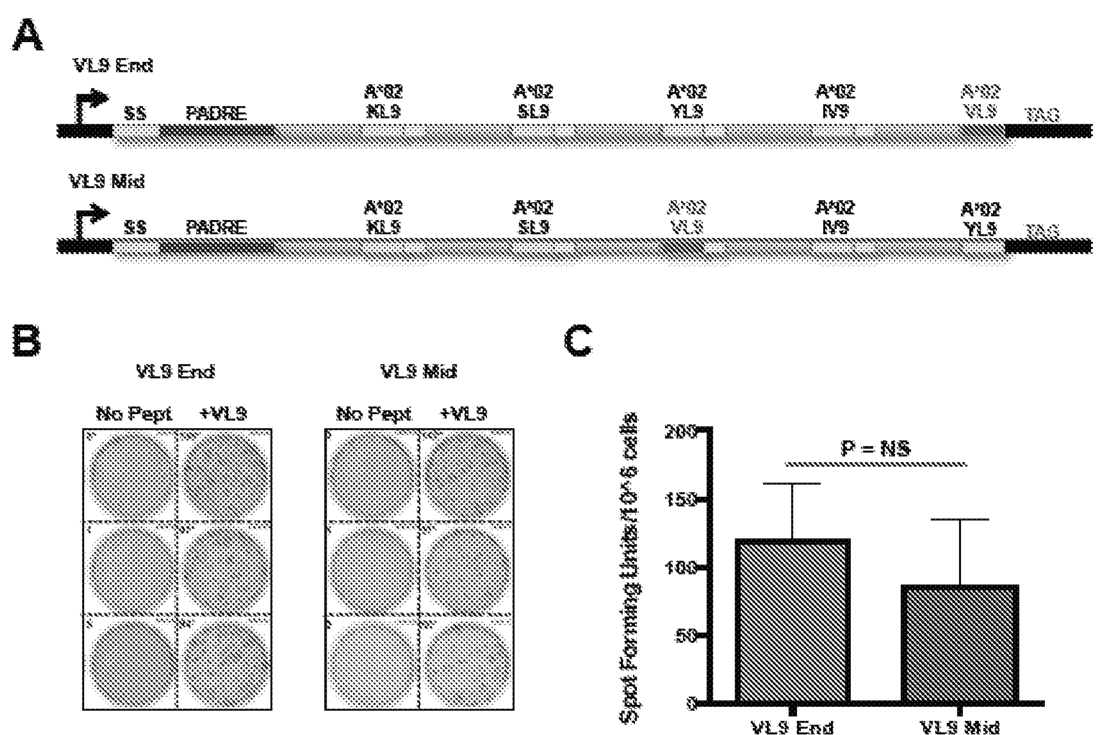
FIG. 18 (A) depicts the immunogenicity of an RNA replicon construct incorporating the VL9 epitope in epitope position 3 of vaccine construct compared to a construct where the VL9 epitope was at the end of the immunogen.

Next, whether the location of the highly networked VL9 epitope within the multi-epitope immunogen affected its ability to induce de novo CTL responses in MHC-positive mice was assessed. An additional RNA replicon construct was generated, which incorporated the VL9 epitope in epitope position 3 of the vaccine construct, and compared its immunogenicity with a construct where the VL9 epitope was at the end of the immunogen (FIG. 18A). Following immunization of MHC-positive mice on day 0 and day 14 with 4 μg of replicon RNA, spleens were harvested on day 28 and splenocytes were isolated. Incubation of 1×106 splenocytes with highly networked VL9 peptide revealed no significant difference in the induction of VL9-specific CD8+ T cell responses (FIG. 18B, 18C), indicating that highly networked epitopes could be incorporated in multiple positions within a multi-epitope immunogen and still retain immunogenicity.

Figures 19A, 19B:
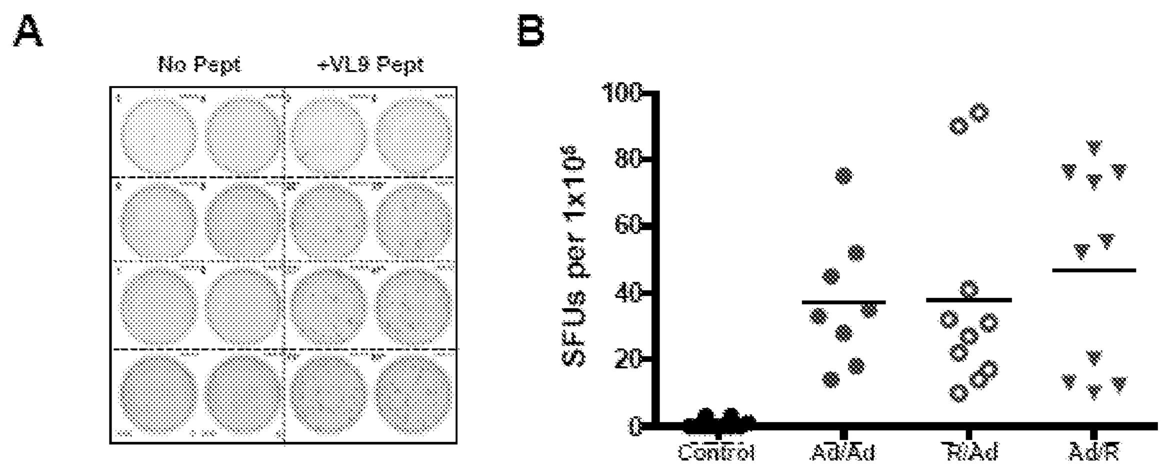
FIGS. 19 (A) and (B) depicts responses to the highly networked epitope VL9 by IFN-γ ELISpot assay.

An adenoviral vector encoding a multi-epitope immunogen with highly networked HLA-A2 epitopes was evaluated for its capacity to induce de novo CD8+ T cell responses in MHC-positive mice. To accomplish this, adenoviruses (1×109 viral particles) were delivered on day 0 and day 14 to C57Bl/6 mice (Ad/Ad) and harvested spleens on day 28. Adenoviral vectors were also delivered as a day 0 prime with day 14 replicon boost (Ad/R) and as a day 14 boost following a day 0 replicon prime (R/Ad). Responses to the highly networked epitope VL9 by IFN-γ ELISpot was assessed, which revealed significant induction across all three groups (FIG. 19A, 19B). This demonstrated that in addition to a nucleic acid-based platform (RNA replicons), highly networked epitopes could be incorporated into a multi-epitope immunogen within a viral vector-based platform (adenovirus) and also elicit de novo, epitope-specific CTL responses.

In addition to RNA replicons and adenoviral vectors, messenger RNA multi-epitope constructs encapsulated in lipid nanoparticles were generated. These constructs contained ten epitopes which included highly networked epitopes restricted by HLA-A*02, HLA-A*03, HLA-A*11 and HLA-B*07 (FIG. 20A). Two constructs were generated which had each epitope flanked by an N-terminal ERSS and C-terminal furin cleavage site (mRNA vaccine #1) or a single ERSS at the N-terminus of the multi-epitope construct, followed by each epitope being flanked by furin cleavage sequences (mRNA vaccine #2). These constructs were then delivered at two concentrations (2 ug or 10 ug) at day 0 and day 7 to HLA-A*11 transgenic mice, prior to spleen harvest on day 14 and splenocyte isolation (FIG. 20B). Incubation of splenocytes (5×105) with the A11-restricted AK9 epitope, which was located at position 6 of the 10 epitope construct, led to a statistically significant induction of IFN-γ ELISpot response in comparison to negative control immunized animals (FIG. 20C, 20D). This demonstrated that a multi-epitope immunogen containing highly networked epitopes restricted by 4 HLA alleles (which collectively provide >80% coverage of the global population) was able to induce epitope-specific CD8+ T cells, in an HLA-restricted manner, in vivo.

The Examples are put forth for illustrative purposes only and are not intended to limit the scope of what the inventors regard as their invention.

All references cited herein, including patents, patent applications, papers, text books, and the like, and the references cited therein, to the extent that they are not already, are hereby incorporated herein by reference in their entirety. Although the forgoing invention has been described in some detail by way of illustration and example for clarity and understanding, it will be readily apparent to one ordinary skill in the art in light of the teachings of this invention that certain variations, changes, modifications and substitution of equivalents may be made thereto without necessarily departing from the spirit and scope of this invention. As a result, the implementations described herein are subject to various modifications, changes and the like, with the scope of this invention being determined solely by reference to the claims appended hereto. Those of skill in the art will readily recognize a variety of non-critical parameters that could be changed, altered or modified to yield essentially similar results.

Having described the invention, we claim:

1. A multi-epitope T cell immunogen composition comprising two highly networked human immunodeficiency virus (HIV) cytotoxic T lymphocyte (CTL) epitopes, wherein the two highly networked HIV CTL epitopes are human leukocyte antigen (HLA)-B*57 KAFSPEVIPMF (KF11) (SEQ ID NO:201) and HLA-B*57 TSTLQEQIGW (TW10) (SEQ ID NO:202), or wherein the amino acid sequences of the highly networked HIV CTL epitopes have at least about 75% to about 99% homology to the amino acid sequences of HLA-B*57 KF11 and HLA-B*57 TW10.

2. A multi-epitope T cell immunogen composition comprising two or more highly networked HIV CTL epitopes, wherein the two highly networked HIV CTL epitopes are HLA-B*57 KAFSPEVIPMF (KF11) (SEQ ID NO:201) and HLA-B*57 TSTLQEQIGW (TW10) (SEQ ID NO:202), and further comprising at least ten HIV CTL epitopes, wherein the ten HIV CTL epitopes are HLA-A*11 AVDLSHFLK (AK9) (SEQ ID NO: 40) and highly networked epitopes restricted by HLA-A*02, HLA-A*03, HLA-A*11 or HLA-B*07 are selected from the group consisting of HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*02 KLTPLCVTL (KL9) (SEQ ID NO: 11), HLA-B*07 SPRTLNAWV (SV9) (SEQ ID NO: 88), HLA-A*02 PLTFGWCYKL (PL10) (SEQ ID NO: 10), and B*07 TPGPGVRYPL (TL10) (SEQ ID NO: 98), or wherein the amino acid sequences of the HIV CTL epitopes have at least about 75% to about 99% homology to the amino acid sequences of HLA-B*57 KAFSPEVIPMF (KF11) (SEQ ID NO:201) and HLA-B*57 TSTLQEQIGW (TW10) (SEQ ID NO:202), HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*11 AVDLSHFLK (AK9) (SEQ ID NO: 40), HLA-A*02 KLTPLCVTL (KL9) (SEQ ID NO: 11), HLA-B*07 SPRTLNAWV (SV9) (SEQ ID NO: 88), HLA-A*02 PLTFGWCYKL (PL10) (SEQ ID NO: 10), and B*07 TPGPGVRYPL (TL10) (SEQ ID NO: 98).

3. A multi-epitope T cell immunogen composition comprising two highly networked HIV CTL epitopes HLA-B*57 KAFSPEVIPMF (KF11) (SEQ ID NO:201) and HLA-B*57 TSTLQEQIGW (TW10) (SEQ ID NO:202), or amino acid sequences having at least about 75% to about 99% homology to the amino acid sequences of HLA-B*57 KF11 of and HLA-B*57 TW10 and further comprising two highly networked HIV CTL epitopes restricted by HLA-E*101 and HLA-E*103, wherein the two highly networked HIV CTL epitopes are selected from HLA-E*101/E*103 SALSEGATP (SEQ ID NO: 261), HLA-E*101/E*103 RMYSPTSIL (SEQ ID NO: 262), HLA-E*101/E*103 AISPRTLNA (SEQ ID NO: 265), HLA-E*101/E*103 STLQEQIGW (SEQ ID NO: 266), HLA-E*101/E*103 HQAISPRTL (SEQ ID NO: 270), and HLA-E*101/E*103 VGGHQAAMQ (SEQ ID NO: 271).

4. A method of preventing HIV infection in a subject, the method comprising:

administering to the subject a prophylactically effective amount of the multi-epitope T cell immunogen composition of claim 1, and a pharmaceutically acceptable carrier, thereby preventing HIV infection in the subject.

5. An RNA vector comprising a multi-epitope T cell immunogen, wherein the vector comprises a sequence comprising two or more highly networked HIV CTL epitopes, wherein the two or more highly networked HIV CTL epitopes each have a network score from 3.04 to 9.05.

6. The RNA vector of claim 5, wherein the two or more highly networked HIV CTL epitopes each have a network score of at least 3.06.

7. The RNA vector of claim 5, wherein, for each of the highly networked HIV CTL epitopes, the RNA vector comprises an endoplasmic reticulum insertion signal sequence (ERISS).

8. The RNA vector of claim 5, wherein, for each of the highly networked HIV CTL epitopes, the RNA vector comprises an enzyme cleavage site sequence.

9. The RNA vector of claim 8, wherein the enzyme cleavage site is a furin cleavage site sequence.

10. The RNA vector of claim 5, wherein the sequences comprising the two or more highly networked HIV CTL epitopes are linked by a linker sequence.

11. The RNA vector of claim 10, wherein the linker sequence comprises Alanine and Tyrosine.

12. The RNA vector of claim 5, wherein two of the highly networked HIV CTL epitopes are HLA-B*57 KAFSPEVIPMF (KF11) (SEQ ID NO:201) and HLA-B*57 TSTLQEQIGW (TW10) (SEQ ID NO:202), or wherein the two or more highly networked HIV CTL epitopes are selected from the group consisting of HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), and HLA-B*40 SEGATPQDL (SEQ ID NO: 161), or wherein the two or more highly networked HIV CTL epitopes are selected from the group consisting of HLA-A*01/A*29/B*35/B*57 YFPDWQNYT (SEQ ID NO: 2), HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-A*11 ACQGVGGPGHK (SEQ ID NO: 43), HLA-A*24 RDYVDRFYKTL (SEQ ID NO: 54), HLA-A*26 EVIPMFSAL (SEQ ID NO: 59), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), HLA-B*14 VRMYSPVSI (SEQ ID NO: 216), HLA-B*14 DRFYKTLRA (SEQ ID NO: 112), HLA-B*14 IRYQYNVL (SEQ ID NO: 111), HLA-B*1501 GLNKIVRMY (SEQ ID NO: 116), HLA-B*1510/B*3901 GHQAAMQML (SEQ ID NO: 130), HLA-B*18/B*53 YPLTFGWCY (SEQ ID NO: 135), HLA-B*27 TRYPLTFGW (SEQ ID NO: 75), HLA-B*27 KRKGGIGGY (SEQ ID NO: 140), HLA-B*27 KRWIILGLNK (SEQ ID NO: 141), HLA-B*40 SEGATPQDL (SEQ ID NO: 161), HLA-B*40 GERIVDII (SEQ ID NO: 168), HLA-B*44 EEKAFSPEV (SEQ ID NO: 178), HLA-B*44 AEQASQDVKNW (SEQ ID NO: 176), HLA-B*49 TWEAWWTEYW (SEQ ID NO: 182), HLA-B*51/Cw*03/Cw*15 RAIEAQQHL (SEQ ID NO: 183), HLA-B*53/B*57 QASQEVKNW (SEQ ID NO: 189), HLA-B*57 IAMESIVIW (SEQ ID NO: 195), HLA-B*57 ISPRTLNAW (SEQ ID NO: 204), HLA-B*57 KAFSPEVIPMF (SEQ ID NO: 201), HLA-B*57 TSTLQEQIGW (SEQ ID NO: 202), HLA-B*81 TPVNIIGRNML (SEQ ID NO: 240), and HLA-Cw*08 IVTDSQYAL (SEQ ID NO: 246), or wherein the two or more highly networked HIV CTL epitopes are selected from the group consisting of HLA-E*101/HLA-E*103 SALSEGATP (SEQ ID NO: 261), HLA-E*101/HLA-E*103 VGGHQAAMQ (SEQ ID NO: 271), HLA-E*101/HLA-E*103 HQAISPRTL (SEQ ID NO: 270), HLA-E*101/HLA-E*103 RIRTWKSLV (SEQ ID NO: 264), HLA-E*101/HLA-E*103 RMYSPTSIL (SEQ ID NO: 262), HLA-E*101/HLA-E*103 AISPRTLNA (SEQ ID NO: 265), and HLA-E*101/HLA-E*103 STLQEQIGW (SEQ ID NO: 266), or wherein the two or more highly networked HIV CTL epitopes are selected from the group consisting of HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), HLA-B*40 SEGATPQDL (SEQ ID NO: 161), HLA-E*101/HLA-E*103 SALSEGATP (SEQ ID NO: 261), HLA-E*101/HLA-E*103 VGGHQAAMQ (SEQ ID NO: 271), HLA-E*101/HLA-E*103 HQAISPRTL (SEQ ID NO: 270), HLA-E*101/HLA-E*103 RMYSPTSIL (SEQ ID NO: 262), HLA-E*101/HLA-E*103 AISPRTLNA (SEQ ID NO: 265), and HLA-E*101/HLA-E*103 STLQEQIGW (SEQ ID NO: 266), or wherein the two or more highly networked HIV CTL epitopes are selected from the group consisting of HLA-A*01/A*29/B*35/B*57 YFPDWQNYT (SEQ ID NO: 2), HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-A*11 ACQGVGGPGHK (SEQ ID NO: 43), HLA-A*24 RDYVDRFYKTL (SEQ ID NO: 54), HLA-A*26 EVIPMFSAL (SEQ ID NO: 59), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), HLA-B*14 VRMYSPVSI (SEQ ID NO: 216), HLA-B*14 DRFYKTLRA (SEQ ID NO: 112), HLA-B*14 IRYQYNVL (SEQ ID NO: 111), HLA-B*1501 GLNKIVRMY (SEQ ID NO: 116), HLA-B*1510/B*3901 GHQAAMQML (SEQ ID NO: 130), HLA-B*18/B*53 YPLTFGWCY (SEQ ID NO: 135), HLA-B*27 TRYPLTFGW (SEQ ID NO: 75), HLA-B*27 KRKGGIGGY (SEQ ID NO: 140), HLA-B*27 KRWIILGLNK (SEQ ID NO: 141), HLA-B*40 SEGATPQDL (SEQ ID NO: 161), HLA-B*40 GERIVDII (SEQ ID NO: 168), HLA-B*44 EEKAFSPEV (SEQ ID NO: 178), HLA-B*44 AEQASQDVKNW (SEQ ID NO: 176), HLA-B*49 TWEAWWTEYW (SEQ ID NO: 182), HLA-B*51/Cw*03/Cw*15 RAIEAQQHL (SEQ ID NO: 183), HLA-B*53/B*57 QASQEVKNW (SEQ ID NO: 189), HLA-B*57 IAMESIVIW (SEQ ID NO: 195), HLA-B*57 ISPRTLNAW (SEQ ID NO: 204), HLA-B*57 KAFSPEVIPMF (SEQ ID NO: 201), HLA-B*57 TSTLQEQIGW (SEQ ID NO: 202), HLA-B*81 TPVNIIGRNML (SEQ ID NO: 240), HLA-Cw*08 IVTDSQYAL (SEQ ID NO: 246), HLA-E*101/HLA-E*103 SALSEGATP (SEQ ID NO: 261), HLA-E*101/HLA-E*103 VGGHQAAMQ (SEQ ID NO: 271), HLA-E*101/HLA-E*103 HQAISPRTL (SEQ ID NO: 270), HLA-E*101/HLA-E*103 RMYSPTSIL (SEQ ID NO: 262), HLA-E*101/HLA-E*103 AISPRTLNA (SEQ ID NO: 265), and HLA-E*101/HLA-E*103 STLQEQIGW (SEQ ID NO: 266).

13. The RNA vector of claim 5, wherein the vector comprises sequences comprising highly networked HIV CTL epitopes having at least about 75% to about 99% homology to epitopes HLA-B*57 KAFSPEVIPMF (KF11) (SEQ ID NO:201) and HLA-B*57 TSTLQEQIGW (TW10) (SEQ ID NO:202), or wherein the vector comprises sequences comprising highly networked HIV CTL epitopes having at least 65% to about 99% homology to epitopes HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), and HLA-B*40 SEGATPQDL (SEQ ID NO: 161), or wherein the vector comprises sequences comprising highly networked HIV CTL epitopes having at least 65% to about 99% homology to epitopes HLA-A*01/A*29/B*35/B*57 YFPDWQNYT (SEQ ID NO: 2), HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-A*11 ACQGVGGPGHK (SEQ ID NO: 43), HLA-A*24 RDYVDRFYKTL (SEQ ID NO: 54), HLA-A*26 EVIPMFSAL (SEQ ID NO: 59), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), HLA-B*14 VRMYSPVSI (SEQ ID NO: 216), HLA-B*14 DRFYKTLRA (SEQ ID NO: 112), HLA-B*14 IRYQYNVL (SEQ ID NO: 111), HLA-B*1501 GLNKIVRMY (SEQ ID NO: 116), HLA-B*1510/B*3901 GHQAAMQML (SEQ ID NO: 130), HLA-B*18/B*53 YPLTFGWCY (SEQ ID NO: 135), HLA-B*27 TRYPLTFGW (SEQ ID NO: 75), HLA-B*27 KRKGGIGGY (SEQ ID NO: 140), HLA-B*27 KRWIILGLNK (SEQ ID NO: 141), HLA-B*40 SEGATPQDL (SEQ ID NO: 161), HLA-B*40 GERIVDII (SEQ ID NO: 168), HLA-B*44 EEKAFSPEV (SEQ ID NO: 178), HLA-B*44 AEQASQDVKNW (SEQ ID NO: 176), HLA-B*49 TWEAWWTEYW (SEQ ID NO: 182), HLA-B*51/Cw*03/Cw*15 RAIEAQQHL (SEQ ID NO: 183), HLA-B*53/B*57 QASQEVKNW (SEQ ID NO: 189), HLA-B*57 IAMESIVIW (SEQ ID NO: 195), HLA-B*57 ISPRTLNAW (SEQ ID NO: 204), HLA-B*57 KAFSPEVIPMF (SEQ ID NO: 201), HLA-B*57 TSTLQEQIGW (SEQ ID NO: 202), HLA-B*81 TPVNIIGRNML (SEQ ID NO: 240), and HLA-Cw*08 IVTDSQYAL (SEQ ID NO: 246), or wherein the vector comprises sequences comprising highly networked HIV CTL epitopes having at least 65% to about 99% homology to epitopes HLA-E*101/HLA-E*103 SALSEGATP (SEQ ID NO: 261), HLA-E*101/HLA-E*103 VGGHQAAMQ (SEQ ID NO: 271), HLA-E*101/HLA-E*103 HQAISPRTL (SEQ ID NO: 270), HLA-E*101/HLA-E*103 RMYSPTSIL (SEQ ID NO: 262), HLA-E*101/HLA-E*103 AISPRTLNA (SEQ ID NO: 265), HLA-E*101/HLA-E*103 STLQEQIGW (SEQ ID NO: 266), or wherein the vector comprises sequences comprising highly networked HIV CTL epitopes having at least 65% to about 99% homology to epitopes HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), HLA-B*40 SEGATPQDL (SEQ ID NO: 161), HLA-E*101/HLA-E*103 SALSEGATP (SEQ ID NO: 261), HLA-E*101/HLA-E*103 VGGHQAAMQ (SEQ ID NO: 271), HLA-E*101/HLA-E*103 HQAISPRTL (SEQ ID NO: 270), HLA-E*101/HLA-E*103 RMYSPTSIL (SEQ ID NO: 262), HLA-E*101/HLA-E*103 AISPRTLNA (SEQ ID NO: 265), and HLA-E*101/HLA-E*103 STLQEQIGW (SEQ ID NO: 266), or wherein the vector comprises sequences comprising highly networked HIV CTL epitopes having at least 65% to about 99% homology to epitopes HLA-A*01/A*29/B*35/B*57 YFPDWQNYT (SEQ ID NO: 2), HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-A*11 ACQGVGGPGHK (SEQ ID NO: 43), HLA-A*24 RDYVDRFYKTL (SEQ ID NO: 54), HLA-A*26 EVIPMFSAL (SEQ ID NO: 59), HLA-B*07 TPQDLNTML (SEQ ID NO: 97), HLA-B*07 SPRTLNAWV (SEQ ID NO: 88), HLA-B*07 TPGPGVRYPL (SEQ ID NO: 98), HLA-B*14 VRMYSPVSI (SEQ ID NO: 216), HLA-B*14 DRFYKTLRA (SEQ ID NO: 112), HLA-B*14 IRYQYNVL (SEQ ID NO: 111), HLA-B*1501 GLNKIVRMY (SEQ ID NO: 116), HLA-B*1510/B*3901 GHQAAMQML (SEQ ID NO: 130), HLA-B*18/B*53 YPLTFGWCY (SEQ ID NO: 135), HLA-B*27 TRYPLTFGW (SEQ ID NO: 75), HLA-B*27 KRKGGIGGY (SEQ ID NO: 140), HLA-B*27 KRWIILGLNK (SEQ ID NO: 141), HLA-B*40 SEGATPQDL (SEQ ID NO: 161), HLA-B*40 GERIVDII (SEQ ID NO: 168), HLA-B*44 EEKAFSPEV (SEQ ID NO: 178), HLA-B*44 AEQASQDVKNW (SEQ ID NO: 176), HLA-B*49 TWEAWWTEYW (SEQ ID NO: 182), HLA-B*51/Cw*03/Cw*15 RAIEAQQHL (SEQ ID NO: 183), HLA-B*53/B*57 QASQEVKNW (SEQ ID NO: 189), HLA-B*57 IAMESIVIW (SEQ ID NO: 195), HLA-B*57 ISPRTLNAW (SEQ ID NO: 204), HLA-B*57 KAFSPEVIPMF (SEQ ID NO: 201), HLA-B*57 TSTLQEQIGW (SEQ ID NO: 202), HLA-B*81 TPVNIIGRNML (SEQ ID NO: 240), HLA-Cw*08 IVTDSQYAL (SEQ ID NO: 246), HLA-E*101/HLA-E*103 SALSEGATP (SEQ ID NO: 261), HLA-E*101/HLA-E*103 VGGHQAAMQ (SEQ ID NO: 271), HLA-E*101/HLA-E*103 HQAISPRTL (SEQ ID NO: 270), HLA-E*101/HLA-E*103 RMYSPTSIL (SEQ ID NO: 262), HLA-E*101/HLA-E*103 AISPRTLNA (SEQ ID NO: 265), and HLA-E*101/HLA-E*103 STLQEQIGW (SEQ ID NO: 266).

14. A pharmaceutical composition comprising the vector of claim 5.

15. A method of preventing or treating an HIV infection in a subject, said method comprising administering the vector of claim 5 to the subject, thereby preventing or treating the HIV infection in the subject.

16. A viral vector comprising a multi-epitope T cell immunogen, wherein the vector comprises a sequence comprising two or more highly networked HIV CTL epitopes, wherein the two or more highly networked HIV CTL epitopes each have a network score from 3.04 to 9.05, and wherein the viral vector is selected from the group consisting of a human adenovirus, a rhesus adenovirus, adeno-associated virus, Gorilla adenovirus, modified Ankara virus, herpesvirus, and a cytomegalovirus (CMV) viral vector.

17. The RNA vector of claim 5, wherein the RNA sequence is an mRNA, replicon RNA or self-amplifying RNA.

18. The RNA vector of claim 5, comprising HLA-B*57 KAFSPEVIPMF (KF11) (SEQ ID NO: 201) and HLA-B*57 TSTLQEQIGW (TW10) (SEQ ID NO: 202) and further comprising at least ten highly networked HIV CTL epitopes restricted by HLA-A*02, HLA-A*03, HLA-A*11 or HLA-B*07, wherein the ten highly networked HIV CTL epitopes restricted by HLA-A*02, HLA-A*03, HLA-A*11 or HLA-B*07 are HLA-A*02 YVDRFYKTL (SEQ ID NO: 23), HLA-A*02 PLTFGWCYKL (SEQ ID NO: 10), HLA-A*02 KLTPLCVTL (SEQ ID NO: 11), HLA-A*02 VIYQYMDDL (SEQ ID NO: 13), HLA-A*02 LVGPTPVNI (SEQ ID NO: 12), HLA-A*03 GIPHPAGLK (SEQ ID NO: 24), HLA-A*11 ACQGVGGPGHK (SEQ ID NO: 43), HLA-B*07 TPQDLNTML (SEQ ID NO: 97), HLA-B*07 SPRTLNAWV (SEQ ID NO: 88), and HLA-B*07 TPGPGVRYPL (SEQ ID NO: 98) or wherein the amino acid sequences of the highly networked HIV CTL epitopes have at least about 65% to about 99% homology to the amino acid sequences of HLA-B*57 KAFSPEVIPMF (KF11) (SEQ ID NO: 201), HLA-B*57 TSTLQEQIGW (TW10) (SEQ ID NO: 202), HLA-A*02 YVDRFYKTL (YL9) (SEQ ID NO: 23), HLA-A*03 GIPHPAFLK (GK9) (SEQ ID NO: 377), HLA-B*07 TPQDLNTML (TL9) (SEQ ID NO: 97), HLA-A*11 ACQGVGGPGHK (AK11) (SEQ ID NO: 43), HLA-A*02 VL9 VIYQYMDDL (VL9) (SEQ ID NO: 13), HLA-A*02 LVGPTPVNI (SEQ ID NO: 12), HLA-A*11 AVDLSHFLK (AK9) (SEQ ID NO: 40), HLA-A*02 KLTPLCVTL (KL9) (SEQ ID NO: 11), HLA-B*07 SPRTLNAWV (SV9) (SEQ ID NO:88), HLA-A*02 PLTFGWCYKL (PL10) (SEQ ID NO: 10), and B*07 TPGPGVRYPL (SEQ ID NO: 98).

19. A method of preventing HIV infection in a subject, the method comprising administering to the subject a prophylactically effective amount of the multi-epitope T cell immunogen composition of claim 2.

20. A method of preventing HIV infection in a subject, the method comprising administering to the subject a prophylactically effective amount of the multi-epitope T cell immunogen composition of claim 3.

* * * * *